(12) United States Patent
Maeda et al.

(10) Patent No.: US 12,004,073 B2
(45) Date of Patent: Jun. 4, 2024

(54) MOBILE COMMUNICATION SYSTEM

(71) Applicant: Mitsubishi Electric Corporation, Tokyo (JP)

(72) Inventors: Miho Maeda, Tokyo (JP); Mitsuru Mochizuki, Tokyo (JP); Taiga Saegusa, Tokyo (JP); Yasushi Iwane, Tokyo (JP); Yuji Kakehi, Tokyo (JP); Masayuki Nakazawa, Tokyo (JP); Taisei Suemitsu, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 0 days.

(21) Appl. No.: 17/660,879

(22) Filed: Apr. 27, 2022

(65) Prior Publication Data
US 2022/0256442 A1 Aug. 11, 2022

Related U.S. Application Data

(60) Continuation of application No. 15/828,018, filed on Nov. 30, 2017, now Pat. No. 11,350,345, which is a
(Continued)

(30) Foreign Application Priority Data

Nov. 4, 2008 (JP) ................................. 2008-283004
Oct. 2, 2009 (JP) ................................. 2009-230545

(51) Int. Cl.
*H04W 48/08* (2009.01)
*H04W 4/08* (2009.01)
(Continued)

(52) U.S. Cl.
CPC ............. *H04W 48/08* (2013.01); *H04W 4/08* (2013.01); *H04W 8/02* (2013.01); *H04W 72/04* (2013.01); *Y02B 70/30* (2013.01); *Y02D 30/70* (2020.08)

(58) Field of Classification Search
CPC ......... H04W 48/08; H04W 4/08; H04W 8/02; H04W 72/04
See application file for complete search history.

(56) References Cited

U.S. PATENT DOCUMENTS 5,850,603 A 12/1998 Lantoo et al.
6,826,414 B1 11/2004 Reynolds et al.
(Continued)

FOREIGN PATENT DOCUMENTS

AU 2007340610 A1 7/2008
AU 2007340610 B2 2/2013
(Continued)

OTHER PUBLICATIONS

"UE Registration and Access Control", 3GPP TSG RAN WG3 Meeting #61 bis, R3-082468, Rope, Agenda Item: 11.2.2, pp. 1-5, (Sep. 29-Oct. 3, 2008).
(Continued)

*Primary Examiner* — Jamal Javaid
(74) *Attorney, Agent, or Firm* — XSENSUS LLP

(57) ABSTRACT

A closed subscriber group (CSG) cell is a cell that allows use of subscribers. In order to receive the service by the CSG cell, a CSG-ID is required to be notified to a user equipment, which cannot be obtained in a situation outside the reach of radio waves from a non-CSG cell. In a mobile communication system including base stations respectively provided to a CSG cell and a non-CSG cell in which access is made to the CSG cell with the use of a CSG-ID issued in a case where use of the CSG cell is allowed, the base station
(Continued)

provided in the CSG cell refers to the notified identification information of a user equipment and then transmits a tracking area update request from the user equipment to a core network, and the core network determines whether the user equipment is allowed to use the CSG cell and, in the case where the use is allowed, transmits a signal for allowing assignment of radio resources to the user equipment and the CSG-ID. The user equipment accesses the CSG cell with the use of the CSG-ID.

5 Claims, 44 Drawing Sheets

Related U.S. Application Data continuation of application No. 14/807,528, filed on Jul. 23, 2015, now Pat. No. 9,877,268, which is a division of application No. 13/127,632, filed as application No. PCT/JP2009/005622 on Oct. 26, 2009, now Pat. No. 9,713,068.

(51) Int. Cl.
  *H04W 8/02* (2009.01)
  *H04W 72/04* (2023.01)

(56) References Cited

U.S. PATENT DOCUMENTS

| | | | |
|---|---|---|---|
| 6,925,074 | B1 | 8/2005 | Vikberg et al. |
| 7,724,695 | B2 | 5/2010 | Uchida |
| 8,036,656 | B2 | 10/2011 | Jeong et al. |
| 8,095,156 | B2 | 1/2012 | Iwamura |
| 8,340,669 | B2 | 12/2012 | Jeong et al. |
| 8,498,616 | B2 | 7/2013 | Voyer et al. |
| 8,554,213 | B2 | 10/2013 | Jeong et al. |
| 8,583,118 | B2 | 11/2013 | Lee |
| 8,649,291 | B2 | 2/2014 | Wang et al. |
| 8,774,810 | B2 | 7/2014 | Jeong et al. |
| 9,585,017 | B2 | 2/2017 | Fox et al. |
| 11,350,345 | B2 * | 5/2022 | Maeda .................. H04W 4/08 |
| 2004/0264421 | A1 | 12/2004 | Sato et al. |
| 2005/0032546 | A1 | 2/2005 | Kehr |
| 2005/0079870 | A1 | 4/2005 | Rick et al. |
| 2007/0087750 | A1 | 4/2007 | Uchida et al. |
| 2007/0099598 | A1 | 5/2007 | Voyer et al. |
| 2007/0218905 | A1 | 9/2007 | Lee |
| 2008/0102896 | A1 | 5/2008 | Wang et al. |
| 2008/0207170 | A1 | 8/2008 | Khetawat et al. |
| 2008/0207245 | A1 | 8/2008 | Wakabayashi et al. |
| 2008/0220782 | A1 | 9/2008 | Wang et al. |
| 2008/0227447 | A1 | 9/2008 | Jeong et al. |
| 2008/0267153 | A1 | 10/2008 | Mukherjee et al. |
| 2009/0047960 | A1 * | 2/2009 | Gunnarsson ...... H04W 36/0058 |
| | | | 455/436 |
| 2009/0104905 | A1 | 4/2009 | DiGirolamo et al. |
| 2009/0270096 | A1 | 10/2009 | Somasundaram |
| 2010/0029283 | A1 | 2/2010 | Iwamura |
| 2010/0040064 | A1 | 2/2010 | Harada et al. |
| 2010/0075670 | A1 | 3/2010 | Wu |
| 2010/0112980 | A1 | 5/2010 | Horn et al. |
| 2011/0070888 | A1 | 3/2011 | Iwamura |
| 2011/0263274 | A1 | 10/2011 | Fox et al. |
| 2012/0028639 | A1 | 2/2012 | Jeong et al. |
| 2012/0295616 | A1 | 11/2012 | Jeong et al. |
| 2013/0288682 | A1 | 10/2013 | Wang et al. |
| 2014/0038610 | A1 | 2/2014 | Jeong et al. |
| 2014/0092871 | A1 | 4/2014 | Wang et al. |
| 2014/0295796 | A1 | 10/2014 | Fox et al. |

FOREIGN PATENT DOCUMENTS

| | | |
|---|---|---|
| CN | 1225224 A | 8/1999 |
| CN | 1883221 A | 12/2006 |
| CN | 1941986 A | 4/2007 |
| CN | 1964522 A | 5/2007 |
| CN | 200710088217.2 | 9/2007 |
| CN | 101258766 A | 9/2008 |
| EP | 1 207 708 A1 | 5/2002 |
| JP | 2010-537480 A | 12/2010 |
| JP | 5726351 B2 | 5/2015 |
| RU | 2 147 796 C1 | 4/2000 |
| RU | 2 276 468 C2 | 9/2005 |
| UA | 39170 C2 | 6/2001 |
| WO | 2008/054668 A2 | 5/2008 |
| WO | 2008/062200 A2 | 5/2008 |
| WO | 2008/081816 A1 | 7/2008 |
| WO | 2008/088168 A1 | 7/2008 |
| WO | WO 2008/106360 A2 | 9/2008 |
| WO | 2009/022976 A1 | 2/2009 |
| WO | 2010/036011 A2 | 4/2010 |

OTHER PUBLICATIONS

"Consideration on PLMN Selection and Signaling Free Mobility", 3GPP TSG RAN WG2Meeting #60 bis, R2-080183, Asustek, Agenda Item: 7 pp. 1-3, (Jan. 14, 2008).
3GPP TS 36.300 V8.6.0, "3$^{rd}$ Generation Partnership Project; Technical Specification Group Radio Access Network; Evolved Universal Terrestrial Radio Access (E-UTRA) and Evolved Universal Terrestrial Radio Access Network (E-UTRAN); Overall Description; Stage 2 (Release 8)", pp. 1-137, (Sep. 2008).
"Signaling of MBSFN Subframe Allocation in D-BCH", 3GPP TSG RAN WG1 Meeting #49 bis, R1-072963, Nokia Siemens Networks, Agenda Item 5.3, Total pp. 5, (Jun. 25-29, 2007).
3GPP TR R3.020, VO. 6. 0, "3rd Generation Partnership Project; Technical Specification Group Radio Access Network; Home (e)NodeB; Network Aspects (Release 8)", pp. 1-54 (May 2008).
"LS on CSG Cell Identification", LTE, RAN2, 3GPP TSG RAN WG2 Meeting #62 , R2-082899, pp. 1-2, (May 5-9, 2008).
3GPP TSG RAN WG2 Meeting #62 bis, R2-083494, "Home Cell "Whitelist" Handling", Samsung, Agenda Item: 4.2, Total pp. 4, (Jun. 30-Jul. 4, 2008).
3GPP TS 36.331 V8.3. 0, "3rd Generation Partnership Project; Technical Specification Group Radio Access Network; Evolved Universal Terrestrial Radio Access (E-UTRA)Radio Resource Control (RRC); Protocol Specification (Release 8)", pp. 1-178, (Sep. 2008).
3GPP TS 36.304 V8.3. 0, "3rd Generation Partnership Project; Technical Specification Group Radio Access Network; Evolved Universal Terrestrial Radio Access (E-UTRA) User Equipment (UE) Procedures in Idle Mode (Release 8)", pp. 1-28, (Sep. 2008).
"Preferred HNB Search", QUALCOMM Europe, 3GPP TSG RAN WG2 #62 bis, R2-084346, Agenda Item: 7.5.09, pp. 1-3, (Aug. 18-22, 2008).
"LS on HNB/HeNB Open Access Mode", 3GPP TSG-SA1 #42, S1-083461, 3GPP SA WG1, Release : Rel-9, Work Item: EHNB, Total pp. 2, (Oct. 13-17, 2008).
"Open Issues for Hybrid/Open Cells", 3GPP TSG-RAN WG2 Meeting #66bis, R2-093950, QUALCOMM Europe, Agenda Item: 4.2.1.2, Total pp. 2, (Jun. 29-Jul. 3, 2009).
Written Decision on Examination of a Request for a Declaration of Invalidity dated May 7, 2021 in Chinese Patent Application No. 201410189332.9 (with English translation), 28 pages.
Written Decision on Examination of a Request for a Declaration of Invalidity dated May 7, 2021 in Chinese Patent Application No. 201410189270.1 (with English translation), 24 pages.
Written Opinion on Examination of a Request for a Declaration of Invalidity dated May 7, 2021 in Chinese Patent Application No. 201410189671.7 (with English translation), 24 pages.
Written Decision on Examination of a Request for a Declaration of Invalidity dated May 7, 2021 in Chinese Patent Application No. 201410189766.9 (with English translation), 30 pages.
"EMM Reject Cause for CSG and Allowed CSG List Update Procedures" Telecom Italia, Huawei, Qualcomm Europe, 3GPP TSG CT WG1 Meeting #55bis C1-084475, Oct. 2008, 26 pages.

(56) References Cited

OTHER PUBLICATIONS

"Psuedo-CR on Allowed CSG List Update" Telecom Italia, 3GPP TSG CT WG1 Meeting #55 C1-083096, Aug. 2008, 3 pages.
Discussions on CSG Offset (E-UTRA), 3 GPP TSG-RAN WG2 Meeting #66bis, R2-093864, Huawei, Total pp. 2, (Jun. 29-Jul. 3, 2009).
"Reselection to H (e) NBs", 3GPP TSG-RAN WG#66, R2-093136, Motorola, Agenda Item: 4.2.1, Total pp. 1-2, (May 4-8, 2009).
3GPP TS 36.213 V8.7.0, 3rd Generation Partnership Project; Technical Specification Group Radio Access Network; Evolved Universal Terrestrial Radio Access (E-UTRA) and Physical Layer Procedures (Release 8), pp. 1-78, (May 5, 2009).
3GPP TS 36.101 V8.6.0, 3rd Generation Partnership Project; Technical Specification Group Radio Access Network; Evolved Universal Terrestrial Radio Access (E-UTRA) User Equipment (UE0Radio Transmission and Reception (Release 8), pp. 1-143, (Jun. 2009).
"Digital cellular telecommunications systems (Phase 2+); Universal Mobile Telecommunications System (UMTS); Service accessibility (3GPP TS 22.011 version 8.3.0 Release 8); ETSI TS 122 011", V8.3.0, vol. 3-SA1, XP-014041634, (Apr. 2008), Apr. 1, 2008, 1 front pages, pp. 1-26.
"Home Cell "Whitelist" Handling", 3GPP TSG RAN WG2 Meeting #62 bis, R2-083494, Samsung, Agenda Item: 4.2, Total pp. 4, (Jun. 30-Jul. 4, 2008).
International Search Report dated Nov. 17, 2009 in PCT/JP09/005622 filed Oct. 26, 2009.
International Preliminary Report on Patentability and Written Opinion dated Jun. 7, 2011 in PCT/JP2009/005622 (with English translation).
Combined Office Action and Search Report dated Apr. 3, 2013, in Chinese Patent Application No. 200980143951.1 (with partial English-language translation).
Office Action dated Apr. 7, 2014, in Australian Patent Application No. 2009312285.
Extended European Search Report dated Mar. 12, 2014, in European Patent Application No. 09824544.2.
Office Action dated Oct. 8, 2013 in Japanese Application No. 2009-230545 with partial English translation.
Notice of Allowance dated Oct. 26, 2013 in Russian Application No. 2012122195/08(033710) with English translation.
Office Action dated Nov. 24, 2015 in Japanese Patent Application No. 2015-068877 with partial English translation.
Australian Office Action dated May 10, 2016 in Patent Application No. 2015252029.
Office Action dated Mar. 4, 2016 in European Patent Application No. 09 824 544.2.
Office Action dated Jul. 5, 2016 in Japanese Patent Application No. 2015-068877 (with partial English translation).
Combined Chinese Office Action and Search Report dated Nov. 2, 2016 in Patent Application No. 201410189671.7 (with English translation of the Search Report).
Chinese Office Action dated Nov. 21, 2016 in Japanese Application No. 2014 10189270.1 (21 pages).
Chinese Office Action dated Dec. 5, 2016 in Chinese Application No. 201410189766.9 (8 pages).
3GPP TS RAN WG220080704, #62bis R2-083611, *Home cell "whitelist" handling*, Samsung (5 pages).
Chinese Office Action issued in corresponding application No. 201410189270.1 dated Jun. 12, 2017 (w/English translation).
Search Report issued in corresponding European application No. 17162460.4 dated Jul. 17, 2017.
Office Action issued in corresponding Indian application No. 2851/CHENP/2011 dated Aug. 23, 2017 (w/English translation).
Office Action issued in corresponding Chinese application No. 201410189766.9 dated Sep. 20, 2017 (w/English translation).
Huawei, "Cell re-selection for hNB", R2-074831, Nov. 2007, 4 pgs.
T-Mobile, et al. "Rel-8 Closed Subscriber Group support for Home NodeB/eNodeB", S2-085683, Aug. 2008, 2 pgs.
Office Action issued in corresponding Chinese application No. 201410189332.9 dated Jul. 20, 2017 (w/English translation).
C1-083966, Telecom Italia, Huawei, EMM reject cause for CSG and Allowed CSG list update procedures, Oct. 2008, 18 pgs.
Office Action issued in Japanese Application No. 2016-197117 dated Oct. 3, 2017 (with English translation).
Qualcomm Europe, "Email Discussion on the Need of CSG Cell Specific PCIs" 3GPP TSG-RAN WG2 meeting #62-bis, Warsaw, Poland, Jun. 30-Jul. 4, 2008.
Office Action issued in corresponding Chinese Application No. 201410189270.1 dated Oct. 11, 2017 (with English translation).
Examination Report issued in corresponding Australian Application No. 2017202066 dated Nov. 24, 2017.
Chinese Office action dated Nov. 13, 2017 in Chinese Patent Application No. 201410189332.9 (with English translation).
Office Action dated Feb. 11, 2018 in Chinese Patent Application No. 201410189766.9 (with English translation).
Chinese Office Action dated Mar. 9, 2018 in Patent Application No. 201410189270.1 (with English language translation), 13 pages.
Office Action dated May 23, 2018 in Chinese Patent Application No. 201410189332.9 with computer-generated English translation obtained from Google Translate.
Office Action datd Jul. 18, 2018 in European Patent Application No. 17162460.4.
Office Action dated Sep. 5, 2018 in Chinese Patent Application No. 201410189766.9 with unedited computer-generated English translation, 11 pages.
Office Action dated Mar. 20, 2019 in corresponding European Patent Application No. 17 162 460.4.
Huawei, "Rel-8 UE idle mode mobility for HNB", 3GPP Draft; R2-082203, 3rd Generation Partnership Project Des Lucioles; F-06921 Sophia-Antipolis Cedex; France; vol. CT WG1, No. Zagreb, Croatia; Jun. 12, 2008, Jun. 12, 2008; XP050030028. [retrieved on Jun. 12, 2008].
Japanese Office Action for Japanese Patent Application No. 2018-244902 dated Oct. 29, 2019 and English translation thereof.
Vodafone, Suppoer of Hybrid Mode CSG Cells in UTRAN [online], 3GPP TSG-TAN WG2#64 R2-086462, <URL:http://www.3gpp.org/ftp/tsg_ran/WG2 _ RL2/TSGR2 _ 64/Docs/R2-086462.zip >, Nov. 3, 2008.
Motorola, UE measurement reporting of CSG cells [online], 3GPP TSG-RAN WG2#63 R2-084438, <URL:http://www.3gpp.org/ftp/tsg_ran/WG2_RL2/TSGR2_63/Docs/R2-084438.zip>, Aug. 12, 2008.
Office Action dated Nov. 11, 2019 in Brazilian Patent Application No. PI0921326 (with English Translation).
Office Action dated Nov. 22, 2019 in European Patent Application No. 17 162 460.4 (in English).
Summons to Attend Oral Proceedings dated Oct. 5, 2020 in corresponding European Patent Application No. 17 162 460.4.
Office Action dated Oct. 2, 2020 in corresponding Brazilian Patent Application No. 122020003171-9 with English Translation.
Office Action dated Oct. 2, 2020 in corresponding Brazilian Patent Application No. 1220220003174-3 with English Translation.
Extended European Search Report dated Aug. 16, 2021 in Application No. 21176941.9.
Office Action dated Sep. 29, 2021 issued for the Indian Patent Application No. 201848000701.
Office Action dated Sep. 29, 2021 issued for the Indian Patent Application No. 201848005579.
Office Action dated Sep. 29, 2021 issued for the Indian Patent Application No. 201848005588.
Office Action dated Mar. 22, 2021 in European Office Action 17162460.4.
Chinese Administrative Judgement made by Beijing Intellectual Property Court for Chinese Patent No. ZL201410189332.9 dated Jul. 20, 2022, 39 pages (with English machine translation).
Chinese Administrative Judgement made by Beijing Intellectual Property Court for Chinese Patent No. ZL201410189270.1 dated Jul. 20, 2022, 34 pages (with English machine translation).
Chinese Administrative Judgement made by Beijing Intellectual Property Court for Chinese Patent No. ZL201410189766.9 dated Jul. 20, 2022, 39 pages (with English machine translation).
Written administrative judgment issued on Jun. 21, 2023, made by Beijing Intellectual Property Court for the Chinese Patent No. ZL201410189671.7, 14 pages.

(56) References Cited

OTHER PUBLICATIONS

Communication pursuant to Article 94(3) EPC, issued Aug. 2, 2023, in corresponding European Application No. 21 176 941.9, 10pp.
Preliminary Opinion of the Board of Appeal issued Aug. 31, 2023, in corresponding European Application No. 17162460.4, 10pp.
Written Administrative Judgment of Chinese Supreme Court delivered Oct. 17, 2023 for Chinese Patent No. ZL201410189332.9 and computer-generated English translation thereof, 52 pages.
Written Administrative Judgment of Chinese Supreme Court delivered Oct. 17, 2023 for Chinese Patent No. ZL201410189270.1 and computer-generated English translation thereof, 41 pages.
Written Administrative Judgment of Chinese Supreme Court delivered Oct. 17, 2023 for Chinese Patent No. ZL201410189766.9 and computer-generated English translation thereof, 50 pages.

* cited by examiner

MOBILE COMMUNICATION SYSTEM

CROSS-REFERENCE TO RELATED APPLICATIONS

This application is a continuation of U.S. application Ser. No. 15/828,018, filed Nov. 30, 2017, which is a continuation application of U.S. application Ser. No. 14/807,528, filed Jul. 23, 2015, now U.S. Pat. No. 9,877,268, issued Jan. 23, 2018, which is a divisional application of U.S. application Ser. No. 13/127,632 filed May 4, 2011, now U.S. Pat. No. 9,713,068, issued Jul. 18, 2017, which is the U.S. National Stage application of PCT International Application No. PCT/JP2009/005622 filed Oct. 26, 2009, which claims priority to Japanese Application No. 2008-283004 filed Nov. 4, 2008 and Japanese Application No. 2009-230545 filed Oct. 2, 2009. U.S. application Ser. Nos. 15/828,018 and 14/807,528 are herein incorporated by reference in their entirety for all purposes.

TECHNICAL FIELD

The present invention relates to a mobile communication system in which a base station performs radio communications with a plurality of user equipments.

BACKGROUND ART

Commercial service of a wideband code division multiple access (W-CDMA) system among so-called third-generation communication systems has been offered in Japan since 2001. In addition, high speed down link packet access (HSDPA) service for achieving higher-speed data transmission using a down link has been offered by adding a channel for packet transmission (high speed-downlink shared channel (HS-DSCH)) to the down link (dedicated data channel, dedicated control channel). Further, in order to increase the speed of data transmission in an uplink direction, service of a high speed up link packet access (HSUPA) has been offered. W-CDMA is a communication system defined by the 3rd generation partnership project (3GPP) that is the standard organization regarding the mobile communication system, where the specifications of Release 8 version are produced.

Further, 3GPP is investigating new communication systems referred to as "long term evolution (LTE)" regarding radio areas and "system architecture evolution (SAE)" regarding the overall system configuration including a core network (merely referred to as network as well) as communication systems independent of W-CDMA. In the LTE, an access scheme, radio channel configuration and a protocol are totally different from those of the current W-CDMA (HSDPA/HSUPA). For example, as to the access scheme, code division multiple access is used in the W-CDMA, whereas in the LTE, orthogonal frequency division multiplexing (OFDM) is used in a downlink direction and single career frequency division multiple access (SC-FDMA) is used in an uplink direction. In addition, the bandwidth is 5 MHz in the W-CDMA, while in the LTE, the bandwidth can be selected from 1.4 MHz, 3 MHz, 5 MHz, 10 MHz, 15 MHz and 20 MHz for each base station. Further, differently from the W-CDMA, circuit switching is not provided but a packet communication system is only provided in the LTE.

The LTE is defined as a radio access network independent of the W-CDMA network because its communication system is configured with a new core network different from a core network (GPRS) of the W-CDMA. Therefore, for differentiation from the W-CDMA communication system, a base station that communicates with a user equipment (UE) and a radio network controller that transmits/receives control data and user data to/from a plurality of base stations are referred to as an E-UTRAN NodeB (eNB) and an evolved packet core (EPC: also referred to as access gateway (aGW)), respectively, in the LTE communication system. Unicast service and evolved multimedia broadcast multicast service (E-MBMS service) are provided in this LTE communication system. The E-MBMS service is broadcast multimedia service, which is merely referred to as MBMS in some cases. Bulk broadcast contents such as news, weather forecast and mobile broadcast are transmitted to a plurality of UEs. This is also referred to as point to multipoint service.

Non-Patent Document 1 describes the current decisions by 3GPP regarding an overall architecture in the LTE system. The overall architecture (Chapter 4 of Non-Patent Document 1) is described with reference to FIG. 1. FIG. 1 is a diagram illustrating the configuration of the LTE communication system. With reference to FIG. 1, the evolved universal terrestrial radio access (E-UTRAN) is composed of one or a plurality of base stations 102, provided that a control protocol (for example, radio resource management (RRC)) and a user plane (for example, packet data convergence protocol (PDCP), radio link control (RLC), medium access control (MAC), and physical layer (PHY)) for a UE 101 are terminated in the base station 102. The base stations 102 perform scheduling and transmission of paging signaling (also referred to as paging messages) notified from a mobility management entity (MME) 103. The base stations 102 are connected to each other by means of an X2 interface. In addition, the base stations 102 are connected to an evolved packet core (EPC) by means of an S1 interface, more specifically, connected to the mobility management entity (MME) 103 by means of an S1_MME interface and connected to a serving gateway (S-GW) 104 by means of an S1_U interface. The MME 103 distributes the paging signaling to multiple or a single base station 102. In addition, the MME 103 performs mobility control of an idle state. When the UE is in the idle state and an active state, the MME 103 manages a list of tracking areas. The S-GW 104 transmits/receives user data to/from one or a plurality of base stations 102. The S-GW 104 serves as a local mobility anchor point in handover between base stations. Moreover, there is provided a PDN gateway (P-GW), which performs per-user packet filtering and UE-ID address allocation.

The current decisions by 3GPP regarding the frame configuration in the LTE system are described in Non-Patent Document 1 (Chapter 5), which are described with reference to FIG. 2. FIG. 2 is a diagram illustrating the configuration of a radio frame used in the LTE communication system. With reference to FIG. 2, one radio frame is 10 ms. The radio frame is divided into ten equally sized subframes. The subframe is divided into two equally sized slots. The first (#0) and sixth (#5) subframes contain a downlink synchronization signal (SS) per each frame. The synchronization signals are classified into a primary synchronization signal (P-SS) and a secondary synchronization signal (S-SS). Multiplexing of channels for multimedia broadcast multicast service single frequency network (MBSFN) and for non-MBSFN is performed on a per-subframe basis. Hereinafter, a subframe for MBSFN transmission is referred to as an MBSFN subframe. Non-Patent Document 2 describes a signaling example when MBSFN subframes are allocated. FIG. 3 is a diagram illustrating the configuration of the MBSFN frame. With reference to FIG. 3, the MBSFN subframes are allocated for each MBSFN frame. An MBSFN frame cluster is scheduled. A repetition period of the MBSFN frame cluster is allocated.

Non-Patent Document 1 describes the current decisions by 3GPP regarding the channel configuration in the LTE system. It is assumed that the same channel configuration is used in a closed subscriber group (CSG) cell as that of a non-CSG cell. A physical channel (Chapter 5 of Non-Patent Document 1) is described with reference to FIG. 4. FIG. 4 is a diagram illustrating physical channels used in the LTE communication system. With reference to FIG. 4, a physical broadcast channel (PBCH) 401 is a downlink channel transmitted from the base station 102 to the UE 101. A BCH transport block is mapped to four subframes within a 40 ms interval. There is no explicit signaling indicating 40 ms timing. A physical control format indicator channel (PCFICH) 402 is transmitted from the base station 102 to the UE 101. The PCFICH notifies the number of OFDM symbols used for PDCCHs from the base station 102 to the UE 101. The PCFICH is transmitted in each subframe. A physical downlink control channel (PDCCH) 403 is a downlink channel transmitted from the base station 102 to the UE 101. The PDCCH notifies the resource allocation, HARQ information related to DL-SCH (downlink shared channel that is one of the transport channels shown in FIG. 5A) and the PCH (paging channel that is one of the transport channels shown in FIG. 5A). The PDCCH carries an uplink scheduling grant. The PDCCH carries ACK/Nack that is a response signal to uplink transmission. The PDCCH is referred to as an L1/L2 control signal as well. A physical downlink shared channel (PDSCH) 404 is a downlink channel transmitted from the base station 102 to the UE 101. A DL-SCH (downlink shared channel) that is a transport channel and a PCH that is a transport channel are mapped to the PDSCH. A physical multicast channel (PMCH) 405 is a downlink channel transmitted from the base station 102 to the UE 101. A multicast channel (MCH) that is a transport channel is mapped to the PMCH.

A physical uplink control channel (PUCCH) 406 is an uplink channel transmitted from the UE 101 to the base station 102. The PUCCH carries ACK/Nack that is a response signal to downlink transmission. The PUCCH carries a channel quality indicator (CQI) report. The CQI is quality information indicating the quality of received data or channel quality. In addition, the PUCCH carries a scheduling request (SR). A physical uplink shared channel (PUSCH) 407 is an uplink channel transmitted from the UE 101 to the base station 102. A UL-SCH (uplink shared channel that is one of the transport channels shown in FIG. 5B) is mapped to the PUSCH. A physical hybrid ARQ indicator channel (PHICH) 408 is a downlink channel transmitted from the base station 102 to the UE 101. The PHICH carries ACK/Nack that is a response to an uplink transmission. A physical random access channel (PRACH) 409 is an uplink channel transmitted from the UE 101 to the base station 102. The PRACH carries a random access preamble.

At downlink reference signal which is a known symbol in a mobile communication system is inserted in the first, third and last OFDM symbols of each slot. The physical layer measurement objects of a UE includes, for example, reference symbol received power (RSRP).

The transport channel (Chapter 5 of Non-Patent Document 1) is described with reference to FIGS. 5A and 5B. FIGS. 5A and 5B are diagrams illustrating transport channels used in the LTE communication system. FIG. 5A shows mapping between a downlink transport channel and a downlink physical channel. FIG. 5B shows mapping between an uplink transport channel and an uplink physical channel. A broadcast channel (BCH) is broadcast to the entire base station (cell) regarding the downlink transport channel. The BCH is mapped to the PBCH. Retransmission control according to a hybrid ARQ (HARM) is applied to a downlink shared channel (DL-SCH). Broadcast to the entire base station (cell) is enabled. The DL-SCH supports dynamic or semi-static resource allocation. The semi-static resource allocation is also referred to as persistent scheduling. The DL-SCH supports discontinuous reception (DRX) of a UE for enabling the UE to save power. The DL-SCH is mapped to the PDSCH. The paging channel (PCH) supports DRX of the UE for enabling the UE to save power. Broadcast to the entire base station (cell) is required. The PCH is mapped to physical resources such as the PDSCH that can be used dynamically for traffic or physical resources such as the PDCCH of the other control channel. The multicast channel (MCH) is used for broadcast to the entire base station (cell). The MCH supports SFN combining of MBMS service (MTCH and MCCH) in multi-cell transmission. The MCH supports semi-static resource allocation. The MCH is mapped to the PMCH.

Retransmission control according to a hybrid ARQ (HARQ) is applied to an uplink shared channel (UL-SCH). The UL-SCH supports dynamic or semi-static resource allocation. The UL-SCH is mapped to the PUSCH. A random access channel (RACH) shown in FIG. 5B is limited to control information. There is a collision risk. The RACH is mapped to the PRACH. The HARQ is described.

The HARQ is the technique for improving the communication quality of a channel by combination of automatic repeat request and forward error correction. The HARQ has an advantage that error correction functions effectively by retransmission even for a channel whose communication quality changes. In particular, it is also possible to achieve further quality improvement in retransmission through combination of the reception results of the first transmission and the reception results of the retransmission. An example of the retransmission method is described. In a case where the receiver fails to successfully decode the received data (in a case where a cyclic redundancy check (CRC) error occurs (CRC=NG)), the receiver transmits "Nack" to the transmitter. The transmitter that has received "Nack" retransmits the data. In a case where the receiver successfully decodes the received data (in a case where a CRC error does not occur (CRC=OK)), the receiver transmits "AcK" to the transmitter. The transmitter that has received "Ack" transmits the next data. Examples of the HARQ system includes "chase combining". In chase combining, the same data sequence is transmitted in the first transmission and retransmission, which is the system for improving gains by combining the data sequence of the first transmission and the data sequence of the retransmission. This is based on the idea that correct data is partially included even if the data of the first transmission contains an error, and highly accurate data transmission is enabled by combining the correct portion of the first transmission data and the retransmission data. Another example of the HARQ system is incremental redundancy (IR). The IR is aimed to increase redundancy, where a parity bit is transmitted in retransmission to increase the redundancy by combining the first transmission and retransmission, to thereby improve the quality by an error correction function.

A logical channel (Chapter 6 of Non-Patent Document 1) is described with reference to FIGS. 6A and 6B. FIGS. 6A and 6B are diagrams illustrating logical channels used in an LTE communication system. FIG. 6A shows mapping between a downlink logical channel and a downlink transport channel. FIG. 6B shows mapping between an uplink logical channel and an uplink transport channel. A broadcast control channel (BCCH) is a downlink channel for broadcast system control information. The BCCH that is a logical channel is mapped to the BCH or DL-SCH that is a transport channel. A paging control channel (PCCH) is a downlink channel for transmitting paging signals. The PCCH is used when the network does not know the cell location of a UE. The PCCH that is a logical channel is mapped to the PCH that is a transport channel. A common control channel (CCCH) is a channel for transmission control information between UEs and a base station. The CCCH is used in a case where the UEs have no RRC connection with the base station. In downlink, the CCCH is mapped to the DL-SCH that is a transport channel. In uplink, the CCCH is mapped to the UL-SCH that is a transport channel.

A multicast control channel (MCCH) is a downlink channel for point-to-multipoint transmission. The MCCH is a channel used for transmitting MBMS control information for one or several MTCHs. The MCCH is a channel used only by a UE during reception of the MBMS. The MCCH is mapped to the DL-SCH or MCH that is a transport channel. A dedicated control channel (DCCH) is a channel that transmits dedicated control information between a UE and a network. The DCCH is mapped to the UL-SCH in uplink and mapped to the DL-SCH in downlink. A dedicated traffic channel (DTCH) is a point-to-point communication channel for transmission of user information to a dedicated UE. The DTCH exists in uplink as well as downlink. The DTCH is mapped to the UL-SCH in uplink and mapped to the DL-SCH in downlink. A multicast traffic channel (MTCH) is a downlink channel for traffic data transmission from a network to a UE. The MTCH is a channel used only by a UE during reception of the MBMS. The MTCH is mapped to the DL-SCH or MCH.

GCI represents a global cell identity. A closed subscriber group (CSG) cell is introduced in the LTE and universal mobile telecommunication system (UMTS). The CSG is described below (Chapter 3.1 of Non-Patent Document 7). The closed subscriber group (CSG) is a cell in which available subscribers are identified by an operator (cell for identified subscribers). The identified subscribers are authorized to access one or more E-UTRAN cells of a public land mobile network (PLMN). One or more E-UTRAN cells in which the identified subscribers are permitted access are referred to as "CSG cell(s)". Note that access is limited in the PLMN. The CSG cell is part of the PLMN that broadcasts a specific CSG identity (CSG ID, CSG-ID). The authorized members of the subscriber group who have registered in advance access the CSG cells using the CSG-ID that is the access enabling information. The CSG-ID is broadcast by the CSG cell or cells. A plurality of CSG-IDs exist in a mobile communication system. The CSG-IDs are used by UEs for facilitating access from CSG-related members. 3GPP discusses in a meeting that the information to be broadcast by the CSG cell or cells is changed from the CSG-ID to a tracking area code (TAC). The locations of UEs are traced based on an area composed of one or more cells. The locations are traced for enabling tracing of the locations of UEs and calling (calling of UEs) even in the state where communication is not performed (in an idle state). An area for tracing locations of UEs is referred to as a tracking area. A CSG whitelist is a list stored in the USIM containing all the CSG IDs of the CSG cells to which the subscribers belong. The whitelist of the UE is provided by a higher layer. By means of this, the base station of the CSG cell allocates radio resources to the UEs.

A "suitable cell" is described below (Chapter 4.3 of Non-Patent Document 7). The "suitable cell" is a cell on which a UE camps on to obtain normal service. Such a cell shall fulfill the following: (1) the cell is part of the selected PLMN or the registered PLMN, or part of the PLMN of an "equivalent PLMN list"; and (2) according to the latest information provided by a non-access stratum (NAS), the cell shall further fulfill the following conditions: (a) the cell is not a barred cell; (b) the cell is part of at least one tracking area (TA), not part of "forbidden LAs for roaming", where the cell needs to fulfill (1) above; (c) the cell fulfills the cell selection criteria; and (d) for a cell identified as CSG cell by system information (SI), the CSG-ID is part of a "CSG whitelist" of the UE (contained in the CSG whitelist of the UE).

An "acceptable cell" is described below (Chapter 4.3 of Non-Patent Document 7). This is the cell on which a UE camps to obtain limited service (emergency calls). Such a cell shall fulfill all the following requirements. That is, the minimum required set for initiating an emergency call in an E-UTRAN network are as follows: (1) the cell is not a barred cell; and (2) the cell fulfills the cell selection criteria.

Camping on a cell represents the state where a UE has completed the cell selection/reselection process and the UE has chosen a cell for monitoring the system information and paging information.

PRIOR ART DOCUMENTS

Non-Patent Documents

Non-Patent Document 1: 3GPP TS36.300 V8.6.0
Non-Patent Document 2: 3GPP R1-072963
Non-Patent Document 3: 3GPP TR R3.020 V0.6.0
Non-Patent Document 4: 3GPP R2-082899
Non-Patent Document 5: 3GPP R2-083494
Non-Patent Document 6: 3GPP TS36.331 V8.3.0
Non-Patent Document 7: 3GPP TS36.304 V8.3.0
Non-Patent Document 8: 3GPP R2-084346
Non-Patent Document 9: 3GPP S1-083461
Non-Patent Document 10: 3GPP R2-093950
Non-Patent Document 11: 3GPP R2-093864
Non-Patent Document 12: 3GPP R2-093138
Non-Patent Document 13: 3GPP TS36.213
Non-Patent Document 14: 3GPP TS36.101

SUMMARY OF INVENTION

Problems to be Solved by the Invention

It is required to install a large number of closed subscriber group (CSG) cells in apartment buildings, schools, companies and the like. For example, the CSG cells are required to be installed for each room in apartment buildings, for each classroom in schools, and for each section in companies in such a manner that only users who have registered the respective CSG cells are allowed to use those CSG cells. Further, the CSG cells are assumed to have portable size and weight, and those CSG cells are also required to be installed or removed frequently and flexibly. Considering the above-mentioned demands, radio waves from a large number of CSG cells are simultaneously transmitted in one location. That is, a situation in which UEs are located in the positions within the reach of the radio waves from a large number of CSG cells occurs in apartment buildings, schools, companies and the like.

Alternatively, the CSG cells are required to be installed in the places outside the reach of the radio waves from non-CSG cells for enabling communication with UEs through the CSG cells. Currently, for example, rooms in apartment buildings are outside the reach of the radio waves from non-CSG cells in many cases. In such cases, the CSG cells are installed for each room of apartment buildings, and the CSG is composed of the CSG cells for each room to be provided with a CSG-ID. For example, a case where user access registration of a UE of a resident in each room is performed for the CSG cell of each room is conceivable. In such a situation, the UE is located in a place outside the reach of the radio waves from non-CSG cells but within the reach of the radio waves from a large number of CSG cells. Further, in such a case, depending on an environment where radio waves propagate, the radio wave from the CSG cell with which user access registration has been performed does not reach the UE, or even if it reaches the UE, the received power is smaller compared with other CSG cells in many cases.

As described above, in the case of a UE located in a position within the reach of the radio waves from a large number of CSG cells, there occurs a situation in which search and cell selection are endlessly repeated for numbers of CSG cells that cannot be accessed (that is, CSG cells with which user access registration has not been performed). Such a case leads to a control delay in a system and reductions in radio resource utilization efficiency and signaling efficiency. Moreover, there arises a problem of an increase in power consumption of a UE that repeats cell search. Assuming a future situation in which the CSG cells are arranged as described above, those problems become crucial ones. The present invention has been made to solve those problems.

Means to Solve the Problems

A mobile communication system according to the present invention includes user equipments, base stations and a radio network controller, the user equipments performing data transmission/reception using an orthogonal frequency division multiplexing (OFDM) system as a downlink access system and a single career frequency division multiple access (SC-FDMA) system as an uplink access system, the base stations provided respectively to cells for specific subscribers that are open only to specific ones of the user equipments or subscribers and cells for non-specific users that are allowed to be used by non-specific ones of the user equipments or users and executing scheduling of assignment of radio resources to the user equipments, the radio network controller managing a desired tracking area in which the user equipments are located through a plurality of the base stations and performing paging on the user equipments, in which the user equipments access the cells for specific subscribers using access allowance information issued upon use of the cells for specific subscribers being allowed, wherein: the base stations provided to the cells for specific subscribers refer to identification information of the user equipments notified by the radio network controller and transmit a tracking area update request for the radio network controller from the user equipments to the radio network controller; the radio network controller determines whether the user equipments that have transmitted the tracking area update request are allowed to use the cells for specific subscribers, and in a case where the use is allowed, transmits a signal for allowing the assignment of radio resources to the user equipments and the access allowance information to the base stations provided to the cells for specific subscribers; and the user equipments access the base stations provided to the cells for specific subscribers using the access allowance information received from the base stations provided to the cells for specific subscribers.

Effects of the Invention

The mobile communication system according to the present invention includes user equipments, base stations and a radio network controller, the user equipments performing data transmission/reception using an orthogonal frequency division multiplexing (OFDM) system as a downlink access system and a single career frequency division multiple access (SC-FDMA) system as an uplink access system, the base stations provided respectively to cells for specific subscribers that are open only to specific ones of the user equipments or subscribers and cells for non-specific users that are allowed to be used by non-specific ones of the user equipments or users and executing scheduling of assignment of radio resources to the user equipments, the radio network controller managing a desired tracking area in which the user equipments are located through a plurality of the base stations and performing paging on the user equipments, in which the user equipments access the cells for specific subscribers using access allowance information issued upon use of the cells for specific subscribers being allowed, wherein: the base stations provided to the cells for specific subscribers refer to identification information of the user equipments notified by the radio network controller and transmit a tracking area update request for the radio network controller from the user equipments to the radio network controller; the radio network controller determines whether the user equipments that have transmitted the tracking area update request are allowed to use the cells for specific subscribers, and in a case where the use is allowed, transmits a signal for allowing the assignment of radio resources to the user equipments and the access allowance information to the base stations provided to the cells for specific subscribers; and the user equipments access the base stations provided to the cells for specific subscribers using the access allowance information received from the base stations provided to the cells for specific subscribers. Accordingly, even in a state of being not notified the whitelist (access allowance information), the UE can update the tracking area for the radio network controller (core network, MME) and obtain the whitelist from the core network via the CSG cell (cell for specific equipments).

Figure 1:
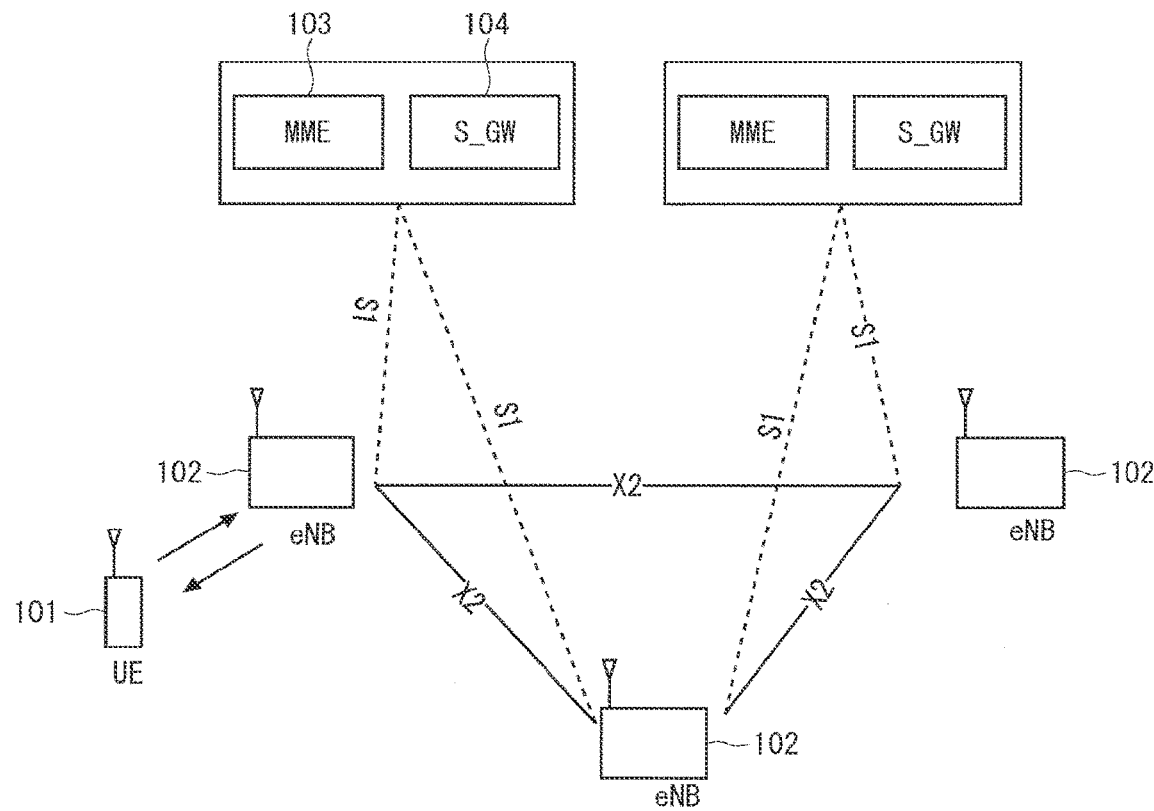
FIG. 1 is a diagram illustrating the configuration of an LTE communication system.
Figure 2:
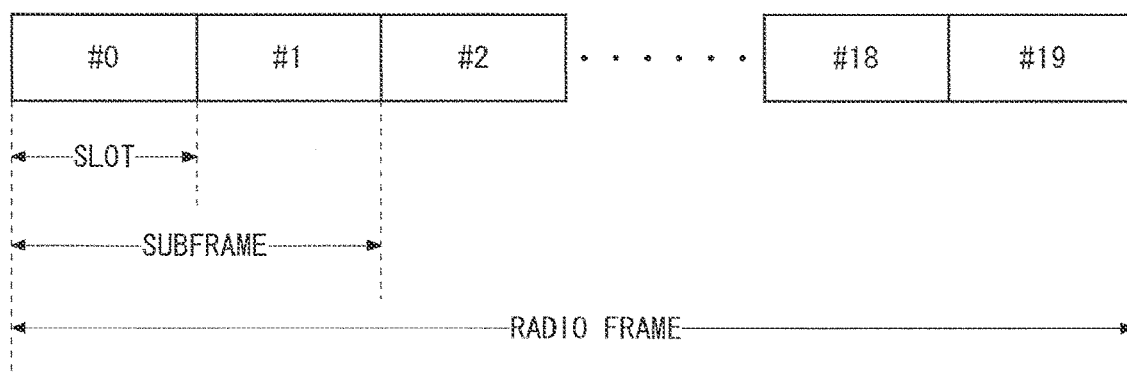
FIG. 2 is a diagram illustrating the configuration of a radio frame used in the LTE communication system.
Figure 3:
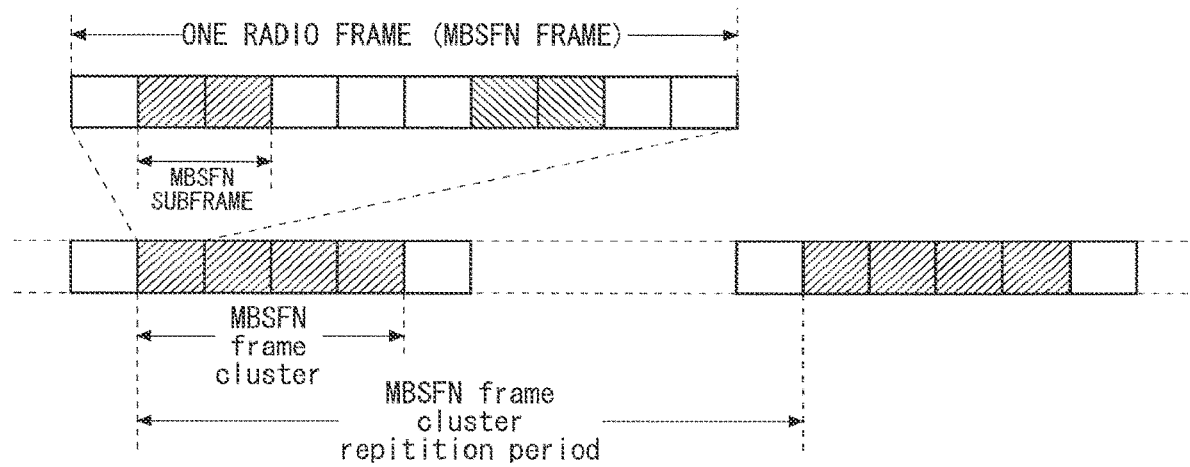
FIG. 3 is a diagram illustrating the configuration of a multimedia broadcast service single frequency network (MBSFN) frame.
Figure 4:
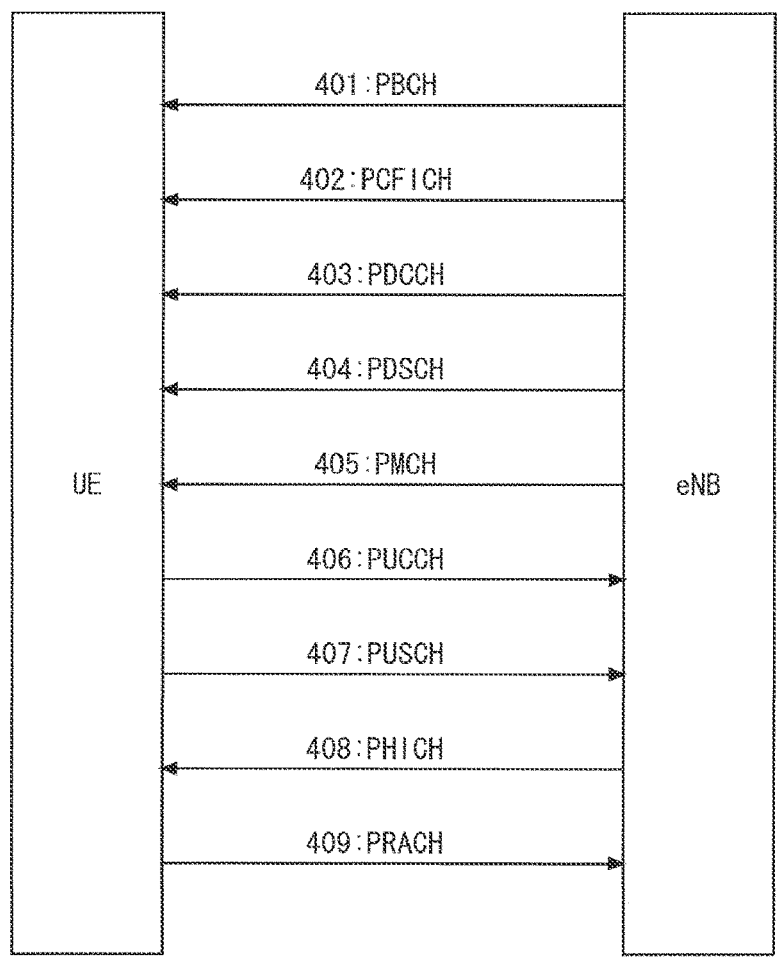
FIG. 4 is a diagram illustrating physical channels used in the LTE communication system.
Figure 5A:
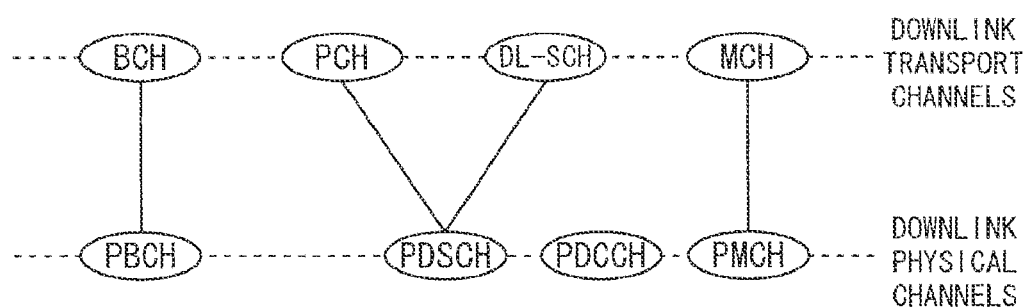
FIGS. 5A and 5B are diagrams illustrating transport channels used in the LTE communication system.
Figure 5B:
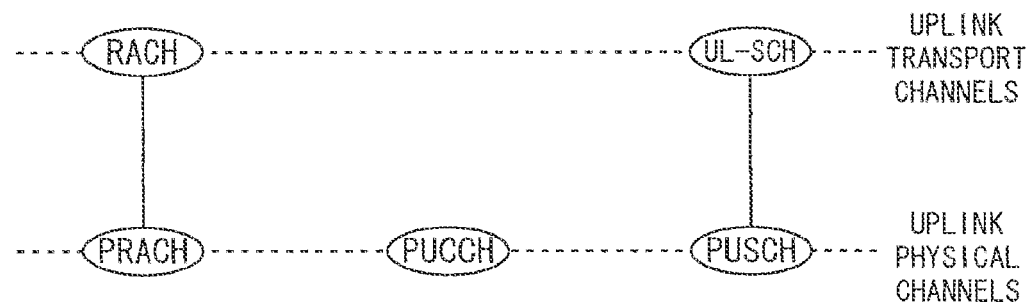
Figure 6A:
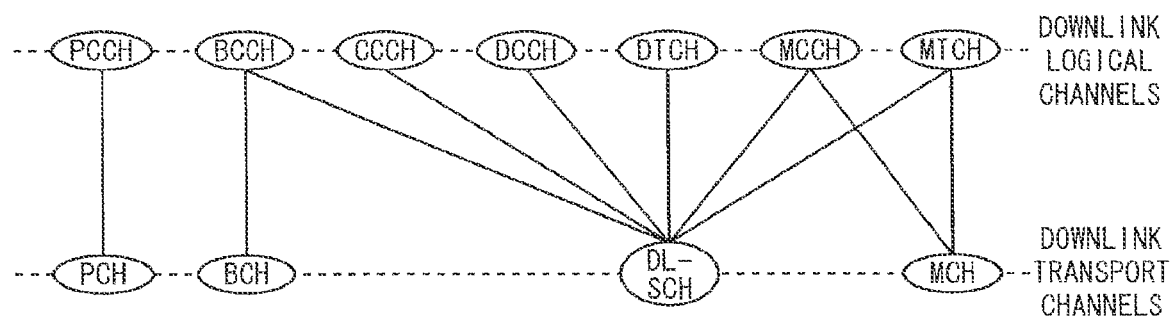
FIGS. 6A and 6B are diagrams illustrating logical channels used in the LTE communication system.
Figure 6B:
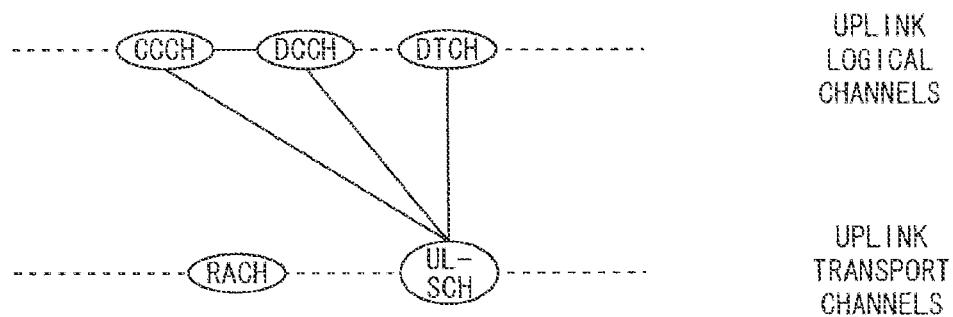

DESCRIPTION OF REFERENCE NUMERALS 101 user equipment, 102 base station, 103 mobility management entity (MME), 104 serving gateway (S-GW)

EMBODIMENTS FOR CARRYING OUT THE INVENTION

First Embodiment

Figure 7A:
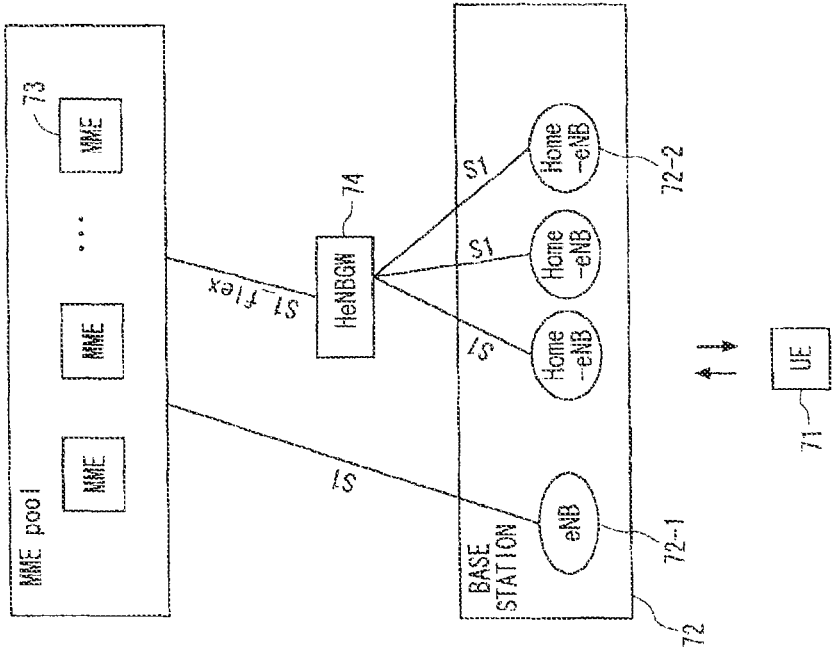
FIGS. 7A and 7B are block diagrams showing the overall configuration of a mobile communication system currently under discussion of 3GPP.
Figure 7B:
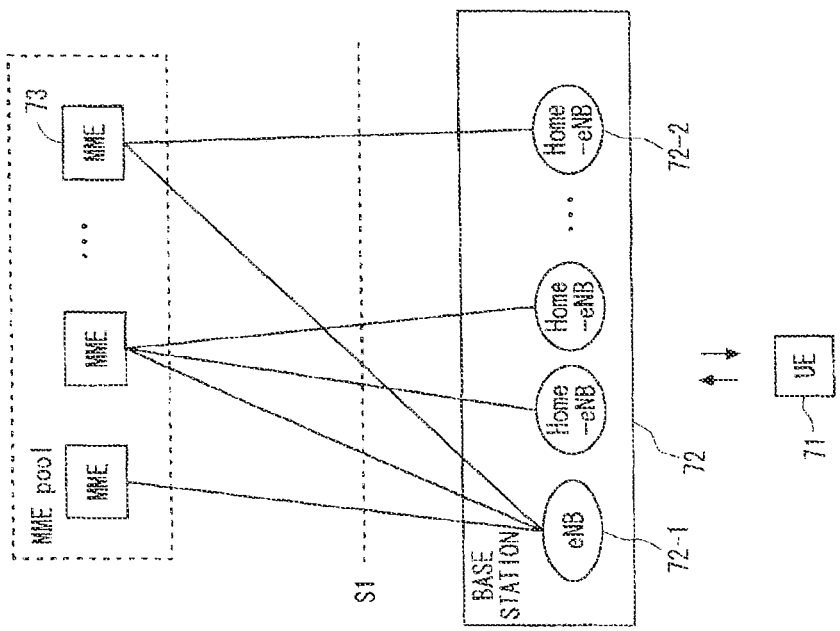

FIGS. 7A and 7B are block diagrams showing an overall configuration of an LTE mobile communication system, which is currently under discussion of 3GPP. Currently, 3GPP is studying an overall system configuration including closed subscriber group (CSG) cells (Home-eNodeBs (Home-eNB and HeNB) of e-UTRAN, Home-NB (HNB) of UTRAN) and non-CSG cells (eNodeB (eNB) of e-UTRAN, NodeB (NB) of UTRAN, and BSS of GERAN) and, as to e-UTRAN, is proposing the configurations of (a) and (b) of FIG. 7 (Non-Patent Document 1 and Non-Patent Document 3). FIG. 7A is now described. A user equipment (UE) 71 performs transmission/reception to/from a base station 72. The base station 72 is classified into an eNB (non-CSG cell) 72-1 and Home-eNBs (CSG cells) 72-2. The eNB 72-1 is connected to MMEs 73 through the S1 interfaces, and control information is communicated between the eNB and the MMEs. A plurality of MMEs are connected to one eNB. The Home-eNB 72-2 is connected to the MME 73 through the S1 interface, and control information is communicated between the Home-eNB and the MME. A plurality of Home-eNBs are connected to one MME.

Next, FIG. 7B is described. The UE 71 performs transmission/reception to/from the base station 72. The base station 72 is classified into the eNB (non-CSG cell) 72-1 and the Home-eNBs (CSG cells) 72-2. As in FIG. 7A, the eNB 72-1 is connected to the MMEs 73 through the S1 interface, and control information is communicated between the eNB and the MMEs. A plurality of MMEs are connected to one eNB. While, the Home-eNBs 72-2 are connected to the MMEs 73 through a Home-eNB Gateway (HeNBGW) 74. The Home-eNBs are connected to the HeNBGW through the S1 interfaces, and the HeNBGW 74 is connected to the MMEs 73 through an S1 flex interface. One or a plurality of Home-eNBs 72-2 are connected to one HeNBGW 74, and information is communicated therebetween through the S1 interfaces. The HeNBGW 74 is connected to one or a plurality of MMEs 73, and information is communicated therebetween through a S1_flex interface.

With the configuration of FIG. 7B, one HeNBGW 74 is connected to the Home-eNBs belonging to the same CSG-ID. As a result, in the case where the same information such as registration information is transmitted from the MME 73 to a plurality of Home-eNBs 72-2 belonging to the same CSG-ID, the information is once transmitted to the HeNBGW 74 and then transmitted to the plurality of Home-eNBs 72-2, with the result that signaling efficiency is enhanced more compared with the case where the information is directly transmitted to each of the plurality of Home-eNBs 72-2. While, in the case where each Home-eNB 72-2 communicates dedicated information with the MME 73, the information is merely caused to pass through the HeNBGW 74 (to be transparent) without being processed, which allows communication in such a manner that the Home-eNB 72-2 is directly connected to the MME 73.

Figure 8:
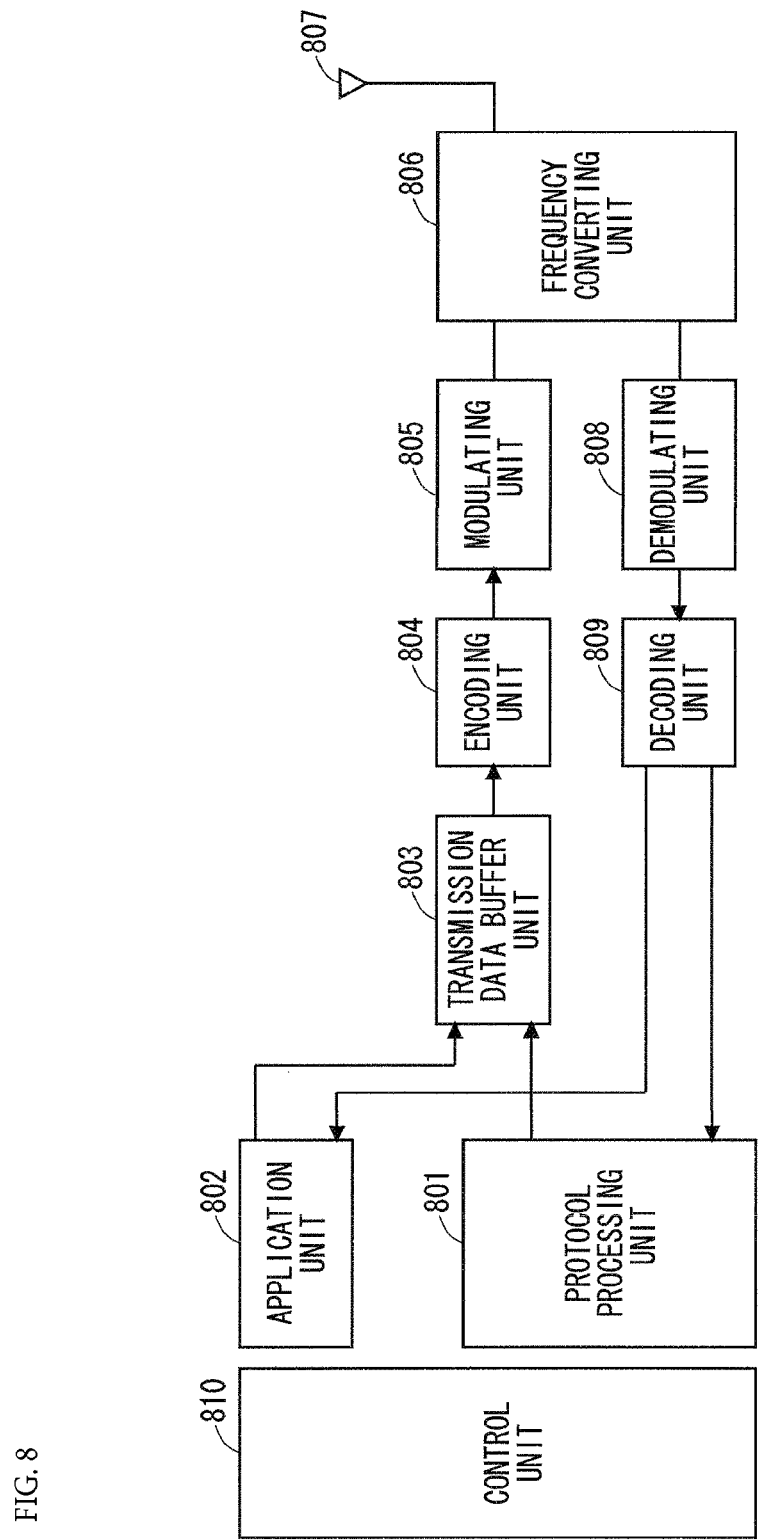
FIG. 8 is a block diagram showing the configuration of a UE 71 according to the present invention.

FIG. 8 is a block diagram showing the configuration of the UE (equipment 71 of FIG. 7A) according to the present invention. The transmission process of the UE shown in FIG. 8 is described. First, a transmission data buffer unit 803 stores the control data from a protocol processing unit 801 and the user data from an application unit 802. The data stored in the transmission data buffer unit 803 is transmitted to an encoding unit 804 and is subjected to encoding process such as error correction. There may exist the data output from the transmission data buffer unit 803 directly to a modulating unit 805 without encoding process. The data encoded by the encoding unit 804 is modulated by the modulating unit 805. The modulated data is output to a frequency converting unit 806 after being converted into a baseband signal, and then is converted into a radio transmission frequency. After that, a transmission signal is transmitted from an antenna 807 to a base station 72. A UE 71 executes the reception process as follows. The antenna 807 receives the radio signal from the base station 72. The received signal is converted from a radio reception frequency to a baseband signal by the frequency converting unit 806 and is then demodulated by a demodulating unit 808. The demodulated data is transmitted to a decoding unit 809 and is subjected to decoding process such as error correction. Among the pieces of decoded data, the control data is transmitted to the protocol processing unit 801, while the user data is transmitted to the application unit 802. A series of process of the UE is controlled by a control unit 810. This means that, though not shown, the control unit 810 is connected to the respective units (801 to 809).

Figure 9:
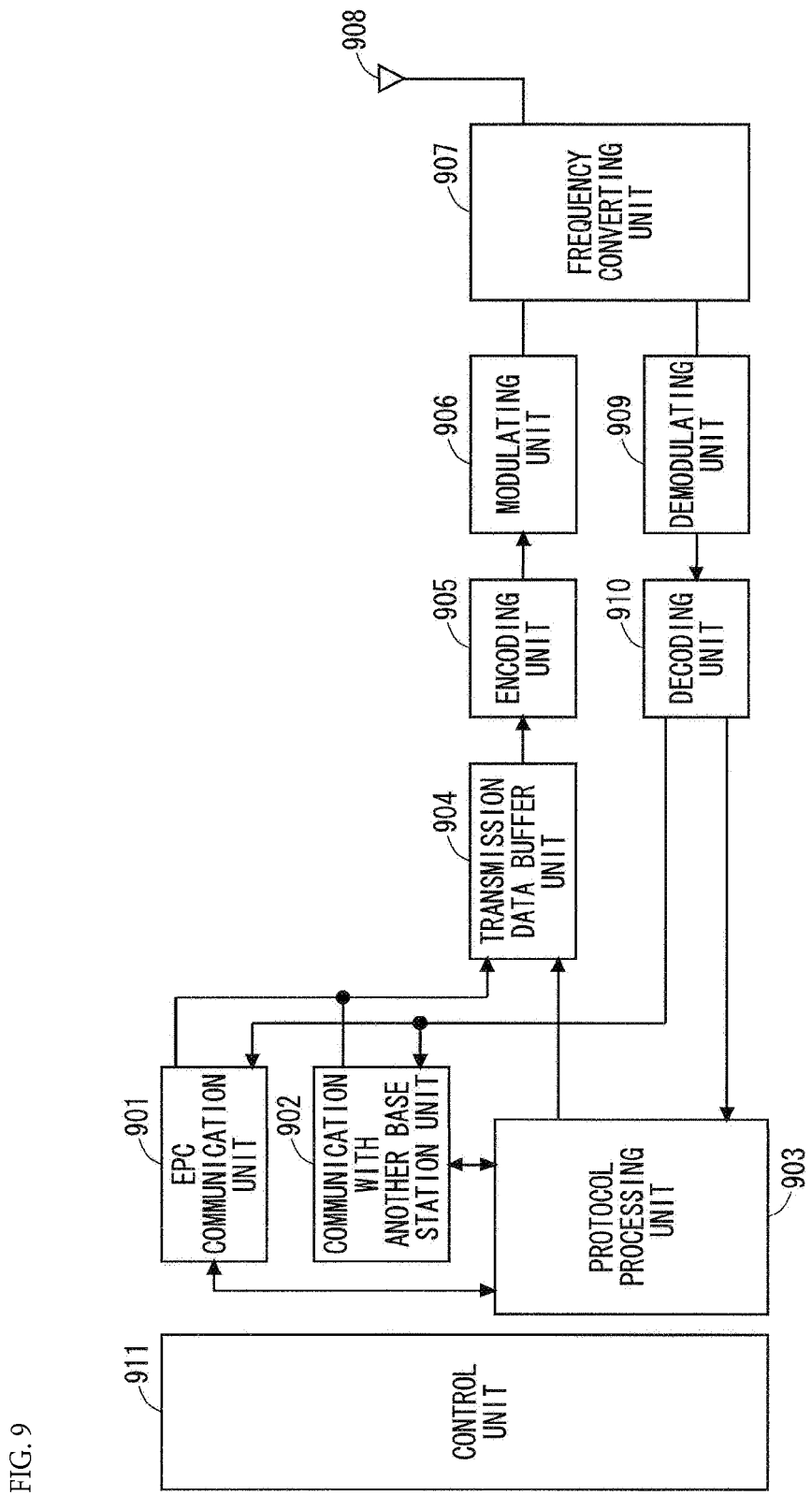
FIG. 9 is a block diagram showing the configuration of a base station 72 according to the present invention.

FIG. 9 is a block diagram showing the configuration of the base station (base station 72 of FIG. 7A) according to the present invention. The transmission process of the base station shown in FIG. 9 is described. An EPC communication unit 901 performs data transmission/reception between the base station 72 and the EPCs (such as MME 73 and HeNBGW 74). A communication with another base station 902 performs data transmission/reception to/from another base station. The EPC communication unit 901 and the communication with another base station unit 902 respectively transmit/receive information to/from the protocol processing unit 903. The control data from the protocol processing unit 903, and the user data and control data from the EPC communication unit 901 and the communication with another base station unit 902 are stored in the transmission data buffer unit 904. The data stored in the transmission data buffer unit 904 is transmitted to the encoding unit 905 and is then subjected to encoding process such as error correction. There may exist the data output from the transmission data buffer unit 904 directly to a modulating unit 906 without encoding process. The encoded data is modulated by the modulating unit 906. The modulated data is output to a frequency converting unit 907 after being converted into a baseband signal, and then is converted into a radio transmission frequency. After that, a transmission signal is transmitted from an antenna 908 to one or a plurality of UEs 71. While, the reception process of the base station 72 is executed as follows. A radio signal from one or a plurality of UEs 71 is received by the antenna 908. The received signal is converted from a radio reception frequency into a baseband signal by the frequency converting unit 907, and is then demodulated by a demodulating unit 909. The demodulated data is transmitted to a decoding unit 910 and is then subjected to decoding process such as error correction. Among the pieces of decoded data, the control data is transmitted to the protocol processing unit 903, EPC communication unit 901, or communication with another base station unit 902, while the user data is transmitted to the EPC communication unit 901 and communication with another base station unit 902. A series of process by the base station 72 is controlled by a control unit 911. This means that, though not shown, the control unit 911 is connected to the respective units (901 to 910).

Figure 10:
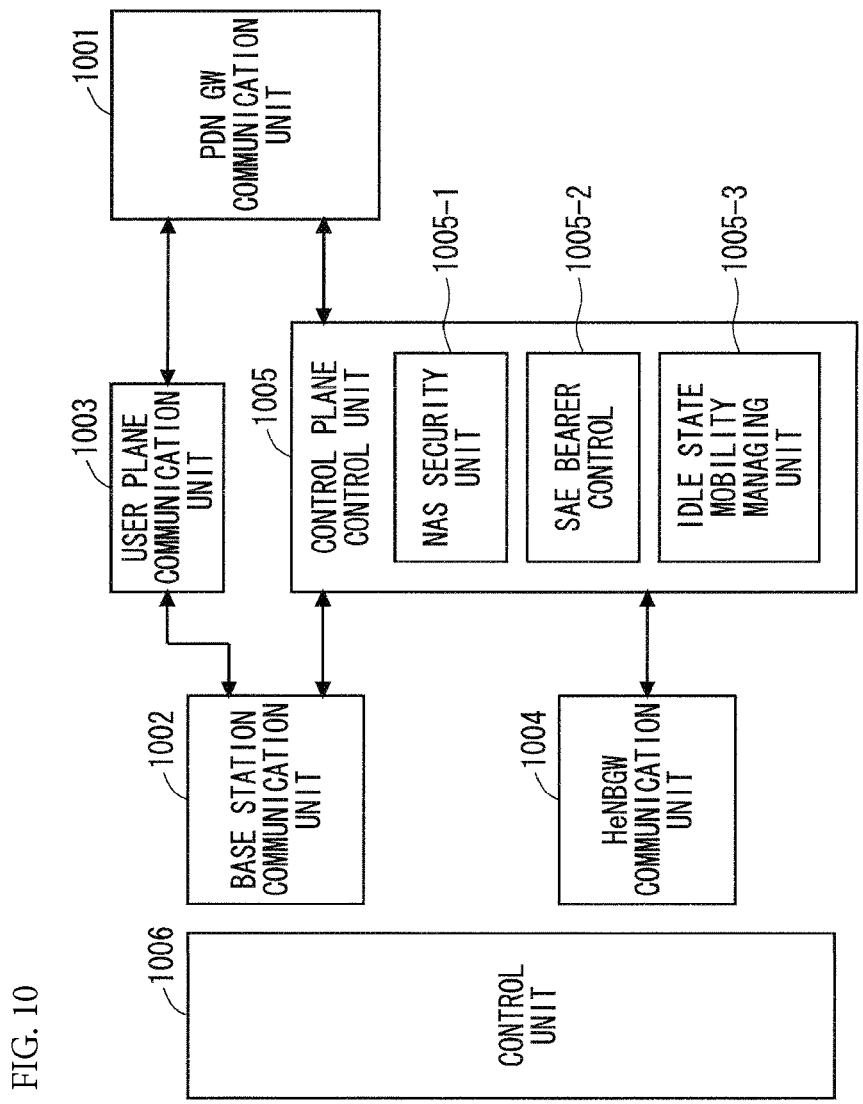
FIG. 10 is a block diagram showing the configuration of an MME according to the present invention.

FIG. 10 is a block diagram showing the configuration of a mobility management entity (MME) according to the present invention. A PDN GW communication unit 1001 performs data transmission/reception between an MME 73 and a PDN GW. A base station communication unit 1002 performs data transmission/reception between the MME 73 and the base station 72 through the S1 interface. In the case where the data received from the PDN GW is user data, the user data is transmitted from the PDN GW communication unit 1001 to the base station communication unit 1002 through a user plane processing unit 1003 and is then transmitted to one or a plurality of base stations 72. In the case where the data received from the base station 72 is user data, the user data is transmitted from the base station communication unit 1002 to the PDN GW communication unit 1001 through the user plane processing unit 1003 and is then transmitted to the PDN GW.

In the case where the data received from the PDN GW is control data, the control data is transmitted from the PDN GW communication unit 1001 to a control plane control unit 1005. In the case where the data received from the base station 72 is control data, the control data is transmitted from the base station communication unit 1002 to the control plane control unit 1005. A HeNBGW communication unit 1004 is provided in the case where the HeNBGW 74 is provided, which performs data transmission/reception by the interface (IF) between the MME 73 and the HeNBGW 74 according to an information type. The control data received from the HeNBGW communication unit 1004 is transmitted from the HeNBGW communication unit 1004 to the control plane control unit 1005. The processing results of the control plane control unit 1005 are transmitted to the PDN GW through the PDN GW communication unit 1001. The processing results of the control plane control unit 1005 are transmitted to one or a plurality of base stations 72 by the S1 interface through the base station communication unit 1002, or are transmitted to one or a plurality of HeNBGWs 74 through the HeNBGW communication unit 1004.

The control plane control unit 1005 includes a NAS security unit 1005-1, an SAE bearer control unit 1005-2, an idle state mobility managing unit 1005-3 and so on, and performs overall process for the control plane. The NAS security unit 1005-1 provides, for example, security of a non-access stratum (NAS) message. For example, the SAE bearer control unit 1005-2 manages a system architecture evolution (SAE) bearer. For example, the idle state mobility managing unit 1005-3 performs mobility management of an idle state (LTE-IDLE state, which is merely referred to as idle as well), generation and control of paging signaling in an idle state, addition, deletion, update and retrieval of one or a plurality of UEs 71 being served thereby, and tracking area (TA) list management. The MME begins a paging protocol by transmitting a paging message to the cell belonging to a tracking area (TA) in which the UE is registered. The idle state mobility managing unit 1005-3 may manage the CSG of the Home-eNBs 72-2 to be connected to the MME, CSG-IDs and a whitelist. In the CSG-ID management, the relationship between a UE corresponding to the CSG-ID and the CSG cell is managed (added, deleted, updated or retrieved). For example, it may be the relationship between one or a plurality of UEs whose user access registration has been performed with a CSG-ID and the CSG cells belonging to this CSG-ID. In the whitelist management, the relationship between the UE and the CSG-ID is managed (added, deleted, updated or retrieved). For example, one or a plurality of CSG-IDs with which user registration has been performed by a UE may be stored in the whitelist. Although other part of the MME 73 may perform those types of CSG-related management, through execution by the idle state mobility managing unit 1005-3, the method of using a tracking area code in place of a CSG-ID, which is currently under discussion of 3GPP meeting, can be efficiently performed. A series of process by an MME 73 is controlled by a control unit 1006. This means that, though not shown, the control unit 1006 is connected to the respective units (1001 to 1005).

Figure 11:
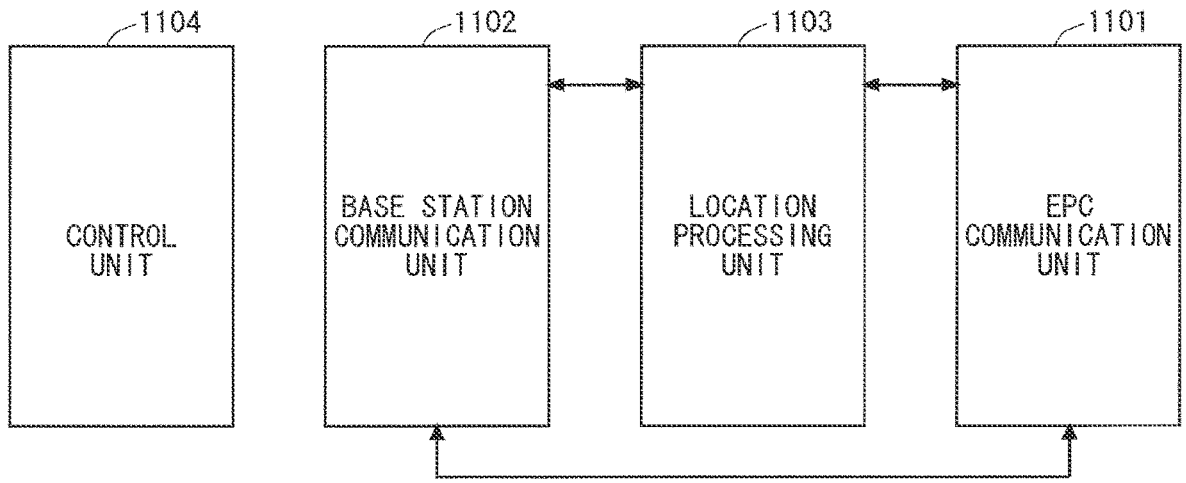
FIG. 11 is a block diagram showing the configuration of a HeNBGW according to the present invention.

FIG. 11 is a block diagram showing the configuration of the HeNBGW according to the present invention. An EPC communication unit 1101 performs data transmission/reception between the HeNBGW 74 and the MME 73 by the S1_flex interface. A base station communication unit 1102 performs data transmission/reception between the HeNBGW 74 and the Home-eNB 72-2 by the S1 interface. A location processing unit 1103 performs the process of transmitting, to a plurality of Home-eNBs, the registration information or the like among the data transmitted from the MME 73 through the EPC communication unit 1101. The data processed by the location processing unit 1103 is transmitted to the base station communication unit 1102 and is transmitted to one or a plurality of Home-eNBs 72-2 through the S1 interface. The data only caused to pass through (to be transparent) without requiring the process by the location processing unit 1103 is passed from the EPC communication unit 1101 to the base station communication unit 1102, and is transmitted to one or a plurality of Home-eNBs 72-2 through the S1 interface. A series of process by the HeNBGW 74 is controlled by a control unit 1104. This means that, though not shown, the control unit 1104 is connected to the respective units (1101 to 1103).

Figure 12:
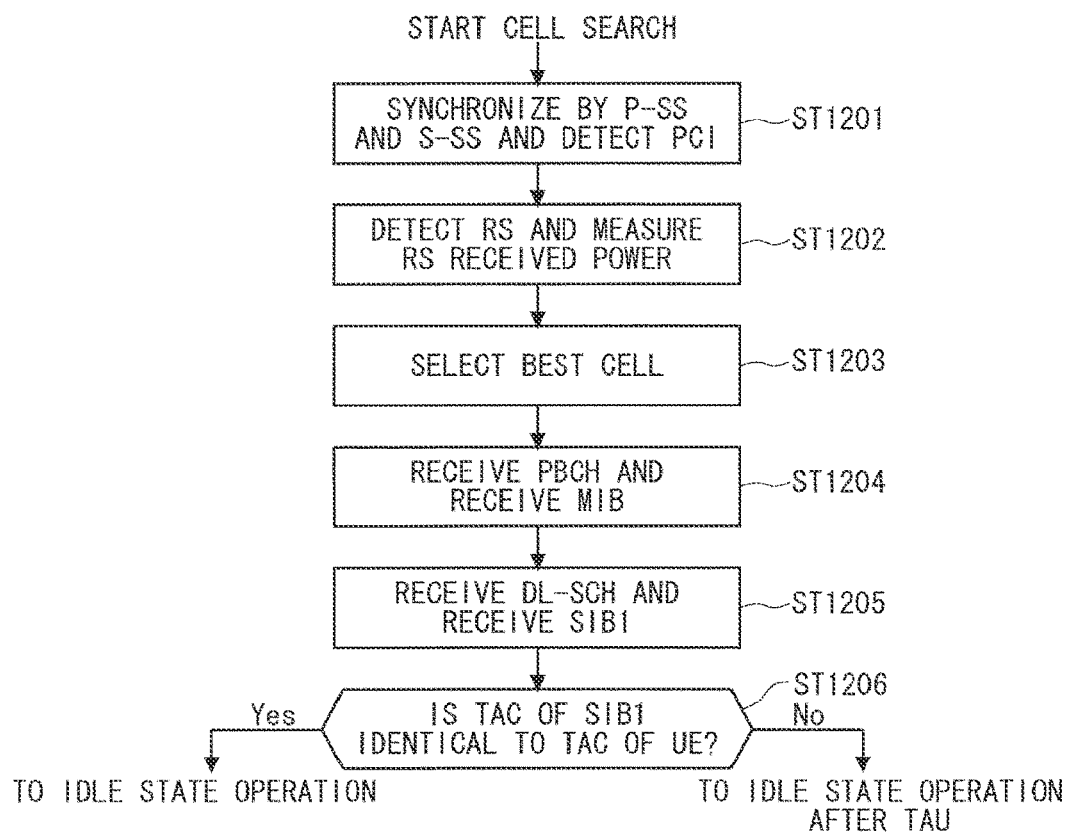
FIG. 12 is a flowchart schematically showing cell search performed by a user equipment (UE) in the LTE communication system.

Next, an example of a typical cell search method in a mobile communication system is described. FIG. 12 is a flowchart showing an outline from cell search to idle state operation performed by an user equipment (UE) in the LTE communication system. When the cell search is started by the UE, in Step ST1201, the slot timing and frame timing are synchronized by a primary synchronization signal (P-SS) and a secondary synchronization signal (S-SS) transmitted from a nearby base station. Synchronization codes, which correspond to physical cell identities (PCIs) assigned per cell one by one, are assigned to the synchronization signals (SS) including the P-SS and S-SS. The number of PCIs is currently studied in 504 ways, and these 504 ways are used for synchronization, and the PCIs of the synchronized cells are detected (identified). Next, in Step ST1202, a reference signal RS of the synchronized cells, which is transmitted from the base station per cell, is detected and the received power is measured. The code corresponding to the PCI one by one is used for the reference signal RS, and separation from other cell is enabled by correlation using the code. The code for RS of the cell is derived from the PCI identified in Step ST1201, which makes it possible to detect the RS and measure the RS received power. Next, in Step ST1203, the cell having the best RS reception quality (for example, cell having the highest RS received power; best cell) is selected from one or more cells that have been detected up to Step ST1202. In Step ST1204, next, the PBCH of the best cell is received, and the BCCH that is the broadcast information is obtained. A master information block (MIB) containing the cell configuration information is mapped on the BCCH on the PBCH. Examples of MIB information include the down link (DL) system bandwidth, transmission antenna number and system frame number (SFN).

In Step ST1205, next, the DL-SCH of the cell is received based on the cell configuration information of the MIB, to thereby obtain a system information block (SIB) 1 of the broadcast information BCCH. The SIB1 contains the information regarding access to the cell, information regarding cell selection and scheduling information of other SIB (SIBk; k is an integer equal to or larger than 2). In addition, the SIB1 contains a tracking area code (TAC). Further, the SIB1 may contain a CSG-ID. In Step ST1206, next, the UE compares the TAC received in Step ST1205 with the TAC that has been already possessed by the UE. In a case where they are identical to each other as a result of comparison, the UE enters an idle state operation in the cell. In a case where they are different from each other as a result of comparison, the UE requires a core network (EPC) (including MME and the like) to change a TA through the cell for performing tracking area update (TAU). The core network updates the TA based on an identification number (such as a UE-ID) of the UE transmitted from the UE together with a TAU request signal. The core network updates the TA, and then transmits the TAU reception signal to the UE. The UE rewrites (updates) the TAC (or TAC list) of the UE. After that, the UE enters the idle state operation in the cell.

In the LTE and universal mobile telecommunication system (UMTS), the introduction of a closed subscriber group (CSG) cell is studied. As described above, access is permitted for only one or a plurality of UEs registered in the CSG cell. One or a plurality of UEs registered with the CSG cell constitute one CSG. A specific identification number referred to as CSG-ID is added to the thus constituted CSG. Note that one CSG may contain a plurality of CSG cells. After being registered with any one of the CSG cells, the UE can access the other CSG cells of the CSG to which the registered CSG cell belongs. Alternatively, the Home-eNB in the LTE or the Home-NB in the UMTS is used as the CSG cell in some cases. One or a plurality of CSG cells included in one CSG-ID belong to the same TA. For this reason, one or a plurality of CSG cells included in one CSG-ID broadcast the same TAC mapped on the broadcast information to the UEs being served thereby. The UE registered in the CSG cell has a whitelist. Specifically, the whitelist is stored in the SIM/USIM. The CSG information of the CSG cell with which the UE has been registered is listed in the whitelist. Specific examples of CSG information include CSG-ID, tracking area identity (TAI) and TAC. Any one of the CSG-ID and TAC is adequate as long as they are associated with each other. Alternatively, GCI is adequate as long as the CSG-ID, TAC and global cell identity (GCI) are associated with each other. As can be seen from the above, the UE which does not have a whitelist (including a case where the whitelist is empty in the present invention) is not allowed to access the CSG cell but is allowed to access only the non-CSG cell. On the other hand, the UE which has a whitelist is allowed to access the CSG cell of the CSG-ID with which registration has been performed as well as the non-CSG cell.

Figure 13:
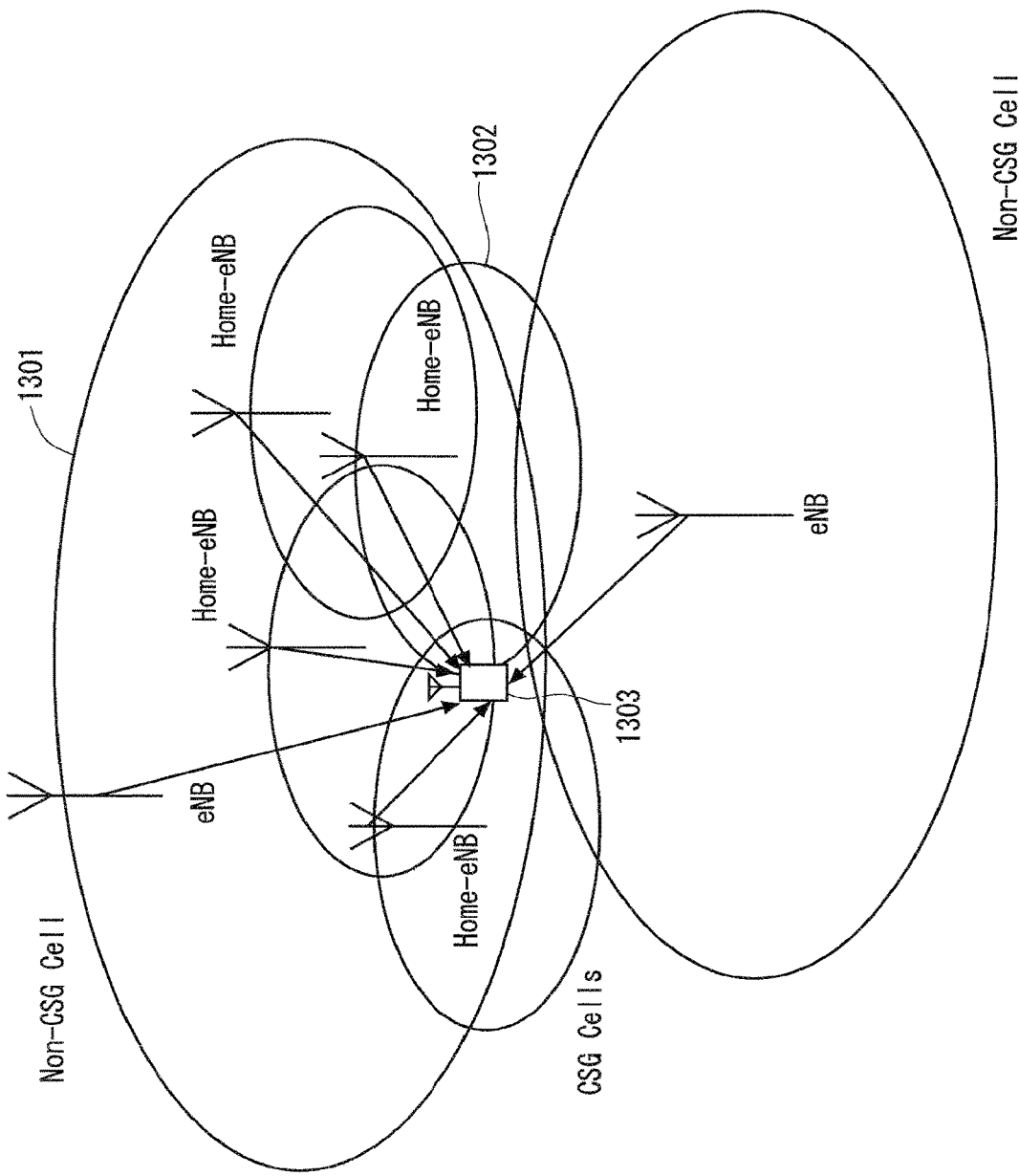
FIG. 13 is a conceptual diagram in a case where a large number of CSG cells exist.

A problem arises in a case where a UE performs cell search in a location with a large number of CSG cells. FIG. 13 is a conceptual diagram of cells in a case where there are a large number of CSG cells. In the figure, 1301 denotes a non-CSG cell of eNB, and 1302 denotes a CSG cell of Home-eNB. 1303 denotes a UE. A large number of CSG cells are required to be installed in apartment buildings, schools, companies and the like. The CSG cell is required to be used in such a manner that the CSG cells are installed for each room in apartment buildings, for each classroom in schools, and for each section in companies, so that only users who have registered with the respective CSG cells are allowed to use those CSG cells. Further, the CSG cells are assumed to have portable size and weight, and those CSG cells are also required to be installed or removed frequently and flexibly. Considering the above-mentioned demands, radio waves from a large number of CSG cells are simultaneously transmitted in one location. That is, a situation in which a UE 1303 is located in a position within the reach of the radio waves from a large number of CSG cells as shown in FIG. 13 occurs in apartment buildings, schools, companies and the like. In such a situation, there are the UEs that have a whitelist and the UEs that do not have a whitelist. A case in which the UE performs cell search in this situation is considered.

Figure 14:
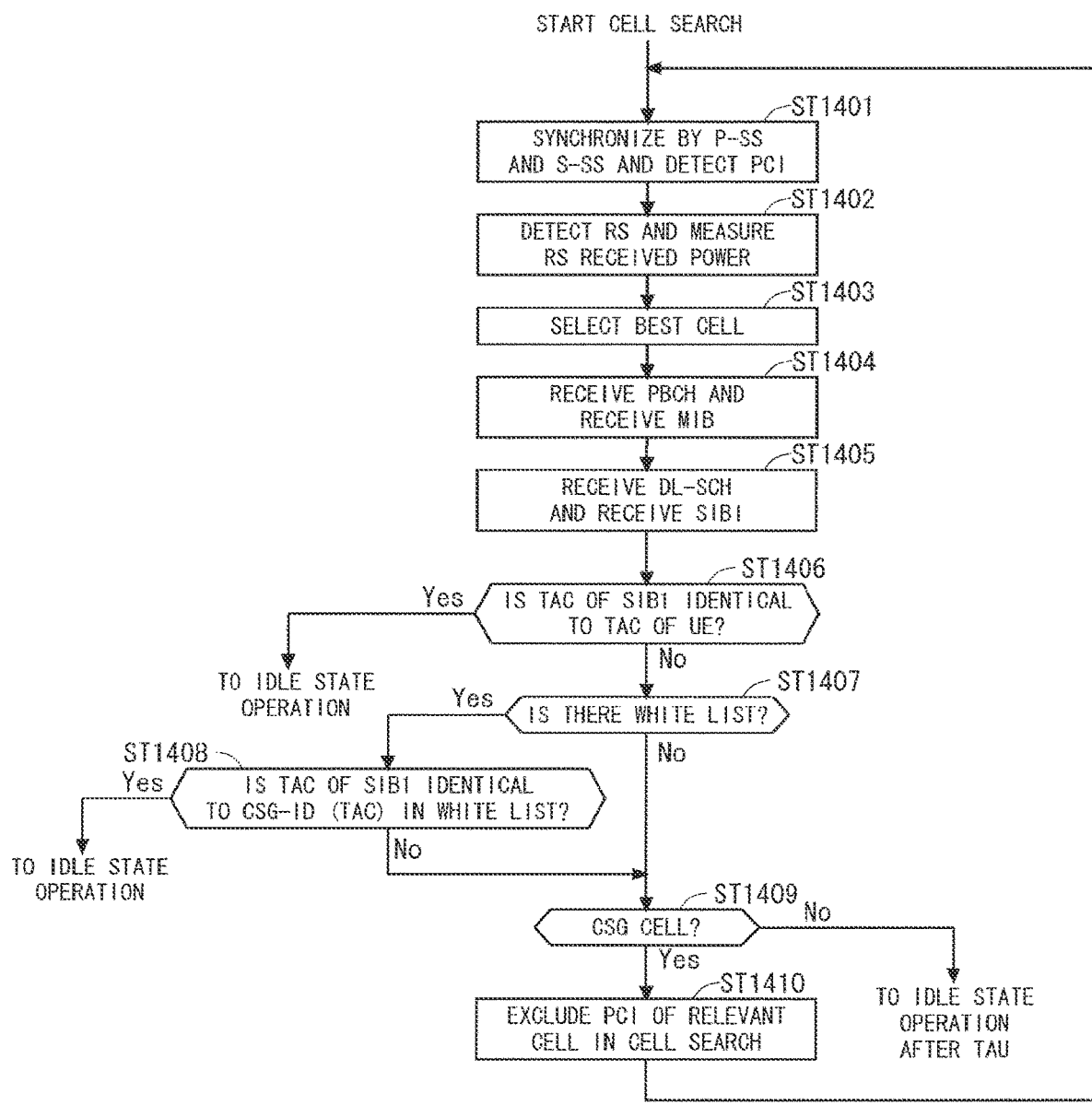
FIG. 14 is a flowchart of cell search of a UE located in a position within the reach of radio waves from a large number of Home-eNBs.

FIG. 14 shows an example of a flowchart of cell search of the UE located in a position within the reach of the radio waves from a large number of CSG cells. The UE starts cell search, and then the operation described as a typical case with reference to FIG. 12 is performed. In Step ST1401, synchronization is achieved by a primary synchronization signal P-SS and a secondary synchronization signal S-SS, and detection (identification) of a physical cell identity (PCI) is performed. In Step ST1402, an RS is detected and the RS received power is measured. In Step ST1403, the best cell is selected, and in Step ST1404, the PBCH of the selected cell is received and the MIB information is obtained. In Step ST1405, the DL-SCH is received and the information of SIB1 is obtained. Then, if the TAC information of the SIB1 is identical to the TAC of the UE, the UE proceeds to the idle state operation. On the contrary, in the case where they are not identical to each other, the operation is different from that described in a typical case. As described above, the UE that has a whitelist and the UE that does not have a whitelist are present in such a situation. In Step ST1407, whether the UE has a whitelist is determined. In a case where the UE has a whitelist, in Step ST1408, whether the TAC of the SIB1 is identical to the CSG-ID (TAC) of the whitelist is determined. This is because, in a case where the TAC of the SIB1 is not identical to the CSG-ID (TAC), registration has not been performed, and thus the access to the cell is prohibited. In the case where they are identical to each other, registration has been performed, and thus the access to the cell is permitted, whereby the UE proceeds to the idle state operation. In the case where they are different from each other, registration has not been performed, and thus access to the cell is not allowed, whereby the UE proceeds to Step ST1409. In Step ST1409, the UE determines whether the cell is a CSG cell. In the LTE, a CSG indicator indicating whether or not the own cell is a CSG cell is included in the SIB1 of the broadcast information of each cell. Therefore, it is possible to perform the determination of Step ST1409 using the CSG indicator included in the information of the SIB1 that has been obtained in Step ST1405. In a case where the CSG indicator indicates a CSG cell, the UE proceeds to Step ST1410. In Step ST1410, the UE stores the PCI of the cell, and performs setting such that the PCI of the cell is excluded when cell search and selection of the best cell are performed thereafter. This is because even if the cell is a CSG cell, it is a cell of a CSG-ID (TAC) that is not listed on the whitelist of the UE. In order that the UE stores the PCI of the CSG cell that cannot be accessed, where the UE has performed cell search and best cell selection once, the list of the PCI that cannot be accessed or the like may be provided for writing in the list. The PCI of the CSG cell that cannot be accessed may be set so as to be reset or erased when the timer is provided and its timer period ends and/or when registration is made with a new CSG-ID. In a case where the cell is determined not to be a CSG cell in Step ST1409, it is a non-CSG cell, and thus the UE proceeds to the idle state operation after TAU.

On the other hand, in the case where the UE does not have a whitelist in Step ST1407, the UE proceeds to Step ST1409. In a case where the cell is not a CSG cell as a result of the determination of Step ST1409, the UE proceeds to the idle state operation after TAU, whereas in the case where the cell is a CSG cell, the UE performs the process of Step ST1410 in a similar manner and performs cell search and selection of the best cell again. In a case where a CSG cell is found after performing cell search and selection of the best cell again, Step ST1407, Step ST1409 and Step ST1410 are performed again, which results in performing cell search and selection of the best cell again. As described above, in particular, a UE that does not have a whitelist performs the cell search for every cell and selection of the best cell even when it is obviously not allowed to access the CSG cell. As a result, in a case of a UE located in a position within the reach of radio waves from a large number of Home-eNBs as shown in FIG. 13, it is highly likely that a large number of CSG cells are searched and the best cell selection is performed, resulting in a situation where the operations of Step ST1401, Step ST1402, Step ST1403, Step ST1404, Step ST1405, Step ST1406, Step ST1407, Step ST1409 and Step ST1410 are repeated several times. This leads to a problem that a very large amount of time is required before entering the idle state operation, causing a long control delay as a system. In addition, another problem arises where a UE that has no other choice but to repeat cell search consumes a large amount of power. This problem occurs even in a case where a UE stores the PCI of a CSG cell that cannot be accessed in Step ST1410, and then performs setting so as to exclude the PCI of that cell in the cell search and selection of the best cell performed thereafter. This problem becomes serious assuming a future arrangement situation of CSG cells as described above.

In order to solve the above-mentioned problems, 3GPP discusses that all physical cell identities (PCIs) are split (referred to as PCI-split) into ones reserved for CSG cell and the others reserved for non-CSG cell (Non-Patent Document 4). By splitting all PCIs into ones reserved for CSG cell and the others reserved for non-CSG cell, the UE that does not have a whitelist during cell search is merely required to achieve synchronization of P-SCH and S-SCH by the PCI reserved for non-CSG cell to identify the PCI, and accordingly does not need to search a CSG cell. However, a UE always has to be aware of the PCI split information before performing cell search. For this reason, 3GPP proposes that the PCI split range is fixed, that is, that the range of PCIs to be assigned to CSG cells and the range of PCIs to be assigned to non-CSG cells are determined in advance. For example, it is determined in advance that PCIs #0 to #49 are assigned to the CSG cells and PCIs #50 to #503 are assigned to the non-CSG cells, which is described in specifications. This enables a UE to recognize these values before performing cell search without fail, whereby it is possible for a UE that does not have a whitelist to avoid searching a CSG cell wastefully during cell search.

However, as described above, the method of preliminarily determining the range of PCIs to be assigned to the CSG cell and the range of PCIs to be assigned to the non-CSG cell does not satisfy the demand for Home-eNB described above. That is, the Home-eNBs are assumed to have portable size and weight, and those Home-eNBs are required to be installed or removed frequently and flexibly. Considering the above-mentioned demand, the number of CSG cells varies in accordance with various situations such as an operator, frequency layer, installation location and time. Therefore, there occurs a problem that the preliminary determination of PCI split information is unable to cope with the number of CSG cells that varies due to flexible and frequent installation or removal of Home-eNBs.

Figure 15:
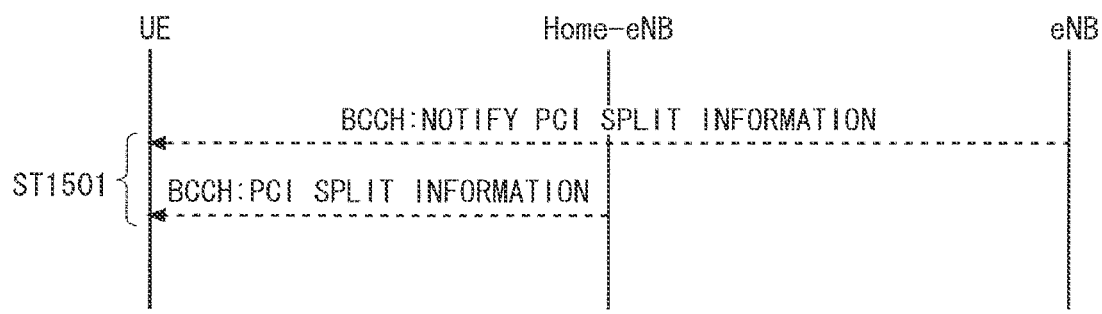
FIG. 15 is a sequence diagram for broadcasting PCI split information according to a first embodiment.
Figure 16:
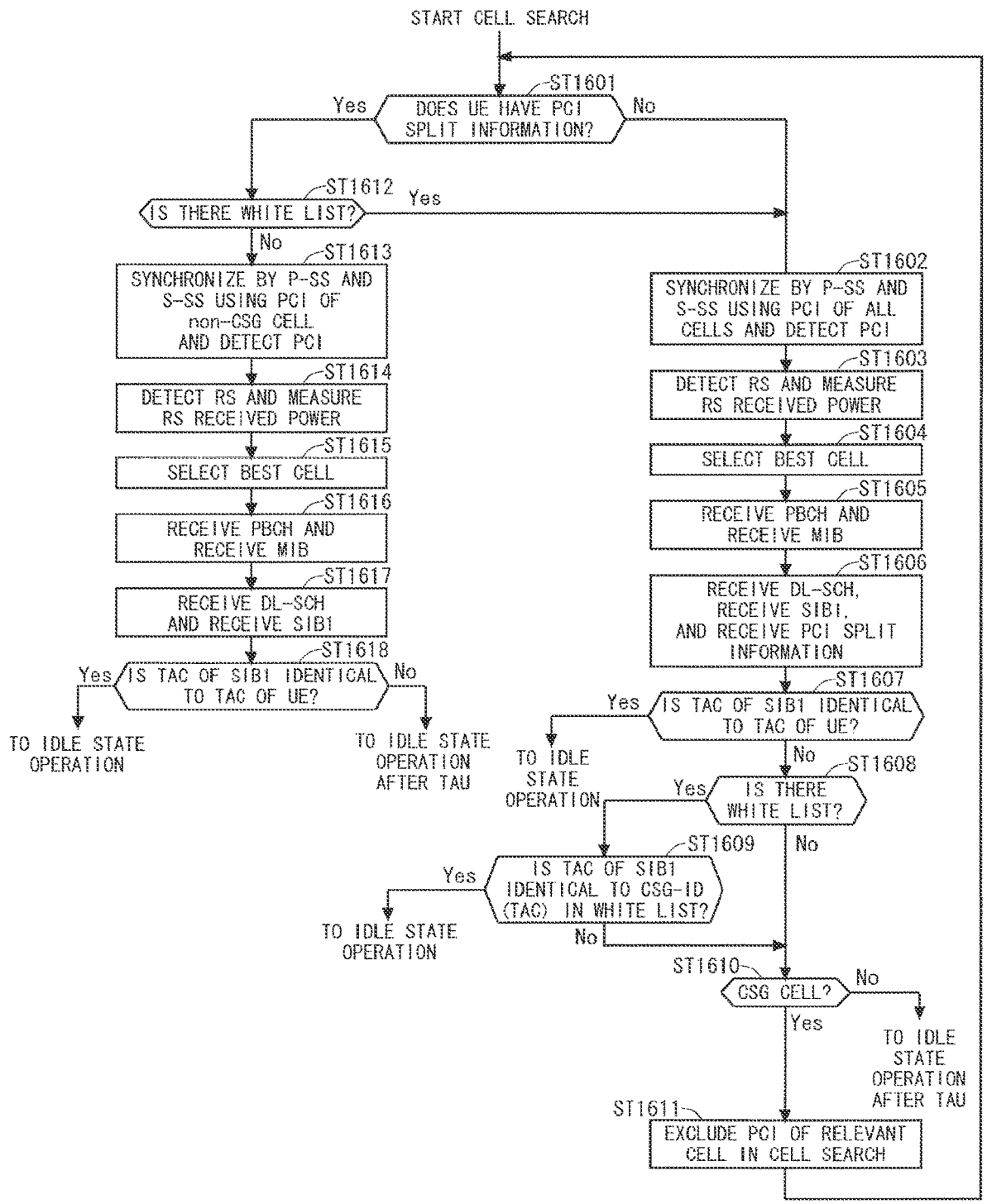
FIG. 16 is a flowchart of cell search of a UE according to the first embodiment.

In order to solve the above-mentioned problem, there is disclosed a method of mapping the PCI split information on the absolutely required minimum broadcast information received from cell search in an idle state operation, to thereby broadcast the PCI split information to UEs being served. FIG. 15 is a sequence diagram for broadcasting the PCI split information in the LTE communication system. For example, in the LTE communication system, examples of the absolutely required minimum broadcast information received from cell search to idle state operation include the SIB1. All base stations (Home-eNBs (CSG cells) and eNBs (non-CSG cells)) map the PCI split information into the SIB1, and map the BCCH including the SIB1 to the DL-SCH. Then, all base stations each transmit the DL-SCH and broadcast the PCI split information mapped into the SIB1 to the user equipments (UEs) being served thereby. It is assumed here that the PCI split information transmitted from all base stations is the PCI split information on a frequency layer to which the own cell belongs. Next, FIG. 16 is a flowchart of cell search of a UE in this method. A UE starts cell search. First, it is determined in Step ST1601 whether the UE has the PCI split information. For example, when power supply is turned on or when the UE has not obtained the PCI split information yet, the UE proceeds to Step ST1602. The UE that has proceeded to Step ST1602 performs the method described with reference to the flowchart shown in FIG. 14, and performs the process from Step ST1602 to Step ST1611. A difference from the flowchart shown in FIG. 14 is that the process of receiving the PCI split information included in the SIB1 transmitted by the DL-SCH is performed in Step ST1606. The UE that has received the PCI split information stores this PCI split information. A PCI split information list may be provided, which may store the PCI split information together with the PLMN and frequency layer. The PCI split information stored in the list is configured so as to be rewritten when the broadcast information is modified.

The PCI split information stored in the list may be reset or erased when power supply is turned on/off, when interfrequency layer reselection is performed, or when intersystem reselection is performed. When proceeding to Step ST1611, the UE that has obtained the PCI split information in Step ST1606 is capable of using the PCI split information during the subsequent cell search and selection of the best cell in Step ST1601. The UE is determined to have the PCI split information in Step ST1601, and then proceeds to Step ST1612. The UE that has proceeded to Step ST1612 is determined whether to have a whitelist. In a case where the UE has a whitelist, the UE proceeds to Step ST1602 and performs operations of Step ST1602 to Step ST1611 again.

However, the UE that does not have a whitelist proceeds to Step ST1613 and achieves synchronization of P-SS and S-SS by the PCI of a non-CSG cell to detect (identify) the PCI by the PCI split information obtained in Step ST1606 of the first cell search. The UE that has identified the PCI proceeds to Step ST1614 and performs the process of Step ST1614 to Step ST1618. This process is identical to the process in typical cell search. What matters is that because synchronization between P-SS and S-SS is achieved by the PCI of a non-CSG cell and the PCI is detected (identified), the CSG cell is not searched. This solves the problem that a UE which does not have a whitelist repeats the operations of Step ST1602 to Step ST1611 (other than Step ST1609) many times even though the UE is fully aware of that it cannot access the CSG cell, which results from the method described with reference to the flowchart shown in FIG. 14.

Further, for example, in a case where a UE that does not have a whitelist, which has obtained the PCI split information in the first cell search after power-on, subsequently performs cell search again, the UE has the PCI split information. As a result, the determination of Step ST1601 is "Yes", and the UE proceeds to Step ST1612. The UE that has proceeded to Step ST1613 to Step ST1618. Accordingly, the problem that the UE that does not have a whitelist repeats the operations of Step ST1602 to Step ST1611 (other than Step ST1609) even though the UE is fully aware of that it cannot access the CSG cell, which occurs by the method described with reference to the flowchart shown in FIG. 14, is solved also in this case.

There are various types of broadcast information blocks. In a case where the PCI split information is mapped into the SIB other than the SIB1, it is not received in a period of time from typical cell search to idle state operation. In order to receive the MIB and the broadcast information block other than SIB1 (SIBk; k is an integer equal to or larger than 2), the scheduling information (assigned information) of the other SIB mapped on the SIB1 needs to be received, and thus a much longer period of time is required, which causes a delay, and also the power consumption of a UE increases further. The PCI split information is mapped into the absolutely required minimum broadcast information in a time period from cell search to idle state operation, whereby the UE is not required to obtain other broadcast information block, so that it is allowed to obtain the PCI split information with low power consumption in a short period of time. It is possible to construct an excellent system with a little control delay as a system. For example, in the LTE communication system, examples of the absolutely required minimum broadcast information received in a time period from cell search to idle state operation include the MIB and SIB1.

With the use of the method of mapping the PCI split information on the SIB1 of the broadcast information to broadcast the PCI split information to UEs being served, which is disclosed in the present embodiment, the UE that does not have a whitelist can avoid wastefully searching CSG cells in the second cell search and the subsequent cell search. As a result, a problem that a long control delay occurs as a system due to a very large amount of time required for cell search to entering an idle state operation and a problem that power is consumed considerably by a UE are solved. This enables to construct a mobile communication system capable of satisfying a demand for future installation of a large number of Home-eNBs and a demand for coping with a flexible change of the number of CSG cells, which arises from frequent and flexible installation and removal of Home-eNBs.

With the use of the method of mapping, by all cells (non-CSG cells and CSG cells), the PCI split information on the absolutely required minimum broadcast information received for cell search to idle state operation to broadcast the PCI split information to UEs being served thereby, even a UE that has a whitelist is capable of selectively searching for a CSG cell or non-CSG cell. For example, in a case where a UE that has a whitelist preferentially accesses a CSG cell, not a non-CSG cell, the UE is capable of searching a CSG cell preferentially using the PCI split information obtained through the reception of the SIB1. In this case, the operations of Step ST1612 and thereafter shown in FIG. 16 may be performed as follows. In a case where it is determined that a UE has a whitelist in Step ST1612, the UE achieves synchronization of the primary synchronization signal P-SS and the secondary synchronization signal S-SS by the PCI of the CSG cell, and detects (identifies) the PCI. A reference signal (RS) is detected with the identified PCI and the received power thereof is measured. Then, the best cell is selected through comparison of the received power that has been measured. The PBCH of the selected cell is received to receive the MIB, and further, the DL-SCH is received to receive the SIB1. The UE proceeds to the idle state operation if a tracking area code (TAC) mapped on the SIB1 is identical to that of a UE, while in a case where they are different from each other, the UE compares as to whether the tracking area code TAC of the SIB1 is identical to the CSG-ID (TAC) within the whitelist of the UE. In a case where they are identical to each other, the UE proceeds to an idle state operation. In a case where they are different from each other, the UE performs cell search again. Then, in a case where cell search is performed using the PCI of the CSG cell and there exists no cell to be selected, the UE starts the operation of performing cell search using the PCI of the non-CSG cell. This enables to perform CSG cell search in a preferential manner, so that cell search and cell selection for a non-CSG cell are performed when a CSG cell that can be selected is not found.

Although the description above is given of the case where a UE that has a whitelist preferentially accesses a CSG cell, not a non-CSG cell, a UE can preferentially access a non-CSG cell, but a CSG cell. In a case where it is determined that a UE has a whitelist in Step ST1612, the UE achieves synchronization of P-SS and S-SS by the PCI of a non-CSG cell and detects (identifies) the PCI. The UE detects the RS with the use of the identified PCI and measures the RS received power. The UE compares the measured RS received power to select the best cell. The UE receives the PBCH of the selected cell to receive the MIB, and further, receives the DL-SCH to receive the SIB1. In a case where the TAC mapped on the SIB1 is identical to the TAC of the UE, the UE proceeds to an idle state operation, or proceeds to an idle state operation after TAU in a case where they are different from each other. Then, in a case where the UE performs cell search using the PCI of a non-CSG cell and there exists no cell to be selected, the UE starts the operation of performing cell search using the PCI of a CSG cell. This enables to perform the non-CSG cell search in a preferential manner, and thus it is possible to perform cell search for CSG cells and cell selection when there exists no non-CSG cell that can be selected.

Therefore, even a UE that has a whitelist is capable of avoiding wasteful cell search when performing the second cell search and the subsequent search. As a result, a problem that a long control delay as a system occurs due to a very large amount of time required for a period of time from cell search to entering an idle state operation and a problem that a UE consumes a large amount of power can be solved and, besides, it is possible to selectively search a CSG-cell or non-CSG cell. This enables the construction of a mobile communication system capable of satisfying a demand for future installation of a large number of Home-eNBs, a demand for coping with a flexible change of the number of CSG cells, which results from frequent and flexible installation or removal of a Home-eNB, and demands of a UE that desires to, for example, preferentially access the registered CSG cell, not a non-CSG cell and a system desired to be accessed.

Although the method of mapping the PCI split information on the SIB1 of the broadcast information to broadcast the PCI split information to UEs being served is described above, the method of mapping the PCI split information on the MIB of the broadcast information to broadcast the PCI split information to UEs being served may be disclosed. In such a case, FIG. 15 is applicable as a sequence diagram. All base stations (eNBs and Home-eNBs) map the PCI split information into the MIB and map the BCCH including the MIB on the PBCH. Then, all base stations transmit the PBCH to the user equipments (UEs) being served thereby and broadcast the PCI split information mapped into the MIB. It is assumed here that the PCI split information to be transmitted by all base stations is the PCI split information on a frequency layer to which the own cell belongs. The flowchart of cell search of a UE in this method may be obtained by changing Step ST1605 and Step ST1606 of FIG. 16 as follows. The PCI split information is mapped into the MIB and then is broadcast from the base station, and thus a UE receives the PCI split information in Step ST1605. While, in Step ST1606, the UE does not receive the PCI split information. The above-mentioned change enables cell search. With the use of the method of mapping the PCI split information on the MIB of the broadcast information to broadcast the PCI split information to UEs being served, the above-mentioned effects can be obtained in a similar manner.

Figure 17:
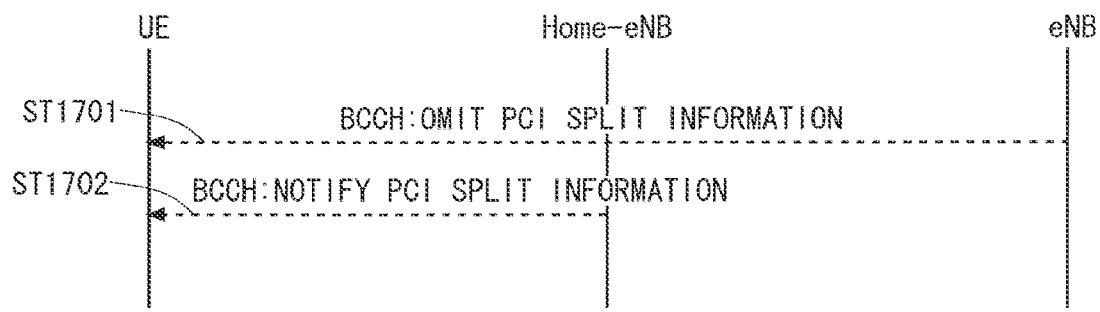
FIG. 17 is a sequence diagram for broadcasting PCI split information according to a first modified example of the first embodiment.

A modified example of the first embodiment is described. The first embodiment discloses the method of mapping the PCI split information from all cells (CSG cells and non-CSG cells) on the absolutely required minimum broadcast information received for cell search to idle state operation to broadcast the PCI split information to UEs being served. The first modified example discloses the method of mapping the PCI split information from only the CSG cell on the absolutely required minimum broadcast information received for cell search to idle state operation to broadcast the PCI split information to UEs being served. FIG. 17 is a sequence diagram for broadcasting the PCI split information in the LTE communication system. In Step ST 1702, a Home-eNB maps the PCI split information into the SIB1 and maps the BCCH including the SIB1 on the DL-SCH. Then, all Home-eNBs transmit the DL-SCH to user equipments (UEs) being served thereby and broadcast the PCI split information mapped into the SIB1. It is assumed here that the PCI split information transmitted by the Home-eNB is the PCI split information on a frequency layer to which the own cell belongs. While, in Step ST1701, the eNB does not broadcast the PCI split information to user equipments (UEs) being served thereby. In this modified example, a UE is capable of obtaining the PCI split information only in a case where the cell obtained by the cell search and best cell selection is a CSG cell. Even in this case, however, a UE that does not have a whitelist is capable of solving a problem that operations of Step ST1602 to Step ST1611 (other than Step ST1609) of FIG. 16, such as cell search and best cell selection of the CSG cell that cannot be accessed thereafter, are repeated several times due to the CSG cell being selected as the best cell once.

With the use of the method of mapping the PCI split information only from the Home-eNB on the SIB1 or MIB of the broadcast information to broadcast the PCI split information to UEs under its control, the effects described in the first embodiment are obtained and, besides, it is not required to transmit new information (PCI split information) for CSG to the broadcast information from a non-CSG cell. This does not require a change in the LTE system (eUTRA/eUTRAN) that does not include existing CSGs, which improves compatibility.

Second Embodiment

Figure 18:
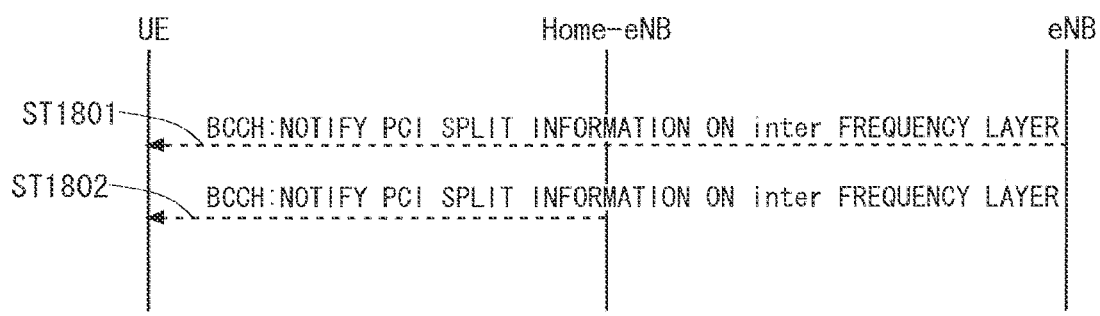
FIG. 18 is a sequence diagram for broadcasting PCI split information on the other frequency layer.

The first embodiment discloses the method of mapping, by all cells (non-CSG cells and CSG cells), the physical cell identity (PCI) split information on the absolutely required minimum broadcast information received in a period of time from cell search to idle state operation to broadcast the PCI split information to UEs being served thereby. The PCI split information is the PCI split information of the frequency layer to which the own cell belongs. A second embodiment discloses the method of broadcasting, by all base stations (eNBs and Home-eNBs), the PCI split information of the other frequency layer as the broadcast information to UEs being served thereby. FIG. 18 is a sequence diagram for broadcasting the PCI split information on the other frequency layer in the LTE communication system. All base stations (Home-eNBs and eNBs) cause the PCI split information on the other frequency layer different from a frequency layer to which the own cell belongs to be included in the broadcast information. Specifically, BCCH includes the PCI split information. All base stations broadcast the broadcast information to user equipments (UEs) being served thereby. Accordingly, the UEs being served are allowed to obtain the PCI split information on the other frequency layer from the broadcast information from a serving cell. This enables a UE to use the PCI split information on the other frequency layer when the processes related to the other frequency layer, such as cell search, cell selection, cell reselection and handover, are required. The PCI split information on the other frequency layer can be used, which enables, for example, when inter-frequency layer cell search and cell selection are performed, the use of the PCI split information on a desired frequency layer from the first cell search and cell selection. This enables a UE that does not have a whitelist to avoid searching from CSG cells that cannot be accessed when cell search is performed. This solves a problem that a long control delays occurs as a system due to a very large amount of time required for a period of time from the cell search for the other frequency layer to idle state operation and a problem that a UE consumes a large amount of power. Accordingly, it is possible to construct a mobile communication system capable of satisfying a demand for future installation of a large number of Home-eNBs and a demand for coping with a flexible change of the number of CSG cells, which arises from frequent and flexible installation or removal of Home-eNBs. The other frequency layer may be one or more. In such a case, a UE may store the PCI split information and a priority of the frequency or the like in pair (for example, may store those as a list).

In the second embodiment, the broadcast information, specifically, BCCH, includes the PCI split information on the other frequency layer different from the frequency layer to which the own cell belongs. Specifically, the PCI split information may be added to an SIB5 that is the broadcast information block on which the broadcast information of a frequency layer different from that of the own cell is mapped, which is currently under discussion of 3GPP. The base station maps the BCCH including the SIB5 on which the broadcast information of the frequency layer different from that of the own cell is mapped to the DL-SCH, and transmits the DL-SCH to user equipments (UEs) under its control. By reception of the SIB5, the UE is capable of performing cell search and cell selection for the other frequency layer and so on with low power consumption in a short period of time with the use of the PCI split information on the other frequency layer of the SIB5 in the case of the cell search and cell selection for the other frequency layer and so on.

Alternatively, the PCI split information on the other frequency layer different from the frequency layer to which the own cell belongs may be transmitted as the dedicated information. For example, the cell may include the PCI split information on the other frequency layer different from the frequency layer to which the own cell belongs in the dedicated control information, specifically, DCCH, and transmit the PCI split information to UEs under its control in a dedicated manner. Still alternatively, UEs being served by one cell may transmit a request message for requesting the cell to transmit the PCI split information as dedicated information in a dedicated manner. Yet still alternatively, for example, a cell may includes the PCI split information on the other frequency layer different from the frequency layer to which the own cell belongs in the paging information, specifically, PCCH, to transmit the PCI split information to UEs under its control in a dedicated manner. This enables each cell to transmit the PCI split information on the other frequency layer different from the frequency layer to which the own cell belongs as required, leading to an improvement in radio resource usage efficiency.

In the first and second embodiments, the PCI split information is transmitted from the non-CSG cell or CSG cell to UEs. The PCI split information may be generated by a core network and transmitted to UEs through a non-CSG cell or CSG cell. Also in this case, similar effects to those described above are obtained.

While the long term evolution (LTE) communication system in which a Home-eNB or Home-eNB in which a closed subscriber group cell (CSG cell) is used, and UMTS (the universal mobile telecommunication system) are described in the first and second embodiments, the present invention is also applicable to the UMTS using a Home-NB in which a CSG is not used. The PCI may be split for the Home-NB and the other NB to serve as the PCI split information, and the PCI split information may be included in the broadcast information from all base stations (NB and Home-NB) to be broadcast to UEs being served thereby. Of the broadcast information, the PCI split information may be included in the broadcast information block required for the cell search and cell selection to be broadcast to UEs being served. This prevents a UE that has not been registered with the Home-NB from wastefully performing cell search and cell selection, which solves a problem that a long control delay occurs as a system due to a large amount of time required for a period of time from cell search to idle state operation and a problem that a UE consumes a very large amount of power. Accordingly, it is possible to construct a mobile communication system capable of satisfying demands for coping with the case where a large number of Home-NBs are installed in the future and the case where the Home-NBs need to be installed or removed frequently and flexibly.

Third Embodiment

The first and second embodiments disclose the method of transmitting/receiving the PCI split information for constructing a mobile communication system capable of satisfying a demand for future installation of a large number of closed subscriber group (CSG) cells and a demand for coping with a flexible change of the number of CSG cells, which arises from frequent and flexible installation or removal of the CSG cells. The present embodiment describes the problem relating to handling of a whitelist, which arises from the installation of a large number of CSG cells and the installation or removal of the CSG cells that is frequently and flexibly performed, and discloses the method of solving that problem.

Figure 19:
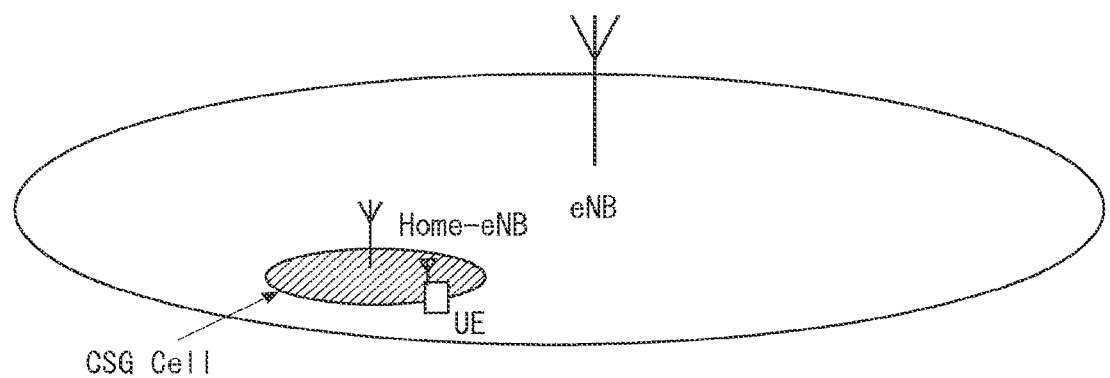
FIG. 19 is a diagram showing a case where a Home-eNB is located within an eNB area.

Currently, 3GPP discusses the method of obtaining a whitelist in a case where a UE performs registration with a CSG cell in the LTE system (Non-Patent Document 5). 3GPP agrees to the method in which a UE is notified a whitelist through a non-CSG cell. FIG. 19 shows a case where a Home-eNB (CSG cell) is located within an area of an eNB (non-CSG cell). A user equipment (UE) is located within the CSG cell area. While one CSG cell is located within a non-CSG cell in the figure, a plurality of CSG cells may be located. The method of obtaining a whitelist in such a situation is described. First, the Home-eNB owner notifies the network operator that the user access registration of the user equipment (UE) of the user has been performed. After that, the network operator notifies the user equipment (UE) of the whitelist from the higher layers. The whitelist is notified through an eNB (non-CSG cell).

Figure 20:
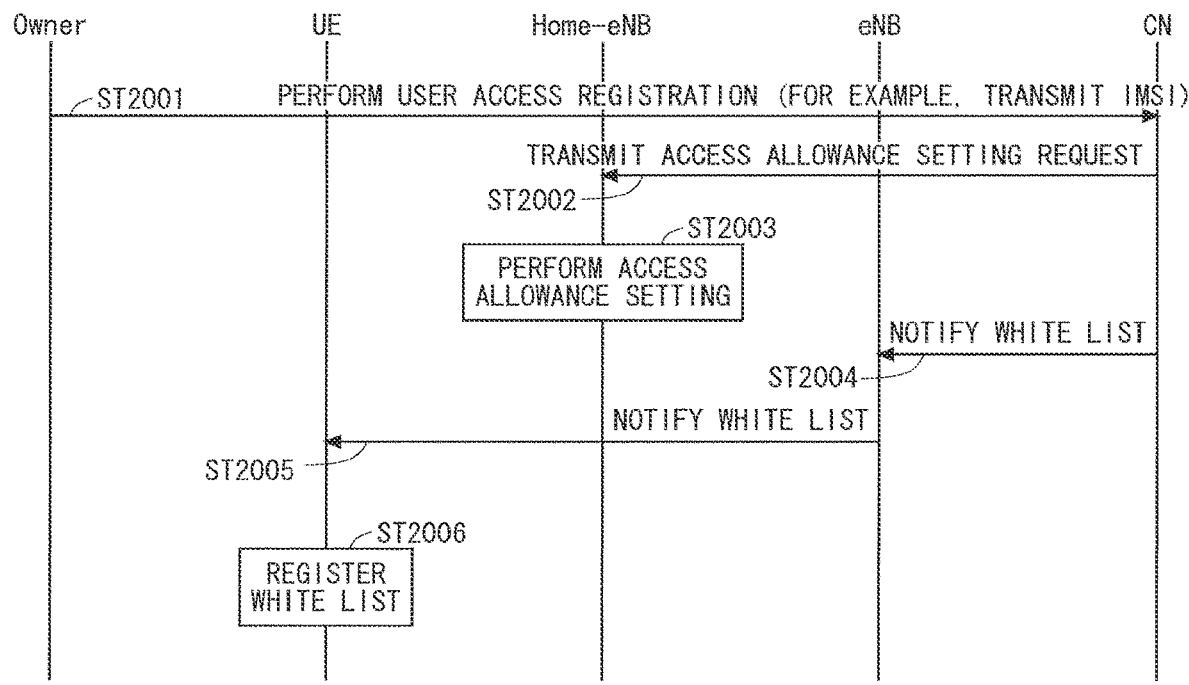
FIG. 20 is a sequence diagram of a method of notifying a whitelist through a non-CSG cell, which is under discussion of 3GPP.

FIG. 20 is a sequence diagram of the method of notifying a whitelist through a non-CSG cell, which is under discussion of 3GPP. The figure shows a case of the LTE communication system, in which "Owner" represents the owner of a Home-eNB and "CN" represents a core network (MME, radio network controller). The core network includes, for example, an MME, etc. The user performs user access registration of a UE with the Home-eNB, and then in Step ST2001, the owner of the Home-eNB transmits, for example, an identification number of a UE (information for identification of a UE, such as UE-ID and IMSI) to the core network for notifying the operator of the network that the user access registration with the Home-eNB of the user equipment (UE) of the user has been performed. In Step ST2002, the network operator that has received the identification number of the UE (such as UE-ID and IMSI) that has been transmitted from the owner transmits an access allowance setting request to the Home-eNB from the core network such that the UE can access the Home-eNB. In Step ST2003, the Home-eNB that has received the access allowance setting request performs setting so as to allow access from the UE. In Step ST2004, next, the network operator transmits the whitelist from the core network to the eNB of the non-CSG cell where the Home-eNB is located. In Step ST2005, the eNB that has received the whitelist notifies the UE of the whitelist. In Step ST2006, the UE that has been notified the whitelist stores the whitelist in the own UE. Specifically, it is proposed to store the whitelist in the SIM/USIM (which may be storage devices such as a memory and a CPU).

A UE that does not have a whitelist is unable to access the CSG cell, and is allowed to access only the non-CSG cell.

On the other hand, a UE that has a whitelist is allowed to access the CSG cell of the registered CSG-ID as well as the non-CSG cell.

The method of obtaining a whitelist in the case where a UE performs registration with the CSG cell, which is under discussion of 3GPP, is described above. In this method, however, a UE receives the whitelist through an eNB (non-CSG cell). This means that a necessary condition is that a UE is being served by the non-CSG cell. That is, there arises a problem that a UE is unable to obtain a whitelist when it is not being served by the non-CSG cell.

Figure 21:
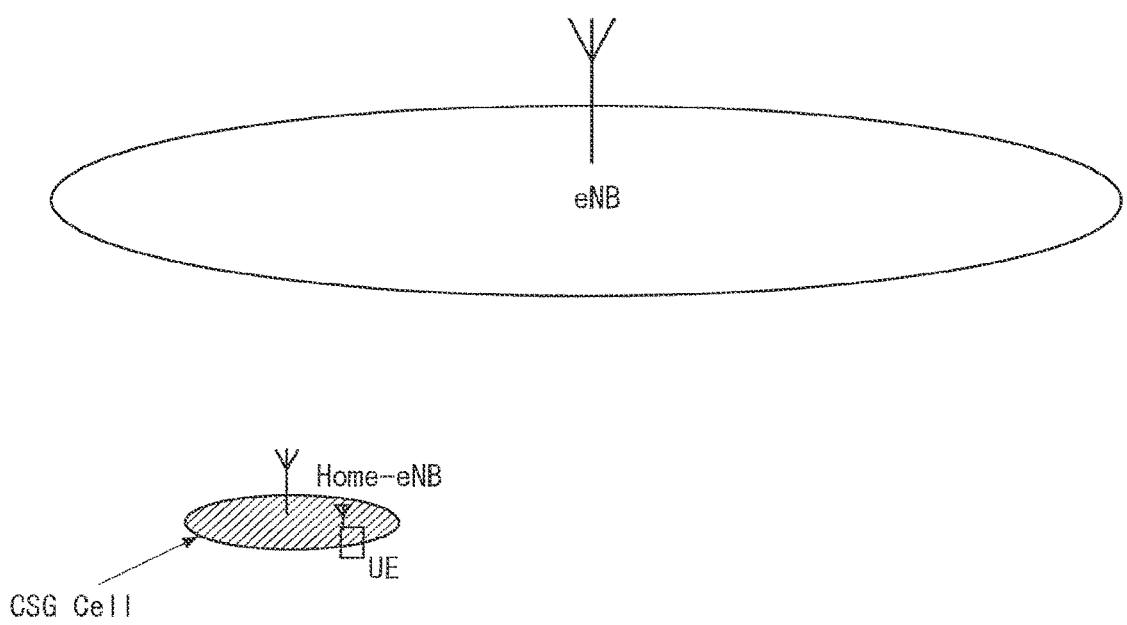
FIG. 21 is a diagram showing a case where a Home-eNB (CSG cell) with which a UE has registered is out of a non-CSG cell area.

FIG. 21 shows a case where the Home-eNB (CSG cell) with which a UE has performed registration is outside the non-CSG cell area. The UE is not being served by the non-CSG cell, and accordingly is unable to communicate with the non-CSG cell. Therefore, the UE cannot obtain a whitelist even if registration with the CSG cell is performed. The UE that does not have a whitelist is not allowed to access the CSG cell, and thus is not allowed to access the registered CSG cell as well. This leads to a situation in which the UE that does not have a whitelist cannot perform cell search and cell selection of the CSG cell even if though it is being served by the CSG cell where user access registration has been performed. In order to solve this problem, 3GPP proposes that the UE located outside the area of the non-CSG cell, which has performed user access registration with the CSG cell, starts manual search (Non-Patent Document 5). Non-Patent Document 5 describes that in a case where the location of a UE is outside the area of the non-CSG cell, which had performed user access registration with the CSG cell, has not obtained a whitelist yet and is located in the area of the CSG cell with which user access registration had been performed, upon start of manual search, TAU is transmitted to the core network through the CSG cell with which user access registration had been performed for obtaining a whitelist.

Figure 22:
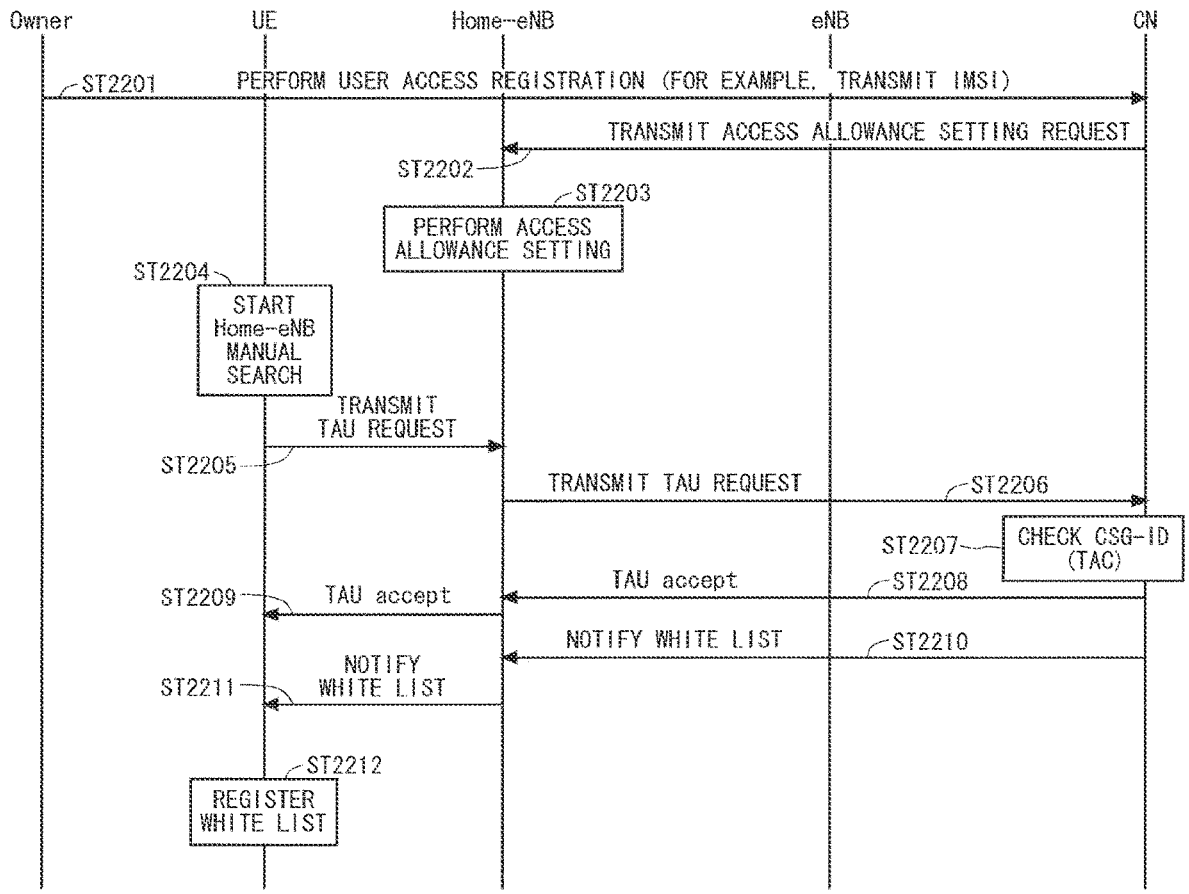
FIG. 22 is a sequence diagram in a case where a UE that does not have a whitelist according to a third embodiment starts manual search.

Unfortunately, a specific manual search method is not described in the proposal of 3GPP. There is no description as to how to transmit TAU to the core network through the CSG cell. A specific method is disclosed here, so that a whitelist is obtained from the CSG cell in a case where a UE that does not have a whitelist performs user access registration with the CSG cell. FIG. 22 discloses a specific sequence diagram in the case where a UE that does not have a whitelist starts manual search in, for example, the LTE communication system. The user performs user access registration with a UE in a CSG cell (here, Home-eNB), and then in Step ST2201, the owner of the CSG cell transmits, for example, an identification number of a UE (such as UE-ID and IMSI) to the core network for notifying the network operator that user access registration of the user equipment (UE) of the user with the CSG cell has been performed. In Step ST2202, the network operator who has received the identification number (such as UE-ID and IMSI) of the UE transmitted from the owner transmits an access allowance setting request from the core network to the CSG cell such that the UE can access the CSG cell. In Step ST2203, the CSG cell that has received the access allowance setting request performs setting to allow access from the UE.

In Step ST2204, next, the UE that has performed user access registration with the CSG cell starts manual search of a CSG cell. In this manual search of the CSG cell, the UE that does not have a whitelist is allowed to access the CSG cell with which user access registration has been performed. This enables the UE being served by the CSG cell with which user access registration has been performed to perform cell search and cell selection for the CSG cell. The UE that has selected the CSG cell receives a tracking area code (TAC) transmitted from the CSG cell and compares it with the TAC in the own UE. The UE does not have a whitelist, and accordingly the TAC in the own UE is different from the TAC transmitted from the CSG cell. Conventionally, the UE is not allowed to establish the RRC connection to the CSG cell in a case where TACs are different from each other as described above. Accordingly, access to the CSG cell is not enabled, whereby it is impossible to transmit the TAU to the core network through the CSG cell. This makes it impossible to obtain the whitelist. In the method disclosed in the present embodiment, however, even in a case of different TACs, a UE is configured to request the RRC connection to the CSG cell with which user access registration has been performed, and further, request the tracking area update (TAU) when the manual search for obtaining a whitelist is started. In Step ST2204, the UE that has started manual search and selected the CSG cell transmits a request for RRC connection to the CSG cell. The CSG cell that has received the RRC connection request from the UE allows the establishment of RRC connection because the access allowance setting for the UE has been made in Step ST2203. In Step ST2205, the UE which has been allowed to establish the RRC connection transmits a TAU request to the CSG cell. The number (such as UE-ID and IMSI) for identifying a UE may be transmitted together with the TAU request message. The access allowance setting is made for the UE, and thus in ST2206, the CSG cell that has received the TAU request transmits the TAU request to the core network together with the number for identifying a UE. In Step ST2207, the core network checks whether the UE that has transmitted the TAU is the UE registered with the CSG cell. Specifically, the core network has a list of the identification numbers of UEs whose user access is allowed for each TAC or each CSG-ID, such that the identification numbers of UEs whose user access registration has been performed in Step ST2201 are rewritten (or may be deleted or added). The process of Step ST2207 is performed by, for example, the MME 73. For example, this is performed by the idle state mobility managing unit 1005-3 of the MME 73 shown in FIG. 10.

In Step ST2207, with the use of the list, it is possible for the core network to determine whether the UE that has transmitted the tracking area update (TAU) is the UE registered with the CSG cell. In Step ST2208, the core network which has determined the UE that had transmitted the TAU in Step ST2207 as the UE registered with the CSG cell transmits a TAU accept message to the CSG cell. In Step ST2209, the CSG cell that has received the TAU accept message transmits the TAU accept message to the UE. In Step ST2210, the core network further transmits a whitelist to the CSG cell, and in Step ST2211, the CSG cell that has received the whitelist transmits it to the UE. In Step ST2212, the UE that has notified the whitelist stores the whitelist in the own UE. Specifically, it is proposed that the whitelist is stored in the SIM/USIM. While the description is given such that the whitelist is transmitted, not the whitelist per se but the CSG information of the CSG cell with which user access registration of the UE has been performed, which is described in the whitelist, may be transmitted. Specifically, conceivable examples of CSG information include CSG-ID, TAI and TAC, etc. Any one of those will be adequate as long as the CSG-ID is associated with the TAI or TAC.

Alternatively, a global cell identity (GCI) will be adequate as long as the CSG-ID, TAI, or TAC is associated with the GCI. Still alternatively, not informing of a whitelist per se, but informing of a message requiring a UE to write, in the whitelist, the TAC or the CSG-ID information on the BCCH that the UE has received through a series of processes including cell search and cell selection will be adequate. In Step ST2212, the UE that has been notified the whitelist in Step ST2211 stores (registers) the whitelist in the own UE. In a case where the CSG-ID, not the whitelist, is notified in Step ST2211, the CSG-ID is stored in the whitelist. In a case where the TAC or CSG-ID information on the BCCH is required to be written in the whitelist, the TAC or CSG-ID information is stored in the whitelist. The UE that has performed registration in the whitelist in Step ST2212 is allowed to access the CSG cell, which is not limited to the case where manual search is started. Note that the CSG cell described here may be any CSG cell as long as it is a CSG cell belonging to the same CSG-ID. The method disclosed in the present embodiment is also applicable to a case where a UE that has already obtained a whitelist makes a change (deletion or addition) in the whitelist.

By performing the manual search method, which is performed in a case where a UE that does not have a whitelist performs user access registration with a CSG cell, as in a manner of the sequence shown in FIG. 22, a whitelist can be obtained from the CSG cell even in a case where the UE is not being served by a non-CSG cell. The Home-eNB manual search proposed by 3GPP is premised on the fact that a UE that does not have a whitelist is being served by the CSG cell with which user access registration has been made and is capable of selecting the CSG cell in manual search, as shown in FIG. 21. Therefore, when the UE is configured so as to make requests for RRC connection which have not been enabled conventionally and tracking area update (TAU) only for the CSG cells belonging to the CSG-ID of the CSG cell with which user access registration has been performed, the UE can access the CSG cell by manual search, which enables to obtain a whitelist.

Fourth Embodiment

Figure 23:
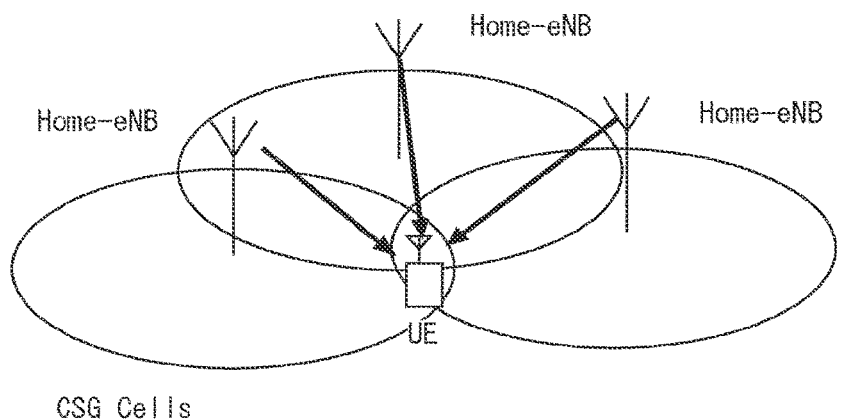
FIG. 23 is a diagram showing a case where a UE is being served by a plurality of CSG cells not by a non-CSG cell.

In a case of future installation of a large number of CSG cells and a case of frequent and flexible installation or removal of the CSG cells, at times, the whitelist will not be obtained only by the method disclosed in the third embodiment. FIG. 23 shows the case where a UE is not being served by a non-CSG cell but is being served by a large number of CSG cells. The situation as shown in the figure will occur in the case where a large number of CSG cells are installed in apartment buildings, schools or companies in the future. As the method of operating CSG cells, it is studied to promote the installation in a place outside the reach of radio waves from those non-CSG cells to allow communication through the CSG cells.

For example, in many cases, rooms of apartment buildings are currently located in places outside the reach of radio waves from the non-CSG cells. In such cases, a CSG cell is provided to each room, and a CSG is constituted per room to be provided with a CSG-ID. For example, it is conceivable that user access registration of a UE of a resident of each room is performed with the CSG of each room. In such a situation, a UE is located in a place outside the reach of radio waves from a non-CSG cell but within the reach of radio waves from a large number of CSG cells as shown in FIG. 23. Further, in such a case, the radio waves from the CSG cell with which user access registration has been performed do not reach a UE depending on an environment where radio waves propagate, or even if it reaches the UE, the received power is smaller compared with the other CSG cell in many cases. In such a situation, a UE cannot select the CSG cell with which user access registration has been performed.

It is described in the above-mentioned proposal by 3GPP (Non-Patent Document 5) that in a case where a UE whose user access registration had been performed with a CSG cell has not obtained a whitelist yet and is located in the area of CSG with which user access registration had been performed, the UE transmits the TAU to the core network through the CSG cell with which user access registration had been performed by starting manual search. However, there is no description regarding the case where a UE cannot select CSG cells (including a CSG cell having the same CSG-ID) with which user access registration has been performed as well as the case where the TAU is rejected. Accordingly, in such a situation that a UE is unable to select the CSG cell with which user access registration has been performed, there arises a problem that a whitelist cannot be obtained by the method proposed by 3GPP (Non-Patent Document 5).

Further, the following problems arise not only in the case where a UE that does not have a whitelist registers a whitelist but also in the case where a UE that has obtained a whitelist makes a change (deletion or addition) in the whitelist. In the above-mentioned proposal by 3GPP, there is no description regarding a UE that has a whitelist. In the situation as shown in FIG. 23, even a UE that has a whitelist selects a CSG cell (cell that is not a suitable cell) having a CSG-ID different from that of the CSG cell with which user access registration of the UE has been performed in some cases. Also in such cases, there is no description regarding the case where a UE cannot select CSG cells (including a CSG cell having the same CSG-ID) with which user access registration has been performed. Further, there arises a problem that a whitelist cannot be obtained by the method proposed by 3GPP (Non-Patent Document 5) where no description is given of a case where the TAU is rejected. In the discussion of 3GPP, no suggestion is made about those problems and solutions to those problems are not described.

In order to solve those problems, the present embodiment discloses the method in which, in a case where a UE that has made user access registration (hereinafter, including change (deletion or addition)) with the CSG cell performs manual search, RRC connection can be established not only with the CSG cells belonging to the CSG-ID of the CSG cell with which user access registration has been performed but also with the other CSG cells and the TAU can be transmitted to the core network through the CSG cell, irrespective of whether or not the presence or absence of a whitelist is absent, to thereby enable the transmission of TAU to the core network through the selected CSG cell even when a UE selects any CSG cell.

Figure 24:
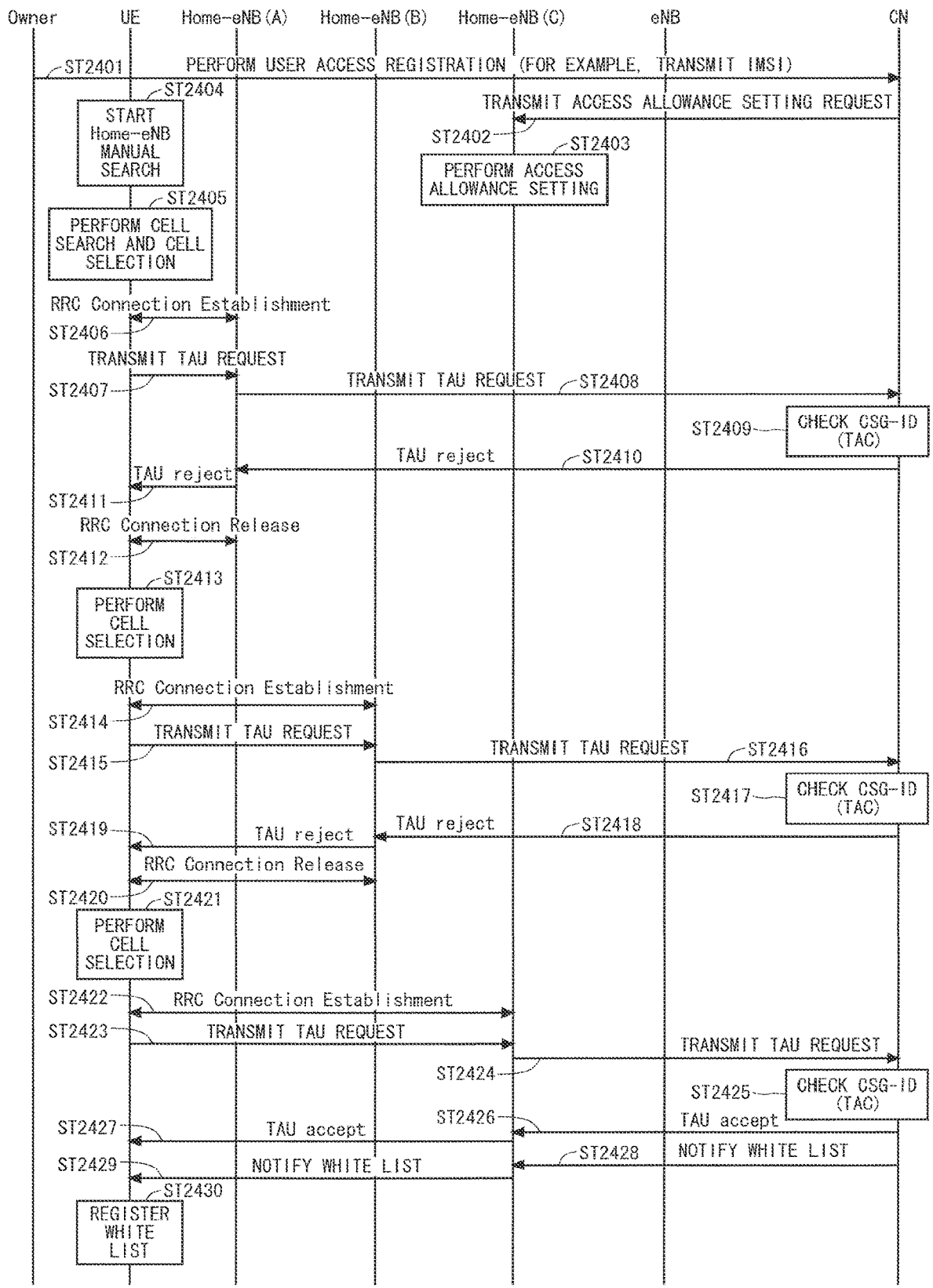
FIG. 24 is a sequence diagram in a case where manual search according to a fourth embodiment is performed.

FIG. 24 is a sequence diagram when manual search is performed in a case where the establishment of RRC connection is enabled not only with the CSG cells belonging to the CSG-ID of the CSG cell with which user access registration has been performed but also in the other CSG cell, to thereby enable the transmission of TAU to the network through the CSG cell. The figure shows the LTE communication system in which, for example, a Home-eNB is used. Description is given of the figure. While it is assumed here that the UE performs user access registration in the Home-eNB(C), Step ST2401 to Step ST2403 are operations similar to those described above, and thus description thereof is omitted. In Step ST2404, a UE in the situation as shown in FIG. 23 starts manual search of the Home-eNB in the registration or change of a whitelist. In Step ST2405, the UE that has started manual search performs cell search and cell selection. In a situation as shown in FIG. 23, the UE selects the CSG cell. Irrespective of whether or not the selected CSG cell is the CSG cell with which user access registration has been performed, a UE is capable of establishing the RRC connection to the CSG cell and transmitting TAU to the network through the CSG cell. Therefore, in Step ST2406, the UE transmits an RRC connection request to a CSG cell (in this case, Home-eNB(A)) that is not the CSG cell (in this case, Home-eNB(C)) with which user access registration has been performed and the Home-eNB(A) that has received the request for RRC connection establishment transmits establishment allowance for this establishment request to the UE, such that the RRC connection is established between a UE and the Home-eNB(A). In Step ST2407 and Step ST2408, next, the UE transmits a TAU request message to the core network through the CSG cell (Home-eNB(A)) that is not the CSG cell with which user access registration has been performed. The UE also transmits a UE identification number. The UE identification number may be included in the TAU request message, may be provided together with the TAU request message, or may be transmitted as another message. Further, the RRC connection request message or TAU request message from the UE may include the information indicating the manual search has been activated, so that a CSG cell that is not the CSG cell with which user access registration has been performed is capable of distinguishing the case in which the manual search has been activated from the other case. This enables the CSG cell that is not the CSG cell with which user access registration has been performed to establish the RRC connection with the UE, and transmit/receive a series of messages such as the reception of the TAU request message from the UE and the transmission thereof to the core network, which are limited to the case in which the manual search has been activated.

The core network that has received the TAU request message checks whether the UE belongs to the CSG-ID of the Home-eNB(A) based on the UE identification number that has been received as well. The method described in Step ST2207, which has been disclosed with reference to FIG. 22, is applicable to this check method. The UE identification number is not registered in the CSG-ID to which the Home-eNB(A) belongs, and thus in Step ST2410 and Step ST2411, the core network which has determined that the Home-eNB(A) cannot be accessed transmits a TAU reject message for the TAU request to the UE through the Home-eNB(A). In Step ST2412, the UE that has received the TAU reject message releases the RRC connection with the Home-eNB(A). In Step ST2413, then, the UE performs cell selection again. In this case, cell selection may be performed after cell search is performed again. When the cell selection is performed again after the TAU reject message is received, the best cell may be selected again except for the Home-eNB(A) that has transmitted the TAU reject message, or the best cell may be selected again including the Home-eNB(A) that has transmitted the TAU reject message. Even in the case where the best cell is selected again including the Home-eNB(A) that has transmitted the TAU reject message, cell selection is performed after cell search is performed again, leading to a case where the other cell serves as the best cell and the other cell is selected when, for example, an environment in which radio waves propagate changes.

The UE that has selected the Home-eNB(B) in the retried cell selection is allowed to request the RRC connection establishment to the CSG cell with which user access registration has not been performed and to transmit the TAU to the network through the CSG cell, and accordingly performs the process of the RRC connection establishment in Step ST2414 and transmits the TAU request message to the core network in Step ST2415 and Step ST2416. However, the UE identification number has not been registered in the CSG-ID to which the Home-eNB(B) belongs in Step ST2417 as in Step ST2409, and thus in Step ST2418 and Step ST2419, the core network which has determined that the Home-eNB(B) cannot be accessed transmits a TAU reject message for the TAU request to the UE through the Home-eNB(B). The UE that has received the TAU reject message releases the RRC connection with the Home-eNB (B) in Step ST2420. In Step ST2421, then, the UE performs cell selection again as in Step ST2413. The UE that has selected the Home-eNB(C) in the retried cell selection is allowed to transmit an RRC connection establishment request to the CSG cell and the TAU to the network through the CSG cell irrespective of whether or not the user access registration with the CSG cell has been performed, and accordingly performs the process of RRC connection establishment in Step ST2422 and transmits a TAU request message to the core network in Step ST2423 and Step ST2424. The UE identification number has been registered with CSG-ID to which the Home-eNB(C) belongs, and thus in Step ST2425, the core network determines that access to the Home-eNB(C) is enabled, and then transmits a TAU accept message for the TAU request to the UE through the Home-eNB(C) in Step ST2426 and Step ST2427. In Step ST2428, the core network transmits a whitelist to the Home-eNB(C). In Step ST2429, the Home-eNB(C) that has received the whitelist transmits the whitelist to the UE. In Step ST 2430, the UE that has received the whitelist stores the whitelist in the own UE.

The method as described above prevents the situation where, in manual search of a UE, a whitelist cannot be obtained even if the CSG cell with which user access registration has been performed is not selected in the first cell selection, and then, the CSG cell where user access registration has been performed is selected in cell selection after a few cell selections. Accordingly, the UE is capable of obtaining a whitelist from the core network through the CSG cell where user access registration has been performed.

As disclosed in the present embodiment, in a case where manual search is performed in the UE, the method is provided such that the RRC connection establishment is enabled not only with the CSG cell belonging to the CSG-ID of the CSG cell with which user access registration has been performed but also with the other CSG cells and TAU transmission to the core network through the CSG cell is enabled irrespective of the presence or absence of a whitelist, and that TAU can be transmitted to the core network through the selected CSG cell even if the UE selects any CSG cell. This makes it possible to solve the problem that a whitelist cannot be obtained in the situation where a UE cannot select the CSG cell with which user access registration has been performed. In addition, it is possible to solve a problem, in a case where the UE that has obtained a whitelist makes a change (deletion or addition) in the whitelist, that a whitelist cannot be obtained in a situation where the UE selects a CSG cell having a CSG-ID different from that of the CSG cell with which user access registration has been performed. Accordingly, it is possible to satisfy demands for a future system in which a large number of CSG cells are installed and the CSG cells are installed or removed frequently and flexibly.

Fifth Embodiment

The method disclosed in the fourth embodiment enables to solve the problem that a whitelist cannot be obtained in a situation where a UE cannot select the CSG cell with which user access registration has been performed. The present embodiment further discloses the method of enabling effective communication even in a case where there are a large number of CSG cells belong to the CSG-ID with, in which user access registration has not been performed.

In a situation as shown in FIG. 23, in a case where there are a larger number of CSG cells belong to the CSG-ID with which, where user access registration of a UE has not been performed, a situation in which a CSG cell with which user access registration of a UE has not been performed is endlessly selected arises in the cell search and cell selection as well as the retried cell search and cell selection when a UE performs manual search. In such a situation, a UE repeats the RRC connection establishment to a large number of CSG cells and a TAU request to the core network through the CSG cell. Further, the above-mentioned situation in which there are a large number of UEs is assumed in future system operation. For example, there is a case where CSG cells are installed in respective classrooms of a school and students of the respective classrooms individually register or change a whitelist. In such a case, a larger number of UEs repeat the RRC connection establishment to a large number of CSG cells and a TAU request to the core network through the CSG cell, which is expected to result in a very large number. Such a situation causes a problem that the radio resource usage efficiency and signaling efficiency reduce extremely as a system. Further, there arise a problem that a long control delay occurs as a system due to a very large amount of time required for a period of time from cell search to idle state operation and a problem that a UE consumes a large amount of power.

Further, the following problems arise in a case where the whitelist of a UE is rewritten for some reason or in a case where a UE mistakenly receives the contents of a whitelist transmitted from the core network in the registration or change of the whitelist. Description is given of a case where, for example, a UE mistakenly receives the contents of a whitelist transmitted from a core network in the registration or change of the whitelist. In a situation where there are a large number of CSG cells as shown in FIG. 23, a case where the CSG cell belonging to the CSG-ID of a mistakenly received whitelist is selected occurs. Also in such a case, the UE repeats the RRC connection establishment to the CSG cell belonging to the CSG-ID of the mistaken whitelist and a TAU request to the core network through the CSG cell.

Figure 25:
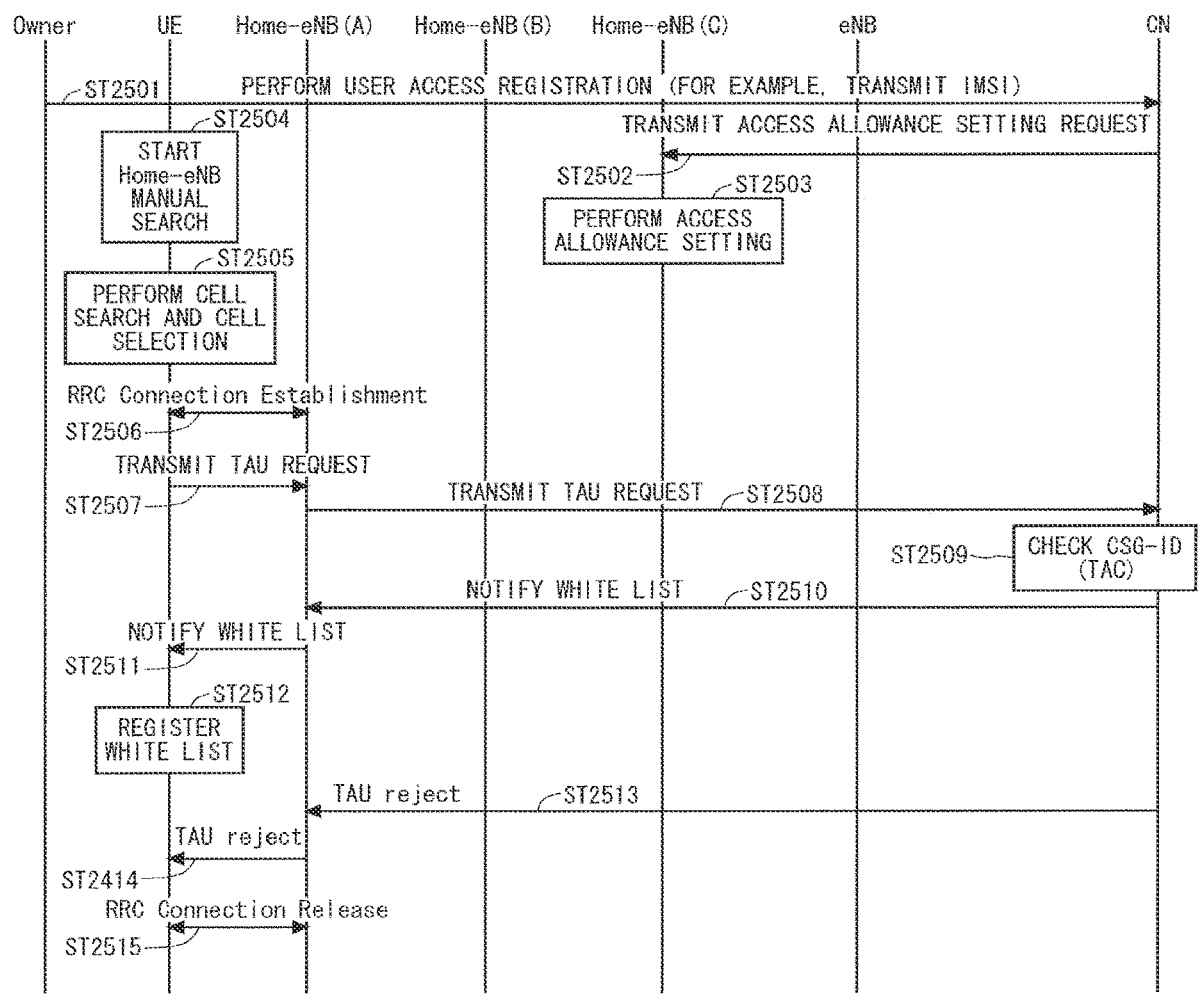
FIG. 25 is a sequence diagram of a method of transmitting a whitelist message before transmitting TAU reject.

In order to solve the above-mentioned problems, in addition to the method of the fourth embodiment, the present embodiment discloses the method in which, when a UE performs manual search, the UE establishes the RRC connection to a CSG cell different from the CSG cell belonging to the CSG-ID of the CSG cell with which user access registration has been performed, and also when the UE further transmits a TAU request to the core network through the CSG cell, the core network transmits a whitelist through the CSG cell before transmitting a TAU reject message to the UE through the CSG cell. FIG. 25 is a sequence diagram of a method of transmitting a whitelist before transmitting a TAU reject. The figure is described. The figure shows the LTE system in which, for example, a Home-eNB is used. Here, the UE performs user access registration with the Home-eNB(C), where the operations of Step ST2501 to Step ST2503 are similar to those described above and thus description thereof is omitted. The UE starts manual search of the CSG cell (in this case, Home-eNB) in Step ST2504, and then performs cell search and cell selection in Step ST2505.

In a situation as shown in FIG. 23, when there are a large number of CSG cells which belong to the CSG-ID, with which a UE has not performed user access registration, the UE selects the CSG cell. As disclosed in the fourth embodiment, the UE is enabled to establish the RRC connection to the CSG cell and transmit the TAU to the network through the CSG cell, irrespective of whether or not the selected CSG cell is the CSG cell with which user access registration has been performed. Accordingly, in Step ST2506, a UE transmits a request for RRC connection to a CSG cell (in this case, Home-eNB(A)) that is not the CSG cell (in this case, Home-eNB(C)) with which user access registration has been performed, and the Home-eNB(A) that has received the request for RRC connection transmits establishment allowance for this establishment request to a UE, so that the RRC connection is established between the UE and the Home-eNB(A). In Step ST2507 and Step ST2508, next, the UE transmits a TAU request message to the core network through the CSG cell (Home-eNB(A)) that is not the CSG cell where user access registration has been performed. The UE transmits the UE identification number as well. The UE identification number may be included in the TAU request message, may be provided together with the TAU request message or may be transmitted as another message. Alternatively, the RRC connection request message and TAU request message from the UE may include the information indicating the manual search has been activated such that the CSG cell that is not the CSG cell with which user access registration has been performed is capable of distinguishing the case in which the manual search has been activated from the other case. This enables the CSG cell that is not the CSG cell with which user access registration has been performed to transmit/receive, to/from the UE, a series of messages such as the RRC connection establishment, the reception of a TAU request message from the UE and the transmission to a core network, which is limited to the case in which the manual search has been activated. The core network that has received a TAU request message checks whether the UE belongs to the CSG-ID of the Home-eNB(A) based on the received UE identification number as well. The method described with reference to Step ST2207, which is disclosed in FIG. 22, is applicable to the check method. The UE identification number has not been registered with the CSG-ID to which the Home-eNB(A) belongs, and thus the core network determines that the Home-eNB(A) cannot be accessed.

In the method disclosed in the fifth embodiment, in Step ST2510, the core network transmits the whitelist of the UE to the Home-eNB(A) before transmitting a TAU reject also in the case where the core network has determined that the Home-eNB(A) cannot be accessed by UE. In Step ST2511, the Home-eNB(A) that has received the whitelist of the UE transmits the whitelist to the UE. The UE that has received the whitelist in Step ST2512 stores the whitelist in the own UE. In Step ST2513 and ST2514, the core network that has transmitted the whitelist of the UE to the Home-eNB(A) in Step ST2510 transmits a TAU reject message for the TAU request to the UE through the Home-eNB(A). In Step ST2515, the UE that has received the TAU reject message releases the RRC connection with the Home-eNB(A).

The method described above prevents the situation in which the CSG cell with which user access registration has been performed cannot be selected endlessly in the cell selection when the UE performs manual search, and thus in the first cell selection, the UE is capable of obtaining a whitelist from the core network through the CSG cell with which user access registration has not been performed.

Further, even in a case where only the best cell selection is allowed in the cell selection, it is possible to reliably obtain a whitelist from the selected best cell with the use of this method.

As the manual search method, not only activated before cell search and cell selection but also in the cell search, the cell identification numbers of one or a plurality of cells suitable for cell search selection criteria, TAC, CSG-ID or the like may be indicated by the UE, so that a desired cell among the one or the plurality of cells is manually selected by a user of the UE to establish the RRC connection and transmit the TAU request to the desired cell. Through manual selection of the CSG cell with which the UE has performed user access registration as a desired cell, the UE is not required to perform transmission/reception for RRC connection establishment to/from the CSG cell with which user access registration has not been performed and transmission of a TAU request message to the CSG cell.

Unfortunately, it takes time for receiving the cell identification number of the cell, TAC, CSG-ID or the like because the broadcast information such as the SIB1 has to be received from the cell as shown in Step ST1201 to Step ST1205 of FIG. 12. In a situation where a large number of CSG cells are installed, it is conceivable that a very large number of cells are suitable for cell search selection criteria in cell search. Accordingly, a very large amount of time is required for receiving the broadcast information of the all cells and indicating the cell identification number, TAC, CSG-ID or the like in the UE. Further, in a case where a UE searches for the CSG cell suitable for cell search selection criteria, for example, the resolution for distinguishing the CSG is required and to store the broadcast information of the CSG cell in the UE is required. In a situation in which a large number of CSG cells are installed, it is conceivable that a very large number of cells are suitable for cell search selection criteria in cell search. Therefore, the receiver of the UE becomes intricate for storing the resolution for receiving the all cells and the broadcast information received from the all cells, which necessitates that a storage processing unit having a large amount of memory capacity to be provided in the UE. This increases the size and manufacturing cost of a UE. In order to avoid such a problem, the method of setting a limit on the search time or setting a limit on the number of cells to be searched is used in the cell search process. This is the method of selecting the best cell within a limited time period or from a certain limited number of cells.

In the case of using such a method, with the method in which the cell identification numbers of one or a plurality of cells suitable for cell search selection criteria in cell search, TAC, CSG-ID or the like are indicated by a UE in cell search and the CSG cell with which a UE has performed user access registration is selected manually from the one or the plurality of cells, there arise problems that the CSG cell will not be searched within the search limit time, and that a limit is set on cells to be searched and the CSG cell will be outside the limit. In such a case, there arises a problem that a UE cannot select the CSG cell where a UE has performed user access registration no matter how much manual search is performed, and a whitelist cannot be obtained.

Also in such a case, it is possible to solve the above-mentioned problems through application of the present embodiment. In a case where a UE that has performed user access registration (hereinafter, including change (deletion or addition)) with the CSG cell performs manual search, it is possible to establish the RRC connection not only to the CSG cell belonging to the CSG-ID with which user access registration has been performed, but also in the other CSG cell and to perform TAU transmission to the core network through the CSG cell, irrespective of the presence or absence of a whitelist, which enables transmission of TAU to the core network through the selected CSG cell even when the UE selects any CSG cell. As a result, even in a case where the CSG cell cannot be searched within the search limit time in cell search or a limit is set on the cell to be searched and the CSG cell is outside the limit, through selection of other CSG cell, the RRC connection establishment is enabled to the other CSG cell and the TAU can be transmitted to the core network through the CSG cell. This enables the core network to transmit a whitelist through the CSG cell before transmitting a TAU reject message to the UE through the CSG cell, whereby the UE is capable of obtaining the whitelist.

In a case where there are a very large number of CSG cells belonging to the CSG-ID with which UE has not performed user access registration, in a case where there are a large number of UEs in such a situation, in a case where the whitelist of the UE is rewritten for some reason, or in a case where the UE mistakenly receives the contents of the whitelist transmitted from the core network in the registration or change of the whitelist, the method disclosed in the present embodiment is capable of solving the problem that the UE wastefully repeats the RRC connection establishment to a large number of CSG cells and a TAU request to the core network through the CSG cell, which result from a situation in which a CSG cell is endlessly selected in performing manual search in the UE. As a result of those problems being solved, radio resource usage efficiency and signaling efficiency are prevented from reducing extremely in future system operation. Further, a period of time required for the cell search to entering the idle state operation can be shortened, which solves a problem that a long control delay occurs as a system. Moreover, a situation in which the CSG cell is selected endlessly can be solved in performing manual search in the UE, leading to a reduction in power consumption of the UE.

Hereinafter, a modified example of the fifth embodiment described above is described. The fifth embodiment discloses the method in which, when a UE performs manual search in addition to the method of the fourth embodiment, the UE establishes the RRC connection to the CSG cell different from the CSG cell belonging to the CSG-ID with which user access registration has been performed, and further, when a TAU request is transmitted to the core network through the CSG cell, the core network transmits a whitelist through the CSG cell before transmitting a TAU reject message to the UE through the CSG cell. The modified example discloses the method in which, when the core network transmits a TAU reject message to the UE through the CSG cell, the core network maps a whitelist on the TAU reject message and transmits the whitelist.

Figure 26:
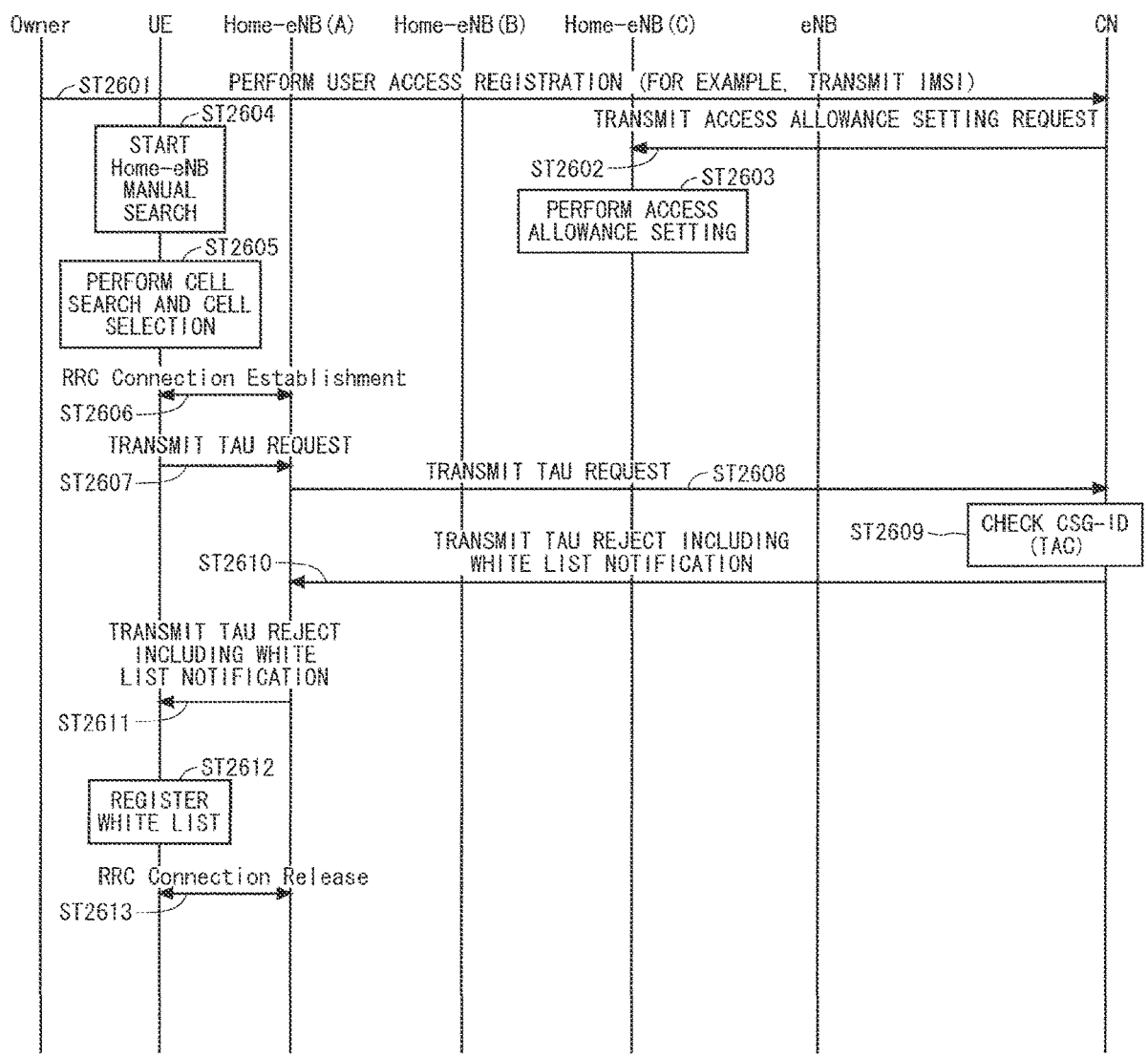
FIG. 26 is a sequence diagram of a method disclosed in a first modified example of a fifth embodiment.

FIG. 26 is a sequence diagram of the method disclosed in the first modified example. This method is substantially identical to the method described with reference to FIG. 25 of the fifth embodiment, and thus only differences are described here. In Step ST2609, the core network that has checked whether the UE belongs to the CSG-ID of the Home-eNB(A) based on the received UE identification number determines that the UE cannot access the Home-eNB(A). In Step ST2610, the core network transmits a TAU reject message including a request for whitelist notification to the Home-eNB(A). In Step ST2611, the Home-eNB(A) that has received this message transmits the TAU reject message including the notification of the whitelist to the UE. In Step ST2612, the UE that has received the TAU reject message including the notification of the whitelist in Step ST2611 stores the whitelist in the own UE. In Step ST2613, the RRC connection between the UE and the Home-eNB(A) is released. This method enables a reduction in signaling for whitelist transmission performed before the core network transmits the TAU reject message to the UE through the CSG cell. Moreover, a TAU reject message is transmitted/received in response to the TAU request message, and thus an effect that the compatibility with the conventional TAU request and reject method is improved is obtained.

Sixth Embodiment

In order to solve the problems described in the fifth embodiment, the present embodiment discloses the method in which, when the UE receives a TAU reject message n consecutive times (n is an integer equal to or larger than 1), the UE prohibits the RRC connection establishment to the cell and the transmission of a TAU request message.

Figure 27:
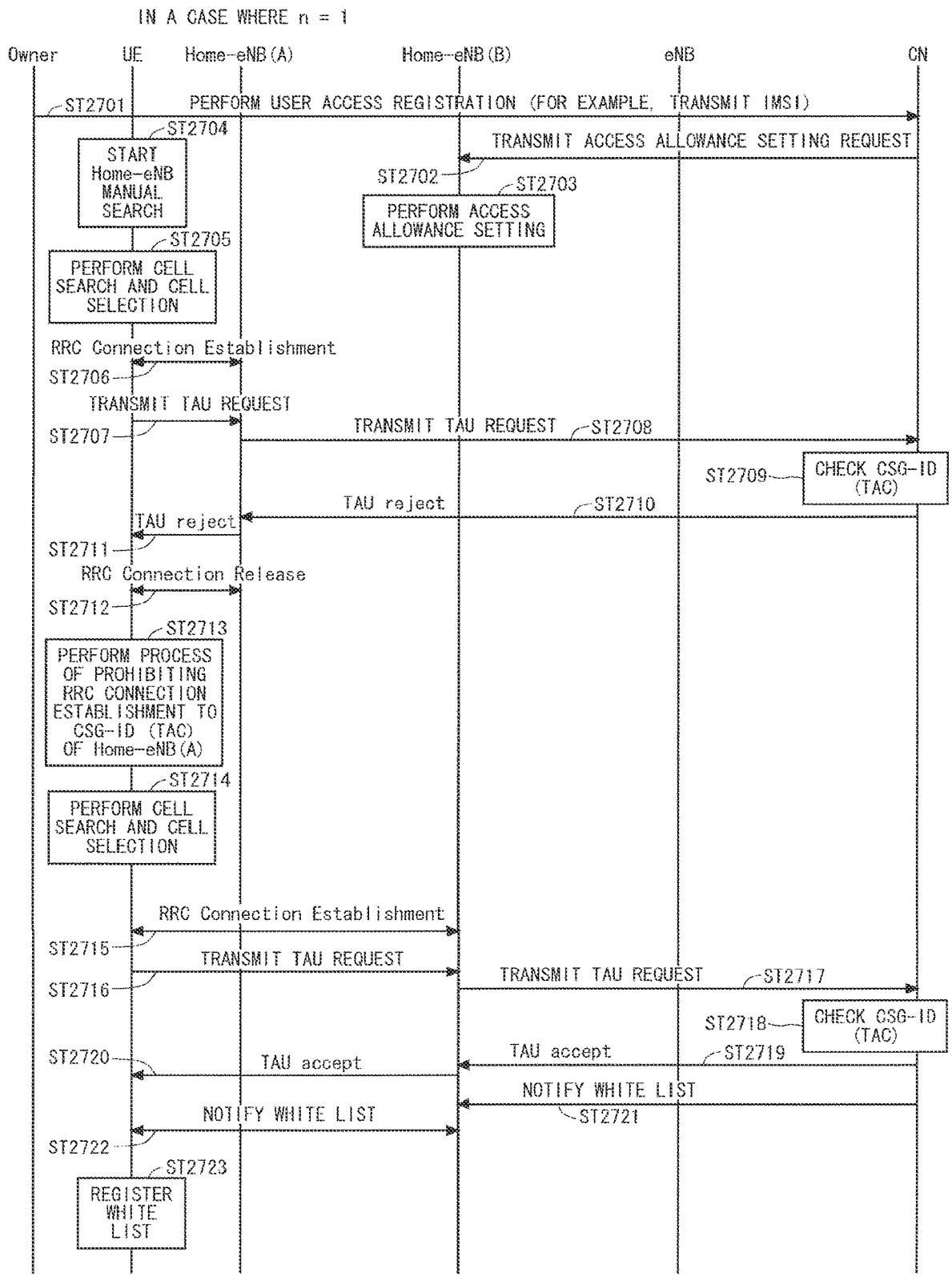
FIG. 27 is a sequence diagram of a method of prohibiting, in a case of receiving a TAU reject message from the same cell, RRC connection establishment with the cell by a UE.

FIG. 27 is a sequence diagram of the method of prohibiting a UE from establishing the RRC connection to the cell when a TAU reject message is received from the same cell. The figure is described. The figure shows, for example, the case of an LTE system in which the Home-eNB is used. In this case, a UE is to perform user access registration in the Home-eNB(B), where operations of Step ST2701 to Step ST2703 are similar to those described above and thus description thereof is omitted. In Step ST2705, the UE that has started manual search of the CSG cell (here, Home-eNB) in Step ST2704 performs cell search and cell selection. In a situation as shown in FIG. 23, when there are a large number of CSG cells belonging to the CSG-ID with which the UE has not performed user access registration, the UE selects the CSG cell belonging to the CSG-ID with which user access registration has not been performed, in many cases. Irrespective of whether or not the selected CSG cell is the CSG cell where user access registration has been performed as disclosed in the fourth embodiment, the UE is allowed to establish the RRC connection to the CSG cell, and the TAU transmission to the network through the CSG cell is enabled. Accordingly, in Step ST2706, the UE transmits the RRC connection request to the CSG cell (in this case, Home-eNB(A)) that is not the CSG cell (in this case, Home-eNB(B)) with which user access registration has been performed, and the Home-eNB(A) that has received the request for RRC connection establishment transmits the establishment allowance for this establishment request to the UE, to thereby establish the RRC connection between the UE and Home-eNB(A).

In Step ST2707 and Step ST2708, next, the UE transmits a TAU request message to the core network through the Home-eNB(A). In this case, the UE transmits the UE identification number as well. The UE identification number may be included in the TAU request message, may be provided together with the TAU request message, or may be transmitted as another message. In Step ST2709, the core network that has received the TAU request message checks whether the UE belongs to the CSG-ID of the Home-eNB(A) based on the received UE identification number as well. The method described in Step ST2207 disclosed with reference to FIG. 22 is applicable to this check method. The UE identification number is not registered in the CSG-ID to which the Home-eNB(A) belongs, and accordingly the core network determines that the UE cannot access the Home-eNB(A). In Step ST2710 and Step ST2711, the core network transmits a TAU reject message to the UE through the Home-eNB(A). In Step ST2712, the UE that has received the TAU reject message releases the RRC connection with the Home-eNB(A). In Step ST2713 where the TAU reject message has been received, the UE performs the process of prohibiting the RRC connection establishment to the Home-eNB(A). Specifically, for example, an RRC-connection-establishment-prohibited cell list is provided in the UE, and the UE stores the cell identification numbers (such as PCI, cell-ID and GCI) of the Home-eNB(A) in the list. Then, the UE checks the list before establishing the subsequent RRC connection, to determine whether the cell is one stored in the list. In the case of the cell stored in the list, the establishment of RRC connection is prohibited. On this occasion, the CSG-ID or TAC may be included in the list, and further, the CSG-ID and TAC may be associated with the cell identification number and stored. As a result, in a case where the Home-eNB(A) is selected again through cell search and cell selection in the future, the UE can avoid the RRC connection establishment to the Home-eNB(A). In Step ST2714, the UE that has not obtained a whitelist until reaching Step ST2713 performs new cell search and cell selection.

In a case where the Home-eNB(A) is selected again, cell selection is performed from the cells excluding the Home-eNB(A) because the RRC connection establishment is prohibited. In Step ST2715, the UE that has selected the Home-eNB(B) through cell selection performs the process of establishing the RRC connection with the Home-eNB(B). After the process of establishing the RRC connection is performed, in Step ST2716 and Step ST2717, the UE transmits a TAU request message to the core network through the Home-eNB(B). In Step ST2718, the core network that has received the TAU request message checks whether the UE belongs to the CSG-ID (TAC) of the Home-eNB(B) based on the UE identification number received together. The method described in Step ST2207 disclosed with reference to FIG. 22 is also applicable to this check method. The UE identification number is registered with the CSG-ID to which the Home-eNB(B) belongs, and accordingly the core network determines that the UE can access the Home-eNB(B). In Step ST2719 and Step ST2720, the core network transmits a TAU accept message to the UE through the Home-eNB(B). In Step ST2721 and Step ST2722, further, the core network transmits the whitelist to the UE through the Home-eNB(B). In Step ST2723, the UE that has been notified the whitelist may store the whitelist in the own UE.

While the process of prohibiting the RRC connection establishment to the cell of which a TAU reject message has been received by a UE is described in the example of the present embodiment, a UE may prohibit the RRC connection establishment to all cells belonging to the CSG-ID of the cell of which a TAU reject message has been received by a UE. Alternatively, while the description is given of the process of prohibiting the RRC connection establishment, the process of prohibiting the transmission of a TAU request message or the process of prohibiting the both above may be provided. Still alternatively, while the description is given of the process of prohibiting, by a UE, the RRC connection establishment to the cell of which a TAU reject message has been received once, the RRC connection establishment may be prohibited in a case where TAU reject messages are received multiple consecutive times from the same cell. The number of times the TAU reject messages are consecutively received from the same cell may be transmitted as the broadcast information from the cell or may be determined in advance.

In a case where there are a very large number of CSG cells belonging to the CSG-ID with which a UE has not performed user access registration, in a case where there are a large number of UEs in such a situation, in a case where the whitelist of the UE is rewritten for some reason, or in a case where the UE mistakenly receives the contents of the whitelist transmitted from the core network in the registration or change of the whitelist, the method disclosed in the present embodiment is capable of solving the problem that the UE wastefully repeats the RRC connection establishment to a large number of CSG cells and a TAU request to the core network through the CSG cell, which results from a situation in which the CSG cell is endlessly selected in performing manual search in the UE. As a result of those problems being solved, radio resource usage efficiency and signaling efficiency are prevented from reducing extremely in future system operation. Further, a period of time required for the cell search to entering the idle state operation can be shortened, which solves a problem that a long control delay occurs as a system. Moreover, a situation in which the CSG cell is selected endlessly can be solved in performing manual search in the UE, leading to a reduction in power consumption of the UE.

Next, a first modified example of the sixth embodiment described above is described. The first modified example discloses the method of mapping the information regarding the prohibition of RRC connection establishment and the prohibition of TAU request message transmission on the TAU reject message and transmitting the information to a UE by the core network.

Description is given with reference to FIG. 27. A part of FIG. 27 may be changed as follows. The same operations as those of the sixth embodiment are not described. In Step ST2709, the core network that has received a TAU request message checks whether the UE belongs to the CSG-ID of the Home-eNB(A) based on the received UE identification number as well. The UE identification number has not been registered with the CSG-ID to which the Home-eNB(A) belongs, and thus the core network determines that the UE cannot access the Home-eNB(A). In Step ST2710 and Step ST2711, the core network transmits a TAU reject message to the UE through the Home-eNB(A). In this case, the core network maps the information regarding the prohibition of RRC connection establishment to the Home-eNB(A) and the prohibition of TAU request message transmission on the TAU reject message. Specifically, a one-bit indicator may be provided so that "1" is set in the case of prohibition and "0" is set in the case of permission (needless to say, which may be opposite). In Step ST2712, the UE that has received this releases the RRC connection with the Home-eNB(A) and, in Step ST2713, performs the process of prohibiting the RRC connection establishment to the Home-eNB(A).

This enables to obtain the same effects as those of the sixth embodiment. Further, this enables the core network to determine whether the RRC connection establishment is prohibited or the TAU request message transmission is prohibited. As a result, it is possible for the core network to cause the UE to appropriately perform the prohibition process in accordance with the situation at that time, such as the signaling load and arrangement of CSG cells, which produces the effect such as flexible operation as a system.

Next, a second modified example of the sixth embodiment described above is described. The sixth embodiment and the first modified example thereof disclose the method of prohibiting, in a case where a UE receives a TAU reject message, the RRC connection establishment and the transmission of a TAU request message to the cell by the UE. However, in a prohibited situation as described above, a problem may arise in a case where a UE performs new user access registration (update) in a CSG cell.

In a case where a UE is prohibited from establishing the RRC connection and transmitting a TAU request message to the CSG-ID of the CSG cell before new user access registration, it is conceivable that even if the UE performs new user access registration with the CSG cell, the RRC connection establishment and transmission of a TAU request message to the CSG cell will be prohibited continuously, whereby the CSG cell cannot be accessed. In order to solve the above-mentioned problems, the second modified example discloses the provision of a timer for releasing the prohibition of RRC connection establishment and the prohibition of TAU request message transmission. The value of the timer may be determined in advance as a value common to all cells or may be broadcast by the broadcast information of the CSG cell.

Figure 28:
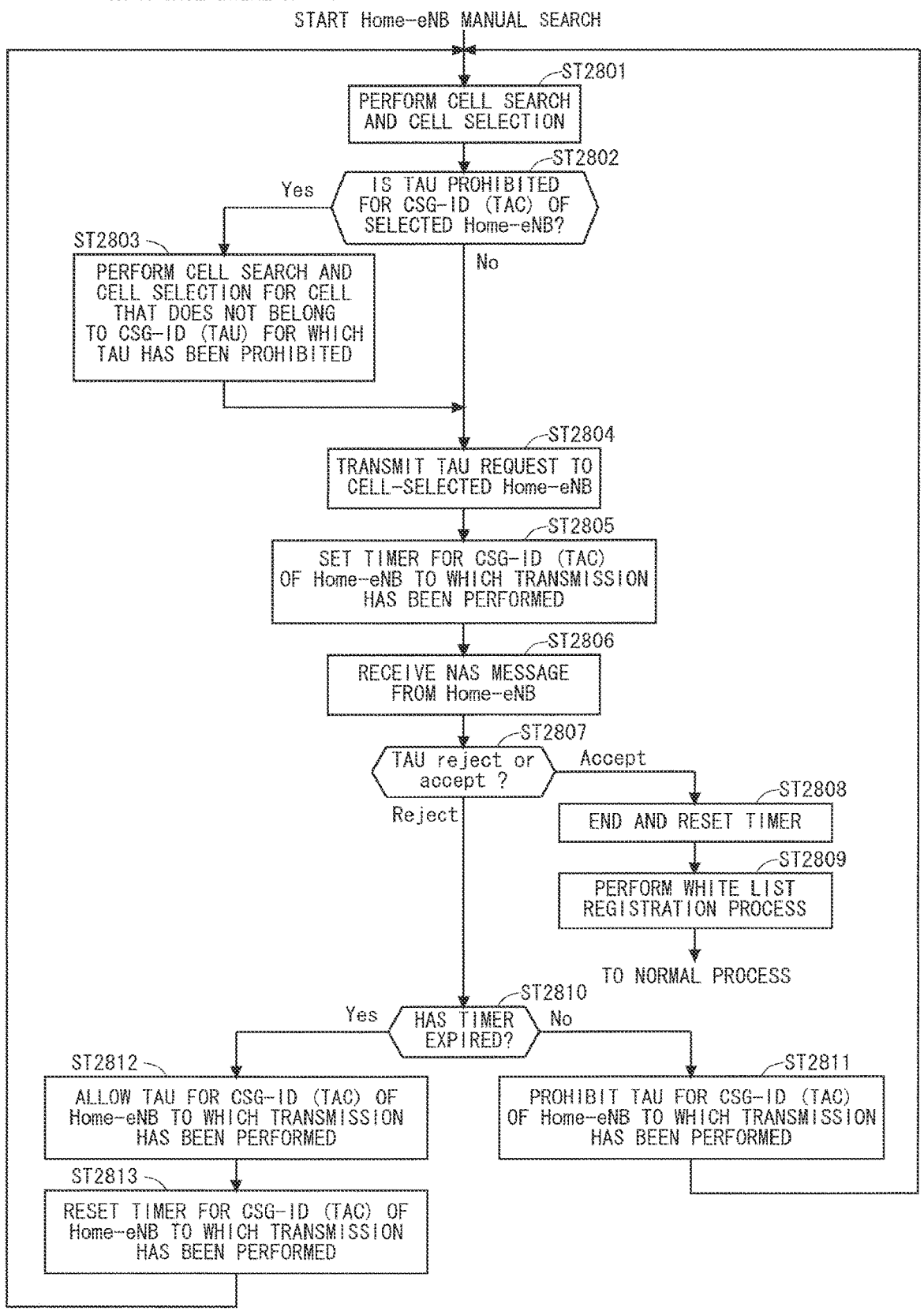
FIG. 28 is a diagram showing the process by a UE in a case where a timer is provided.

In the case where a value is broadcast by the broadcast information of the CSG cell, the value may differ from cell to cell. This enables flexible operation for each cell. Alternatively, a value may be transmitted by being included in the TAU reject message shown in Step ST2710 and Step ST2711 of FIG. 27. The value may be included in the first TAU reject message or a TAU reject message immediately before the RRC connection establishment is prohibited and the transmission of a TAU request message is prohibited. In this case, it is possible for a core network to set the value of a timer, and further, a value may be set on a UE dedicatedly. This enables to appropriately set the timer value in accordance with the situation of a system such as a signaling load or the situation specific to a UE such as the remaining battery capacity of a UE. The timer may be started, for example, upon the transmission of the TAU request message to a CSG cell. The timer may be ended when the timer period ends, when a TAU accept message is received from the CSG cell, or when user access registration (update) is performed with a new CSG cell. FIG. 28 discloses an example of the process in a UE in a case where a timer is provided.

In Step ST2801, the UE that has started manual search of the Home-eNB (CSG cell) performs cell search and cell selection. In Step ST2802, the UE determines whether a timer operates because TAU is prohibited with the CSG-ID (TAC) of the cell-selected Home-eNB. Specifically, for example, a CSG-ID (TAC) and the timer set for the CSG-ID (TAC) may be put on the prohibition list described in the process of Step ST2713 of FIG. 27. Determination may be made by checking the timer of the list. In a case where the timer operates, TAU is prohibited for the cell-selected CSG cell, and accordingly in Step ST2803, the UE performs the cell search and cell selection for a cell that does not belong to the CSG-ID (TAC) for which TAU is prohibited. Then, the UE proceeds to Step ST2804. On the other hand, in a case where a CSG cell for which the timer does not operate is selected in Step ST2802, TAU is not prohibited for the CSG cell, and accordingly the UE proceeds to Step ST2804 to transmit a TAU request to the cell-selected Home-eNB. In Step ST2805, a timer is set for the CSG-ID (TAC) of the Home-eNB to which the TAU has been requested, upon the transmission of a TAU request. In Step ST2806, a NAS message for the TAU request message is received from the Home-eNB.

In Step ST2807, the UE determines whether the NAS message received in Step ST2806 is TAU reject or TAU accept. In the case of TAU accept, the UE proceeds to Step ST2808, and ends and resets the timer. In Step ST2809, then, the UE registers the whitelist, and proceeds to a normal process. On the other hand, in the case where TAU reject is determined in Step ST2807, the UE proceeds to Step ST2810 to again determine whether the timer period has expired. When the timer period has expired in Step ST2810, the UE proceeds to Step ST2812 to allow TAU for the CSG-ID (TAC) of the Home-eNB to which the TAU has been requested, and resets the timer in Step ST2813 and then performs cell search and cell selection again. In the case where the timer period has not expired in Step ST2810, the UE proceeds to Step ST2811 to perform the cell search and cell selection again while prohibiting TAU for the CSG-ID (TAC) of the Home-eNB to which the TAU has been requested. Note that whether the timer period has expired may be determined not only in the time shown in FIG. 28 but also in, for example, the process of Step ST2802. In a case where the timer period has expired, the UE may proceed to Step ST2804 after performing the process of Step ST2812 and Step ST2813. In a case where the timer period has not expired, the UE may proceed to Step ST2803 after performing the process of Step ST2811.

As described above, the same effects as those described in the sixth embodiment and first modified example described above are obtained by providing the timer for releasing the prohibition of RRC connection establishment and the prohibition of TAU request message transmission. In addition, it is possible to solve a problem that access cannot be made in a case where, for example, the UE performs new user access registration (update) to the CSG cell. This enables the construction of more stable system.

The LTE and UMTS in which the Home-eNB or the Home-NB in which the CSG is used are described in the sixth embodiment above. However, the present invention is also applicable to the UMTS using the Home-NB in which the CSG is not used. In the case of the UMTS using the Home-NB where CSG is not used, the UE accesses a Home-eNB with which user access registration has been performed, and when the access is successfully made, the UE obtains the cell identification number (such as cell identity, PCI and GCI) of the Home-NB from the Home-NB, and registers it in the whitelist (referred to as the cell identification number whitelist in the case of the UMTS) of the UE. Also in this case, when the Home-NB, which is different from the Home-NB where the UE has performed user access registration in the cell search and cell selection, is continuously selected, at times, the UE cannot receive the cell identification number where user access registration has been performed or a long period of time is required for reception.

In order to solve the above-mentioned problems, the method of the sixth embodiment is applicable to the UMTS using the Home-NB in which the CSG is not used. With the use of the method in which a UE receives a TAU reject message and the UE prohibits the RRC connection establishment to the cell and prohibits the transmission of a TAU request message, a Home-NB different from the Home-NB from which the UE has received the TAU reject message is selected in the cell search and cell search thereafter. This prevents a Home-NB different from the Home-NB with which a UE has performed user access registration from being continuously selected.

Note that in a case of the UMTS communication system, it suffices that an RNC is provided between a base station (Home-NB, NB) and a core network, so that RRC messages such as an RRC connection request are transmitted/received to/from a UE and the RNC, and that NAS messages such as a TAU request are transmitted/received between a UE and a core network through the base station (Home-NB, NB) and RNC. This enables the application also to the UMTS communication system in which the Home-NB is used as the CSG cell. Therefore, a UE is prevented from wastefully performing cell search and cell selection, whereby it is possible to solve a problem that a long control delay occurs as a system due to a very large amount of time required for the cell search to entering the idle state operation and a problem that a UE consumes a large amount of power. It is possible to construct a mobile communication system capable of satisfying demands for coping with the case where a large number of Home-NBs are installed in the future and the case where the Home-NBs are frequently and flexibly installed or removed.

Seventh Embodiment

The present embodiment discloses, in order to solve the problems described in the fifth embodiment, the method in which, when a core network consecutively transmits a TAU reject message n-th times (n is an integer equal to or larger than 1) to the same UE, the core network transmits a whitelist before transmitting the n-th TAU reject message.

Figure 29:
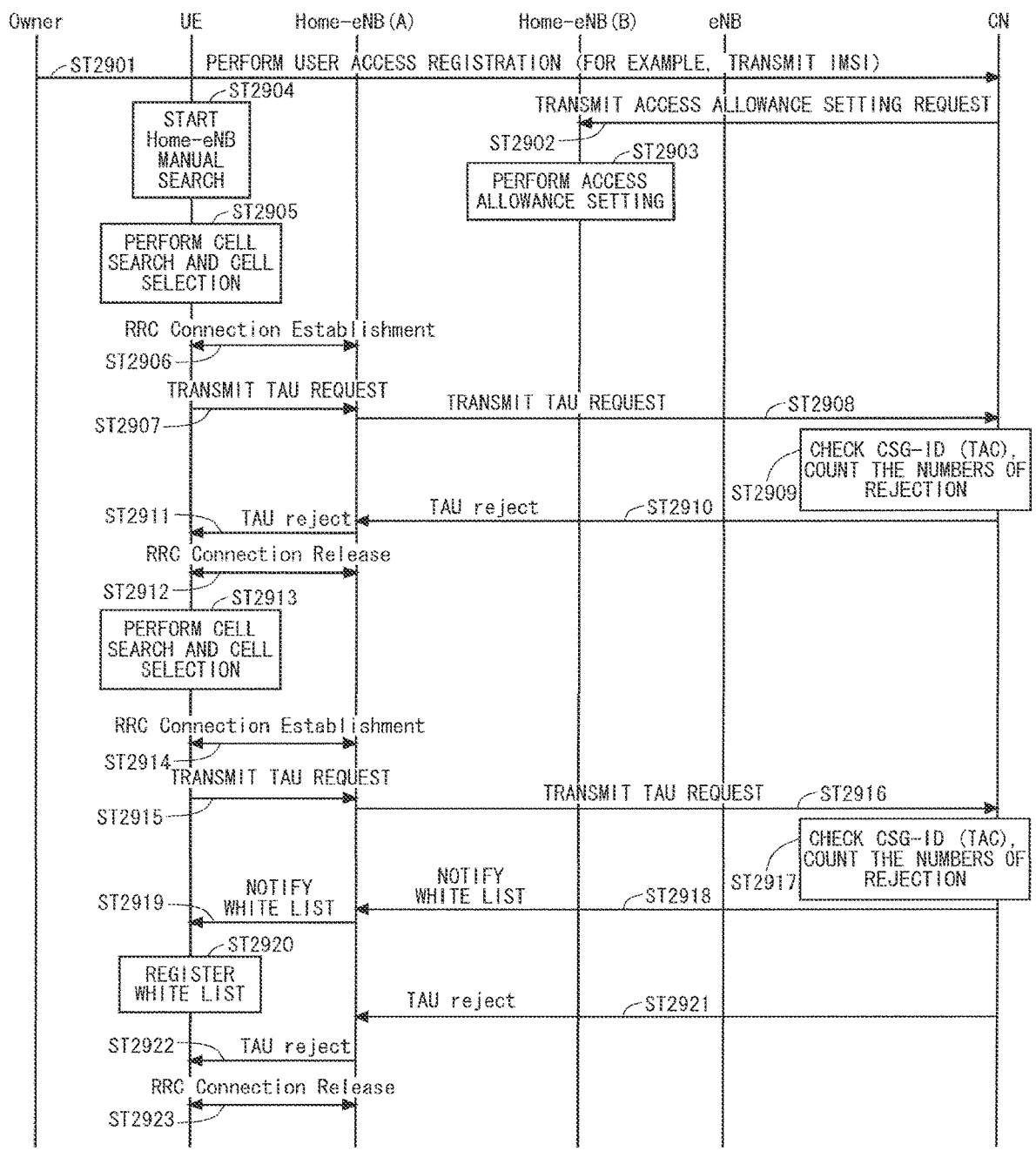
FIG. 29 is a sequence diagram of a method of transmitting a registered message of a whitelist before transmitting an n-th TAU reject message according to a seventh embodiment.

FIG. 29 is a sequence diagram of the method of transmitting, by a core network, a whitelist before transmitting an n-th TAU reject message in a case of consecutively transmitting the TAU reject message to the same UE two times. The figure is described. The figure shows an LTE system in which, for example, Home-eNBs are used. While it is assumed here that a UE performs user access registration with the Home-eNB(B), the operations of Step ST2901 to Step ST2903 are similar to those described above, and thus description thereof is omitted. The UE that has started manual search of a CSG cell (in this case, Home-eNB) in Step ST2904 performs cell search and cell selection in Step ST2905. In a situation as shown in FIG. 23, in a case where there are a very large number of CSG cells belonging to a CSG-ID with which the UE has not performed user access registration, the UE selects the CSG cell belonging to the CSG-ID with which user access registration has not been performed in many cases. As disclosed in the fourth embodiment, the UE is allowed to establish the RRC connection to the CSG cell and transmit TAU to the network through the CSG cell, irrespective of whether or not the selected CSG cell is the CSG cell with which user access registration has been performed. As a result, in Step ST2906, the UE transmits a request message for RRC connection to the CSG cell (in this case, Home-eNB(A)) that is not the CSG cell (in this case, Home-eNB(C)) with which user access registration has been performed, and the Home-eNB(A) that has received the request message for RRC connection transmits allowance to this request, whereby RRC connection is established between the UE and the Home-eNB(A).

In Step ST2907 and Step ST2908, next, the UE transmits a TAU request message to the core network through the Home-eNB(A). On this occasion, the UE transmits a UE identification number as well. The UE identification number may be included in the TAU request message, may be transmitted together with the TAU request message, or may be transmitted as another message. In Step ST2909, the core network that has received the TAU request message checks whether the UE belongs to the CSG-ID of the Home-eNB (A) based on the received UE identification number as well. The method described with reference to Step ST2207, which is disclosed in FIG. 22, is applicable to the check method. The UE identification number has not been registered in the CSG-ID to which the Home-eNB(A) belongs, and thus the core network determines that the UE cannot access the Home-eNB(A). The core network that has determined that the UE cannot access the Home-eNB(A) further counts the number of rejection for the UE (n=1). In Step ST2910 and Step ST2911, the core network transmits a TAU reject message to the UE through the Home-eNB(A). In Step ST2912, the UE that has received the TAU reject message releases the RRC connection with the Home-eNB(A). In Step ST2913, the UE that has not obtained the whitelist until reaching Step ST2912 performs new cell search and cell selection. In this case, when the Home-eNB(A) is selected again, in Step ST2914, the UE establishes the RRC connection with the Home-eNB(A) again. In Step ST2915 and Step ST2916, next, the UE transmits the TAU request message to the core network through the Home-eNB(A). On this occasion, the UE transmits the UE identification number as well.

In Step ST2917, the core network that has received the TAU request message checks whether the UE belongs to the CSG-ID of the Home-eNB(A) based on the received UE identification number as well. The UE identification number has not been registered in the CSG-ID to which the Home-eNB(A) belongs as in Step ST2909, and thus the core network determines that the UE cannot access the Home-eNB(A). The core network that has determined that the UE cannot access the Home-eNB(A) increments the number of rejection for the UE by one (n=2). The number of rejection for the same UE is two, and thus the core network transmits a registration message of the whitelist before transmitting the second TAU reject message. In Step ST2918 and Step ST2919, the core network transmits the whitelist to the UE through the Home-eNB(B). In Step ST2920, the UE that has been notified the whitelist stores the whitelist in the own UE. In Step ST2921 and Step ST2922, the core network that has transmitted the whitelist of the UE to the Home-eNB(A) in Step ST2918 transmits the second TAU reject message for the TAU request to the UE through the Home-eNB(A). In Step ST2923, the UE that has received the TAU reject message releases the RRC connection with the Home-eNB (A). The number of times the TAU reject message is transmitted consecutively to the same UE may be determined in advance, which can be determined flexibly by the core network. Flexible determination by the core network enables to appropriately transmit a whitelist to a UE in accordance with a situation at that time, such as the situations of a signaling load and reception quality of the UE, which produces the effect of flexible operation as a system.

In a case in which there are a very large number of CSG cells belonging to the CSG-ID, with which a UE has not performed user access registration, in a case where there are a large number of UEs in such a situation, in a case where the whitelist of the UE is rewritten for some reason, or in a case where the UE mistakenly receives the contents of the whitelist transmitted from the core network in the registration or change of the whitelist, the method disclosed in the present embodiment is capable of solving the problem that the UE wastefully repeats the RRC connection establishment to a large number of CSG cells and a TAU request to the core network through the CSG cell, which results from a situation in which a CSG cell is endlessly selected in performing manual search in the UE. As a result of those problems being solved, radio resource usage efficiency and signaling efficiency can be prevented from reducing considerably in future system operation. Further, a period of time required for the cell search to entering the idle state operation can be shortened, which solves a problem that a long control delay occurs as a system. Moreover, a situation in which the CSG cell is selected endlessly can be solved in performing manual search in the UE, leading to a reduction in power consumption of the UE.

Eighth Embodiment

The fourth to seventh embodiments described above disclose the method in which the UE establishes the RRC connection with the CSG cell belonging to the CSG-ID, with which user access registration has not been performed, and the TAU reject message to be transmitted to the UE by the core network is used. In each of those cases, unfortunately, it is required to establish the RRC connection between the UE and the CSG cell belonging to the CSG-ID, with which user access registration has not been performed, and further, it is required to transmit/receive a NAS message such as a TAU request between the UE and the core network.

Therefore, there is disclosed a method of registering a whitelist not with the use of the TAU reject message transmitted to the UE by the core network, but with the use of an RRC connection reject message corresponding to an RRC connection request message, which is transmitted by the UE. This does not require the establishment of RRC connection and the transmission/reception of a NAS message such as a TAU request. For example, there is disclosed a method of registering, in the method disclosed in the sixth embodiment, a whitelist with the use of an RRC connection reject message to an RRC connection request message transmitted by a UE, not with the use of a TAU reject message transmitted to a UE by a core network. In a case where a UE receives an RRC connection reject message from the same cell n consecutive times (n is an integer equal to or larger than 1), the UE prohibits the RRC connection request to the cell.

Figure 30:
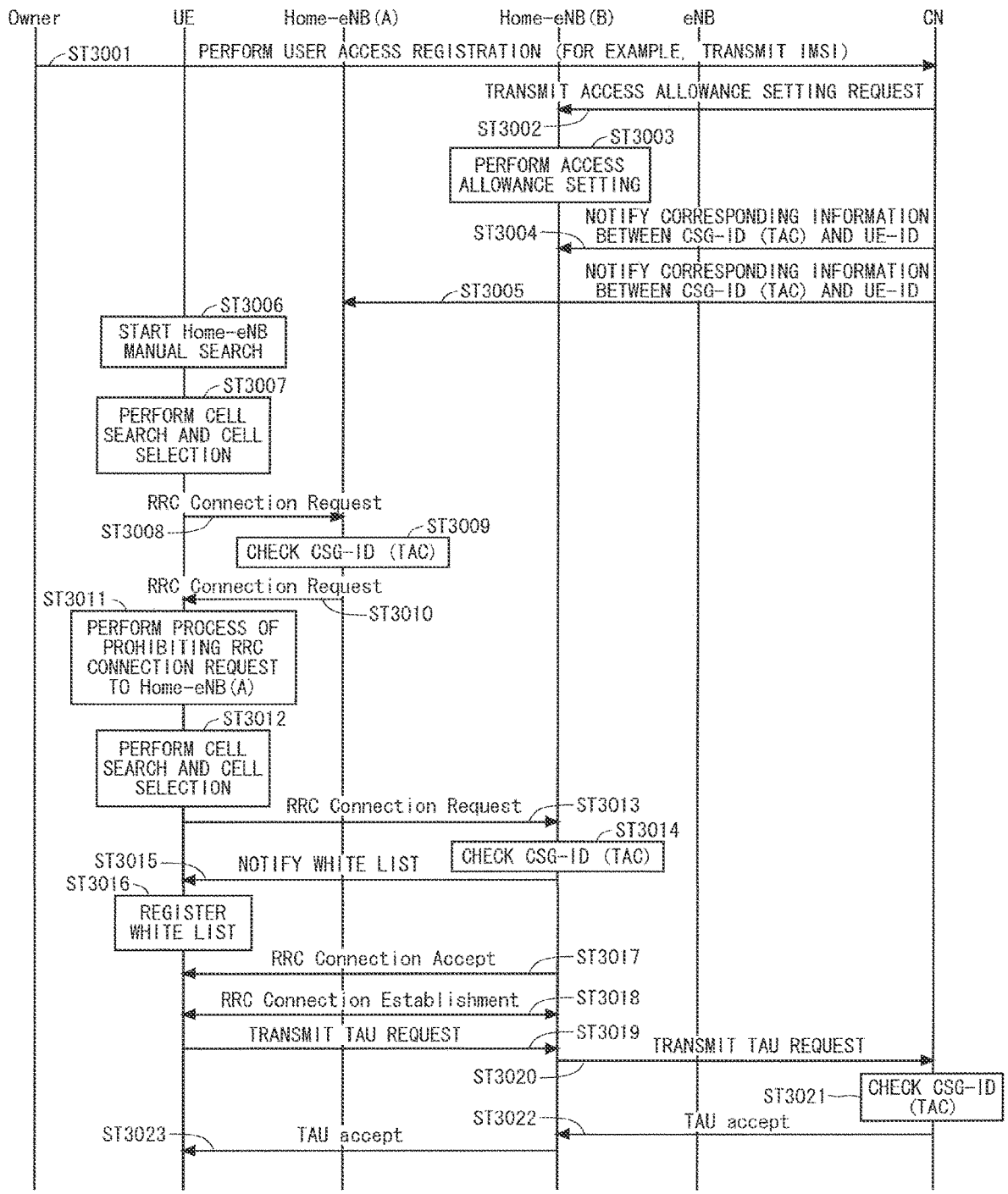
FIG. 30 is a sequence diagram of a method of prohibiting, in a case where one RRC connection reject message is received from the same cell, RRC connection request for the cell by a UE.

FIG. 30 is a sequence diagram of a method of prohibiting an RRC connection request to the cell by a UE in a case of receiving an RRC connection reject message from the same cell. The figure is described. The figure shows an LTE system in which, for example, a Home-eNB is used. While it is assumed here that a UE performs user access registration with the Home-eNB(B), the operations of Step ST3001 to Step ST3003 are similar to those described above, and thus description thereof is omitted. In Step ST3004 and Step ST3005, the core network transmits, to all CSG cells (in this case, Home-eNBs), the information of CSG-IDs (TACs) of the respective Home-eNBs and identification numbers of UEs belonging to the CSG-IDs. For example, the core network transmits the information of the identification numbers of UEs belonging to the CSG-ID of the Home-eNB(B) to the Home-eNB(B), and transmits the information of identification number of UEs belonging to the CSG-ID of the Home-eNB(A) to the Home-eNB(A). Specific examples of those pieces of information may include a list in which the identification numbers of UEs belonging to the CSG-IDs are described. The list corresponding to the CSG-ID of each Home-eNB is transmitted to each Home-eNB from the core network.

In Step ST3007, the UE that has started manual search of the Home-eNB in Step ST3006 performs cell search and cell selection. In a situation as shown in FIG. 23, when there are a very large number of CSG cells belonging to a CSG-ID with which the UE has not performed user access registration, the UE selects the CSG cell belonging to the CSG-ID where the user access registration has not been performed in many cases. In the present embodiment, the UE is configured so as to transmit a request message for RRC connection to the CSG cell, irrespective of whether or not the selected CSG cell is the CSG cell with which user access registration has been performed. The UE transmits the UE identification number as well. The UE identification number may be included in an RRC connection request message or may be provided together with an RRC connection request message. Accordingly, in Step ST3008, the UE transmits a request for RRC connection to the CSG cell (in this case, Home-eNB (A)) that is not the CSG cell (in this case, Home-eNB(B)) with which UE has performed user access registration. In Step ST3009, the Home-eNB(A) that has received this RRC connection request checks whether the UE belongs to the CSG-ID of the Home-eNB(A) based on the received UE identification number as well. Through this check, it is determined whether or not the UE identification number is included in the identification number list of UEs belonging to the CSG-ID of the Home-eNB(A), which has been transmitted from the core network in Step ST3008.

The UE identification number has not been registered in the CSG-ID to which the Home-eNB(A) belongs, and thus the Home-eNB(A) determines that the UE cannot access the Home-eNB(A). In Step ST3010, the Home-eNB(A) transmits an RRC connection reject message to the UE. In Step ST3011, the UE that has received the RRC connection reject message performs the process of prohibiting the transmission of RRC connection request message to the Home-eNB (A). Specifically, for example, an RRC-connection-request-transmission-prohibited cell list is provided in the UE, and the UE stores cell identification numbers (such as PCI, cell-ID and GCI) of the Home-eNB(A) in the list. Then, the UE checks the list before transmitting the subsequent RRC connection request and determines whether a cell is the cell stored in the list. In the case of the cell stored in the list, the UE prohibits the transmission of RRC connection request. In this case, what is stored in the list may be a CSG-ID or TAC of the CSG cell, and further, the CSG-ID or TAC may be stored by being associated with the CSG cell identification number. This prevents the UE from transmitting an RRC connection request to the Home-eNB(A) in a case where the Home-eNB(A) is selected again by cell search and cell selection in the future.

In Step ST3012, the UE that has been unable to obtain the whitelist until reaching Step ST3011 performs new cell search and cell selection. In the case where the Home-eNB (A) is selected again, the transmission of RRC connection request is prohibited, and thus cell selection is performed from the cells except for the Home-eNB(A). In Step ST3013, the UE that has selected the Home-eNB(B) through cell selection transmits an RRC connection request message to the Home-eNB(B). In Step ST3014, the Home-eNB(B) that has received the RRC connection request message checks whether the UE belongs to the CSG-ID (TAC) of the Home-eNB(B) based on the UE identification number received together therewith. The above-mentioned method is applicable to this check method as well. The UE identification number has been registered in the CSG-ID to which the Home-eNB(B) belongs, and thus the Home-eNB(B) determines that the UE can access the own cell. The Home-eNB(B) that has determined that the UE can access the own cell may notify the UE of the whitelist in Step ST3015 before transmitting an RRC connection accept message. In Step ST3016, the UE that has received the whitelist stores the whitelist in the own UE. In Step ST3017, the Home-eNB(B) that has transmitted the whitelist to the UE transmits the RRC connection accept message. As a result, the RRC connection is established between the UE and the Home-eNB(B) (Step ST3018). In Step ST3019 and Step ST3020, after that, the UE transmits a TAU request message to the core network through the Home-eNB(B). The UE transmits the UE identification number as well.

In Step ST3021, the core network that has received the TAU request message checks the CSG-ID (TAC) based on the received UE identification number as well. In Step ST3022 and Step ST3023, the core network that has checked that the UE belongs to the CSG-ID (TAC) of the Home-eNB(B) in Step ST3021 transmits a TAU accept to the UE through the Home-eNB(B). While the core network is configured to transmit the information of the CSG-ID (TAC) of each Home-eNB and the identification number of the UEs belonging to the CSG-ID to all CSG cells (in this case, Home-eNBs) in Step ST3004 and Step ST3005, the information of the identification number of the UE belonging to each CSG-ID may be transmitted to a HeNBGW connected to the CSG cell belonging to the CSG-ID. The HeNBGW may be configured to transmit the received information of the identification number of UE belonging to each CSG-ID to the CSG cell of the same CSG-ID connected to the own HeNB. Alternatively, the process of transmitting, by the HeNBGW, the received information of the identification number of UE belonging to each CSG-ID to the CSG cell of the same CSG-ID that is connected to the own HeNB may be set such that the CSG cell which has received the RRC connection request from the UE in ST3008 transmits the message for requesting the information of the identification number of the UE belonging to the CSG-ID of the own CSG cell to the HeNBGW, and may be performed when the HeNBGW receives the message.

While the present embodiment describes the process in which the UE prohibits the RRC connection request to the CSG cell from which it has received the RRC connection reject message, the UE may prohibit the RRC connection request to all cells belonging to the CSG-ID of the cell from which it has received the RRC connection reject message. Further, the present embodiment describes the process in which the UE prohibits the RRC connection request to the CSG cell from which it has received the RRC connection reject message, the UE may prohibit the RRC connection request in a case where it receives the RRC connection reject message from the same cell multiple consecutive times. The number of times the RRC connection reject message is received consecutively from the same cell may be transmitted from the cell in the broadcast information or may be determined in advance. Further, while a whitelist notification is performed before the Home-eNB transmits the RRC connection accept, it may be transmitted to a UE from the core network through the CSG cell in a NAS message after the UE receives the TAU accept in Step ST3023.

Next, there is disclosed a method of transmitting a whitelist with the use of an RRC connection reject message to the RRC connection request message transmitted by a UE, not with the use of a TAU reject message transmitted to the UE by the core network in the method disclosed in, for example, the fifth embodiment or the seventh embodiment. In the fifth or seventh embodiment, it is required to transmit, also from a CSG cell belonging to a CSG-ID with which a UE has not performed user access registration, a whitelist of the UE. For this reason, the core network transmits, to all CSG cells, the information of all CSG-IDs (TACs) and the identification numbers of UEs belonging to the CSG-IDs.

Figure 31:
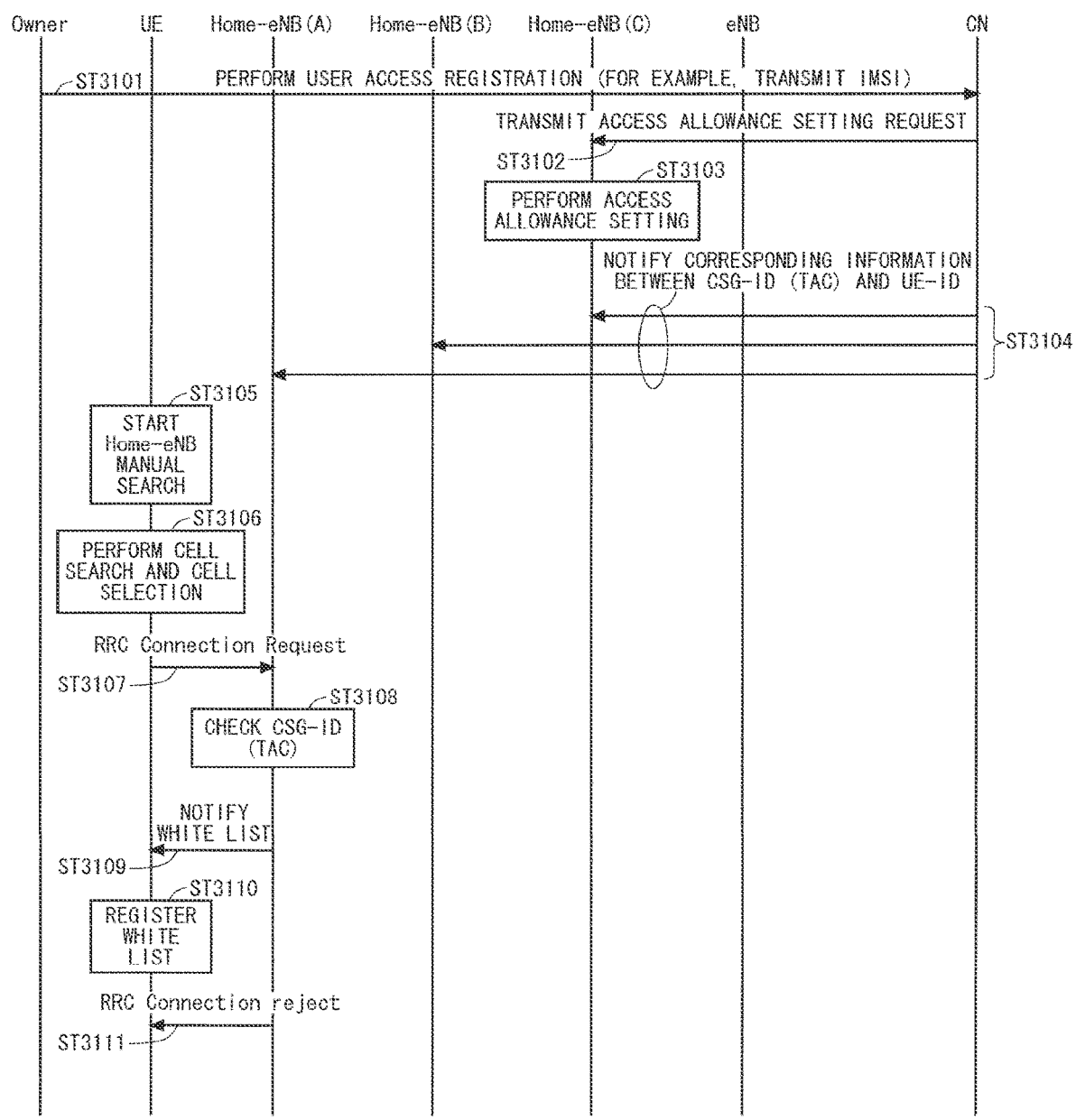
FIG. 31 is a sequence diagram of a method of transmitting, by a UE, a registered message of a whitelist before a CSG cell belonging to a CSG-ID in which user access registration has not been performed transmits an RRC connection reject message.

FIG. 31 is a sequence diagram of a method of transmitting a whitelist before a CSG cell belonging to a CSG-ID with which a UE has not performed user access registration transmits an RRC connection reject message. FIG. 31 shows a case of an LTE system in which, for example, Home-eNBs are used. While it is assumed here that a UE performs user access registration with a Home-eNB(C), operations of Step ST3101 to Step ST3103 are similar to those described above, and thus description thereof is omitted. In Step ST3104, the core network transmits the information of all CSG-IDs (TACs) and the identification numbers of UEs belonging to the CSG-IDs to all CSG cells (in this case, all Home-eNBs). Specific examples of the information may include a list in which the identification numbers of UEs belonging to the CSG-IDs are described. The list corresponding to all CSG-IDs is transmitted from the core network to all Home-eNBs. In Step ST3106, the UE that has started manual search in Step ST3105 performs cell search and cell selection. In a situation as shown in FIG. 23, when there are a very large number of CSG cells belonging to the CSG-ID, with which the UE has not performed user access registration, the UE selects the CSG cell belonging to the CSG-ID, with which user access registration has not been performed, in many cases. In the present embodiment, the UE is allowed to transmit a request message for RRC connection to the CSG cell irrespective of whether or not the selected CSG cell is the CSG cell with which user access registration has been performed. In addition, the UE transmits the UE identification number. The UE identification number may be included in the RRC connection request message or may be provided together with the RRC connection request message.

Accordingly, in Step ST3107, the UE transmits an RRC connection request to the CSG cell (in this case, Home-eNB (A)) that is not the CSG cell (in this case, Home-eNB(C)) with which user access registration has been performed. In Step ST3108, the Home-eNB(A) that has received this RRC connection request checks which CSG-ID the UE belongs to, based on the received UE identification number as well. This check is performed with the use of the list of the identification numbers of UEs belonging to all CSG-IDs, which has been transmitted from the core network in Step ST3104. The Home-eNB(A) searches for and identifies a CSG-ID containing the UE identification number. In Step ST3109, the Home-eNB(A) notifies the UE of a whitelist using the identified CSG-ID. In Step ST3110, the UE that has received the whitelist stores the whitelist in the own UE. In Step ST3111, the Home-eNB(A) that has notified the UE of the whitelist in Step ST3109 transmits an RRC connection reject message to the UE.

While the core network transmits the information of all CSG-IDs (TACs) and the identification numbers of UEs belonging to the CSG-IDs to all CSG cells (in this case, all Home-eNBs) in Step ST3104, the information of the identification numbers of UEs belonging to the respective CSG-IDs may be transmitted to all HeNBGWs. The HeNBGW may transmit the information of the identification numbers of UEs belonging to all CSG-IDs to all CSG cells connected to the own HeNB. Further, the process of transmitting, by all HeNBGWs, the received information of the identification numbers of UEs belonging to all CSG-IDs to all CSG cells connected to the own HeNB may be set such that the CSG cell which has received the RRC connection request from the UE in Step ST3107 transmits the message for requesting the information of the identification numbers of UEs belonging to all CSG-IDs to the HeNBGWs, and may be performed in a case where the HeNBGWs receive the message. The above-mentioned method enables to transmit, also from a CSG cell belonging to a CSG-ID with which a UE has not performed user access registration, a whitelist of the UE.

In addition to the effects described in the fourth to seventh embodiments, the adoption of the method disclosed above does not require the establishment of the RRC connection and transmission/reception of a NAS message such as the TAU request. As a result, it is possible to achieve an improvement in radio resource usage efficiency, a reduction in signaling load, a reduction in control delay as a system, and a reduction in power consumption of a UE.

Ninth Embodiment

In the third embodiment to the seventh embodiment described above, the UE that has performed user access registration with a CSG cell transmits a TAU request to the core network for obtaining a whitelist from a core network. The description is given that the core network that has received the TAU request from the UE checks a CSG-ID (TAC) with the use of the identification number of the UE and transmits a whitelist to the UE.

The core network may be configured to transmit a whitelist in accordance with the method described above without fail, upon transmission of a TAU request message from a UE. However, the TAU request message is generated not only for obtaining a whitelist from a core network but also due to other causes. For example, in a case where a UE has obtained two CSG-IDs in a whitelist and moves from the CSG cell belonging to one CSG-ID to the CSG cell belonging to the other CSG-ID, the whitelist is not required to be registered (updated) anew, but TACs of two CSG cells are different from each other. Accordingly, the UE transmits the TAU request to the core network. In such a case, though the core network is not required to transmit a whitelist to the UE, the whitelist is transmitted to the UE, which causes a problem that a signaling load is increased wastefully.

Further, in the methods disclosed in the first modified example of the sixth embodiment and the seventh embodiment, the core network is capable of determining the prohibition of RRC connection establishment and TAU request transmission for the UE, but also in such a case, the core network desirably knows whether the TAU request message transmitted by the UE is for requesting a whitelist. If the core network does not know the above, the core network also takes a TAU request message transmitted due to other causes into consideration, leading to an inefficient operation. The present embodiment discloses, in order to solve the above-mentioned problem, that the information indicating that the message is a request for (registering) updating a whitelist or for requesting transmission (notification) of a whitelist is mapped on the TAU request message.

For example, in the example shown in FIG. 25, which is described in the fifth embodiment, in Step ST2507 and Step ST2508, the UE transmits a TAU request to the core network through the Home-eNB(A). The information indicating that the message is a request for (registering) updating a whitelist is mapped on the TAU request message, and the core network is notified that the cause of the message is a request for (registering) updating a whitelist, together with the TAU request. With the above-mentioned configuration, the core network is capable of knowing that the UE requests the (registration) update of the whitelist. On the other hand, in a case where the information indicating that the message is a request for updating (registering) a whitelist is not mapped on the TAU request message, the core network knows that the TAU request message is not a request for (registering) updating a whitelist, and accordingly is not required to transmit the whitelist to the UE. As a specific method of mapping the information indicating that the message is a request for (registering) updating a whitelist on the TAU request message, a whitelist (registration) update request may be added to the Type information of TAU. The Type information may be expressed numerically. Alternatively, a one-bit indicator indicating whether or not the message is a request for (registering) updating a whitelist may be provided on the TAU request message.

The adoption of the method described above enables to prevent an increase in signaling load due to the transmission of a whitelist to the UE, which is intrinsically unnecessary, though the core network is not required to transmit a whitelist to the UE. In addition, in a case where the core network determines whether to prohibit the establishment of RRC connection and transmission of the TAU request for the UE, it is possible to solve a problem that an inefficient operation occurs in consideration of the TAU request message transmitted due to other causes.

Next, a first modified example of the present embodiment is described. The method of mapping the information used for requesting (registration) update of a whitelist on a TAU request message is applicable to the third embodiment to the seventh embodiment. Disclosed here is that for application to the method disclosed in the eighth embodiment, the information indicating that the message is a request for (registering) updating a whitelist or a request for transmitting (notifying) a whitelist is mapped on the RRC connection request message.

In the eighth embodiment, a whitelist is transmitted with the use of an RRC connection reject message to an RRC connection request message transmitted by a UE. It is described that a CSG cell that has received the RRC connection request from the UE checks a CSG-ID (TAC) using an identification number of the UE and transmits the whitelist to the UE. The CSG cell may be configured to transmit a whitelist in accordance with the above-mentioned method without fail upon the transmission of an RRC connection request message from a UE, which causes a problem that the radio resource usage efficiency decreases wastefully as described above, further leading to an inefficient operation. The first modified example discloses, in order to solve the above-mentioned problem, that the information indicating that the message is a request for (registering) updating a whitelist is mapped on an RRC connection request message.

For example, in a case of the example shown in FIG. 31, which is described in the eighth embodiment, the UE transmits an RRC connection request to a Home-eNB(A) in Step ST3107. The UE maps the information indicating that the message is a request for (registering) updating a whitelist on the RRC connection request message and notifies the Home-eNB(A) that the cause of the message is a request for (registering) updating a whitelist, together with the RRC connection request. This allows the Home-eNB(A) to know that the UE requests (registration) update of a whitelist. On the other hand, in a case where the information indicating that the message is a request for (registering) updating a whitelist is not mapped on the RRC connection request message, the Home-eNB(A) knows that the RRC connection request message is not a request for (registering) updating a whitelist, and accordingly is not required to transmit the whitelist to the UE.

As a specific method of mapping the information indicating that the message is a request for (registering) updating a whitelist on an RRC connection request message, a whitelist (registration) update request may be added as the cause information of an RRC connection request message. The cause information may be expressed numerically. Alternatively, a one-bit indicator indicating whether or not the message is a request for (registering) updating a whitelist may be provided on the RRC connection request message.

While this modified example describes the case of the application to the method disclosed in the eighth embodiment, this modified example is also applicable to the third embodiment to the seventh embodiment. It is possible to apply this modified example when RRC connection is requested, which is performed when (registration) update of a whitelist is requested.

In addition to the effects described in the eighth embodiment, the method disclosed in the present embodiment is further capable of solving the above-mentioned problem that a registration (update) notification message is transmitted to the UE though a CSG cell is not required to transmit a whitelist to the UE, which wastefully reduces a radio resource. In addition, the method is capable of solving the above-mentioned problem that, in a case where, for example, a CSG cell determines whether to prohibit the transmission of an RRC connection request to the UE, an inefficient operation occurs also in consideration of an RRC connection request message that has been transmitted due to other causes. Further, as a result of the information indicating that the message is a request for (registering) updating a whitelist being mapped on a TAU request message or an RRC connection request message, the execution of the establishment of RRC connection to a CSG cell that is not the CSG cell with which a UE has performed user access registration and the execution of the transmission of a TAU request message to the core network through the CSG cell are not limited to the case in which the manual search has been activated. Through application of the methods described in the present embodiment and its modified example, it suffices that, for requesting (registering) update of a whitelist, a UE is permitted to perform the establishment of RRC connection to a CSG cell that is not the cell with which the UE has performed user access registration and the transmission of a TAU request message to the core network through the CSG cell. This enables, for example, after the user access registration, to automatically perform the communication for obtaining a whitelist without starting manual search and to perform the communication for obtaining a whitelist periodically (for example, periodically in a cycle determined in advance) before obtaining a whitelist without starting manual search. As a result, the procedure until a UE obtains a registered (updated) whitelist can be performed flexibly, and it is possible to cope with the situation in which a large number of CSG cells are installed and user access registration is performed in various locations in the future. As a result of the methods described in the present embodiment and its modified example being applied, it is not required to include the information indicating that a UE has started manual search in an RRC connection and a TAU request as disclosed in the fourth and fifth embodiments, leading to a reduction in signaling amount.

Tenth Embodiment

In the fourth embodiment to the seventh embodiment, the UE that has performed user access registration with a CSG cell transmits a TAU request to the core network through the CSG cell for obtaining a whitelist from a core network (CN). It is described that the core network that has received the TAU request from the UE checks a CSG-ID (TAC) with the use of the identification number of the UE and, in a case of determining that it cannot access the CSG cell, transmits a TAU reject message to the UE through the CSG cell. Besides, the description is given of the method of determining, by the UE, a subsequent operation in response to the TAU reject message received from the core network through the CSG cell. In such a case, the UE preferably knows whether the TAU reject message received through the CSG cell is transmitted in response to the TAU request message for requesting (registration) update of a whitelist and, otherwise, a TAU reject message transmitted due to other causes is also taken into consideration, leading to an inefficient operation.

On the other hand, 3GPP discusses that the cause information indicating "no suitable cells" is mapped on the TAU reject message or RRC connection reject message. As described above, however, the "suitable cell" is defined in several ways, and thus it is difficult to identify any definition into which the cell does not fall. The present embodiment discloses, in order to solve the above-mentioned problem, that the information indicating the cause of rejection is that the UE identification number is not registered in the CSG-ID to which the CSG cell belongs is mapped on the TAU reject message.

For example, in the case of the example shown in FIG. 27, which is described in the sixth embodiment, the core network transmits a TAU request reject message to the UE through the Home-eNB(A) in Step ST2710 and Step ST2711. The information indicating that the cause of rejection is that the UE identification number is not registered in the CSG-ID to which the Home-eNB(A) belongs is mapped on the TAU reject message, to thereby notify that the cause is that the UE identification number is not registered in the CSG-ID to which the Home-eNB(A) belongs. This enables the UE to know that the cause of the received TAU request reject message is that the UE identification number is not registered in the CSG-ID to which the CSG cell belongs. On the other hand, in a case where the information indicating that the cause of rejection is that the UE identification number is not registered in the CSG-ID to which a CSG cell belongs is not mapped on a TAU reject message, it is understood that the TAU reject message is transmitted due to any other causes.

As a specific method of mapping, on the TAU reject message, the information indicating that the cause of rejection is that the UE identification number is not registered in the CSG-ID to which the CSG cell belongs, the information indicating that the UE identification number is not registered in the CSG-ID to which the CSG cell belongs may be added to the cause information of the TAU reject message. The cause information may be expressed numerically. Alternatively, a one-bit indicator indicating whether or not the cause is the UE identification number is not registered in the CSG-ID to which the CSG cell belongs may be provided on the TAU request reject message.

In addition to the effects described in the fourth to seventh embodiments, the method disclosed in the present embodiment enables to solve the above-mentioned problem that an insufficient operation is caused also in consideration of the TAU reject message transmitted due to other causes in the case where a UE determines whether to prohibit the establishment of RRC connection and the transmission of TAU request to the TAU reject message transmitted from the core network.

Next, a first modified example of the tenth embodiment described above is described. Disclosed here is that the information indicating that the cause of rejection is that the UE identification number is not registered in the CSG-ID to which the CSG cell belongs is mapped on the RRC connection reject message, for application to the method disclosed in the eighth embodiment. The eighth embodiment describes that the UE performs the process of prohibiting the transmission of an RRC connection request message, with the use of the RRC connection reject message to the RRC connection request message transmitted by the UE. The UE may be configured to prohibit the transmission of an RRC connection request message to the CSG cell without fail upon the transmission of the RRC connection reject message from the CSG cell. However, this causes an inefficient operation as described above.

The first modified example discloses, in order to solve the above-mentioned problem, that the information indicating that the cause of rejection is that the UE identification number is not registered in the CSG-ID to which the CSG cell belongs is mapped on an RRC connection reject message. For example, in the case of the example shown in FIG. 31, which is described in the eighth embodiment, in Step ST3110, the UE receives RRC connection reject from the Home-eNB(A). The Home-eNB(A) maps, on the RRC connection reject message, the information indicating that the cause of rejection is that the UE identification number is not registered in the CSG-ID to which the Home-eNB(A) belongs, and notifies the UE that the cause of rejection is that the UE identification number is not registered in the CSG-ID to which the Home-eNB(A) belongs. This enables the UE to know that the received RRC connection reject message is transmitted because the UE identification number is not registered in the CSG-ID to which the CSG cell belongs. On the other hand, in a case where the information indicating that the cause of rejection is that the UE identification number is not registered in the CSG-ID to which the CSG cell belongs is not mapped on the RRC connection reject message, it is possible to know that the cause of rejection is that the UE identification number is not registered in the CSG-ID to which the CSG cell belongs.

As a specific method of mapping the information indicating that the cause of rejection is that the UE identification number is not registered in the CSG-ID to which the CSG cell belongs on the RRC connection reject message, the information indicating that the UE identification number is not registered in the CSG-ID to which the CSG cell belongs may be added to the cause information of the RRC connection reject message. The cause information may be expressed numerically. Alternatively, a one-bit indicator indicating whether or not the cause is the UE identification number is not registered in the CSG-ID to which the CSG cell belongs may be provided on the RRC connection reject message.

In addition to the effects described in the eighth embodiment, the method disclosed in the present embodiment enables to solve the problem that an insufficient operation is caused also in consideration of the RRC connection reject message transmitted due to other causes in the case where a UE determines whether to prohibit the RRC connection request when receiving an RRC connection reject message from the CSG cell.

Eleventh Embodiment

The description is given of the case where a UE mistakenly receives the contents of a whitelist transmitted from a core network at times in the registration or change of the whitelist. In such a case, there occurs a case where a CSG cell belonging to the CSG-ID of the mistakenly received whitelist is selected in a situation where there are a large number of CSG cells, and accordingly a UE repeats the establishment of RRC connection to the CSG cell belonging to the CSG-ID of the mistakenly received whitelist and the TAU request to the core network through the CSG cell many times. As a result, there arises a problem of extreme reductions in radio resource usage efficiency and signaling efficiency as a system. Further, a problem that a long control delay occurs due to a very large amount of time period required from cell search to entering an idle state operation and a problem that a UE consumes a large amount of power are caused.

Figure 32:
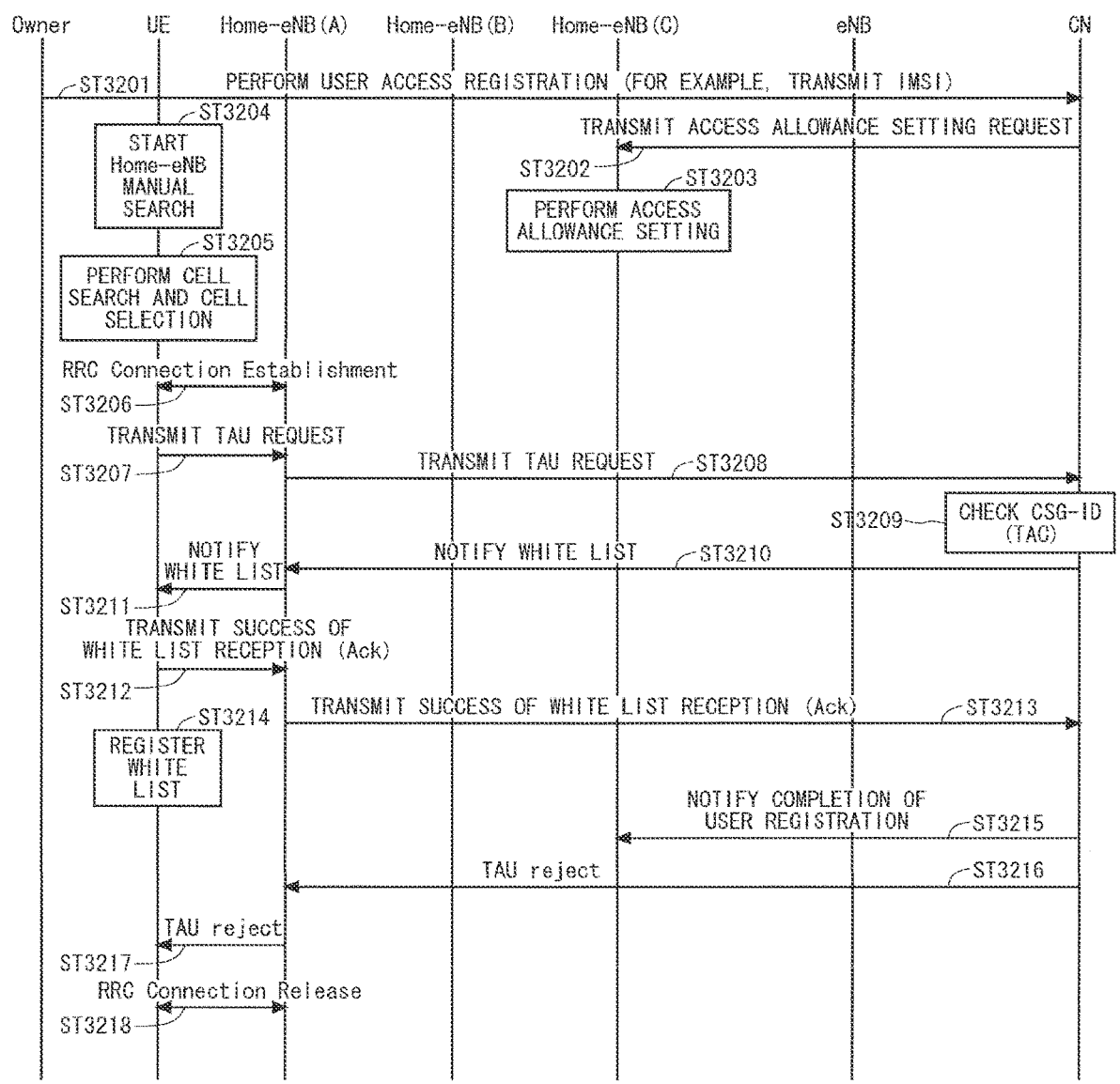
FIG. 32 is a sequence diagram of a method of sending Ack/Nack indicating success/failure of (updated) whitelist message reception according to an eleventh embodiment.

The present embodiment discloses, in order to solve those problems, the method of transmitting the success/failure (Ack/Nack) of whitelist reception to a core network by a UE in an explicit manner. FIG. 32 is a sequence diagram of the method of transmitting, when a whitelist is registered, the success/failure (Ack/Nack, complete/incomplete) of whitelist reception by a UE to a core network in an explicit manner. The figure shows a case of LTE communication system using, for example, a Home-eNB. The figure is described below. While it is assumed here that a UE performs user access registration with a Home-eNB(C), operations of Step ST3201 to Step ST3203 are similar to those described above, and thus description thereof is omitted. In Step ST3205, the UE that has started manual search of a CSG cell (in this case, Home-eNB) in Step ST3204 performs cell search and cell selection. In a situation as shown in FIG. 23, when there are a larger number of CSG cells belonging to the CSG-ID with which a UE has not performed user access registration, the UE selects a CSG cell. As described in the fourth embodiment, a UE is enabled to establish RRC connection to the CSG cell irrespective of whether the selected CSG cell is the CSG cell with which user access registration has been performed, and accordingly is enabled to transmit TAU to the network through the CSG cell. As a result, in Step ST3206, the UE transmits a request for RRC connection to a CSG cell (in this case, Home-eNB(A) that is not the CSG cell (in this case, Home-eNB(C)) with which user access registration has been performed, and the Home-eNB(A)) that has received this request for RRC connection transmits establishment allowance to this establishment request to a UE, whereby RRC connection is established between the UE and the Home-eNB(A).

In Step ST3207 and Step ST3208, next, the UE transmits a TAU request message to the core network through the Home-eNB(A). On this occasion, the UE transmits a UE identification number as well. The UE identification number may be included in the TAU request message, may be provided together with the TAU request message, or may be transmitted as the other message. The core network that has received the TAU request message checks whether the UE belongs to the CSG-ID of the Home-eNB(A) based on the received UE identification number as well. The method described with reference to Step ST2207, which is disclosed in FIG. 22, is applicable to this check method. The UE identification number is not registered in the CSG-ID to which the Home-eNB(A) belongs, and accordingly the core network determines that the UE cannot access the Home-eNB(A). In the present embodiment, for example, the method disclosed in the fifth embodiment is used. Also in a case where the core network determines that the UE cannot access the Home-eNB(A), in Step ST3210, the core network transmits the whitelist of the UE to the Home-eNB(A) before transmitting TAU reject. In Step ST3211, the Home-eNB(A) that has received the whitelist of the UE transmits the whitelist to the UE.

On this occasion, in Step ST3212, the UE that has received the whitelist transmits Ack indicating the success of whitelist reception to the Home-eNB(A). This Ack may be provided as a NAS message. In Step ST3213, the Home-eNB(A) that has received Ack indicating the success of whitelist reception from the UE transmits Ack indicating the success of whitelist reception to the core network. In Step ST3215, the core network that has received AcK indicating the success of whitelist reception transmits, to the Home-eNB(C) with which the UE has performed user access registration, the information for notifying that the UE has completed the user access registration. On the other hand, in Step ST3214, the UE stores the received whitelist in the own UE. In Step ST3216 and Step ST3217, the core network that has received Ack indicating the success of whitelist reception in Step ST3213 transmits a TAU reject message for the TAU request to the UE through the Home-eNB(A). In Step ST3218, the UE that has received the TAU reject message releases the RRC connection with the Home-eNB(A).

In Step ST3212, the UE that has failed to receive the whitelist in Step ST3211 transmits Nack indicating the failure of whitelist reception to the Home-eNB(A). This Nack may be provided as a NAS message. In Step ST3213, the Home-eNB(A) that has received Nack indicating the failure of whitelist reception from the UE transmits Nack indicating the failure of whitelist reception to the core network. The core network that has received Nack indicating the failure of whitelist reception transmits the whitelist to the UE through the Home-eNB(A) again in Step ST3210 and Step ST3211. The process described above is repeated until the UE successfully receives the whitelist. If the UE succeeds in reception, the process of Step ST3212 and thereafter is performed. The above-mentioned method enables to considerably reduce the probability that the UE will mistakenly receive the contents of the whitelist transmitted from the core network. This solves a problem that, in a situation in which a large number of CSG cells are present as described above, a UE mistakenly selects the CSG cell belonging to the CSG-ID of the whitelist that has been received mistakenly and repeats the establishment of RRC connection to the CSG cell many times and a TAU request to the core network through the CSG cell. By solving those problems, it is possible to avoid extreme reductions in radio resource usage efficiency and signaling efficiency in a future system operation.

While the fourth to eleventh embodiments of the present invention describe the registration of a whitelist, which are also applicable not only to the registration of a whitelist, but also to the update (including deletion and addition) of a whitelist. The examples of the first to eleventh embodiments of the present invention describe the communication system using an LTE system in which the Home-eNB is used as a CSG cell, which are also applicable to a case of the UMTS communication system in which the Home-NB is used as a CSG cell. In the case of the UMTS communication system in which the Home-NB is used as a CSG cell, an RNC may be provided between a base station (Home-NB, NB) and the core network, so that an RRC message such as an RRC connection request is transmitted/received between the UE and the RNC and that a NAS message such as a TAU request is transmitted/received between the UE and the core network through the base station (Home-NB, NB) and the RNC. This also allows the application to the case of the UMTS communication system in which the Home-eNB is used as a CSG cell.

Twelfth Embodiment

Figure 33:
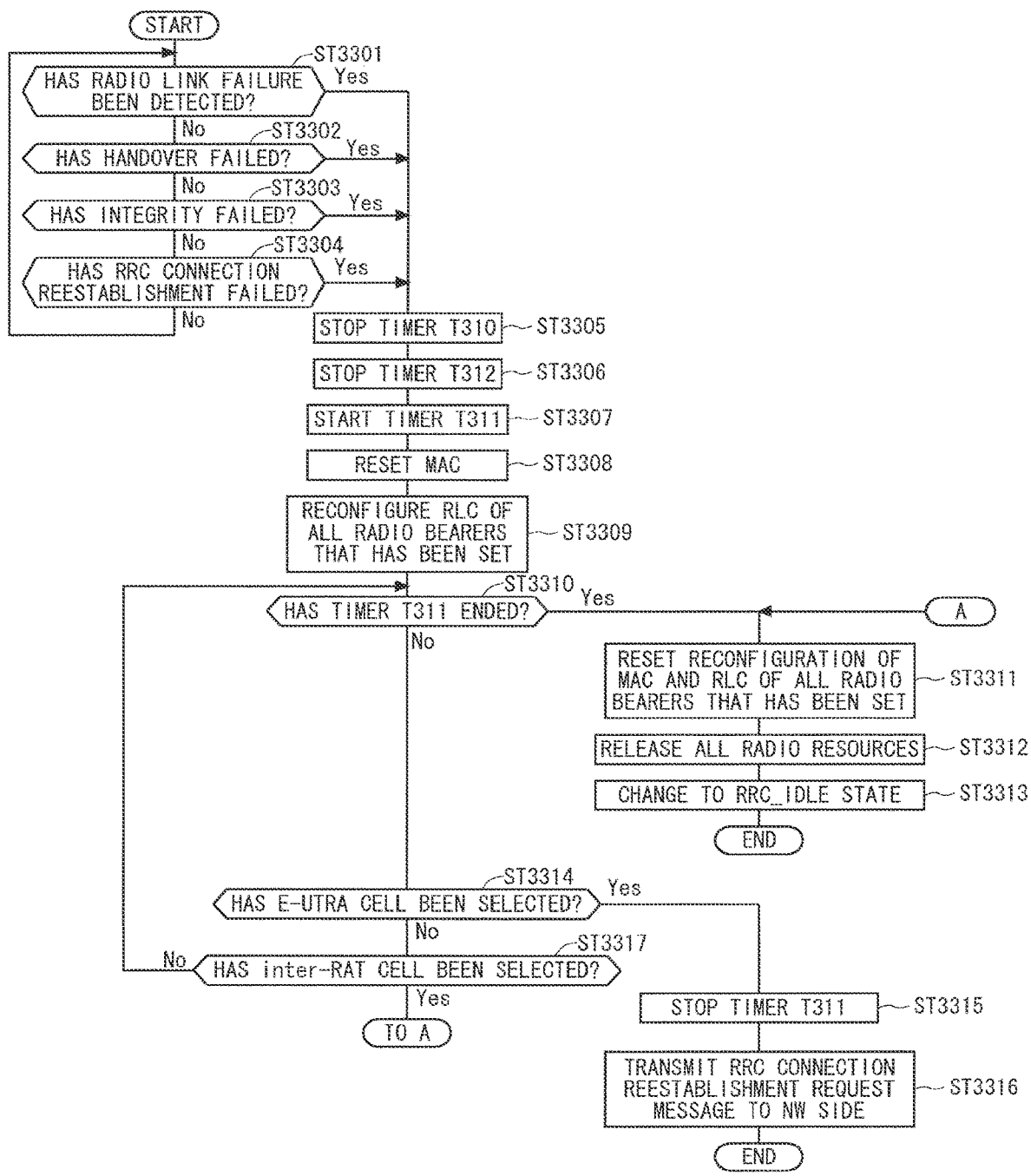
FIG. 33 is a flowchart showing the process of a UE regarding RRC connection re-establishment.

Non-Patent Document 6 discloses the process of radio resource control (RRC) connection re-establishment as an LTE mobile communication system. FIG. 33 shows the process flow of the RRC connection re-establishment as a UE. In Step ST 3301, the UE determines whether or not radio link failure has been detected. As a result, in a case where radio link failure has been detected, the UE proceeds to Step ST3305, or proceeds to Step ST3302 in a case where it has not been detected. In Step ST3302, the UE determines whether or not handover failure has occurred. As a result, in a case where handover failure has occurred, the UE proceeds to Step ST3305, or proceeds to Step ST3303 in a case where handover failure has not occurred. In Step ST3303, the UE determines whether or not there exists an indication of integrity failure from lower layers. As a result, in a case where there is an indication of integrity failure, the UE proceeds to Step ST3305, or proceeds to Step ST3304 in a case where there is no indication. In Step ST3304, the UE determines whether or not RRC connection reconfiguration failure has occurred. As a result, the UE proceeds to Step ST3305 in a case where RRC connection reconfiguration failure has occurred, or proceeds to Step ST3301 in a case where it has not occurred. The UE that has returned to Step ST3301 repeats the process of Step ST3301, Step ST3302, Step ST3303 and Step ST3304. Step ST3301, Step ST3302, Step ST3303 and Step ST3304 are processed in an arbitrary order, and may be processed at the same time.

Description is given below of radio link failure where a UE determines the presence or absence of detection in Step ST3301. The time period required for permitting radio link recovery after the detection of a physical layer problem is, for example, T310. It is also possible to define a counter value of physical layer failure from the detection of a physical layer problem to the permission of radio link recovery, instead of T310. Further, the time period required for permitting radio link recovery after the reception of random access problem indication from the MAC is, for example, T312.

The UE detects radio link failure in a case where the above-mentioned timers (T310, T312) end. Note that the timers (T310, T312) are mapped to a system information block type 2 (SIB2) as part of UE-timer and constants information element, and the base station (on a network side) notifies the UE of the timers on the PDSCH (DL-SCH) using the BCCH.

Description is given below of handover failure that is determined by a UE in Step ST3302. The UE executes handover upon reception of an RRC message that is a trigger of handover. In a case where the RRC connection reconfiguration message includes mobility control information, the UE sets a timer (for example, T304) included in the mobility control information. In a case where the MAC completes a random access procedure, the UE stops the timer (T304). The UE determines that the handover failure has occurred in a case where the timer (T304) has ended. That is, the timer (T304) defines the allowed time required for the UE executing handover to the MAC completing a random access procedure. Note that the timer (T304) is mapped to the RRC connection reconfiguration message as part of the mobility control information element and the base station (on a network side) notifies the UE of the timer as the non access stratum (NAS) dedicated information.

Description is given below of the RRC connection reconfiguration failure that is determined by a UE in Step ST3304. In a case where the RRC connection reconfiguration message includes the configuration with which the UE is unable to comply, the UE determines that the RRC connection reconfiguration failure has occurred. Note that the base station (on a network side) notifies the UE of the RRC connection reconfiguration message as the NAS dedicated information. In Step ST3305, the UE stops the timer of the time (T310) for permitting radio link recovery after detecting a physical layer problem, and then proceeds to Step ST3306. In Step ST3306, the UE stops the timer of the time (T312) for permitting radio link recovery after receiving a random access problem indication from the MAC, and then proceeds to Step ST3307. In Step ST3307, the UE starts the timer (for example, T311) of the allowed time for the detection of radio link failure, determination of handover failure, determination of integrity failure or determination of RRC connection reconfiguration failure to the selection of a cell in the E-UTRA, and then proceeds to Step ST3308. Note that the timer (T311) is mapped to the system information block type (SIB2) as part of UE-timer and constants information element, and the base station (on a network side) notifies the UE of the timer on the PDSCH using the BCCH. In Step ST3308, the UE resets media access control (MAC) and then proceeds to Step ST3309. In Step ST3309, the UE reconfigures the radio link control (RLC) of all radio bearers (RBs) that have been set, and then proceeds to Step ST3310.

In Step ST3310, the UE determines whether the T311 timer has ended.

As a result, the UE proceeds to Step ST3311 in a case where the timer has ended (the timer has timed out, completed or expired), or proceeds to Step ST3314 in a case where the timer has not ended.

In Step ST3311, the UE resets the reconfiguration of the MAC and the RLC of all radio bearers that have been set, and then proceeds to Step ST3312.

In Step ST3312, the UE releases all radio resources, and then proceeds to Step ST3313. In Step ST3313, the UE changes to the RRC-IDLE state.

In Step ST3314, the UE determines whether or not the E-UTRA cell has been selected in accordance with a cell selection process, or a cell reselection process. As a result, the UE proceeds to Step ST3315 in a case where the E-UTRA cell has been selected, or proceeds to Step ST3317 in a case where the E-UTRA cell has not been selected. In Step ST3315, the UE stops the timer T311 and then proceeds to Step ST3316. In Step ST3316, the UE transmits an RRC connection reestablishment request message to the network side.

In Step ST3317, the UE determines whether or not an inter-radio access technology (RAT) cell has been selected in accordance with the cell selection process. As a result, the UE proceeds to Step ST3311 in a case where the inter-RAT cell has been selected, or proceeds to Step ST3310 in a case where the inter-RAT cell has not been selected. The UE that has returned to Step ST3310 repeats the process of Step ST3310, Step ST3314 and Step ST3317.

The problems of the twelfth embodiment are described below. As described above, the CSG cell is introduced in the LTE and UMTS. However, Non-Patent Document 6 does not disclose how to introduce a CSG cell in the process of RRC connection re-establishment as a mobile communication system. In addition, there is no suggestion for the problems indicated in the twelfth embodiment. In order to receive normal service in the CSG cell, the UE needs to be registered in the CSG cell. The UE that has completed the registration stores the CSG-ID of the CSG cell that has registered in a whitelist in the UE (such as USIM, SIM, memory and CPU). The CSG cell notifies the UEs being served thereby of the CSG-ID or a tracking area code (TAC) associated with the CSG-ID as system information. The CSG-ID or TAC is mapped to the system information block type 1 (SIB1), which is notified from the CSG cell on the PDSCH using the BCCH. Note that the cycle of broadcasting the SIB1 is set at once every 20 ms. In order that the UE select the CSG cell as a suitable cell and perform location registration or idle state operation for obtaining normal service, it is required to additionally perform the process of determining whether or not the own UE has been registered in the CSG cell, compared with the case where the non-CSG cell is selected as a suitable cell. In order to determine whether or not the own UE has been registered in the CSG cell, it is required to determine whether or not the CSG-ID (or TAC) broadcast by the CSG cell is identical to the CSG-ID in the whitelist of the own UE.

The RRC connection re-establishment process when a CSG cell is introduced is described. The process is substantially identical to that of FIG. 33, and characteristic Step ST3314 is shown in detail in FIG. 34. In Step ST3401, the UE determines whether or not the whitelist includes the CSG-ID. Alternatively, the UE determines whether or not it has been registered in the CSG cell. In a case where the whitelist includes the CSG-ID, or in a case where the UE has been registered in the CSG cell, the UE proceeds to Step ST3402. In a case where the whitelist includes no CSG-ID, or in a case where the UE has not been registered in the CSG cell, the UE proceeds to Step ST3410. In Step ST3402, the UE determines whether or not there are cells capable of being a serving cell among the CSG cells from the measurement results of the received quality of the neighboring cells. In a case where there are such cells, the UE proceeds to Step ST3403. In a case where there are no such cells, the UE proceeds to Step ST3410. In Step ST3403, the UE selects the most excellent cell (also referred to as best cell) from the cells that can serve as a serving cell among the CSG cells, based on the received quality, from the measurement results of received quality of neighboring cells, and then proceeds to Step ST3404.

In Step ST3404, the UE receives a physical downlink control channel (PDCC, which is also referred to as L1/L2 signaling channel) of the cell selected in Step ST3403. The UE needs to perform blind detection for receiving the PDCCH. As a result of the blind detection, the UE receives the assignment of BCCH on the PDSCH, and then proceeds to Step ST3405. In Step ST3405, the UE receives the PDSCH in accordance with the assignment for BCCH that has been received in Step ST3404, and then proceeds to Step ST3406. The BCCH to which the SIB1 is mapped is transmitted on the PDSCH once every 20 ms. In Step ST3405, the UE obtains the SIB1. In Step ST3406, the UE obtains the CSG-ID or TAC mapped to the SIB1 obtained in Step ST3405, and then proceeds to Step ST3407. While the CSG-ID may be mapped to another system information different from the SIB1, it is possible to apply the present embodiment even in such a case.

In Step ST3407, the UE determines whether or not the CSG-ID of the CSG cell that has been obtained in Step ST3406 is identical to the CSG-ID of the registered CSG cell stored in the whitelist of the own UE. Accordingly, the UE determines whether or not the CSG cell can serve as a "suitable cell". That is, in the case where the CSG-ID of the CSG cell is included in the whitelist, the cell can serve as a "suitable cell" as the registered CSG cell. On the other hand, in the case where the CSG-ID of the CSG cell is not included in the whitelist, the cell cannot serve as a "suitable cell" as the unregistered CSG cell. In the case where the CSG cell is a registered CSG cell, the UE proceeds to Step ST3315 of FIG. 33. In the case where the CSG cell is an unregistered CSG cell, the UE proceeds to Step ST3408.

In Step ST3408, the UE excludes the CSG cell from the process of selecting an E-UTRA cell, and then proceeds to Step ST3409. In Step ST3409, the UE determines whether or not the timer T311 has ended. As a result, in a case where the timer has ended (the timer has timed out, completed or expired), the UE proceeds to Step ST3311 of FIG. 33, or returns to Step ST3402 in a case where the timer has not ended. In Step ST3410, the UE determines whether or not there are cells that can serve as a serving cell among the non-CSG cells from the measurement results of the received quality of neighboring cells. In a case where there are such cells, the UE proceeds to Step ST3411. In a case where there are no such cells, the UE proceeds to Step ST3317 of FIG. 33. In Step ST3411, the UE selects the best cell from the cells that can serve as a serving cell among the non-CSG cells, based on the received quality, from the measurement results of received quality of neighboring cells, and then proceeds to Step ST3315 of FIG. 33.

Figure 34:
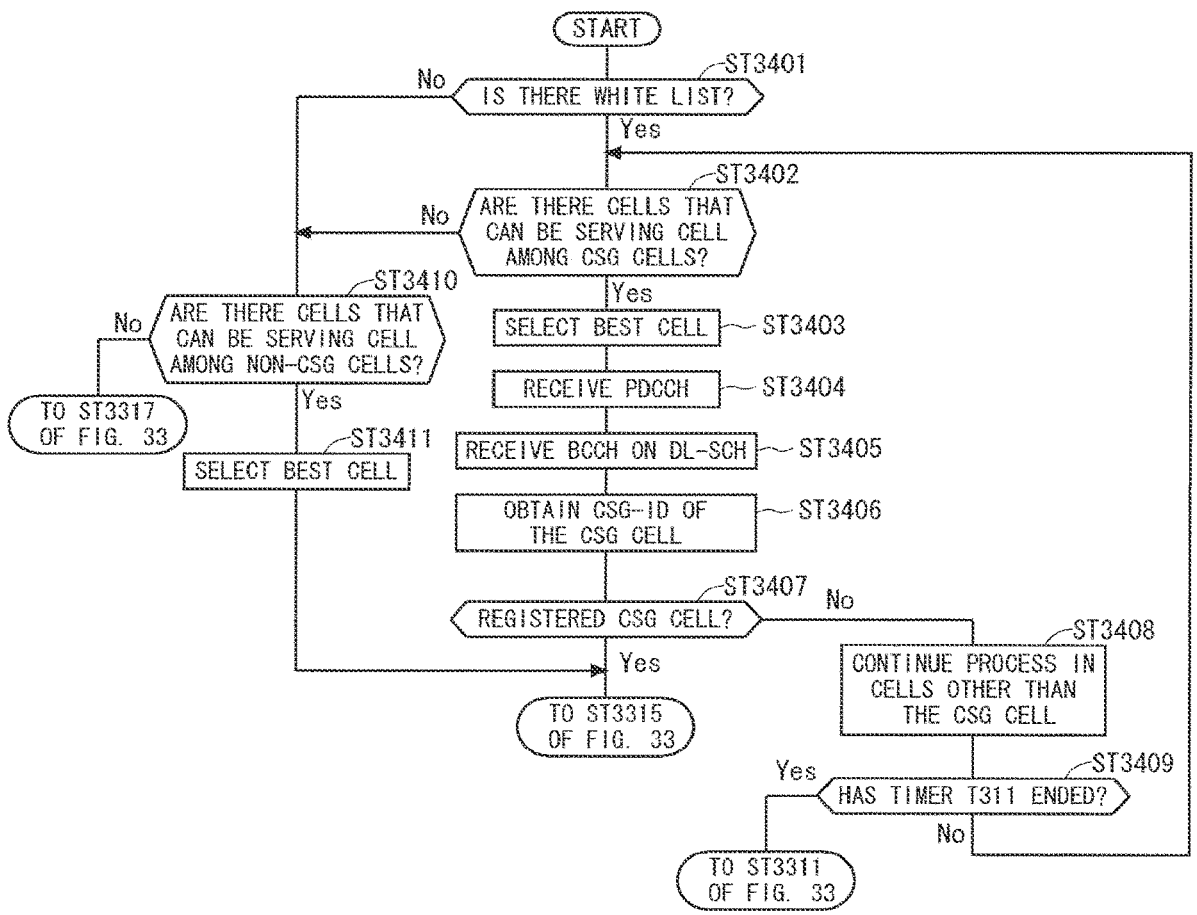
FIG. 34 is a flowchart showing the process of a UE regarding RRC connection re-establishment when a CSG cell is introduced.

As apparent from the above and FIG. 34, it is shown that the time period required for the UE that has a CSG-ID in the whitelist, that is, the UE registered in any of CSG cells to select the E-UTRA cell may be longer than the time period required for the UE that does not has a CSG-ID in the whitelist, that is, the UE that has not been registered in any of the CSG cells to select the E-UTRA cell. This phenomenon occurs more remarkably in a case where the own UE has been registered in the CSG cell (where it is assumed that CSG-ID=10) but the CSG cell (where CSG-ID=10) is not in the vicinity thereof. In this case, the UE determines the "unregistered CSG cell" in Step ST3407 of FIG. 34. Further, the above problem occurs more remarkably in the case where the UE is present in the location where there are a large number of CSG cells in which the UE has not been registered, and the large number of CSG cells where registration has not been performed have excellent received quality and can serve as a serving cell. This is because, in this case, the process of Step ST3402 to Step ST3409 of FIG. 34 is repeated until there is no cell that can serve as a serving cell among the CSG cells.

The problem described below occurs due to a difference of time period required for selecting a cell between a UE that has a CSG-ID in a whitelist and a UE that does not have a CSG-ID in the whitelist. As described above, there is a timer (for example, T311) for allowed time from the detection of radio link failure, determination of handover failure, determination of integrity failure, or determination of RRC connection reconfiguration failure to the selection of a cell in the E-UTRA. In a case where there is one type of the timer as in this situation, the case where a timer value is set so as to be suitable for the UE that has a CSG-ID in the whitelist is considered. In this case, the CSG-ID is not included in the whitelist, and thus the timer is not timed out though the time period required for cell selection is relatively short. That is, in Step ST3310 of FIG. 33, the "timer has ended" is determined with an unnecessary delay. This means that the release of all radio resources, which is performed in Step ST3312 of FIG. 33, delays unnecessarily. This results in a problem of the reservation of unnecessary resources. In contrast to this, the case where a timer value is set so as to be suitable for a UE that does not have a CSG-ID in the whitelist is considered. On that occasion, considered is a case where the timer is timed out during the cell selection though there still exists a cell that can serve as a serving cell among the CSG cells because the whitelist includes a CSG-ID in the whitelist and long time period is required for sell selection.

That is, considered is a case where the "timer has ended" is determined too early in Step ST3310 of FIG. 33 or the "timer has ended" is determined too early in Step 3409 of FIG. 34. This leads to a problem of a reduction in possibility of RRC connection re-establishment in the state where radio bearers, or, radio resources are reserved though the MAC of the UE having the CSG-ID in the whitelist has been reset. This leads to a problem that the UE having a CSG-ID in the whitelist changes to the RRC_IDLE state though there are cells having excellent received quality in the vicinity thereof, which causes a control delay. Note that Non-Patent Document 6 does not suggest this problem. In addition, FIG. 34 describes the case where the selection of a CSG cell is performed with a higher priority compared with the selection of a non-CSG cell. However, the above-mentioned problem occurs even when this priority is not provided. Further, this problem also occurs in introducing a CSG cell in the LTE (E-UTRAN) system as well as introducing a CSG cell in the W-CDMA (UTRAN, UMTS) system.

The solution to the problems of the twelfth embodiment is described below. This solution is also applicable to the LTE system as well as the W-CDMA system. The twelfth embodiment discloses that different timers are individually provided in accordance with whether or not the whitelist includes a CSG-ID and are reflected on the UE for solving the above-mentioned problems. More specifically, disclosed is that the timers (for example, T311) for the allowed time from the detection of radio link failure, determination of handover failure, determination of integrity failure or determination of RRC connection reconfiguration failure to the selection of a cell in the E-UTRA are individually provided (T311_with a whitelist and T311_without a whitelist) in accordance with whether or not the whitelist includes a CSG-ID and are reflected on the UE.

Figure 35:
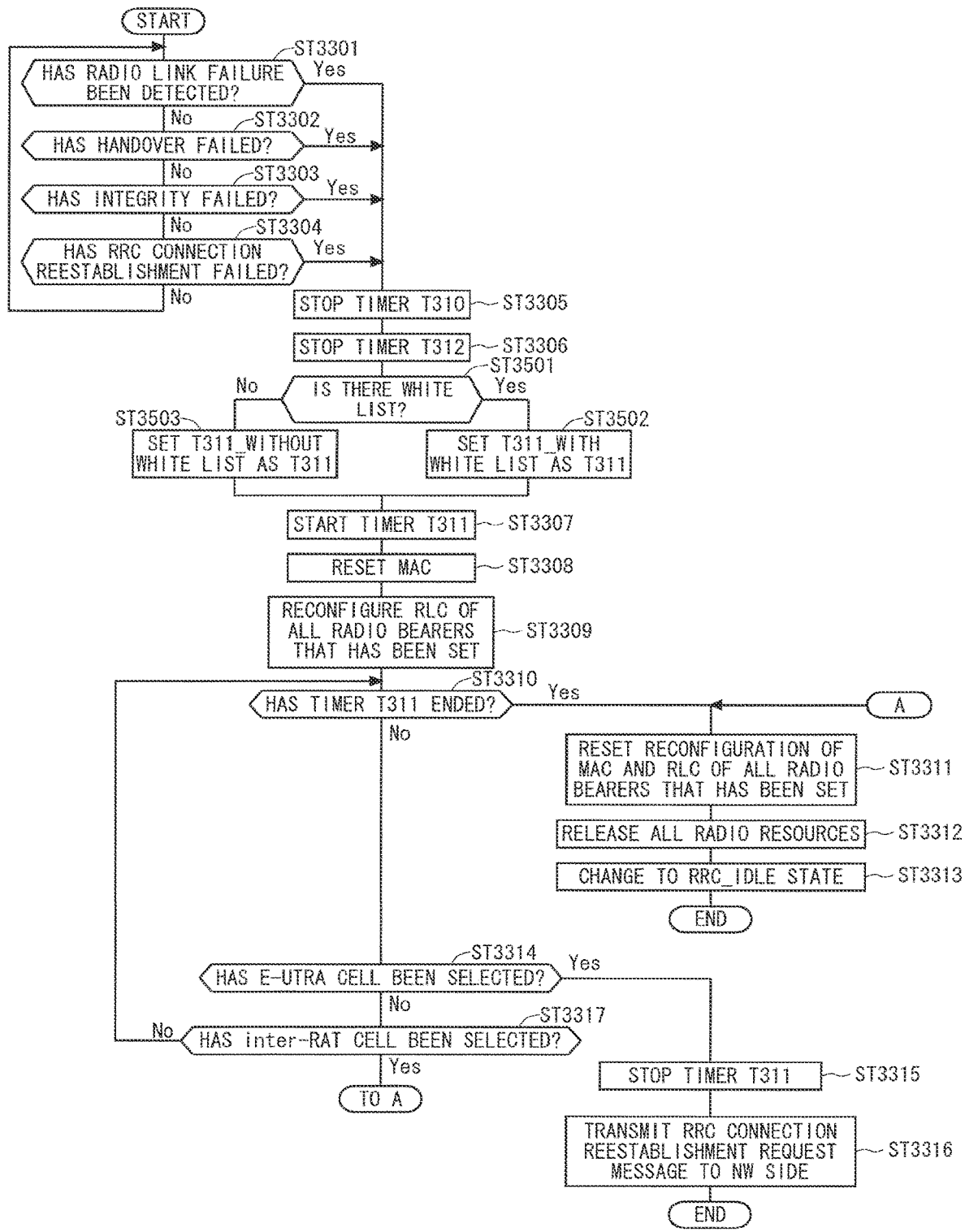
FIG. 35 is a flowchart showing the process of a UE regarding RRC connection re-establishment when a timer for permissible time before selecting a cell within E-UTRA is individually provided for each of a case where a whitelist is provided and a case where a whitelist is not provided.

A specific operation example is decried with reference to FIG. 35. The portions of the same step numbers as those of FIG. 33 are not described in FIG. 35. Note that FIG. 34 can be used also in FIG. 35. In Step ST3501, the UE determines whether or not the whitelist includes a CSG-ID. Alternatively, the UE determines whether or not the UE has been registered in the CSG cell. In a case where the whitelist includes a CSG-ID or in the case where the UE has been registered in the CSG cell, the UE proceeds to Step ST3502. In a case where the whitelist include no CSG-ID or in a case where the UE has not been registered in the CSG cell, the UE proceeds to Step ST3503. In Step ST3502, the UE sets, as the timer (for example, T311) for the allowed time period for the detection of radio link failure, determination of handover failure, determination of integrity failure or determination of RRC connection reconfiguration failure to the selection of a cell in the E-UTRA, the timer (for example, T311_with a whitelist) for the allowed time period for the detection of radio link failure, determination of handover failure, determination of integrity failure or determination of RRC connection reconfiguration failure to the selection of a cell in the E-UTRA in the case where the whitelist includes a CSG-ID or in the case where a UE has been registered in the CSG cell, and then proceeds to Step ST3307.

In Step ST3503, the UE sets, as the timer (for example, T311) of the allowed time period for the detection of radio link failure, determination of handover failure, determination of integrity failure or determination of RRC connection reconfiguration failure to the selection of a cell in the E-UTRA, the timer (for example, T311_without a whitelist) for the allowed time period for the detection of radio link failure, determination of handover failure, determination of integrity failure or determination of RRC connection reconfiguration failure to the selection of a cell in the E-UTRA in the case where the whitelist includes no CSG-ID or in the case where a UE has not been registered in the CSG cell, and then proceeds to Step ST3307.

Next, the method of notifying different timers individually provided in accordance with whether or not the whitelist includes a CSG-ID is disclosed. As a first method, a serving cell (on the network side) notifies the UEs of the timer (for example, T311_with a whitelist) used in a case where the whitelist includes a CSG-ID as well as the timer (for example, T311_without a whitelist) used in a case where the whitelist includes no CSG-ID. More specifically, a notification is made with the use of the dedicated control channel (DCCH) or broadcast control channel (BCHH). In a case of using the DCCH, this is the method excellent in that control is enabled in accordance with the communication state of the UE. While, in a case where the BCCH is used, this is the method excellent in that all UEs being served can be notified and radio resources are effectively used. As a specific example in the case where a notification is made with the use of the BCCH, mapping to the MIB or SIB is conceivable.

In the case where the MIB is used, mapping is performed to the PBCH, which is the method excellent in that a UE is capable of receiving a small amount of control delay. In the case where the SIB is used, a notification is made with the use of the SIB1. This is the method excellent in that the MIB or SIB1 is the broadcast information that is the absolutely required minimum broadcast information received from cell search to the idle state operation, and that a control delay of a UE is reduced. In addition, as part of the UE-timer and constants information element, mapping is performed to the system information block type 2 (SIB2), and a notification is made on the PDSCH using the BCCH. Further, irrespective of whether the serving cell is a CSG cell or a non-CSG cell, the timer (for example, T311_with a whitelist) used in the case where the whitelist includes a CSG-ID and the timer (for example, T311_without a whitelist) used in the case where the whitelist includes no CSG-ID are mapped to a system information block type 2 (SIB2) as part of the UE-timer and constants information element, and the serving cell (on a network side) notifies the UEs of the timers on the PDSCH using the BCCH. In the case of using the SIB2, a notification can be made simultaneously with a similar (same type of) parameter in terms of timer, which is the method excellent in that the UE that has received a notification can perform the process easily. Further, even in the method of making a notification in the system information other than the SIB1 and SIB2, which is also the broadcast information, and thus all UEs being served can be notified. Therefore, this is the method excellent in that radio resources are effectively used. The UE is capable of obtaining different timers only by receiving the BCCH or DCCH of a serving cell, whereby an effect of control delay prevention can be achieved.

As a second method, a timer (for example, T311_without a whitelist) used in the case where the whitelist includes no CSG-ID is mapped to the SIB2 as part of the UE-timer and constants information element, and the serving cell (on the network side) notifies the UEs of the timer on the PDSCH using the BCCH. Further, irrespective of whether the serving cell is a CSG cell or a non-CSG cell, the timer (for example, T311_without a whitelist) used in the case where the whitelist includes no whitelist is mapped to the SIB2 as part of the UE-timer and constants information element, and the serving cell (on the network side) notifies the UEs of the timer on the PDSCH using the BCCH. The CSG cell maps the timer (for example, T311_with a whitelist) used in the case where the whitelist includes a CSG-ID to the system information and notifies the UEs of the timer on the PDSCH using the BCCH.

A specific operation example is described with reference to FIG. 36 and FIG. 37. The portions of the same step numbers as those of FIG. 33 and FIG. 35 and the portions of the same step numbers as those of FIG. 34 are not described in FIG. 36 and FIG. 37, respectively. In Step ST3601 of FIG. 36, the UE determines whether or not the serving cell is a CSG cell. In a case where the serving cell is a CSG cell, the UE proceeds to Step ST3502. In a case where the serving cell is not a CSG cell, the UE proceeds to Step ST3503.

Figure 36:
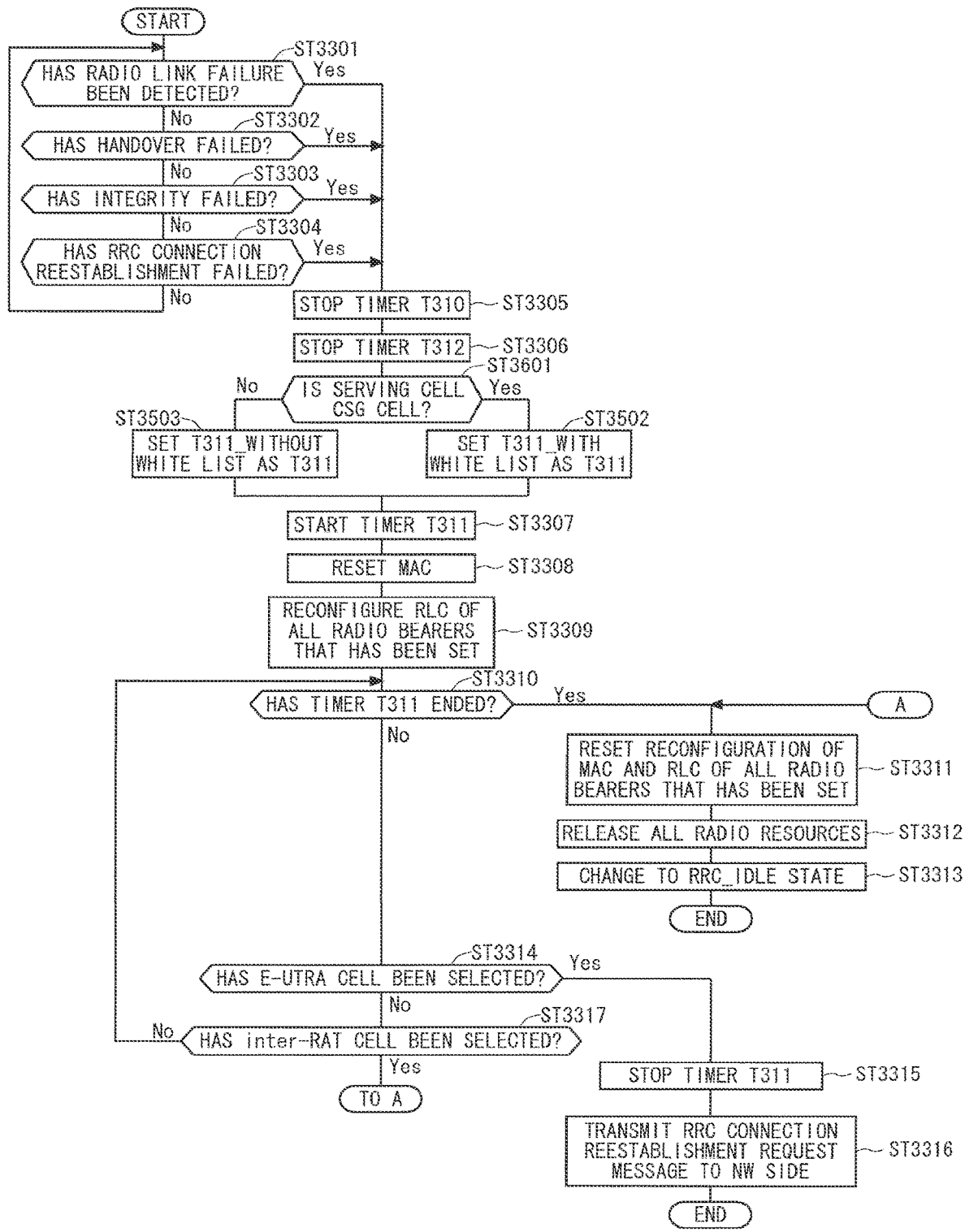
FIG. 36 is a flowchart showing the process of a UE regarding RRC connection re-establishment when a timer for the case where a whitelist is provided is notified by a CSG cell.

In Step ST3502 of FIG. 36, the UE sets the T311_with a whitelist (T311 received from the CSG cell (serving cell)) as the T311. In Step ST3503 of FIG. 36, the UE sets the T311_without a whitelist (T311 received from the non-CSGL cell (serving cell)) as the T311. In Step ST3701 of FIG. 37, the UE determines whether or not the timer (for example, T311_with a whitelist) used in the case where the whitelist includes a CSG-ID has been set as the T311.

In the case where the T311_with a whitelist has been set, the UE proceeds to Step ST3407. In a case where the T311_with a whitelist has not been set, the UE proceeds to Step ST3702.

Figure 37:
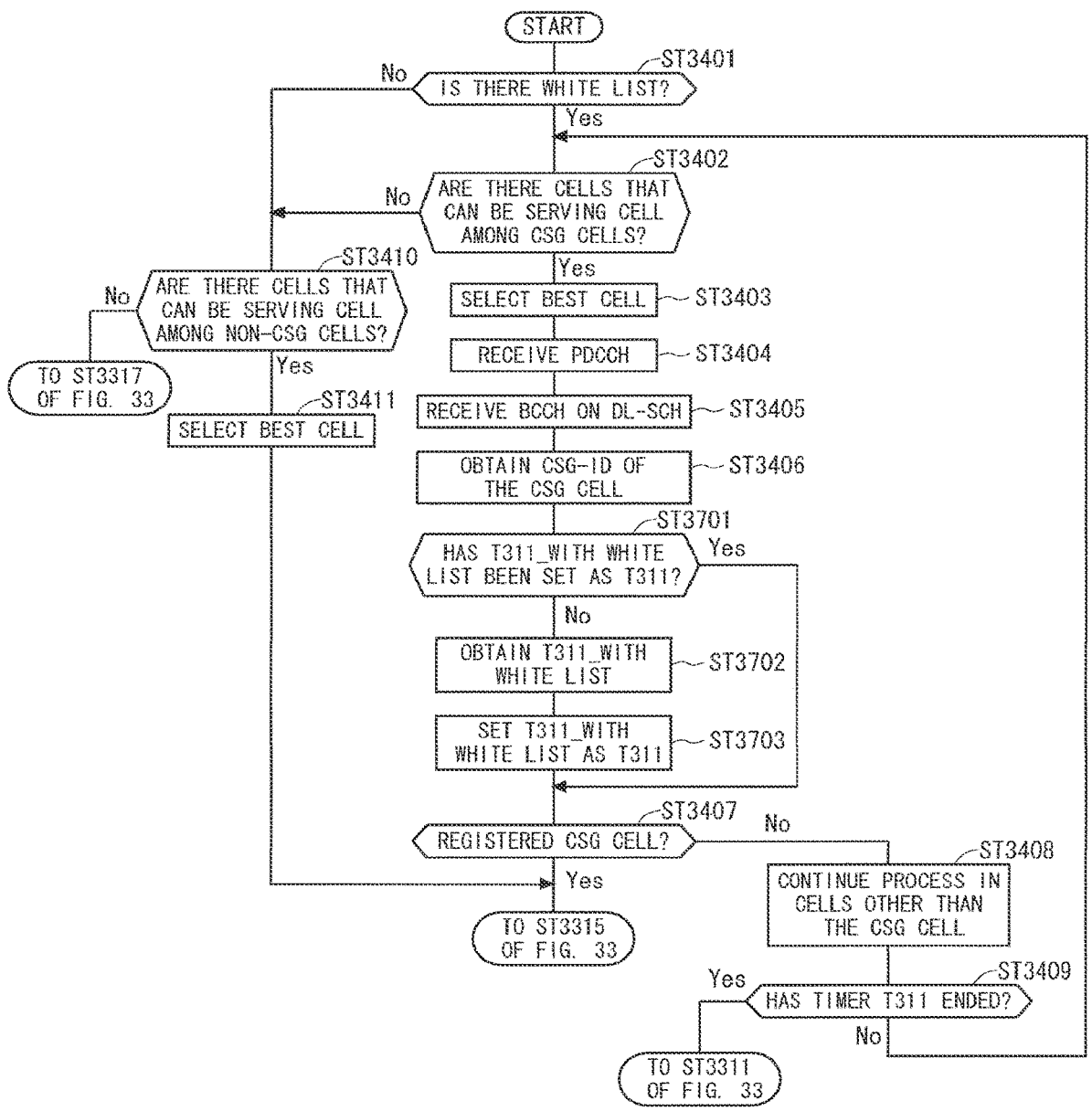
FIG. 37 is another flowchart showing the process of a UE regarding RRC connection re-establishment when a timer for the case where a whitelist is provided is notified by a CSG cell.

In Step ST3702 of FIG. 37, the UE obtains the T311_with a whitelist from the system information mapped to the BCCH on the PDSCH that has been received in Step ST3405 and then proceeds to Step ST3703. In Step ST3703 of FIG. 37, the UE sets, as the timer (for example, T311) for the allowed time for the detection of radio link failure, determination of handover failure, determination of integrity failure or determination of RRC connection reconfiguration failure to the selection of a cell in the E-UTRA, the timer (for example, T311_with a whitelist) for the allowed time for the detection of radio link failure, determination of handover failure, determination of integrity failure or determination of RRC connection reconfiguration failure to the selection of a cell in the E-UTRA in a case where the whitelist includes a CSG-ID or in a case where a UE has been registered in the CSG cell, and then proceeds to Step ST3407. The second method is capable of achieving an effect that a change due to the CSG introduction does not need to be added to the system information of a non-CSG cell. This does not require a change in the LTE system (eUTRA/eUTRAN) including no existing CSG, which improves compatibility.

The method of notifying a timer (for example, T311_with a whitelist) used in a case where the whitelist includes a CSG-ID in the system information mapped to the BCCH on the PDSCH is specifically described in the second method. Also in the second notification method, the dedicated control channel and broadcast control channel (MIB, SIB) can be used as a specific example as in the first notification method.

Effects of the twelfth embodiment are described below. UEs that have a CSG-ID in a whitelist and UEs that do not have a CSG-ID in a whitelist may coexist being served by a base station. A timer (for example, T311) for the allowed time from the detection of radio link failure, determination of handover failure, determination of integrity failure or determination of RRC connection reconfiguration failure to the selection of a cell in the E-UTRA can be set individually in a UE that has a CSG-ID in the whitelist and a UE that does not have a CSG-ID in the whitelist. This enables appropriate setting of the timer value to a UE that has a CSG-ID in the whitelist as well as a UE that does not have a CSG-ID in the whitelist. As a result, it is possible to avoid the wasteful reservation of radio resources due to the timer being set longer, and accordingly an effect that radio resources are used effectively can be obtained. In addition, it is possible to achieve an effect that an increase in control delay as a mobile communication system is avoided due to the timer being set shorter. Owing to the prevention of control delay, an effect that the power consumption of a UE is reduced can be obtained as well.

The solution of the twelfth embodiment is excellent in that the above-mentioned effects are achieved if a network side (such as a base station) does not recognize whether or not a relevant UE has a CSG-ID in a whitelist. Through the above, a UE is not required to notify a base station of the presence or absence of a CSG-ID in the whitelist, which achieves effective use of radio resources. Further, an effect of a reduction in processing load of a base station can be achieved in that the base station is not required to manage the presence or absence of a CSG-ID in the whitelist of UEs being served thereby.

Thirteenth Embodiment

Figure 38:
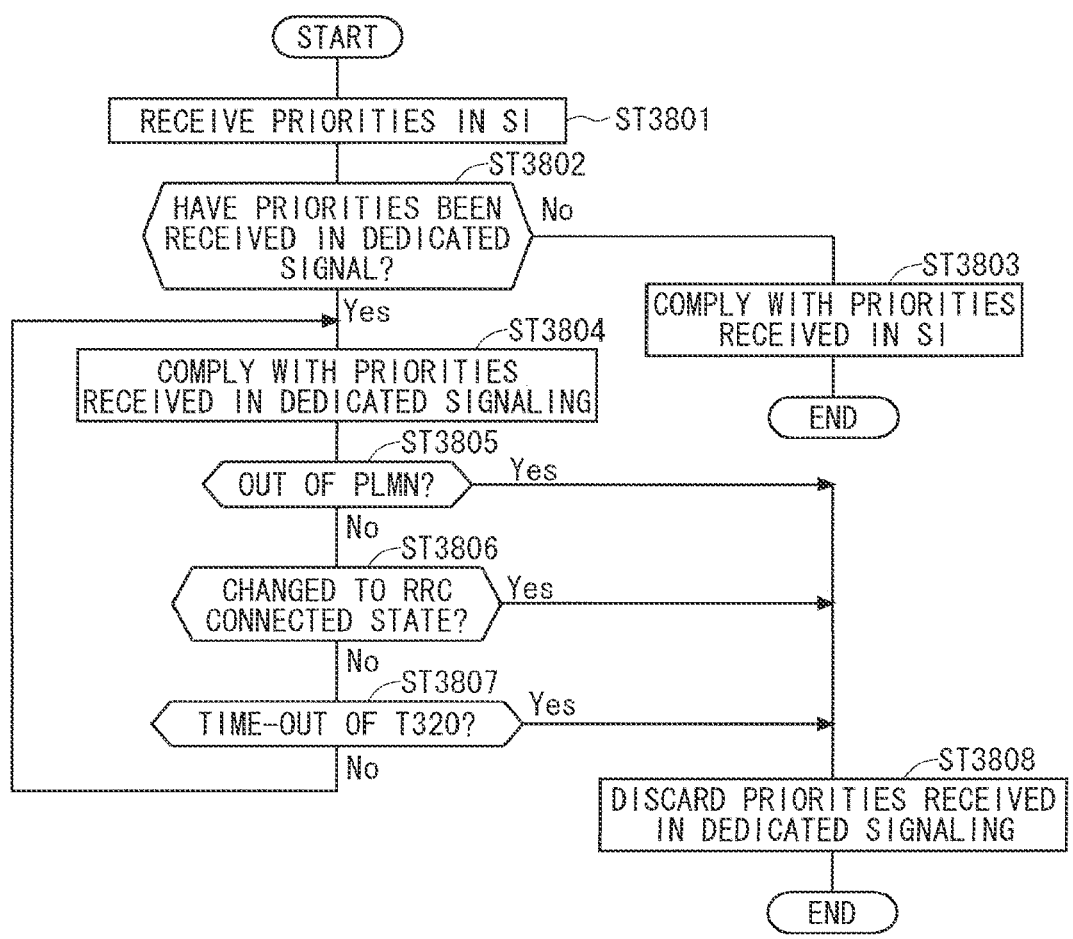
FIG. 38 is a flowchart showing the process of a UE regarding the priority of a conventional art.

Non-Patent Document 7 discloses that in the LTE mobile communication system, the priorities of different E-UTRAN frequencies or inter-RAT frequencies are provided to the UEs from the network side in the system information and the RRC message. In a case where priorities are assigned to the UEs from the network side via dedicated signaling, the UEs ignore all the priorities provided in the system information. Non-Patent Document 6 describes the following. In a case where the RRC connection release message includes the idle mode Mobility Control Information and the idle mode Mobility Control Information includes the cell reselection priority expiry timer (for example, T320), the following operation is performed as a mobile communication system. FIG. 38 shows the process flow as a UE that is disclosed. In Step ST3801, the UE receives the priorities of different E-UTRAN frequencies or inter-RAT frequencies in the system information transmitted from the base station, and then proceeds to Step ST3802. In Step ST3802, the UE determines whether or not to have received the priorities of different E-UTRAN frequencies or inter-RAT frequencies in a dedicated signal transmitted from the base station. In a case where they have been received, the UE proceeds to Step ST3803. In a case where they have not been received, the UE proceeds to Step ST3804. In Step ST3803, the UE reselects a cell in accordance with the priorities received in the system information.

In Step ST3804, the UE reselects a cell in accordance with the priorities received in a dedicate signal, and then proceeds to Step ST3805. In Step ST3805, the UE determines whether or not it has been away from the PLMN in which the priorities are set in the dedicated signal. The UE proceeds to Step ST3808 in a case where it has been away therefrom. The UE proceeds to Step ST3806 in a case where it has not been away therefrom. In Step ST3806, the UE determines whether or not it has changed to the RRC connected state. The UE proceeds to Step ST3808 in a case where it has changed. The UE proceeds to Step ST3807 in a case where it has not changed. In Step ST3807, the UE determines whether or not the timer T320 has ended. In a case where the timer T320 has ended, the UE proceeds to Step ST3808. In a case where the timer T320 has not ended, the UE returns to Step ST3804 and repeats the process from the Step ST3804 to Step ST3807. Step ST3804 to Step ST3807 are processed in an arbitrary order, and further, may be processed at the same time.

The problem of the thirteenth embodiment is described below. As described above, a CSG cell is introduced in the LTE and UMTS. Only a non-CSG cell is a target of cell reselection by a UE that has not been registered in any CSG cell, that is, a UE that does not have a CSG-ID in the whitelist. Not only a non-CSG cell but also a CSG cell is a target of reselection by a UE that has been registered in any CSG cell, that is, a UE that has a CSG-ID in the whitelist. Further, the frequency (frequency layer) dedicated to a CSG where only CSG cells exist is being studied. Therefore, a problem such as an increase in control delay as a mobile communication system occurs in a case where the same priorities (priorities of different E-UTRAN frequencies or Inter-RAT frequencies) are set in a UE that has not been registered in a CSG cell (UE that does not have a CSG-ID in the whitelist) and a UE that has been registered in any CSG cell (UE that has a CSG-ID in the whitelist). Further, the problem occurs in introducing a CSG cell in the LTE (E-UTRAN) system as well as in introducing a CSG cell in the W-CDMA (UTRAN, UMTS) system.

Figure 39:
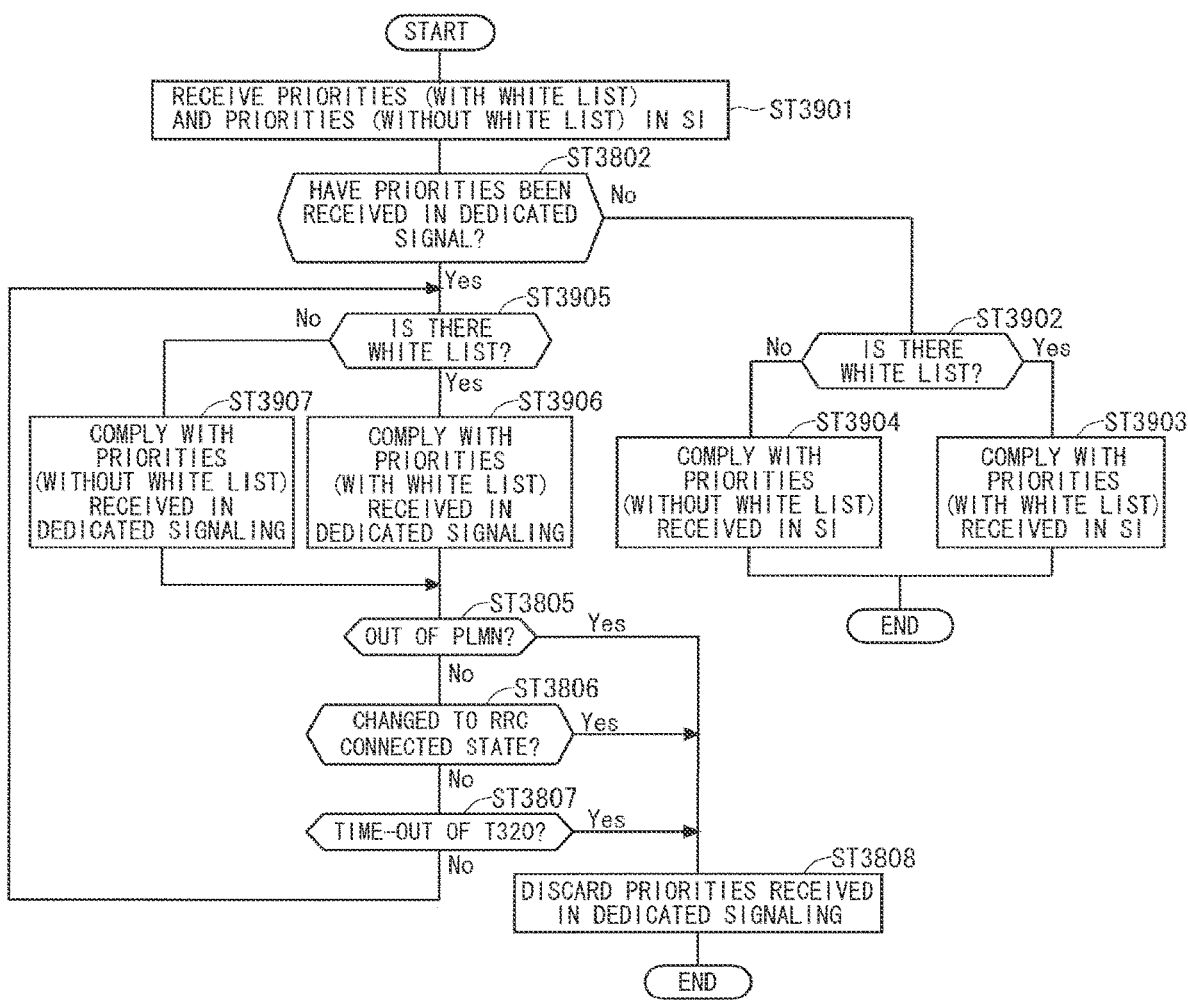
FIG. 39 is a flowchart showing the process of a UE when a priority is individually provided for each of the case where a whitelist is provided and the case where a whitelist is not provided.

A solution to the problem of the thirteenth embodiment is described below. This solution is applicable to the LTE system as well as the W-CDMA system. The thirteenth embodiment discloses that, in order to solve the above-mentioned problem, different priorities (such as priorities of different E-UTRAN frequencies or inter-RAT frequencies) are individually provided in accordance with whether or not the whitelist includes a CSG-ID to be reflected on a UE. A specific operation example is described with reference to FIG. 39. The same portions as those of FIG. 38 are not described in FIG. 39. In Step ST3901, the UE receives the priorities (priorities of different E-UTRAN frequencies or inter-RAT frequencies) for a UE that has a CSG-ID in the whitelist (for a UE that has been registered in a CSG cell) and the priorities for a UE that does not have a CSG-ID in the whitelist (for a UE that has not been registered in a CSG cell), which are transmitted from a base station in the system information, and then proceeds to Step ST3802. In Step ST3902, the UE determines whether or not the whitelist includes a CSG-ID. Alternatively, the UE determines whether or not the UE has been registered in a CSG cell. In a case where the whitelist includes a CSG-ID, or in a case where the UE has been registered in a CSG cell, the UE proceeds to Step ST3903. In a case where the whitelist includes no CSG-ID, or in a case where the UE has not been registered in a CSG cell, the UE proceeds to Step ST3904. In Step ST3903, the UE reselects a cell in accordance with the priorities for a UE that has a CSG-ID in the whitelist (for a UE that has been registered in the CSG cell), which has been received in the system information. In Step ST3904, the UE reselects a cell in accordance with the priorities for a UE that does not have CSG-ID in the whitelist (for a UE that has not been registered in a CSG cell), which has been received in the system information.

In Step ST3905, the UE determines whether or not the whitelist includes a CSG-ID. Alternatively, the UE determines whether or not the UE has been registered in the CSG cell. In a case where the whitelist includes a CSG-ID or in a case where the UE has been registered in the CSG cell, the UE proceeds to Step ST3906. In a case where the whitelist includes no CSG-ID or in a case where the UE has not been registered in a CSG cell, the UE proceeds to Step ST3907. In Step ST3906, the UE reselects a cell in accordance with the priorities for a UE that has a CSG-ID in the whitelist (for a UE that has been registered in a CSG cell), which has been received in the dedicated signal, and then proceeds to Step ST3805. In Step ST3907, the UE reselects a cell in accordance with the priorities for a UE that does not have a CSG-ID in the whitelist (for a UE that has not been registered in a CSG cell), which has been received in a dedicated signal, and then proceeds to Step ST3805. In this case, the priorities that differ depending on whether or not the whitelist includes a CSG-ID may be any one of the priorities notified in the system information or the priorities notified in the dedicated signal.

Next, the method of notifying the priorities that differ depending on whether or not the whitelist includes a CSG-ID as the system information (Step ST3901) is disclosed. As a first method, the priorities used in the case where the whitelist includes a CSG-ID and the priorities used in the case where the whitelist includes no CSG-ID are notified to a UE by a serving cell (on a network side) on the PDSCH using the BCCH as the system information. Further, irrespective of whether the serving cell is a CSG cell or a non-CSG cell, the priorities used in the case where the whitelist includes no CSG-ID are notified to a UE by a serving cell (on a network side) on the PDSCH using the BCCH as the system information. By the first method, the UE is capable of obtaining different priorities only through reception of the BCCH of the serving cell, which achieves the effect of preventing a control delay. As a second method, the priorities used in the case where the whitelist includes no CSG-ID are notified to a UE by a serving cell (on a network side) on the PDSCH using the BCCH as the system information. Further, irrespective of whether the serving cell is a CSG cell or a non-CSG cell, the priorities used in a case where the whitelist includes a CSG-ID and the priorities used in a case where the whitelist includes no CSG-ID are notified to a UE by the serving cell (on a network side) on the PDSCH using the BCCH as the system information. The priorities used in a case where the whitelist includes a CSG-ID are notified to the UE on the PDSCH using the BCCH by being mapped to the system information by the CSG cell. This achieves an effect that a change due to the CSG introduction is not required to be added to the system information of a non-CSG cell. As a result, the LTE system (eUTRA/eUTRAN) including no existing CSG does not need to be changed, which improves compatibility.

Next, as to the method of notifying the priorities for the case where the whitelist includes a CSG-ID or the case where the UE has been registered in the CSG cell, and priorities for the case where the whitelist includes no CSG-ID or the case where the UE has not been registered in the CSG cell, which are notified from a base station (on a network side) to a UE in a dedicate signal, an RRC message is conceivable.

Effects of the thirteenth embodiment are described below. UEs that have a CSG-ID in the whitelist and UEs that do not have a CSG-ID in the whitelist may coexist by being served by a base station. The priorities (such as priorities of different E-UTRAN frequencies or inter-RAT frequencies) are allowed to be set individually in a UE that has a CSG-ID in the whitelist and a UE that does not have a CSG-ID to the whitelist. This achieves an effect of preventing an increase in control delay as a mobile communication system. The solution of the thirteenth embodiment is excellent in that the above-mentioned effect is achieved even if the network side (such as a base station) does not recognize whether or not a relevant UE has a CSG-ID in a whitelist. As a result, the presence or absence of a CSG-ID in the whitelist is not required to be notified from a UE to a base station, which enables effective use of radio resources. In addition, an effect of alleviating the processing load of a base station can be achieved in that a base station does not need to manage the presence or absence of a CSG-ID in the whitelist of UEs being served thereby.

Fourteenth Embodiment

The problem of the fourteenth embodiment is described below. In a conventional technology, there is one type of effective time of the priorities (priorities of different E-UTRAN frequencies or inter-RAT frequencies) notified from the network side (base station) to a UE in a dedicated signal, as described in the thirteenth embodiment. As described above, a CSG cell is introduced in the LTE and UMTS. Only a non-CSG cell is a target of the cell reselection by a UE that has not been registered in any CSG cell, that is, a UE that does not have a CSG-ID in the whitelist. Accordingly, it is considered that the priorities change a little. Not only a non-CSG cell but also a CSG cell is a target of the reselection by a UE that has been registered in any CSG cell, that is, a UE that has a CSG-ID in the whitelist. Therefore, it is considered that the priorities change frequently. If there is one type of effective time of priorities in a situation where the frequencies of priority change vary as described above, it is not possible to set the effective time suitable for each situation change, leading to a problem that a control delay increases. Further, this problem also occurs in introducing a CSG cell in the LTE (E-UTRAN) system and introducing a CSG cell in the W-CDMA (UTRAN, UMTS) system.

Figure 40:
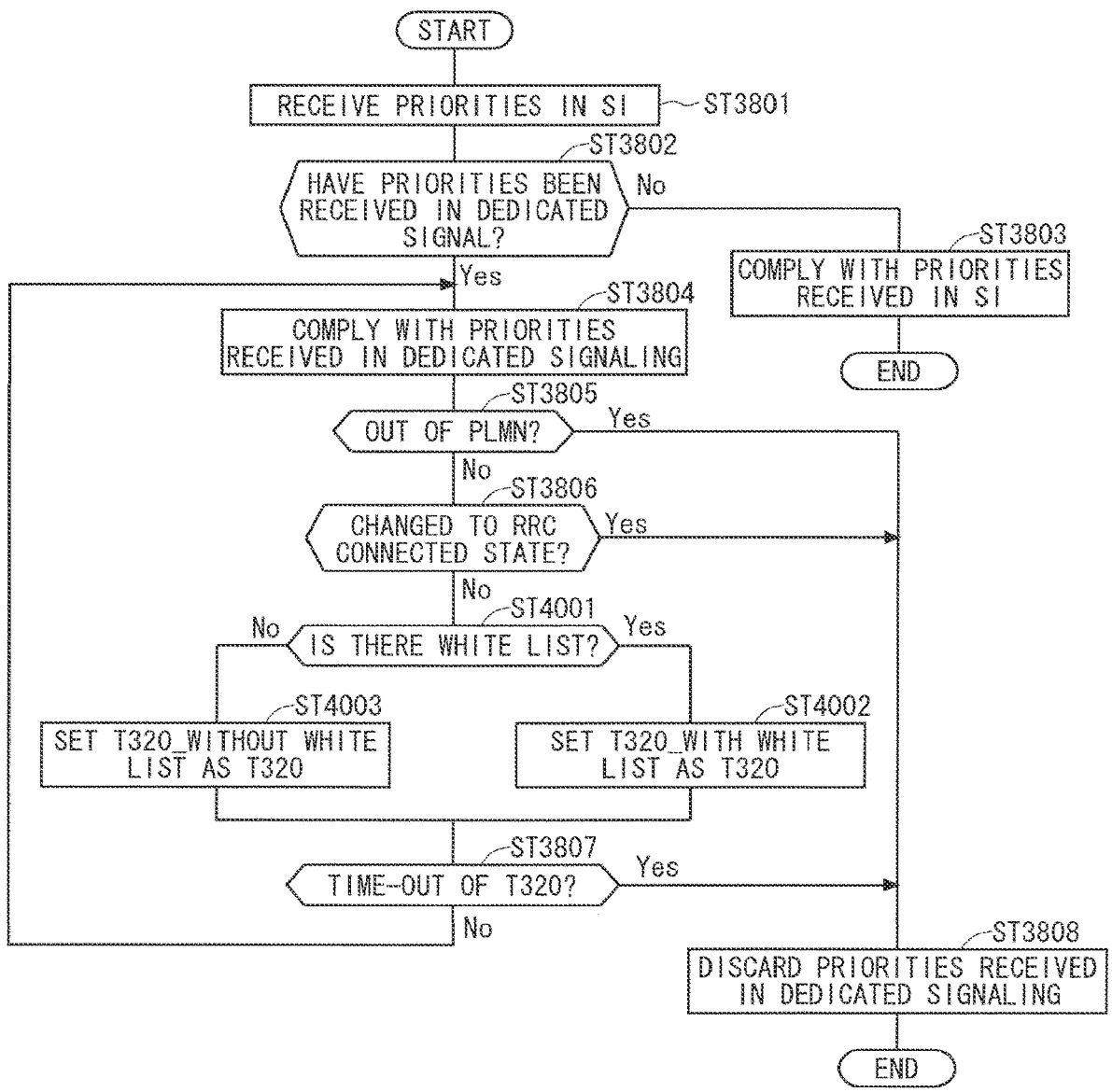
FIG. 40 is a flowchart showing the process of a UE when a priority is individually provided for each of the case where a whitelist is provided and the case where a whitelist is not provided.

A solution to the problem of the fourteenth embodiment is described below. This solution is applicable to the LTE system as well as the W-CDMA system. The fourteenth embodiment discloses that, in order to solve the above-mentioned problem, the effective time (such as T320) of different priorities (priorities of different E-UTRAN frequencies or inter-RAT frequencies) is individually provided in accordance with whether or not the whitelist includes a CSG-ID, to be reflected on a UE. A specific operation example is described with reference to FIG. 40. The same portions as those of FIG. 38 are not described in FIG. 40. In Step ST4001, the UE determines whether or not the whitelist includes a CSG-ID. Alternatively, the UE determines whether or not it has been registered in the CSG cell. In the case where the whitelist includes a CSG-ID or in the case where the UE has been registered in the CSG cell, the UE proceeds to Step ST4002. In the case where the whitelist includes no CSG-ID or in the case where the UE has not been registered in the CSG cell, the UE proceeds to Step ST4003. In Step ST4002, the UE sets, as the effective time (for example, T320) of priorities (priorities of different E-UTRAN frequencies or inter-RAT frequencies), the effective time (for example, T320_with a whitelist) of the priorities (priorities of different E-UTRAN frequencies or inter-RAT frequencies) for the case where the whitelist includes a CSG-ID or the case where the UE has been registered in the whitelist, and then proceeds to Step ST3807.

In Step ST4003, the UE sets, as the effective time (for example, T320) of priorities (priorities of different E-UTRAN frequencies or inter-RAT frequencies), the effective time (for example, T320_without a whitelist) of the priorities (priorities of different E-UTRAN frequencies or inter-RAT frequencies) for the case where the whitelist includes no CSG-ID or the case where the UE has not been registered in the CSG cell, and then proceeds to Step ST3807. As to the method of notifying the effective time of priorities for the case where the whitelist includes a CSG-ID or the case where the UE has been registered in the CSG cell, and the effective time of priorities for the case where the whitelist includes no CSG-ID or the case where the UE has not been registered in the CSG cell, an RRC message and a broadcast control channel are conceivable. In the case where the dedicated control channel is used, this is the method excellent in that control is enabled in accordance with the communication state of the UE.

In the case where a notification is made on the broadcast control channel, this is the method excellent in that all UEs being served can be notified and that radio resources are effectively used. The fourteenth embodiment can be used together with the thirteenth embodiment. As to the method of notifying the effective time of priorities for the case where the whitelist includes a CSG-ID or the case where the UE has been registered in the CSG cell, and the effective time of priorities for the case where the whitelist includes no CSG-ID or the case where the UE has not been registered in the CSG cell, the RRC message and broadcast control channel are conceivable. In a case where a notification is made in the RRC message, further, it is conceivable to make a notification together with the priorities notified in a dedicated signal. In the case where a notification is made in the RRC message, this method is excellent in that the priorities and the effective time of the priorities can be notified by the same notification method and that a mobile communication system is avoided from becoming intricate. Further, this method is excellent in that the control delay of a mobile communication system can be reduced by notifying the priorities as well as the effective time of the priorities. In the case where a notification is made on the broadcast control channel, this is the method excellent in that all UEs being served can be notified and radio resources are effectively used.

The effects of the fourteenth embodiment are described below. UEs that have a CSG-ID in the whitelist and UEs that do not have a CSG-ID in the whitelist may coexist by being served by a base station. Setting for the effective time of the priorities (priorities of different E-UTRAN frequencies or inter-RAT frequencies) is enabled individually for a UE that has a CSG-ID in the whitelist and a UE that does not have a CSG-ID in the whitelist. This enables the setting for the effective time of the priorities in accordance with the frequency of a priority change. Accordingly, an effect of preventing an increase in control delay as a mobile communication system is achieved.

The solution of the fourteenth embodiment is excellent in that the above-mentioned effect is achieved even if a network side (such as a base station) does not recognize whether or not a relevant UE has a CSG-ID in the whitelist. As a result, a UE is not required to notify a base station of the presence or absence of a CSG-ID in the whitelist, which achieves effective use of radio resources. In addition, an effect of alleviating the processing load is achieved in that the base station is not required to manage the presence or absence of a CSG-ID of UEs being served thereby. The use of the fourteenth embodiment as well as the thirteenth embodiment enables highly flexible priority setting that is suitable for a UE that has a CSG-ID in the whitelist and a UE that does not have a CSG-ID in the whitelist. Accordingly, an effect of preventing an increase in control delay as a mobile communication system is achieved.

Fifteenth Embodiment

Non-Patent Document 6 (Chapter 10.1.1.2) and Non-Patent Document 7 (Chapter 5.2.4.2) disclose the process of cell reselection as an LTE mobile communication system. The matters disclosed therein are described below. The UE in an RRC_IDLE state performs cell reselection. The UE performs measurements on a serving cell and neighbor cells for performing reselection.

Neighbor cells in the serving cell system information are not required to be indicated (in order that a UE perform cell search and measurements). The measurements are omitted in a case where the characteristics of the serving cell satisfy the measurement criteria. In the cell reselection, a cell on which a UE should camp is authenticated. This is based on the cell reselection criteria regarding measurements for a serving cell. The reselection on the same frequency is based on cell ranking. The reselection on different frequencies is based on the absolute priorities where the UE attempts to camp on an available frequency having the highest frequency. The absolute priorities for reselection are provided only by the RPLMN that is the PLMN whose location has been registered last time, which is effective only within the RPLMN. The priorities are provided in the system information and are effective in all UEs within a cell (UEs by being served by a cell). The exceptional priorities for each UE can be notified in an RRC connection release message. The effective time can be associated with the priorities of individual UEs. It is possible to show layer-specific cell reselection parameters (for example, such as layer-specific offsets) for neighbor cells of different frequencies. Those parameters are common to all neighbor cells on the frequency. A neighbor cell list (NCL) can be provided in order that a serving cell deal with exceptional cases on the same frequency and different frequencies. The NCL includes cell-specific cell reselection parameters (for example, cell-specific offsets) for specific neighbor cells. A blacklist can be provided so that a UE will not reselect specific neighbor cells on the same frequency and different frequencies. The cell reselection depends on speed (which is enabled to depend on speed). Speed detection is based on the solution for UTRAN. While it is possible to apply cell reselection parameters to all UEs of one cell, it is also possible to set specific reselection parameters for each UE group or each UE.

Figure 41:
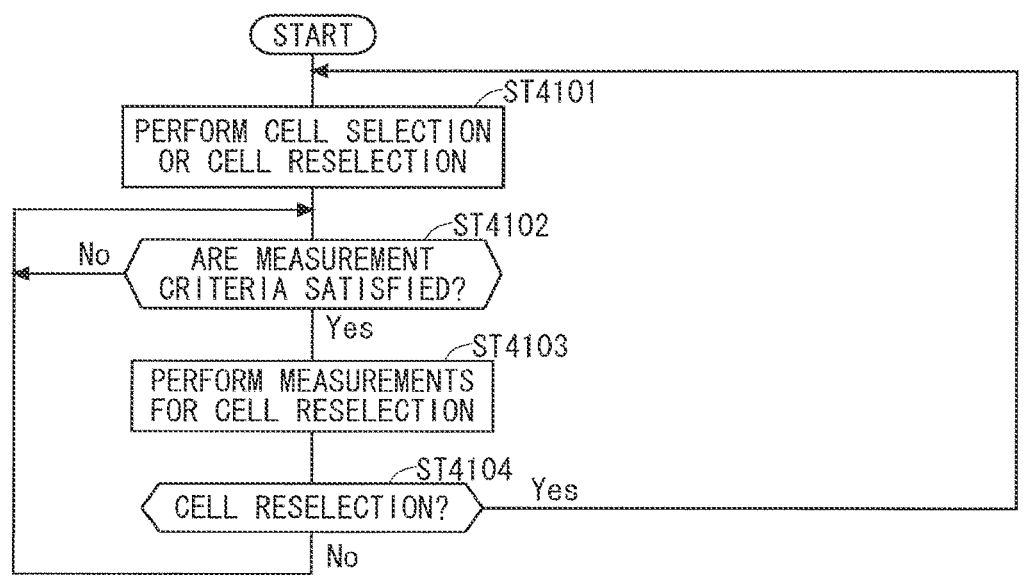
FIG. 41 is a flowchart showing the process of a UE in a cell reselection procedure according to a conventional art.

A process flow as a UE, which is disclosed in FIG. 41, is described below. In Step ST4101, the UE performs cell selection or cell reselection, and then proceeds to Step ST4102. In Step ST4102, the UE determines whether or not measurement criteria for starting cell reselection are satisfied. Specifically, the UE determines whether or not the received quality of a serving cell is equal to or smaller than a threshold. More specifically, the UE determines whether or not S_ServingCell is equal to or smaller than S_intrasearch (or S_ServingCell is equal to or smaller than S_non intrasearch). In a case where the measurement criteria are satisfied, the UE proceeds to Step ST4103. In a case where the measurement criteria are not satisfied, the UE repeats the process of Step ST4102. In Step ST4103, the UE performs measurements for cell reselection, and then proceeds to Step ST4104. In Step ST4104, the UE determines whether or not to perform cell reselection from the results of the measurements performed in Step ST4103. In a case of performing cell reselection, the UE returns to Step ST4101. In a case of not performing cell reselection, the UE returns to Step ST4102.

A CSG cell is introduced in the LTE and UMTS. It is studied that a more inexpensive accounting system is set for the CSG cell compared with a non-CSG cell. Therefore, it is expected that a user will attempt to camp on a CSG cell in a location that can be selected by a CSG cell. Further, in a situation in which a CSG cell exists within the coverage of a non-CSG cell as a mobile communication system, the processing load of a non-CSG cell is alleviated as the number of UEs that manage scheduling or the like increases.

Accordingly, it is expected that a UE in a location which can be selected by a CSG cell will camp on the CSG cell for a mobile communication system as well.

The following problems arise in the above-mentioned cell reselection process described in Non-Patent Document 6 and Non-Patent Document 7.

A case where a CSG cell is installed in a non-CSG cell is considered. In addition, a case where a UE whose serving cell is a non-CSG cell exists in the coverage of a CSG cell is considered. The UE does not perform the measurements for cell reselection in a case where the measurement criteria of the UE are not satisfied in this situation, in a case where the received quality of a serving cell (non-CSG cell) is larger than a threshold, or in a case where S_ServingCell>S_intrasearch. The UE determines in Step ST4102 of FIG. 41 that the measurement criteria are not satisfied, and then repeats Step ST4102 without performing the process of Step ST4103. This means that the UE does not gain an opportunity to reselect the CSG cell though it is within the coverage of a CSG cell. This leads to a problem that a user is unable to benefit from an accounting plan for a CSG cell. Further, there arises a problem that the load of a non-CSG cell cannot be alleviated in a mobile communication system as well.

The above-mentioned problems are also disclosed in Non-Patent Document 8. Non-Patent Document 8 is the document for UTRA. Non-Patent Document 8 discloses the following method as the solution to the above-mentioned problems. The UE should be able to search for a HNB even in a case where a serving cell is in a good condition (Sx>S_intrasearch, Sx>S_intersearch). In that case, the HNB search cycle is expected to be longer than a typically used search cycle. Lower power consumption of the UE is supported by avoiding search in a place where a HNB is not arranged. Only in a case where the neighbor cell list of a non-CSG cell indicates the existence of the HNB in the neighborhood, a search cycle longer than a typically used search cycle is used in the method.

The problem of the fifteenth embodiment is described below. Non-Patent Document 8 is the document for UTRA, and thus Non-Patent Document 8 does not disclose the solution to the problem of EUTRAN (LTE system). Further, the neighbor cell list is used for supporting lower power consumption of a UE in Non-Patent Document 8. However, it is regarded in the LTE system that neighbor cells in the serving cell system information do not need to be indicated in order that a UE search for and measure a cell, as described above. Therefore, it is not possible to apply, to the LTE system, the method of supporting lower power consumption of a UE using a neighbor cell list, which is described in Non-Patent Document 8, without any change. Further, as a new problem inherent in the technology disclosed in Non-Patent Document 8, even in a case where a CSG cell exists in neighbor cells of a serving cell (non-CSG cell), there is no possibility that the UE may select the CSG cell as a suitable cell when the CSG cell has not been registered in the whitelist of the UE. Accordingly, there is considered a case where a UE that has not been registered in the CSG cell starts search using the technology of Non-Patent Document 8 even in a case where the serving cell is in a good condition (Sx>S_intrasearch, Sx>S_intersearch) owing to the existence of a CSG cell in neighbor cells of the serving cell (non-CSG cell). In that case, a UE (that has not been registered in a CSG cell) is unable to select a CSG cell, and accordingly measurements are performed wastefully, leading to a problem of an increase in power consumption of a UE.

The solution to the problem of the fifteenth embodiment is described below. The fifteenth embodiment discloses that a cycle (which may be a timer) for performing measurements for cell reselection is provided and reflected on the UE even in a case where a serving cell is in a good condition (Sx>S_intrasearch, Sx>S_intersearch), which is applied in a case where the whitelist includes a CSG-ID for solving the above-mentioned problem. Alternatively, the fifteenth embodiment discloses that a cycle (which may be a timer) for performing measurements for cell reselection is provided and reflected on a UE even in a case where a serving cell is in a good condition (Sx>S_intrasearch, Sx>S_intersearch), which is applied in a case where the UE has been registered in the CSG cell. A specific operation example is described with reference to FIG. 42. The portions of the same step numbers as those of FIG. 41 are not described in FIG. 42. In Step ST4201, the UE determines whether or not the whitelist includes a CSG-ID. Alternatively, the UE determines whether or not it has been registered in a CSG cell. The UE proceeds to Step ST4202 in a case where the whitelist includes a CSG-ID, or in a case where it has been registered in a CSG cell. The UE proceeds to Step ST4207 in a case where the whitelist includes no CSG-ID or in a case where it has not been registered in a CSG cell. In Step ST4202, the UE starts the measurement cycle for cell reselection that is applied in the case where the whitelist includes a CSG-ID or a timer (for example, T_reselectCSG), and then proceeds to Step ST4203. Alternatively, the UE starts the measurement cycle for cell reselection that is applied in the case where the UE has been registered in a CSG cell or a timer (for example, T_reselectCSG), and then proceeds to Step ST4203.

In Step ST4203, the UE determines whether or not the measurement cycle is one (for example, T_reselectCSG) for cell reselection that is applied in the case where a whitelist includes a CSG-ID. Alternatively, the UE determines whether or not a timer (for example, T_reselectCSG) for cell reselection, which is applied in the case where the whitelist includes a CSG-ID, has been timed out (or will be timed out). The UE proceeds to Step ST4205 in the case of a measurement cycle or in the case where the timer has been timed out. The UE proceeds to Step ST4204 in a case where the cycle is not a measurement cycle or in a case where the timer has not been timed out. In Step ST4204, the UE determines whether or not the measurement criteria for starting cell reselection are satisfied. Specifically, the UE determines whether or not the received quality of a serving cell is equal to or smaller than a threshold. More specifically, the UE determines whether or not S_ServingCell is equal to or smaller than S_intrasearch (or S_SearvingCell is equal to or smaller than S_non intrasearch). The UE proceeds to Step ST4205 in a case where the measurement criteria are satisfied (in a case where the received quality of a serving cell is equal to or smaller than the threshold or in a case where S_ServingCell≤S_intrasearch). The UE returns to Step ST4203 in a case where the measurement criteria are not satisfied. In Step ST4205, the UE performs measurements for cell reselection, and then proceeds to Step ST4206.

In Step ST4206, the UE determines whether or not to perform cell reselection from the results of measurements performed in Step ST4205. The UE returns to Step ST4101 in a case of performing cell reselection.

The UE returns to Step ST4202 in a case where the UE does not perform cell reselection. In Step ST4207, the UE determines whether or not the measurement criteria for starting cell reselection are satisfied. Specifically, the UE determines whether or not the received quality of the serving cell is equal to or smaller than a threshold. More specifically, the UE determines whether or not S_ServingCell is equal to or smaller than S_intrasearch (or S_ServingCell is equal to or smaller than S_non intrasearch). The UE proceeds to Step ST4208 in the case where the measurement criteria are satisfied. The UE repeats the process of Step ST4207 in the case where the measurement criteria are not satisfied. In Step ST4208, the UE performs measurements for cell reselection, and then proceeds to Step ST4209. In Step ST4209, the UE determines whether or not to perform cell reselection from the results of measurements performed in Step ST4208. The UE returns to Step ST4101 in the case of performing cell reselection. The UE returns to Step ST4207 in the case of not performing cell reselection.

Next, the method of notifying a cycle (which may be a timer; for example, T_reselectCSG) for performing measurements for cell reselection even in a case where a serving cell is in a good condition (Sx>S_intrasearch, Sx>S_intersearch), which is applied in the case where a whitelist includes a CSG-ID, is disclosed. As a first method, a serving cell (on a network side) notifies the UE of the cycle on the PBCH or PDSCH using the BCCH as the broadcast information.

Further, the serving cell notifies the cycle on the PBCH using the master information (MIB) or on the PDSCH using the system information (SIB). The MIB is mapped on the PBCH in the case of using the MIB, which is the method excellent in that a UE is capable of receiving just a small amount of control delay. In the case of using the SIB, the cycle is notified using the SIB1. This is the method excellent in that the MIB or SIB1 is the absolutely required minimum broadcast information received for the cell search to the idle state operation and that a UE has just a smaller amount of control delay. Further, what is used is the broadcast information even in the method of making a notification in the system information other than the SIB1, which is the method excellent in that all UEs being served can be notified and that radio resources are effectively used. In the first method, the UE is capable of obtaining a cycle (timer) for performing measurements for cell reselection even in a case where the serving cell is in a good condition (Sx>S_intrasearch, Sx>S_intersearch), which is applied in a case where only the BCCH of the serving cell is received and the whitelist includes a CSG-ID, and thus an effect of preventing a control delay can be achieved. As a second method, the CSG cell notifies a UE of the cycle on the PBCH or PDSCH using the BCCH as the broadcast information. Further, the CSG cell notifies the cycle on the PBCH using the master information (MIB) or on the PDSCH using the system information (SIB). In the case of using the MIB, the MIB is mapped on the PBCH, which is the method excellent in that a UE is capable of receiving just a small amount of control delay. In the case of using the SIB, the cycle is notified using the SIB1. This is the method excellent in that the MIB or SIB1 is the absolutely required minimum broadcast information received from the cell search to the idle state operation and that a UE has just a smaller amount of control delay. Further, what is used is the broadcast information even in the method of making a notification in the system information other than the SIB1, and thus the cycle can be notified to all UEs being served, which is the method excellent in that radio resources are effectively used. There can be achieved an effect that the system information of a non-CSG cell is not required to be modified due to the CSG. As a result, the LTE system (eUTRA/eUTRAN) including no existing CSG is not required to be modified, which improves compatibility. As a third method, a non-CSG cell notifies a UE on the PBCH or PDSCH using the BCCH as the broadcast information. Further, the CSG cell notifies the cycle on the PBCH using the master information (MIB) or on the PDSCH using the system information (SIB). In the case of using the MIB, the MIB is mapped on the PBCH, which is the method excellent in that a UE is capable of receiving just a small amount of control delay. In the case of using the SIB, the cycle is notified using the SIB1. This is the method excellent in that the MIB or SIB1 is the absolutely required minimum broadcast information received for the cell search to the idle state operation and that a UE has just a smaller amount of control delay. Further, the method of making a notification in the system information other than the SIB1 may be employed. The system information other than the SIB1 is the broadcast information as well, which is the method excellent in that all UEs being served can be notified and radio resources are effectively used. It suffices that the parameters are notified from the non-CSG cell in order that a CSG cell can be selected when a non-CSG cell is the serving cell. Therefore, the third method is excellent in that radio resources are effectively used. As a fourth method, a static value (value known to a UE and a base station as a mobile communication system, or value described in, for example, specifications) is set as a mobile communication system. As a result, a radio signal does not occur between a base station (on a network side) and a UE. Accordingly, there can be achieved an effect that radio resources are effectively used. Further, the value is determined in a static manner, whereby it is possible to achieve an effect that erroneous reception of a radio signal is prevented.

While it is disclosed above that a cycle (timer) for performing measurements for cell reselection is provided to be reflected on a UE even in a case where the serving cell is in a good condition (Sx>S_intrasearch, Sx>S_intersearch), which is applied in the case where the whitelist includes a CSG-ID, different cycles (timers) may be provided individually in accordance with whether or not the whitelist includes a CSG-ID to be reflected on a UE, to thereby solve the problem. In addition, while it is disclosed above that a cycle (timer) for performing measurements for cell reselection is provided to be reflected on a UE even in a case where the serving cell is in a good condition (Sx>S_intrasearch, Sx>S_intersearch), which is applied in a case where the whitelist includes a CSG-ID, the cycle may be applied only in a case where the serving cell is a non-CSG cell even in a case of a UE having a CSG-ID in the whitelist. This enables to reduce wasteful measurement (the serving cell is not desired to be changed from a non-CSG cell to a CSG cell, and thus the measurements for selecting a CSG cell also in a case where the received quality of the serving cell is good are wasteful measurements) for cell selection in a case where the serving cell has been a CSG cell, which occurs in the above-mentioned solution. This achieves an effect that a UE consumes a less amount of power. While the LTE using a HeNB in which a CSG is used is described above, the present invention is also applicable to the UMTS using a HNB in which a CSG is used, a HeNB in which a CSG is not used, a HNB, and a base station having a small radius (also referred to as pico cell or macro cell).

Effects of the fifteenth embodiment are described below. UEs that have a CSG-ID in the whitelist and UEs that do have a CSG-ID in the whitelist may coexist by being served by a base station. By providing a cycle (which may be a timer) for performing measurements for cell reselection even in a case where the serving cell is in a good condition (Sx>S_intrasearch, Sx>S_intersearch), which is applied in a case where the whitelist includes a CSG-ID, it is possible to solve, in a case where the received quality of the serving cell (non-CSG cell) is good, a problem that a user is unable to benefit from an accounting plan of a CSG cell, which results from the fact that the measurements for reselecting a CSG cell are not performed, and a problem that the load of a non-CSG cell cannot be alleviated in a mobile communication system as well. A UE, which performs measurements for cell reselection even in a case where the serving cell is in a good condition (when the measurement criteria are not satisfied, Sx>S_intrasearch, Sx>S_intersearch), does not have a CSG-ID in the whitelist and has not been registered in the CSG cell, does not perform measurements for cell reselection in a case where a serving cell is in a good condition (when the measurement criteria are not satisfied, Sx>S_intrasearch, Sx>S_intersearch) as conventionally. This makes it possible to omit the measurements for selecting a CSG cell even in a case where the serving cell is in a good condition, which is wasteful for a UE that is unable to reselect a CSG cell because it has not been registered in the CSG cell. This achieves an effect that the power consumption of a UE that has not been registered in a CSG cell is reduced. The effects are the effects according to the present invention, which cannot be achieved by the technology disclosed in Non-Patent Document 8. The solution of the fifteenth embodiment is excellent in that the problems can be solved without using a neighbor cell list. This is because a CSG cell, HeNB and HNB are assumed to have a portable size and weight and the CSG cell and the like are assumed to be installed or removed frequently and flexibly, as described above. Accordingly, in the solution using a neighbor cell list, the neighbor cell list needs to be updated every time the CSG cell, HeNB, HNB and the like are installed or removed, and it is expected that the neighbor cell list will be updated frequently. As a result, the mobile communication system becomes intricate and complicated in the solution where a neighbor cell list is used. In addition, the solution of the fifteenth embodiment is excellent in that the above-mentioned effects are achieved even if the network side (such as a base station) does not recognize whether or not a relevant UE has a CSG-ID in the whitelist. This does not require a UE to notify a base station of the presence or absence of a CSG-ID in the whitelist, which enables effective use of radio resources. Further, an effect of alleviating the processing load of a base station can be achieved in that a base station is not required to manage the presence or absence of a CSG-ID in the whitelist of UEs being served thereby.

Next, a first modified example of the fifteenth embodiment is described. In the fifteenth embodiment, a cycle (which may be a timer) for performing measurements for cell reselection is provided to be reflected on a UE even in a case where the serving cell is in a good condition (Sx>S_intrasearch, Sx>S_intersearch), which is applied in a case where the whitelist includes a CSG-ID, to thereby solve the problems. However, it is unclear that CSG cells existing in the vicinity of a present serving cell can be a suitable cell just because the whitelist includes a CSG-ID. In a case where a UE has not been registered in a CSG cell existing in the vicinity of a present serving cell, a problem that the power consumption of a UE increases occurs by performing the measurements for cell reselection even when the serving cell is in a good condition. This is a problem occurring when, for example, a user who has registered in a CSG cell installed in a company goes home.

Figure 42:
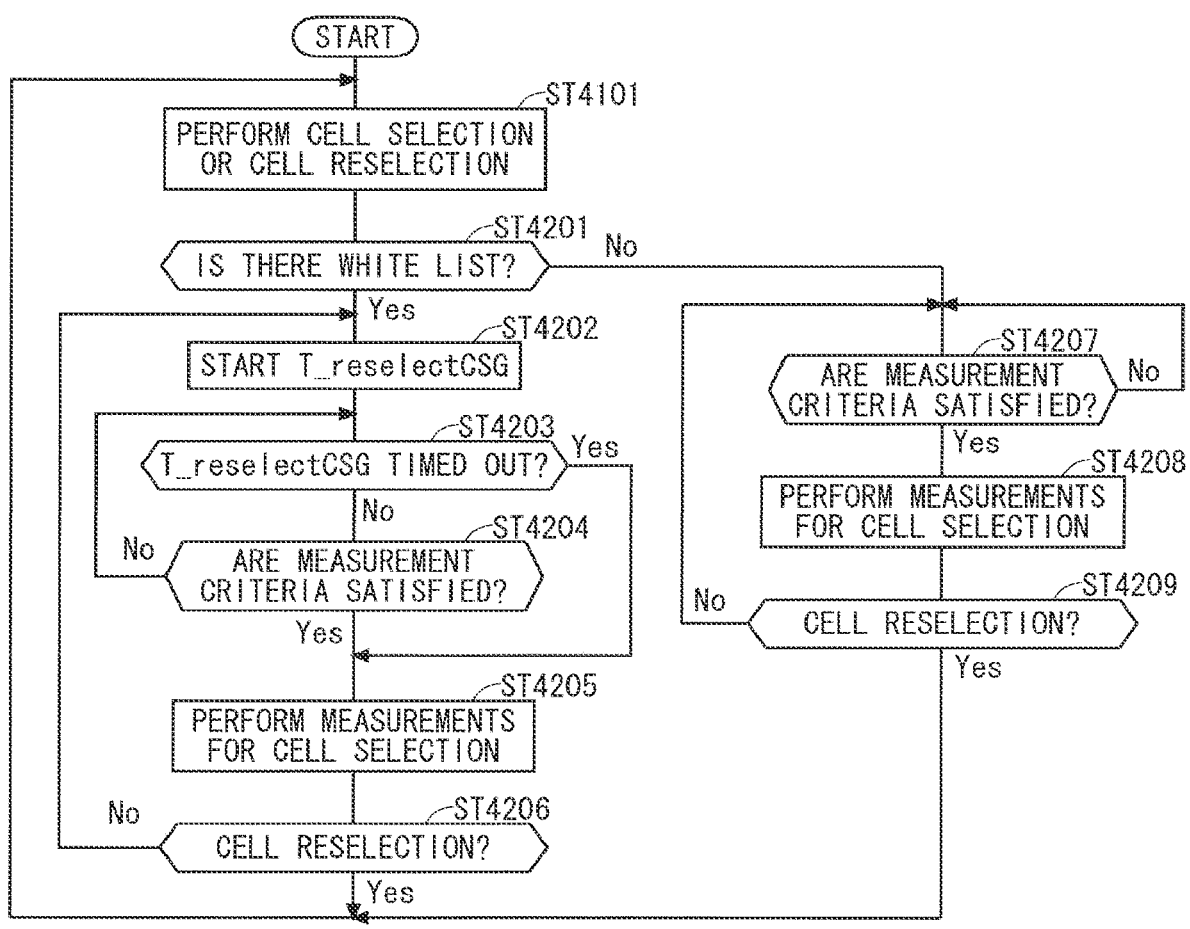
FIG. 42 is a flowchart showing the process of a UE, which has a CSG-ID in a whitelist, in a cell reselection procedure in which the UE uses a cycle of performing measurement for cell reselection even in a case where a serving cell is in a good state.
Figure 43:
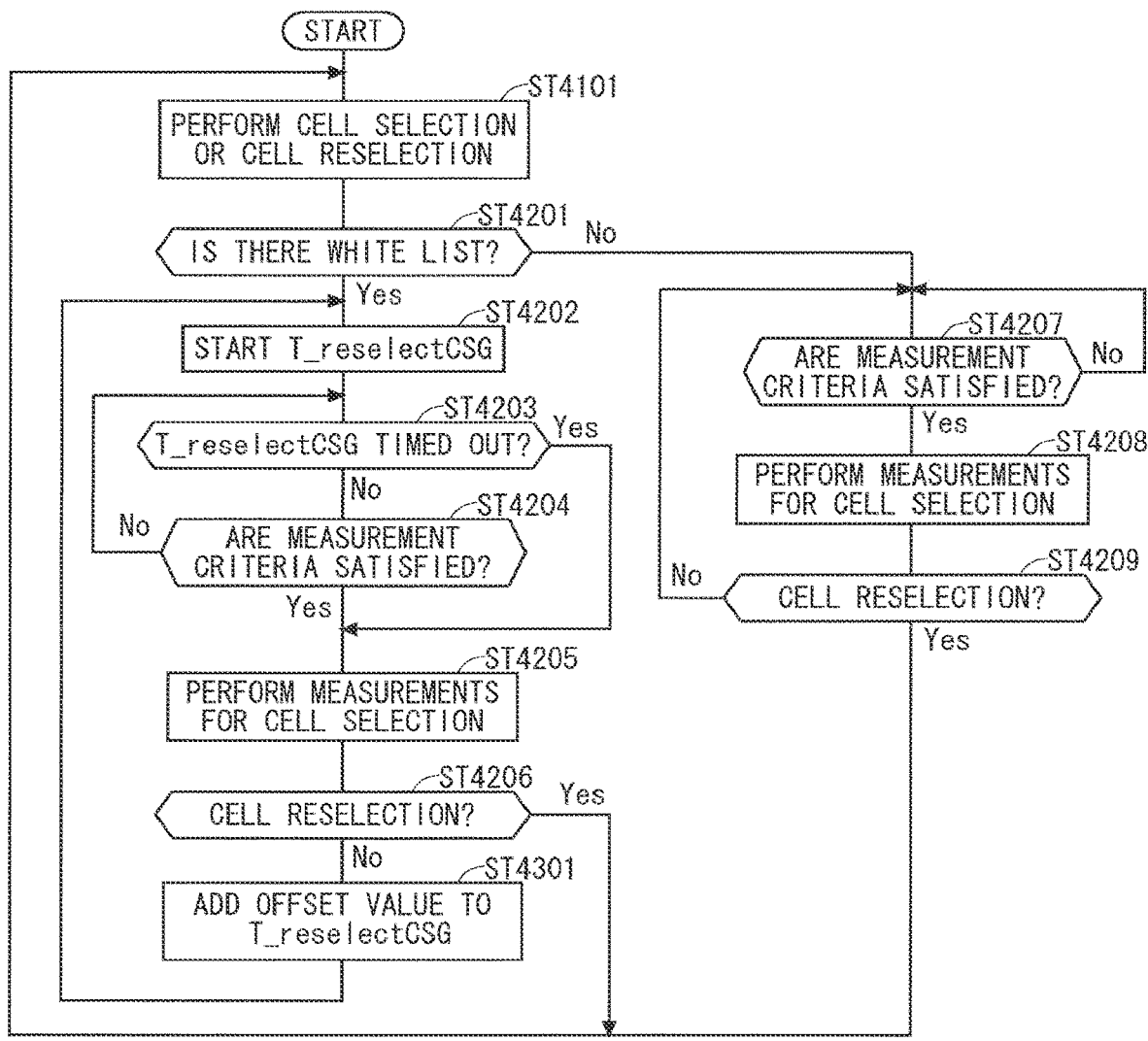
FIG. 43 is a flowchart showing the process of a UE, which has a CSG-ID in a whitelist, in a cell reselection procedure in which the UE uses a cycle of performing measurement for cell reselection and an offset value even in a case where a serving cell is in a good state.

The solution to the problem of the first modified example of the fifteenth embodiment is described below. The first modified example of the fifteenth embodiment discloses, in order to solve the above-mentioned problem, that an offset is added to the cycle for performing measurements for cell reselection to be reflected on a UE even in a case where the serving cell is in a good condition, when a cell cannot be selected even though the measurements for cell selection have been performed in the cycle (which may be a timer) for performing measurements for cell reselection, which is applicable in the case where the whitelist includes a CSG-ID, are performed even in a case where the serving cell is in a good condition (Sx>S_intrasearch, Sx>S_intersearch). A specific operation example is described with reference to FIG. 43. The portions of the same step numbers as those of FIG. 42 are not described in FIG. 43. In Step ST4301, the UE adds an offset value to the cycle (timer; for example, T_reselectCSG) for performing measurements for cell reselection even in a case where the serving cell is in a good condition (Sx>S_intrasearch, Sx>S_intersearch), and then proceeds to Step ST4202. For example, if the offset value is a positive value, in a case where cell reselection has not been performed even though measurements for cell reselection have been performed even when the serving cell has been in a good condition (Sx>S_intrasearch, Sx>S_intersearch), that is, in a case where a CSG cell that serves as a suitable cell for the UE has not been found, the cycle for performing measurements for cell reselection becomes longer even when the serving cell is in a good condition. Accordingly, the power consumption of the UE in a case where the UE has not been registered in a CSG cell existing in the vicinity of a present serving cell can be reduced with the use of an offset value. The method of notifying a cycle (timer) for performing measurements for cell reselection even in a case where the serving cell is in a good state in the fifteenth embodiment can be used as the method of notifying an offset value. In this case, the cycle (timer) for performing measurements for cell reselection may be notified simultaneously with or individually of an offset value even in a case where the serving cell is in a good condition.

While the LTE using a HeNB in which a CSG is used is described above, the present invention is also applicable to a UMTS using a HNB in which a CSG is used, a HeNB in which a CSG is not used, a HNB, and a base station having a small radius (also referred to as pico cell or macro cell).

The first modified example of the fifteenth embodiment is capable of achieving the following effect in addition to the effects of the fifteenth embodiment. It is possible to reduce the power consumption of the UE in a case where the UE has not been registered in a CSG cell existing in the vicinity of a present serving cell. The solution of the first modified example of the fifteenth embodiment is excellent in that the above-mentioned effect is achieved even though a network side (such as a base station) does not recognize which CSG cell a relevant UE has been registered in (which CSG-ID is included in the whitelist). As a result, a UE is not required to notify a base station of a CSG-ID in the whitelist, which achieves effective use of radio resources. In addition, an effect of alleviating the processing load of a base station can be achieved in that a base station does not need to manage a CSG-ID in the whitelist of UEs being served thereby.

Figure 44:
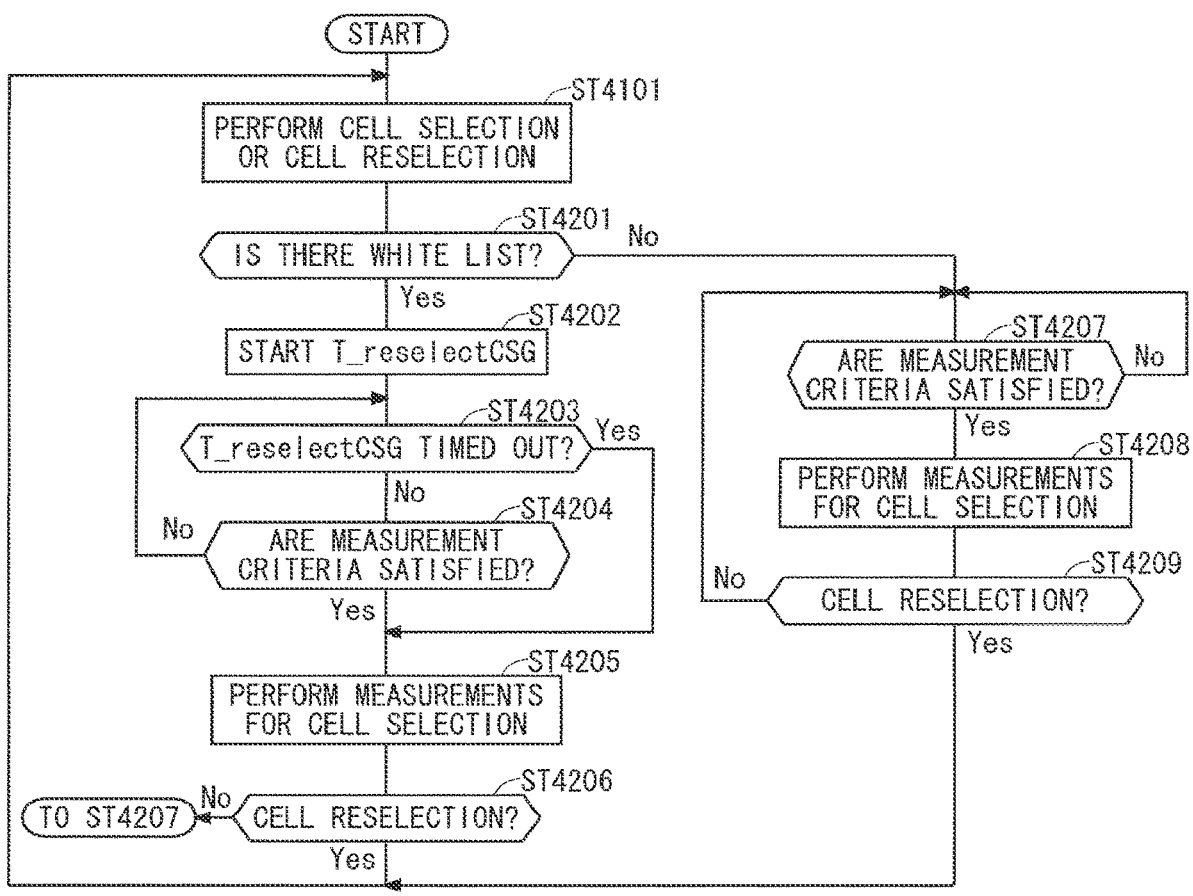
FIG. 44 is a flowchart showing the process of a UE, which has a CSG-ID in a whitelist, in a cell reselection procedure in which the UE cancels a cycle of performing measurement for cell reselection even in a case where a serving cell is in a good state and a cycle for performing measurement in a case where cell reselection has not been performed.

Next, a second modified example of the fifteenth embodiment is described. Another solution to the problem described in the first modified example of the fifteenth embodiment, which is different from that of the first modified example of the fifteenth embodiment, is disclosed. The second modified example of the fifteen embodiment discloses, in order to solve the above-mentioned problem, that the application of the cycle for performing measurements for cell reselection is canceled even in a case where the serving cell is in a good condition, when a cell cannot be selected even though the measurements for cell selection have been performed in the cycle (which may be a timer) for performing measurements for cell reselection, which is applicable to the case where the whitelist includes a CSG-ID, are performed even in a case where the serving cell is in a good condition (Sx>S_intrasearch, Sx>S_intersearch). A specific operation example is described with reference to FIG. 44. The portions of the same step numbers as those of FIG. 42 are not described in FIG. 44. In Step ST4206, the UE determines whether or not cell reselection has been performed from the results of the measurements performed in Step ST4205. In a case where cell reselection has been performed, the UE returns to Step ST4101. In a case where cell reselection has not been performed, the UE proceeds to Step ST4207.

While the LTE using a HeNB in which a CSG is used is described above, the present invention is also applicable to a UMTS using a HNB in which a CSG is used, a HeNB in which a CSG is not used, a HNB, and a base station having a small radius (also referred to as pico cell or macro cell).

The second modified example of the fifteenth embodiment is capable of achieving the following effect in addition to the effects of the fifteenth embodiment. It is possible to reduce the power consumption of the UE in a case where the UE has not been registered in a CSG cell existing in the vicinity of a present serving cell. Further, the solution of the second modified example of the fifteenth embodiment is excellent in that the above-mentioned effect is achieved even though a network side (such as a base station) does not recognize which CSG cell a relevant UE has been registered in (which CSG-ID is included in the whitelist). As a result, a UE is not required to notify a base station of the presence or absence of a CSG-ID in the whitelist, which achieves effective use of radio resources. In addition, an effect of alleviating the processing load of a base station can be achieved in that a base station does not need to manage a CSG-ID in the whitelist of UEs being served thereby.

Sixteenth Embodiment

A sixteenth embodiment discloses another solution to the problem described in the fifteenth embodiment, which is different from that of the fifteenth embodiment. Further, even in a case where the received quality of the serving cell that is a non-CSG cell is good in the current cell reselection process, the following operation is conceivable so as to select a CSG cell in neighbor cells. For example, S_intrasearch is set to be low. As a result, even in a case where the received quality of the serving cell is good, the measurement criteria are satisfied more easily, which facilitates the measurements for cell reselection. However, when S_intrasearch is set to be low as described above, even in a case where the received situation of a serving cell is good in all UEs (including a UE that does not have a CSG-ID in a whitelist) being served by the serving cell, the measurement criteria are satisfied more easily, which facilitates the measurements for cell reselection. In that case, it is not possible to select a CSG cell by a UE (that has not been registered in a CSG cell), and thus wasteful measurements are caused, resulting in a problem that the power consumption of a UE increases.

The sixteenth embodiment discloses, in order to solve the above-mentioned problem, that the measurement criteria for starting cell reselection are provided individually for the case where the whitelist includes a CSG-ID and a case where the whitelist includes no CSG-ID to be reflected on a UE. More specifically, the sixteenth embodiment discloses that thresholds to be compared with the received quality of the serving cell, which are the measurement criteria for starting cell reselection, are provided individually for the case where the whitelist includes a CSG-ID and a case where the whitelist includes no CSG-ID to be reflected on a UE. A specific operation example is described with reference to FIG. 45. The portions of the same step numbers as those of FIG. 41 and FIG. 42 are not described in FIG. 45. In Step ST4201, the UE determines whether or not the whitelist includes a CSG-ID. Alternatively, the UE determines whether or not the UE has been registered in the CSG cell. The UE proceeds to Step ST4501 in a case where the whitelist includes a CSG-ID or in a case where the UE has been registered in the CSG cell. The UE proceeds to Step ST4502 in a case where the whitelist includes no CSG-ID or in a case where the UE has not been registered in the CSG cell. In Step ST4501, the UE determines whether or not the measurement criteria for cell reselection, which are applied in the case where the whitelist includes a CSG-ID, are satisfied. As a specific example, the UE determines whether or not the received quality (for example, Sx) of the serving cell is equal to or smaller than a threshold (for example, S_intrasearchCSG) that is applied in the case where the whitelist includes a CSG-ID.

The UE proceeds to Step ST4205 in a case where the measurement criteria are satisfied, as a specific example, in a case where Sx≤S_intrasearchCSG. The UE returns to Step ST4501 in a case where the measurement criteria are not satisfied, as a specific example, in a case where Sx>S_intrasearchCSG. In this case, comparison may be performed not only with the threshold regarding whether or not the measurement criteria of the same frequency are satisfied but also with the threshold (for example, S_intersearchCSG) regarding whether or not the measurement criteria of different frequencies are satisfied. In Step ST4502, the UE determines whether or not the measurement criteria for cell reselection, which are normally (may be in a case where the whitelist includes no CSG-ID) applied, are satisfied. As a specific example, the UE determines whether or not the received quality (for example, Sx) of the serving cell is equal to or smaller than a threshold (S_intrasearch). The UE proceeds to Step ST4208 in a case where the measurement criteria are satisfied, as a specific example, in a case where Sx≤S_intrasearch. The UE returns to Step ST4502 in a case where the measurement criteria are not satisfied, as a specific example, in a case where Sx>S_intrasearch. In this case, comparison may be performed not only with the threshold regarding whether or not the measurement criteria of the same frequency are satisfied but also with the threshold (for example, S_intersearch) regarding whether or not the measurement criteria of different frequencies are satisfied. Further, a threshold (for example, S_intersearchCSG) that is applied in the case where the whitelist includes a CSG-ID, which is disclosed above, may be applied only in a case where the serving cell is a non-CSG cell even in a UE that has a CSG-ID in the whitelist. This enables to reduce wasteful measurements (the serving cell is not desired to be changed from a non-CSG cell to a CSG cell, and thus measurements for selecting a CSG cell also in a case where the received quality of the serving cell is good are wasteful measurements) for cell selection in a case where the serving cell has been a CSG cell, which occurs in the above-mentioned solution. This achieves an effect that a UE consumes a less amount of power.

The method of notifying the cycle (timer) for performing measurements for cell reselection even in a case where the serving cell is in a good condition in the fifteenth embodiment can be used as the method of notifying the measurement criteria for starting cell reselection in a case where the whitelist includes a CSG-ID. In this case, the measurement criteria for starting cell reselection in a case where the whitelist includes a CSG-ID may be notified simultaneously with or independently of the measurement criteria for cell reselection that are normally applied.

While the LTE using a HeNB in which a CSG is used is described above, the present invention is also applicable to a UMTS using a HNB in which a CSG is used, a HeNB in which a CSG is not used, a HNB, and a base station having a small radius (also referred to as pico cell or macro cell).

The effects of the sixteenth embodiment is described below. UEs that have a CSG-ID in a whitelist and UEs that do not have a CSG-ID in a whitelist may coexist by being served by a base station. By providing the measurement criteria for starting cell reselection, which are applied in a case where the whitelist includes a CSG-ID, it is possible to solve, in a case where the received quality of the serving cell (non-CSG cell) is good, a problem that a user is unable to benefit from an accounting plan of a CSG cell, which results from the fact that the measurements for reselecting a CSG cell are not performed as well as a problem that the load of a non-CSG cell cannot be alleviated in a mobile communication system as well. A UE, which performs measurements for cell reselection even in a case where the serving cell is in a good condition when the whitelist includes a CSG-ID, does not have a CSG-ID in the whitelist and has not been registered in a CSG cell, does not perform measurements for cell reselection in a case where the serving cell is in a good condition as conventionally. This makes it possible to omit the measurements for selecting a CSG cell even in a case where the serving cell is in a good condition, which is wasteful for a UE that is unable to reselect a CSG cell because it has not been registered in the CSG cell. This achieves an effect that the power consumption of a UE that has not been registered in a CSG cell is reduced. This effect is the effect according to the present invention, which cannot be achieved by the technology disclosed in Non-Patent Document 8.

The solution of the sixteenth embodiment is excellent also in that the problem can be solved without using a neighbor cell list. This because, as described above, the CSG cell, HeNB and HNB are assumed to have a portable size and weight and the CSG cell and the like are assumed to be installed or removed frequently and flexibly. Accordingly, the neighbor cell list needs to be updated every time the CSG cell, HeNB, HNB and the like are installed or removed in the solution in which the neighbor cell list is used, and it is expected that the neighbor cell list will be updated frequently. This is because the mobile communication system becomes intricate and complicated in the solution where a neighbor cell list is used. Further, the solution of the sixteenth embodiment is excellent in that the above-mentioned effect is achieved even though a network side (such as a base station) does not recognize whether or not a relevant UE has a CSG-ID in the whitelist. As a result, the UE is not required to notify the base station of the presence or absence of a CSG-ID in the whitelist, which achieves effective use of radio resources. In addition, an effect of alleviating the processing load of a base station can be achieved in that the base station does not need to manage the presence or absence of a CSG-ID in the whitelist of UEs being served thereby.

Next, a first modified example of the sixteenth embodiment described above is described. Specifically, the solution to the problem described in the first modified example of the fifteenth embodiment is disclosed. The first modified example of the sixteenth embodiment discloses, in order to solve the above-mentioned problem, that the application of the measurement criteria (for example, S_intrasearchCSG) for starting cell reselection is canceled, even though the measurements for cell selection are performed in accordance with the measurement criteria (for example, S_intrasearchCSG) for starting cell reselection, which are applied in a case where the whitelist includes a CSG-ID, in a case where a cell has not been selected.

Figure 45:
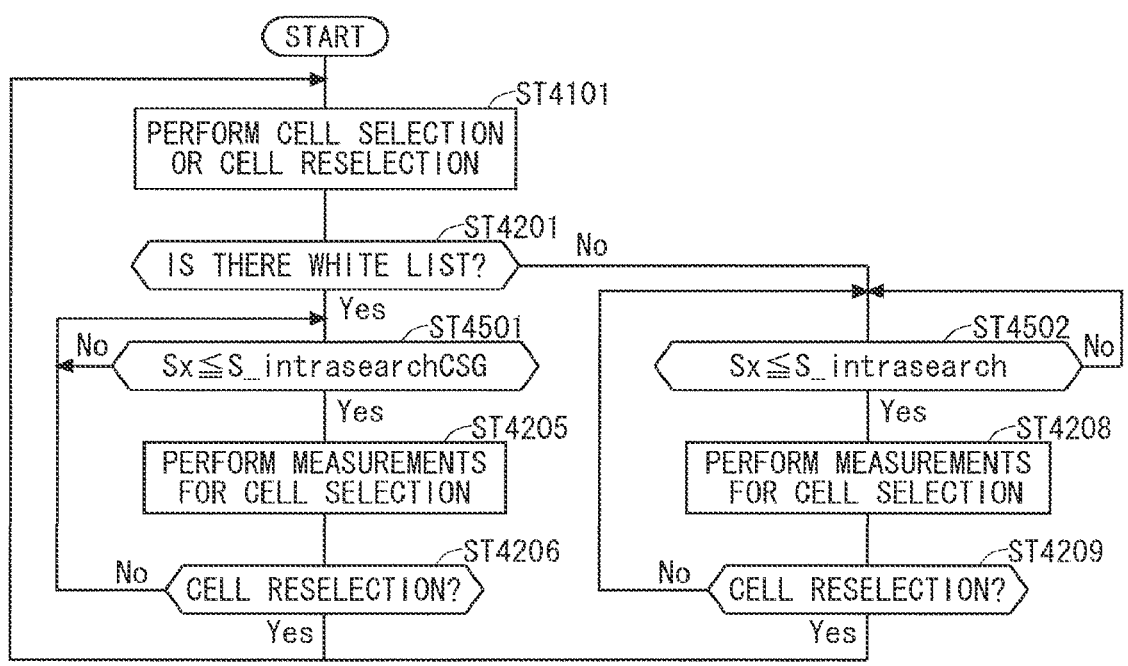
FIG. 45 is a flowchart showing the process of a UE, which has a CSG-ID in a whitelist, in a cell reselection procedure in which the UE uses a measurement reference for starting cell reselection for a UE which has a CSG-ID in a whitelist.

A specific operation example is described with reference to FIG. 45. In Step ST4206, the UE determines whether or not the cell reselection has been performed from the results of the measurements performed in Step ST4205. The UE returns to Step ST4101 in the case where cell reselection has been performed. The UE proceeds to Step ST4502 in the case where cell reselection has not been performed.

Seventeenth Embodiment

3GPP is studying base stations referred to as Home-NodeB (Home-NB, HNB) and Home-eNodeB (Home-eNB, HeNB). HNB/HeNB is a base station for, for example, household, corporation or commercial access service in UTRAN/E-UTRAN. Non-Patent Document 9 discloses three different modes of the access to the HeNB and HNB. Those are an open access mode, a closed access mode and a hybrid access mode. The respective modes have the following characteristics. In the open access mode, the HeNB and HNB are operated as a normal cell of an operator. In the closed access mode, the HeNB and HNB are operated as a CSG cell. The CSG cell is a cell where only CSG members are allowed access. In the hybrid access mode, the HeNB and HNB are CSG cells where non-CSG members are allowed access at the same time. In other words, a cell in the hybrid access mode is the cell that supports both the open access mode and the closed access mode. The cell of hybrid access mode is also referred to as a hybrid cell.

3GPP is studying the method of allowing cell reselection to a desired CSG cell even in a case where the received quality of the serving cell is good. It is considered that the above needs to be studied also in the hybrid cell. For example, Non-Patent Document 10 proposes that UEs of a CSG member should stay longer at hybrid cells than UEs of a non-CSG member, and that a camping mechanism is required to vary between UEs of a CSG member and the UEs of non-CSG member. However, Non-Patent Document 10 has no description on a specific method therefor.

The hybrid cell is a CSG cell, and thus the methods disclosed in the fifteenth embodiment, first modified example of the fifteenth embodiment, second modified example of the fifteenth embodiment, sixteenth embodiment and first modified example of the sixteenth embodiment are applicable as a specific method of causing UEs of a CSG member to stay longer at the hybrid cells than UEs of a non-CSG member. Those methods enable the UE having a CSG-ID in the whitelist (CSG-ID list, allowed CSG list) or the UE registered in a CSG cell to execute the process of cell reselection more rapidly compared with the other UEs. Accordingly, it is possible to detect CSG cells including a hybrid cell rapidly. This allows a UE having a CSG-ID of the CSG to which the hybrid cell belongs or a UE registered in the CSG to perform cell reselection to the hybrid cell rapidly. The methods disclosed in the embodiments above are applicable also to a specific operation.

The sixteenth embodiment discloses that the measurement criteria for cell reselection are provided individually for the case where the whitelist includes a CSG-ID and a case where the whitelist includes no CSG-ID. As an example, the threshold of cell reselection in the case where the whitelist includes no CSG-ID is regarded as S_intrasearch and the threshold of cell reselection in the case where the whitelist includes a CSG-ID is regarded as S_intrasearchCSG.

In order that the process of cell reselection be performed more rapidly in the case where the whitelist includes a CSG-ID than the case where the whitelist includes no CSG-ID, S_intrasearchCSG may be set to be lower than S_intrasearch (S_intrasearch>S_intrasearchCSG). The process of cell reselection is started more easily as the threshold of cell reselection becomes smaller, which accordingly facilitates cell reselection to a CSG cell by a UE of a CSG member. Accordingly, cell reselection to a hybrid cell is facilitated in the seventeenth embodiment as well.

Eighteenth Embodiment

Even in a case where the received quality of the serving cell is good, for example, Non-Patent Document 11 describes the method of providing Qoffset for each CSG cell as a specific method of enabling cell reselection to a desired CSG cell.

Qoffset is the offset provided to the measured value of received quality of the detected cell when cell ranking is performed in cell reselection, as described in Non-Patent Document 7. Qoffset is broadcast from the serving cell together with the information of a cell to which the Qoffset is provided.

Further, Non-Patent Document 12 describes the method of providing one Qoffset to hybrid cells, that is, the method of providing one Qoffset to all cells in a hybrid access mode. Further, described is the method of providing two Qoffsets corresponding to a macro cell RSRP range, and Qoffsets are individually applied when macro cell RSRP is below or above an RSRP threshold.

As described in those methods, offset values are varied only for each cell, each cell type, or positional relationship with a macro cell only by providing Qoffset for each CSG cell, providing one Qoffset to hybrid cells, or providing Qoffset correspondingly to a macro cell RSRP range.

However, while the hybrid cell is a CSG cell, it supports both an open access mode and a closed access mode at the same time. For this reason, the criteria for cell reselection cannot be varied between UEs of a non-CSG member and UEs of a CSG member for a hybrid cell. Accordingly, those methods cause a problem that UEs of a CSG member are not allowed to stay longer at hybrid cells than UEs of a non-CSG member.

In order to solve the above-mentioned problem, in the present embodiment, there are provided an offset value (Qoffset_csg) applied to UEs having a CSG-ID in the whitelist or UEs registered in a CSG and an offset value (Qoffset_noncsg) applied to the other UEs.

As described above, it is possible to vary the criteria for cell reselection between UEs of a non-CSG member and UEs of a CSG member by providing offsets individually for UEs having a CSG-ID in the whitelist or UEs registered in a CSG and the other UEs. This enables UEs of a CSG member to stay longer at hybrid cells than UEs of a non-CSG member.

Figure 46:
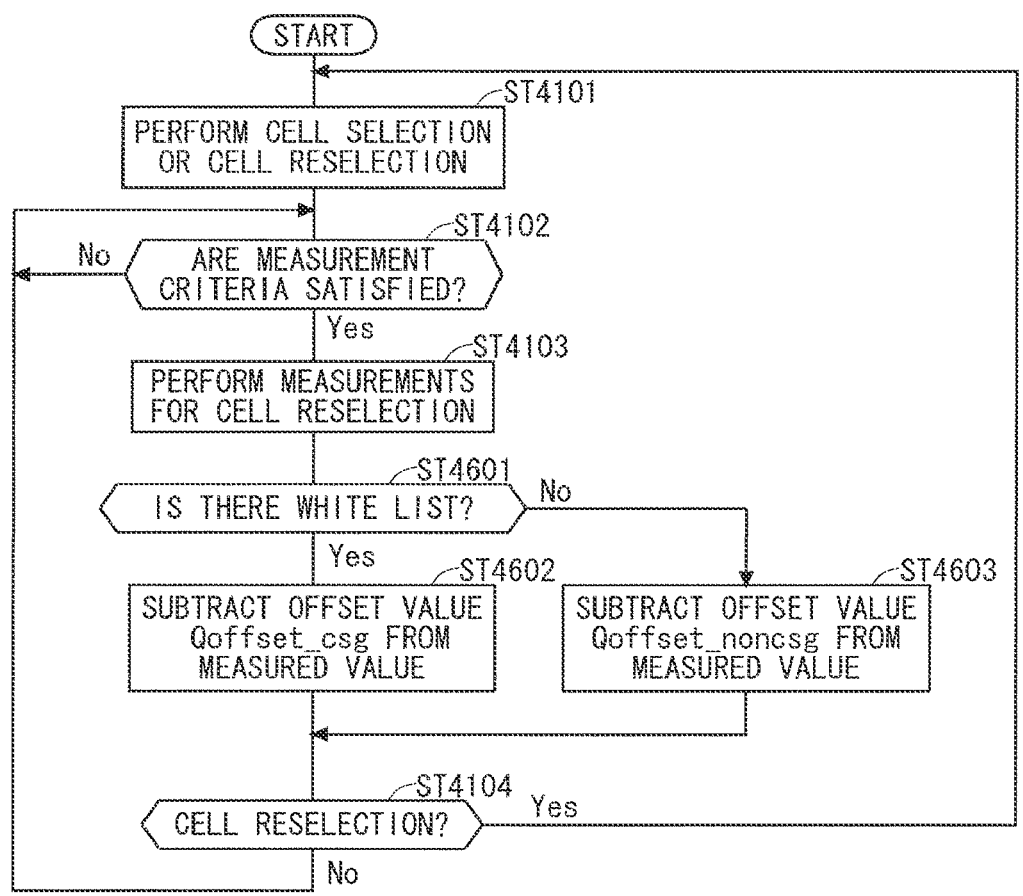
FIG. 46 is a flowchart showing the process of a UE in a case where a reselection procedure for a hybrid cell is varied by individually providing an offset for a UE having a CSG-ID in a whitelist and for a UE having no CSG-ID in a whitelist.

A specific operation example is described with reference to FIG. 46. The portions of the same step numbers as those of FIG. 41 are not described in FIG. 46. In Step ST4103, the UE performs measurements for cell reselection and performs cell ranking. In Step ST4601, the UE determines whether or not the whitelist includes a CSG-ID. Alternatively, the UE determines whether or not the UE has been registered in a CSG cell. The UE proceeds to Step ST4602 in a case where the whitelist includes a CSG-ID or in a case where the UE has been registered in a CSG cell. In Step ST4602, the UE subtracts Qoffset_csg from the measured value. The UE proceeds to Step ST4603 in the case where the whitelist includes no CSG-ID or in the case where the UE has not been registered in a CSG cell. In Step ST4603, the UE subtracts Qoffset_noncsg from the measured value. The UE performs cell ranking based on the results obtained by the subtraction, whereby it is possible to vary the measurement criteria for performing cell reselection between UEs having a CSG-ID in the whitelist or UEs registered in a CSG and the other UEs. It is also possible to perform cell ranking only in Step ST4602 or Step ST4603 and omit cell ranking in Step ST4103.

As to the value of Qoffset_noncsg and the value of Qoffset_csg, it suffices that the received quality criteria for cell reselection be satisfied more rapidly in the UEs having a CSG-ID in the whitelist or UEs registered in a CSG than the other UEs, in accordance with the radio wave environments of a serving cell and neighbor cells.

For example, the value of Qoffset_csg is set to be smaller than the value of Qoffset_noncsg (Qoffset_noncsg>Qoffset_csg). This makes the results calculated in consideration of those offsets for one cell become larger in the UEs having a CSG-ID in the whitelist or UEs registered in a CSG than the other UEs. Accordingly, the UEs having a CSG-ID in the whitelist or the UEs registered in a CSG satisfy the received quality criteria for sell reselection more rapidly than the other UEs. As a result of the received quality criteria for cell reselection being satisfied more rapidly, reselection to a suitable cell is enabled more rapidly. Therefore, it is possible to allow the UEs of a CSG member to perform cell reselection more rapidly than UEs of a non-CSG member for hybrid cells, which enables UEs of a CSG member to stay longer than UEs of a non-CSG member.

The criteria for cell ranking may be expressed by equations below.

As to the UEs having a CSG-ID in the whitelist or the UEs registered in a CSG, $$Rn = Qmeas,n - Qoffset\_csg,$$

while as to the other UEs, $$Rn = Qmeas,n - Qoffset\_noncsg.$$

Qmeas and n represent measured values of received quality of an n-th cell, and Rn represents calculation results of received quality in consideration of offset.

Alternatively, the criteria for cell ranking may be expressed by equations below.

As to the UEs having a CSG-ID in the whitelist or the UEs registered in a CSG, $$Rn = Qmeas,n - Qoffset - Qoffset\_csg,$$

while as to the other UEs, $$Rn = Qmeas,n - Qoffset - Qoffset\_noncsg.$$

Considering conventional Qoffset, Qoffset_noncsg and Qoffset_csg can be used only for difference between the UEs having a CSG-ID in a whitelist or the UEs registered in a CSG and the other UEs.

The first method to the fourth method disclosed as the method of notifying a cycle for performing measurements for cell reselection in the fifteenth embodiment are applicable as the method of notifying Qoffset_csg and Qoffset_noncsg. Similar effects can be achieved in the cases where those are applied.

Further, in the first method, a notification may be made using an SIB4 in a case where an SIB is used.

Conventional offset values are transmitted together with the information of corresponding cells in the SIB4. The offset values are transmitted together with those pieces of information, and accordingly the cell ranking criteria are executed for each corresponding cell together with the conventional offset values. As the information of corresponding cell, a PCI range capable of being provided for hybrid cells may be used. This enables to set the same value to a plurality of hybrid cells, which reduces the information amount of the SIB4.

Further, in the second method, only the hybrid cells may notify offset values as the broadcast information.

In the method disclosed above, the offset value (Qoffset_csg) applied to the UEs having a CSG-ID in the whitelist or the UEs registered in a CSG and the offset value (Qoffset_noncsg) applied to the other UEs are provided, so that cell ranking is performed and then cell reselection is performed.

As another method, a value (Qoffset_delta) of a difference between the offset value applied to the UEs having a CSG-ID in the whitelist or the UEs registered in a CSG and the offset value applied to the other UEs may be provided. That is, Qoffset_noncsg and Qoffset_delta may be provided to be used as the criteria for cell ranking.

For example, the criteria for cell ranking may be expressed by equations below.

As to the UEs having a CSG-ID in the whitelist or the UEs registered in a CSG, $$Rn = Qmeas,n - (Qoffset\_noncsg - Qoffset\_delta),$$

while as to the other UEs, $$Rn = Qmeas,n - Qoffset\_noncsg.$$

As a result, similar effects to those of the method of notifying Qoffset_noncsg and Qoffset_csg, which is disclosed above, can be achieved.

Further, as still another method, an offset value applied to the UEs having a CSG-ID in the whitelist or the UEs that have not been registered in a CSG may be set as the conventional Qoffset to be used together with the difference value Qoffset_delta.

For example, the criteria for cell ranking may be expressed by equations below.

As to the UEs having a CSG-ID in the whitelist or the UEs registered in a CSG, $$Rn = Qmeas,n - (Qoffset - Qoffset\_delta),$$

while as to the other UEs, $$Rn = Qmeas,n - Qoffset.$$

As a result, not only similar effects to those of the method disclosed above can be achieved, but also parameters to be set can be reduced by one. That is, both Qoffset_csg and Qoffset_noncsg are not required to be set, and only Qoffset_delta needs to be set. Accordingly, it is possible to reduce the information amount for parameter setting. The above-mentioned method is applicable as the notification method. As another method, Qoffset and Qoffset_delta may be notified individually from different cells. For example, Qoffset is notified from a serving cell, while Qoffset_delta is notified from a hybrid cell. Qoffset_delta is a value used only for a hybrid cell, and thus it may be notified only from hybrid cells, so that the UEs having a CSG-ID in the whitelist or the UEs registered in a CSG may perform recalculation using the offset value (Qoffset_delta) in the criteria for cell ranking. The other UEs are not required to perform recalculation and receive the offset value of a hybrid cell, whereby it suffices that only the received quality is measured. This can simplify the measurements in cell reselection, and an effect of reducing power consumption of a UE can be obtained.

The method disclosed in the present embodiment is also applicable to the method of providing Qoffset for each CSG cell that is described in Non-Patent Document 11, the method of providing one Qoffset to hybrid cells that is described in Non-Patent Document 12, or the method of providing two Qoffsets corresponding to an RSRP range of a macro cell and individually applying each Qoffset when macro cell RSRP is below or above an RSRP threshold. For example, those Qoffsets may be used as Qoffset of the criteria for cell ranking that is disclosed in the present embodiment, or used in addition to Qoffset. As a result, it is possible to taken into consideration respective Qoffsets that are provided for each CSG cell, are specific to hybrid, or correspond to the RSRP range of a macro cell.

Further, as another method, the values described in those Non-Patent Documents are avoided to be applied, as the offset values applied to the UEs having a CSG-ID in the whitelist or the UEs registered in a CSG, to the other UEs. For example, the values described in those Non-Patent Documents may be used in Qoffset_delta as the criteria for cell ranking. This enables the criteria for cell reselection to vary between the UEs of a non-CSG member and the UEs of a CSG member for hybrid cells.

It is possible to use the method disclosed in the present embodiment in combination with the method disclosed in the fifteenth embodiment, the first modified example of the fifteenth embodiment, the second modified example of the fifteenth embodiment, the sixteenth embodiment, the first modified example of the sixteenth embodiment or the seventeenth embodiment.

Figure 47:
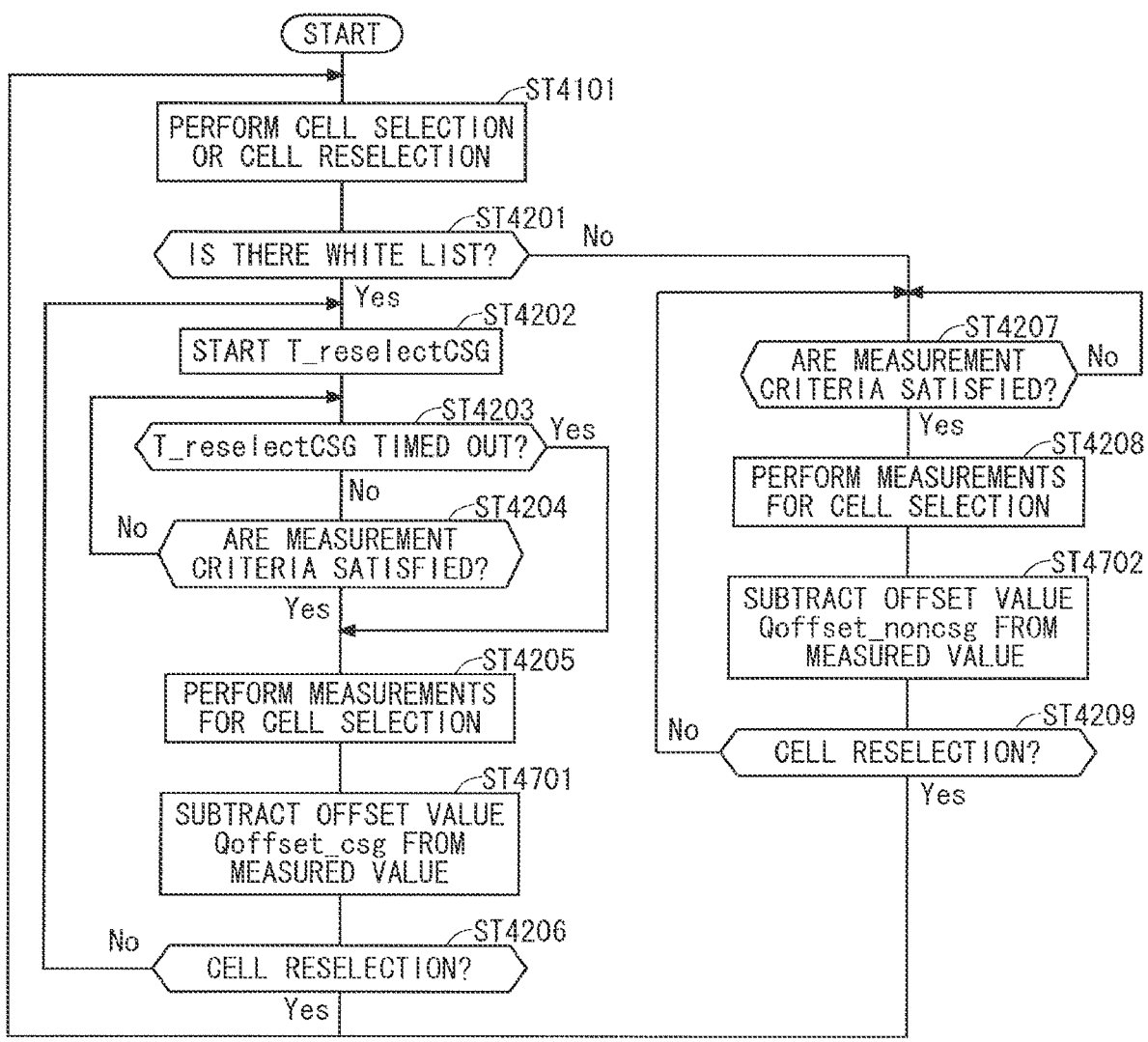
FIG. 47 is a flowchart showing a cell reselection procedure process of a UE in a case where the method of individually providing an offset is combined with a fifteenth embodiment.

For example, FIG. 47 shows a specific operation example in a case of the combination with the fifteenth embodiment. The portions of the same step numbers as those of FIG. 42 are not described in FIG. 47. In Step ST4201, the UE determines whether or not the whitelist includes a CSG-ID. Alternatively, the UE determines whether or not the UE has been registered in the CSG cell. In the case where the whitelist includes a CSG-ID or in the case where the UE has been registered in the CSG cell, in Step ST4701, the UE subtracts Qoffset_csg from the measured value. In a case where the whitelist includes no CSG-ID or in a case where the UE has not been registered in the CSG cell, in Step ST4702, the UE subtracts Qoffset_noncsg from the measured value. As a result of the cell ranking performed based on the results obtained by the subtraction, it is possible to vary the determination criteria for performing cell reselection between the UEs having a CSG-ID in the whitelist or the UEs registered in a CSG and the other UEs. It is also possible to perform cell ranking only in Step ST4701 or Step ST4702, and omit the cell ranking in Step ST4205 or Step ST4208.

It is possible to use the other embodiment or modified example in combination through similar operations. As a result of the combination of the method disclosed in the present embodiment and the embodiment or modified example, there is obtained an effect that flexible handling is also available for a difference in the environment of respective radio waves that results from a flexible arrangement of HeNBs or HNBs including hybrid cells.

The method disclosed in the present embodiment enables the criteria for cell reselection to vary between the UEs of a non-CSG member and the UEs of a CSG member for hybrid cells. As a result, the UEs of a CSG member are allowed to stay longer at the hybrid cells than the UEs of a non-CSG member.

Accordingly, the CSG members are capable of obtaining service such as high-speed communications and preferential charging plan, which is dedicated to CSG members in hybrid cells, more rapidly in a longer period of time.

Nineteenth Embodiment

The eighteenth embodiment discloses the method in which the UEs of a CSG member perform cell reselection on hybrid cells more rapidly than the UEs of a non-CSG member, in other words, the method of facilitating (inbound) reselection to hybrid cells.

In order that the UEs of a CSG member perform cell reselection from the hybrid cells more slowly than the UEs of a non-CSG member, in other words, in order to make (outbound) cell reselection from the hybrid cells difficult, the present embodiment discloses the case of applying the method of providing an offset value (Qoffset_csg) applied to the UEs having a CSG-ID in the whitelist or the UEs registered in a CSG and an offset value (Qoffset_noncsg) applied to the other UEs, and performing cell ranking and cell reselection with the use of those, to thereby vary the criteria for cell reselection between the UEs of a non-CSG member and the UEs of a CSG member.

As a specific operation example, criteria for cell ranking may be expressed by equations below.

As to the UEs having a CSG-ID in the whitelist or the UEs registered in a CSG, $$Rs = Q\text{meas},s + Q\text{hyst} - Q\text{offset\_csg},$$

while as to the other UEs, $$Rs = Q\text{meas},s + Q\text{hyst} - Q\text{offset\_noncsg}.$$

Qmeas and s represent the measured values of the received quality of a serving cell, Qhyst represents an offset value for providing hysteresis, and Rs represents the calculation results of the received quality of a serving cell in which the offset is taken into consideration.

A hybrid cell serves as a serving cell in the reselection from the hybrid cells. Accordingly, in order to make the cell reselection from the hybrid cells difficult, a difference is provided in the measurement value of the serving cell between the UEs having a CSG-ID in the whitelist or the UEs registered in a CSG and the other UEs in cell ranking during cell reselection. As a specific example, calculation is performed with the use of Qoffset_noncsg and Qoffset_csg in Rs derivation. This enables the determination criteria for performing cell reselection from hybrid cells to vary between both UEs.

As to the value of Qoffset_noncsg and the value of Qoffset_csg, the UEs having a CSG-ID in the whitelist or the UEs registered in a CSG may be set so as to satisfy the received quality criteria for cell reselection more slowly than the other UEs, in accordance with the environment of radio waves of the serving cell and neighbor cells.

For example, the value of Qoffset_csg is set to be larger than the value of Qoffset_noncsg (Qoffset_noncsg<Qoffset_csg). Accordingly, the results calculated in consideration of the offsets for the serving cell that is a hybrid cell are lower in the UEs having a CSG-ID in the whitelist or the UEs registered in a CSG than the other UEs.

This means that the UEs having a CSG-ID in the whitelist or the UEs registered in a CSG satisfy the received quality criteria for cell reselection more slowly than the other UEs.

As a result of the received quality criteria being satisfied more slowly, it is possible to prevent the reselection from hybrid cells from being performed before the received quality criteria are satisfied. This enables the UEs of a CSG member to perform cell reselection at hybrid cells more slowly than the UEs of a non-CSG member, which makes it possible for the UEs of a CSG member to stay longer than the UEs of a non-CSG member.

Figure 48:
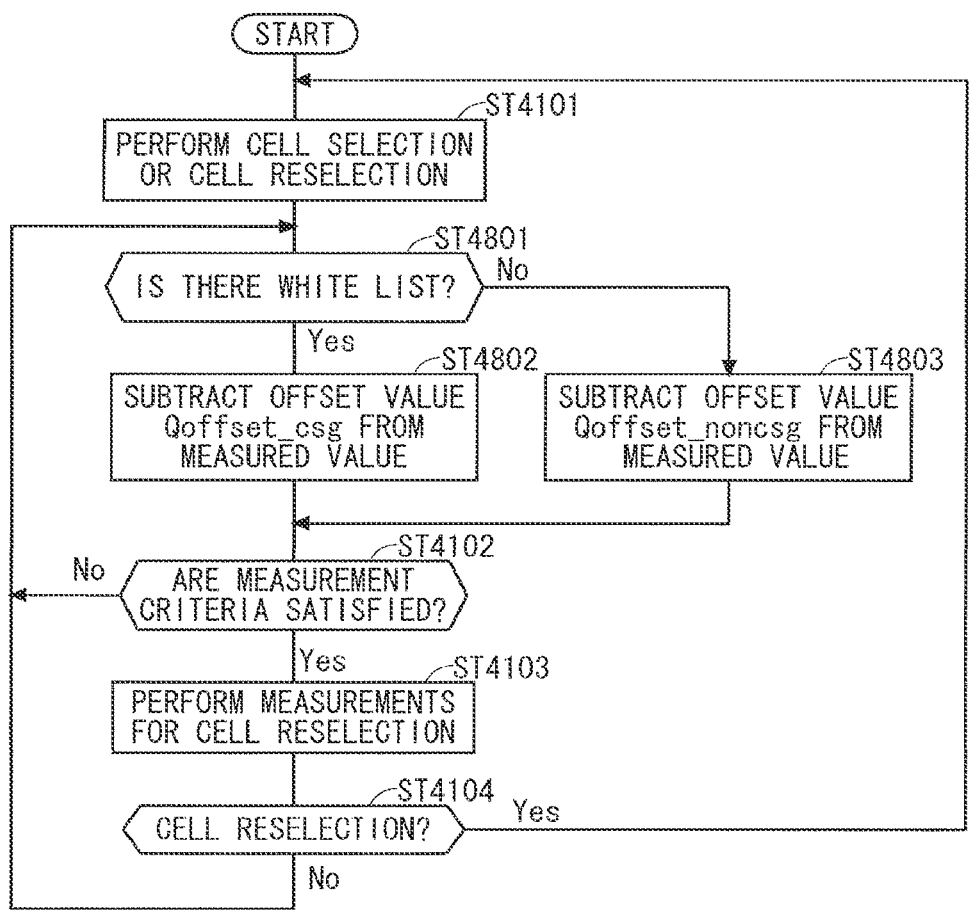
FIG. 48 is a flowchart showing a cell reselection procedure process of a UE in a case where an offset for making cell reselection from a hybrid cell difficult is provided individually.

FIG. 48 shows a specific operation example of cell reselection at hybrid cells. The portions of the same step numbers as those of FIG. 41 are not described in FIG. 48. The UE that has started the process of cell selection or cell reselection in Step ST4101 performs measurements of a serving cell for cell reselection, and performs cell ranking criteria for the serving cell. In Step ST4801, the UE determines whether or not the whitelist includes a CSG-ID. Alternatively, the UE determines whether or not the UE has been registered in a CSG cell. In the case where the whitelist includes a CSG-ID or in the case where the UE has been registered in a CSG cell, the UE proceeds to Step ST4802. In Step ST4802, the UE subtracts Qoffset_csg from the measured value. In the case where the whitelist includes no CSG-ID or in the case where the UE has not been registered in a CSG cell, the UE proceeds to Step ST4803. In Step ST4803, the UE subtracts Qoffset_noncsg from the measured value. In Step ST4102, the UE determines whether the measurement criteria for cell reselection are satisfied based on those results obtained by the subtraction. This enables the determination criteria for performing cell reselection to vary between the UEs having a CSG-ID in the whitelist or the UEs registered in a CSG and the other UEs.

It is also possible to avoid the use of the offset values (Qoffset_csg, Qoffset_noncsg) in derivation of a measured value of a serving cell in a case where cell ranking is performed including the received quality measured value of the serving cell in Step ST4103. In a case where those offset values are not used, the UEs of a CSG member are highly likely to select a serving cell.

Alternatively, an offset value (Qoffset_csg_r) applied to the UEs having a CSG-ID in the whitelist or the UEs registered in a CSG and an offset value (Qoffset_noncsg_r) applied to the other UEs may be provided separately, and in performing the derivation of the measured values of a serving cell when cell ranking is performed including the measured value of the received quality of the serving cell in Step ST4103, those may be applied to the measured values of the serving cell to perform cell ranking and then perform cell reselection. In this case, Qoffset_noncsg_r is preferably set to be higher than Qoffset_csg_r. Accordingly, the results calculated in consideration of those offsets for the serving cell that is a hybrid cell are higher in the UEs having a CSG-ID in the whitelist or the UEs registered in a CSG than the other UEs. Therefore, the UEs having a CSG-ID in the whitelist or the UEs registered in a CSG are highly likely to select a serving cell than the other UEs.

As a result of the criteria for cell ranking being set as described above, the UEs of a CSG member are allowed to perform cell reselection more slowly than the UEs of a non-CSG member in hybrid cells, which enables the UEs of a CSG member to stay longer at the hybrid cells than the UEs of a non-CSG member.

The first to fourth methods, which are disclosed in the fifteenth embodiment as the method of notifying the cycle for performing measurements for cell reselection, are applicable to the method of notifying those parameters, and similar effects can be obtained.

Through the combination of the present embodiment and the eighteenth embodiment, it is possible to make the reselection to the hybrid cells easier and make the reselection from hybrid cells more difficult in the UEs of a CSG member than the UEs of a non-CSG member. Accordingly, it is possible to allow the UEs of a CSG member to stay longer at the hybrid cells than the UEs of a non-CSG member.

In the case where the present embodiment and the eighteenth embodiment are combined, the offset value provided for making the reselection to the hybrid cells easier and the offset value provided for making the cell reselection from the hybrid cells more difficult in the UEs of a CSG member than the UEs of a non-CSG member may be set to values different from each other or the same value.

For example, the respective values are set such that the offset values provided for making the reselection are to the hybrid cells easier are Qoffset_csg_in and Qoffset_noncsg_in and the offset values provided for making the cell reselection from the hybrid cells more difficult are Qoffset_csg_out and Qoffset_noncsg_out. As a result, it is possible to cope with more flexible installation and handling of HeNB s and HNBs.

As an example of setting to the same value, two offsets of Qoffset1 and Qoffset2 may be provided. In order to make the reselection to the hybrid cells easier, Qoffset_csg is set to Qoffset1 and Qoffset_noncsg is set to Qoffset2 to be used in the derivation of a cell ranking Rn of neighbor cells. On the other hand, in order to make the cell reselection from the hybrid cells more difficult, Qoffset_csg is set to Qoffset2 and Qoffset_noncsg is set to Qoffset1 to be used in the derivation of a cell ranking Rs of serving cells. Qoffset1 may be set to be lower than Qoffset2. This reduces the number of parameters, leading to a reduction in information amount to be transmitted to the UEs.

The notification methods disclosed in the fifteenth embodiment and the eighteenth embodiment can be used as the method of notifying those parameters, and the combination of various notification methods are allowed.

For example, Qoffset_csg_in and Qoffset_noncsg_in may be notified from the serving cell on the SIB4 for being used in the derivation of the cell ranking Rn of neighbor cells, whereas Qoffset_csg_out and Qoffset_noncsg_out may be notified only from the hybrid cells on the SIB1 for being used in the derivation of the cell ranking Rs of serving cells in the hybrid cells.

This reduces the information amount notified from the cells which are not hybrid cells.

In a case where two offsets of Qoffset1 and Qoffset2 are provided, a notification may be made on the SIB1 of all cells. As a result, it is possible to reduce the information amount to be notified also in the hybrid cells.

The method disclosed in the present embodiment can be used in combination with the method disclosed in the fifteenth embodiment, the first modified example of the fifteenth embodiment, the second modified example of the fifteenth embodiment, the sixteenth embodiment, the first modified example of the sixteenth embodiment, the seventeenth embodiment or the eighteenth embodiment.

Through the combination of the method disclosed in the present embodiment and the above-mentioned embodiment or modified example, it is possible to make the reselection to the hybrid cells easier and make the reselection from the hybrid cells more difficult in the UEs of a CSG member than the UEs of a non-CSG member even in various environments of radio waves that result from a flexible arrangement of the HeNBs or HNBs including hybrid cells. Accordingly, it is possible to allow the UEs of a CSG member to stay longer at the hybrid cells than the UEs of a non-CSG member.

Twentieth Embodiment

The embodiment above discloses the method of reselecting a cell to/from the hybrid cells for allowing the UEs of a CSG member to stay longer at the hybrid cells than the UEs of a non-CSG member. The present embodiment discloses the method of handover (inbound HO/outbound HO) to/from the hybrid cells for allowing the UEs of a CSG member to stay longer at the hybrid cells than the UEs of a non-CSG member.

In the handover to/from hybrid cells, the process, rule and criteria of the handover are varied between the UEs of a non-CSG member and the UEs of a CSG member. As a specific method, as to the parameters used in HO to/from hybrid cells, the parameters applied to the UEs having a CSG-ID in the whitelist or the UEs registered in a CSG and the parameters applied to the other UEs are provided. By setting the parameters to different values between the UEs of a non-CSG member and the UEs of a CSG member, it is possible to vary the criteria for handover to/from hybrid cells between the UEs of a non-CSG member and the UEs of a CSG member.

Examples of parameters used in handover to/from hybrid cells include parameters serving as indicators for determining whether or not an event occurs in a measurement report. That includes thresholds of event occurrence (Thresh, Thresh1, Thresh2), an offset value (Ocs) of a serving cell that is applied to the measurement results of the received quality, an offset value (Ofs) of the frequency of a serving cell that is applied to the measurement results of the received quality, an offset value (Ocn) of neighbor cells that is applied to the measurement results of the received quality, an offset value (Ofn) of the frequency of neighbor cells that is applied to the measurement results of the received quality, an offset value (Off) for each event and a hysteresis (Hys) for each event.

For example, as to the threshold of event occurrence, Thresh_csg applied to the UEs having a CSG-ID in a whitelist or the UEs registered in a CSG and Thresh_noncsg applied to the other UEs are provided in a case where the serving cell is a hybrid cell. By setting Thresh_csg higher than Thresh_noncsg, event for handover occurs in the UEs of a CSG member more slowly than the UEs of a non-CSG member, which enables the UEs of a CSG member to stay longer at the hybrid cells than the UEs of a non-CSG member.

For example, as to the offset values of neighbor cells, Ocn_csg applied to the UEs having a CSG-ID in the whitelist or the UEs registered in a CSG and Ocn_noncsg applied to the other UEs are provided. In a case where the offset value is subtracting from the measurement results of the received quality, Ocn_noncsg is set higher than Ocn_csg. In a case where the neighbor cells are hybrid cells, the UEs of a CSG member calculate the received quality of the neighbor cells using Ocn_csg, and the UEs of a non-CSG member calculate the received quality of the neighbor cells using Ocn_noncsg. Ocn_noncsg is set higher than Ocn_csg, and thus event for handover occurs more rapidly in the UEs of a CSG member than the UEs of a non-CSG member, which enables the handover to the hybrid cells rapidly.

As to the method of notifying the parameters, the parameters may be notified individually from the serving cell to the UEs that performs measurement. For example, the parameters may be notified by being included in a measurement control message. As a result, the respective UEs can perform setting individually, and setting can be performed individually in accordance with the situation of radio waves of the UEs, whereby it is possible to obtain excellent communication quality of the respective UEs.

Alternatively, prior to the measurements in the UEs, a difference between the parameter applied to the UEs having a CSG-ID in the whitelist or the UEs registered in a CSG and the parameter applied to the other UEs may be broadcast from the serving cell as the broadcast information.

Any one of the parameters may be notified dedicatedly to the UEs so that derivation is performed using the difference value. This reduces the information notified dedicatedly to the UEs, which reduces the resource load for signaling.

Still alternatively, the difference value may be preliminarily determined in a static manner such that a base station as well as a UE can recognize the information in advance. There is no need to broadcast the difference as the broadcast information, which further reduces the resource load for signaling.

The method disclosed in the present embodiment enables the UEs of a CSG member to perform HO more rapidly than the UEs of a non-CSG member in the handover to the hybrid cells and the UEs of a CSG-member to perform handover more slowly than the UEs of a non-CSG member in the handover from the handover to the hybrid cells. This allows the UEs of a CSG member to stay longer at the hybrid cells than the UEs of a non-CSG member.

The method disclosed in the present embodiment is applicable also in the case where the serving cell does not recognize whether the UE makes access in an open mode or a closed mode, and also in such a case, similar effects can be achieved.

It is possible to use the method disclosed in the present embodiment in combination with the method disclosed in the fifteenth embodiment, the first modified example of the fifteenth embodiment, the second modified example of the fifteenth embodiment, the sixteenth embodiment, the first modified example of the sixteenth embodiment, the seventeenth embodiment, the eighteenth embodiment or the nineteenth embodiment.

Through the combination of the method disclosed in the present embodiment and the above-mentioned embodiment or modified example, it is possible to allow the UEs of a CSG member to stay longer at the hybrid cells than the UEs of a non-CSG member irrespective of the UE state, that is, even when the UE is not only in the RRC_Idle state but also in the RRC_Connected state.

Twenty-First Embodiment

The problem of the present embodiment is described below. For example, there is conceivable the service in which the same owner posses the cells having the same CSG-ID, the cells having the same CSG-ID offer the same charging benefit, or the cells having the same CSG-ID offer the same benefit at a communication speed. As a result, the user may desire to reselect the cell having the same CSG-ID.

In order to solve this problem, in the present embodiment, an offset value (Qoffset_samecsg) adaptable to neighbor cells having the same CSG-ID as that of the serving cell and an offset value (Qoffset_diffcsg) adaptable to neighbor cells having a CSG-ID different from that of the serving cell are provided.

The offsets are individually provided for the neighbor cells having the same CSG-ID as that of the serving cell and the neighbor cells having a CSG-ID different from that of the serving cell are provide as described above, whereby it is possible to vary the criteria for cell reselection between the neighbor cells having the same CSG-ID and the neighbor cells having a different CSG-ID. This enables to more easily reselect the cell having the same CSG-ID as that of the serving cell compared with the cell having a CDG-ID different therefrom.

A specific operation example is described with reference to FIG. 46. The portions of the same step numbers as those of FIG. 41 are not described in FIG. 46. In Step ST4103, the UE performs measurements for cell reselection and performs cell ranking. In Step ST4601, the UE determines whether or not the CSG-ID of the neighbor cell where measurements have been performed is the same as that of the serving cell. In a case of determining that the CSG-ID is the same, the UE proceeds to Step ST4602. In Step ST4602, the UE subtracts Qoffset_samecsg from the measured value. In a case of determining that the CSG-ID is different, the UE proceeds to Step ST4603. In Step ST4603, the UE subtracts Qoffset_diffcsg from the measured value. Cell ranking is performed based on those results obtained by the subtraction, whereby it is possible to vary the measurement criteria for performing cell reselection between the neighbor cells having the same CSG-ID and the neighbor cells having a different CSG-ID. It is also possible to perform cell ranking only in Step ST4602 or Step ST4603 and omit cell ranking in Step ST4103.

As to the value of Qoffset_samecsg and the value of Qoffset_diffcsg, the cell having the same CSG-ID as that of the serving cell is more likely to satisfy the received quality criteria for reselection than the cell having a CSG-ID different therefrom, in accordance with the environment of radio waves of the serving cell and the neighbor cells.

For example, the value of Qoffset_samecsg is set to be smaller than the value of Qoffset_diffcsg (Qoffset_diffcsg>Qoffset_samecsg). As a result, the cell having the same CSG-ID as that of the serving cell is more likely to satisfy the received quality criteria for reselection than the cell having a CSG-ID different therefrom. The received quality criteria is more likely to be satisfied, which facilitates the reselection of a cell having the same CSG-ID.

The criteria for cell ranking may be expressed by equations below.

As to the neighbor cells having the same CSG-ID as that of the serving cell, $$Rn = Qmeas,n - Qoffset\_samecsg,$$

while as to the neighbor cells having a CSG-ID different from that of the serving cell, $$Rn = Qmeas,n - Qoffset\_diffcsg.$$

Qmeas and n represent the measured values of received quality of an n-th cell, and Rn represents the calculation results of received quality in which the offset is taken into consideration.

Further, the Qoffset_samecsg and Qoffset_diffcsg may be set such that only the UEs having a CSG-ID in the whitelist or the UEs registered in a CSG are adaptable thereto. The UEs that have not been registered in a CSG do not desire to reselect the cell having the same CSG-ID. This alleviates the wasteful processing load of the UEs that have not been registered in a CSG, and accordingly an effect of reducing power consumption of the UEs can be achieved.

Alternatively, the criteria for cell ranking may be expressed by equations below.

As to the neighbor cells having the same CSG-ID as that of the serving cell, $$Rn = Qmeas,n - Qoffset - Qoffset\_samecsg,$$

while as to the neighbor cells having a CSG-ID different from that of the serving cell, $$Rn = Qmeas,n - Qoffset - Qoffset\_diffcsg.$$

Qoffset_samecsg and Qoffset_diffcsg can be used only for providing a difference between the case of the same CSG-ID as that of the serving cell and the case of the CSG-ID different from that of the serving cell, in consideration of the conventional Qoffsets.

As the method of notifying Qoffset_samecsg and Qoffset_diffcsg, the first method to the fourth method that are disclosed as the method of notifying the cycle for performing measurements for cell reselection in the fifteenth embodiment can be applied.

In a case where those are applied, similar effects can be achieved.

Further, in the first method, a notification may be made using the SIB4 in the case of using an SIB.

In the SIB4, the conventional offset values are transmitted together with the information of the corresponding cell. As a result of the offset values being transmitted together with the information, cell ranking criteria can be executed together with the conventional offset values for each corresponding cell.

In the method disclosed above, the offset value (Qoffset_samecsg) applied to the neighbor cells having the same CSG-ID as that of the serving cell and the offset value (Qoffset_diffcsg) applied to the neighbor cells having a CSG-ID different from that of the serving cell are provided, so that cell ranking is performed using those and cell reselection is performed.

As another method, there may be provided a difference value (Qoffset_delta2) between the offset value applied to the neighbor cells having the same CSG-ID as that of the serving cell and the offset value applied to the neighbor cells having a CSG-ID different from that of the serving cell. That is, Qoffset_diffcsg and Qoffset_delta2 may be provided to be used in the criteria for cell ranking.

For example, the criteria for cell ranking may be expressed as equations below.

As to the neighbor cells having the same CSG-ID as that of the serving cell, $$Rn = Qmeas,n - (Qoffset\_diffcsg - Qoffset\_delta2),$$

while as to the neighbor cells having a CSG-ID different from that of the serving cell, $$Rn = Qmeas,n - Qoffset\_diffcsg.$$

As a result, similar effects to those of the method of notifying Qoffset_samecsg and Qoffset_diffcsg, which is disclosed above, can be achieved.

As still another method, the offset value applied to the neighbor cells having a CSG-ID different from that of the serving cell may be set as the conventional Qoffset to be used together with the difference value Qoffset_delta2.

For example, the criteria for cell ranking may be expressed as equations below.

As to the neighbor cells having the same CSG-ID as that of the serving cell, $Rn = Q\text{meas},n - (Q\text{offset} - Q\text{offset\_delta2})$, while as to the neighbor cells having a CSG-ID different from that of the serving cell, $Rn = Q\text{meas},n - Q\text{offset}$.

As a result, it is possible not only to achieve similar effects to those of the method disclosed above, but also to reduce the parameters to be set by one. That is, both Qoffset_samecsg and Qoffset_diffcsg are not required to be set, and it suffices that Qoffset_delta2 is set. Therefore, it is possible to reduce the information amount for parameter setting. The above-mentioned methods are applicable as the notification method. As another method, Qoffset and Qoffset_delta2 may be notified individually from different cells. For example, Qoffset is notified from the serving cell while Qoffset_delta2 is notified from the CSG cell. Qoffset_delta2 is the value used only for the CSG cells, and thus it may be notified only from the CSG cells and, in the criteria for cell ranking, recalculation may be performed using the offset value (Qoffset_delta2) for the neighbor cells having the same CSG-ID as that of the serving cell. Recalculation is not required for non-CSG cells, and it suffices that the received quality is measured. This enables to simplify the measurements in cell reselection, and an effect of reducing power consumption of a UE is achieved.

The method disclosed in the present embodiment is also applicable to the method of providing Qoffset for each CSG cell that is described in Non-Patent Document 11, the method of providing one Qoffset to hybrid cells that is described in Non-Patent Document 12, or the method of providing two Qoffsets corresponding to an RSRP range of a macro cell and applying each Qoffset when macro cell RSRP is below or above an RSRP threshold. For example, those Qoffsets may be used as Qoffsets in the criteria for cell ranking disclosed in the present embodiment or may be used in addition to Qoffsets. This also enables to take into consideration each Qoffset that is, for example, provided for each CSG cell, is specific to hybrid or corresponds to the RSRP range of a macro cell.

It is possible to use the method disclosed in the present embodiment in combination with the method disclosed in the fifteenth embodiment, the first modified example of the fifteenth embodiment, the second modified example of the fifteenth embodiment, the sixteenth embodiment, the first modified example of the sixteenth embodiment, the seventeenth embodiment, the eighteenth embodiment, the nineteenth embodiment or the twentieth embodiment.

For example, a specific operation example in a case of the combination with the fifteenth embodiment is described with reference to FIG. 47. The portions of the same step numbers as those of FIG. 42 are not described in FIG. 47. In Step ST4201, the UE determines whether or not the whitelist includes a CSG-ID. Alternatively, the UE determines whether or not the UE has been registered in a CSG cell. The UE executes Step ST4701 in the case where the whitelist includes a CSG-ID or in the case where the UE has been registered in a CSG-ID. In Step ST4701, the UE subtracts Qoffset_samecsg from the measured value in the case where the CSG-ID of the neighbor cell where measurements have been performed is the same as that of the serving cell. On the other hand, in Step ST4701, the UE subtracts Qoffset_diffcsg from the measured value in the case where the CSG-ID has been determined to be different from that of the serving cell. The UE performs cell ranking based on those results of the distraction. In Step ST4702, the UE executes especially nothing in the case where the whitelist includes no CSG-ID or the case where the UE has not been registered in a CSG cell. This enables to vary the determination criteria for performing cell reselection between the neighbor cells having the same CSG-ID and the neighbor cells having a different CSG-ID.

It is possible to use the other embodiment or modified example in combination through similar operations. The method disclosed in the present embodiment is combined with the above-mentioned embodiment or modified example, whereby there is achieved an effect of enabling flexible handling of a difference in environment of respective radio waves that results from a flexible arrangement of HeNBs or HNBs.

The method disclosed in the present embodiment enables the determination criteria for performing cell reselection between the neighbor cells having the same CSG-ID and the neighbor cells having a different CSG-ID. As a result, the cells having the same CSG-ID as that of the serving cell can be more likely to be reselected than the cells having a CSG-ID different therefrom. This allows a user to select the cells having the same CSG-ID continuously, whereby the user can receive the same service of the same CSG-ID. Therefore, an effect of the construction of a mobile communication system easily used by a user can be achieved.

Twenty-Second Embodiment

In order that a CSG member be able to receive the service such as high-speed communications and preferential charging plan for the CSG member in the hybrid cells more rapidly in a longer period of time, the UEs of a CSG member are required to stay longer at hybrid cells than the UEs of a non-CSG member.

Figure 49:
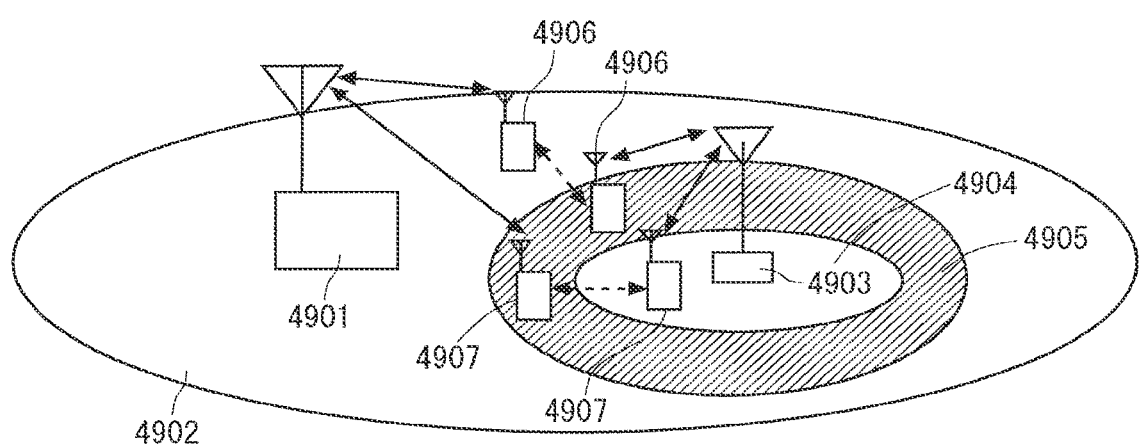
FIG. 49 is a conceptual diagram in a case where UEs of a CSG member are caused to be located longer than UEs of a non-CSG member in a hybrid cell.

FIG. 49 is a conceptual diagram in a case where the UEs of a CSG member are caused to stay longer at hybrid cells than the UEs of a non-CSG member. In the figure, 4901 denotes a non-CSG cell, which is a macro cell (eNB) here. 4902 denotes the coverage of the non-CSG cell 4901. 4903 denotes a HeNB in a hybrid access mode, that is, a hybrid cell. 4904 denotes the coverage that can be accessed in an open access mode as well as a closed access mode by the hybrid cell 4903. 4905 denotes the coverage accessed only in the closed access mode by the hybrid cell 4903. 4906 denotes the UE of the same CSG member as the CSG to which the hybrid cell 4903 belongs. 4907 denotes the UE of a non-CSG member. The UE 4906 of the CSG member communicates with the non-CSG cell 4901 outside the area of the coverage 4905, and the UE 4906 that has moved to the area of the coverage 4905 communicates with the hybrid cell 4903 by cell reselection. The UE 4907 of the non-CSG member still communicates with the non-CSG cell 4901 also in the area of the coverage 4905, and is allowed to communicate with the hybrid cell 4903 by sell reselection only after moving to the coverage 4904.

As described above, when the UEs of a CSG member are caused to stay longer than the UEs of a non-CSG member in the reselection to a hybrid cell or from a hybrid cell, the coverage only in the closed access mode becomes wider than the coverage in the open access mode in some cases. In the above-mentioned case, if the initial transmission power of the UE in starting uplink communication at a hybrid cell is the same between the UEs of a CSG member and the UEs of a non-CSG member, the coverage that can be accessed by the UEs of a CSG member becomes wider, increasing a possibility that the uplink transmission of the UEs of a CSG member may fail.

The process in starting uplink communication includes a random access (RA) procedure. PRACH is used as a physical channel in the RA procedure. The PRACH preamble is used in the initial transmission of PRACH. The initial transmission power Pprach of PRACH is determined as follows (Non-Patent Document 13, Non-Patent Document 14).

$$P\text{prach}=\min\{P\text{cmax},\text{PREAMBLE\_RECEIVED\_TARGET\_POWER}+PL\}\_[\text{dBm}]$$

$$P\text{cmax}=\min\{Pe\text{ max},Pu\text{ max}\}$$

where PREAMBLE_RECEIVED_TARGET_POWER represents the target received power of a base station, PL represents path loss, Pemax represents the maximum permissible power that is set for each cell, and Pu max represents the maximum transmission power of a UE. Pemax is the maximum permissible power that is notified to the UEs as, for example, the broadcast information from each cell and is common to all UEs being served. Pu max is determined in advance correspondingly to a power class of each UE.

As can be seen from the derivation equation for the initial transmission power Pprach of PRACH, the initial transmission power is limited by Pc max in a case of, for example, large PL. Pcmax is limited by Pemax as well, which means that the initial transmission power of PRACH is limited by Pemax. Pemax is common to all UEs being served by the cell, which has the same value for the UEs of a CSG member as well as the UEs of a non-CSG member in a hybrid cell. Accordingly, in a case where the PRACH initial transmission power is limited by Pemax, such as the case of large PL, the UEs of a CSG member as well as the UEs of a non-CSG member cannot perform transmission exceeding the common Pemax. Therefore, there is a high possibility that in hybrid cells, the uplink transmission of the UEs of a CSG member may fail in a case where the coverage that can be accessed by the UEs of a CSG member becomes wider compared with the UEs of a non-CSG member.

This problem arises in any state of the RRC_Idle state and RRC_Connected state. For example, in the RRC_Idle state, this problem arises in a case where the UE of a CSG member performs cell reselection to the hybrid cell, while in the RRC_Connected state, this problem arises in a case where the UE of a CSG member performs HO to the hybrid cell. This problem is not described in any prior art document nor discussed by 3GPP.

The present embodiment discloses, in order to solve this problem, the method capable of varying the initial transmission power of a UE in starting uplink communication between the UEs of a CSG member and the UEs of a non-CSG member. As a specific example, in order to vary the initial transmission power of PRACH between the UEs of a CSG member and the UEs of a non-CSG member, the maximum permissible power used in derivation of the PRACH initial transmission power is individually provided for the UEs of a CSG member and the UEs of a non-CSG member in the hybrid cell. The maximum permissible power for a CSG member is represented by Pemax_csg, whereas the maximum permissible power for a non-CSG member is represented by Pemax_noncsg.

The derivation equation of the initial transmission power Pprach in a hybrid cell is expressed as follows.

$$P\text{prach}=\min\{P\text{cmax},\text{PREAMBLE\_RECEIVED\_TARGET\_POWER}+PL\}\_[\text{dBm}]$$

As to the CSG member, Pc max=min{Pemax_csg, Pu max}, while as to the non-CSG member, Pc max=min{Pemax_noncsg, Pu max}.

As a result, it is possible for the initial transmission power Pprach in a hybrid cell to have the maximum permissible power different between the UEs of a CSG member and the UEs of a non-CSG member in a case of, for example, large PL. In a case where the coverage of the UEs of a CSG member becomes wider compared with the UEs of a non-CSG member in the hybrid cell, it is possible to reduce the uplink transmission failure of the UEs of a CSG member by setting Pemax_csg larger than Pemax_noncsg.

Further, it is possible to vary the initial transmission power for each cell in the both UEs by providing the maximum permissible power for each cell individually for the UEs of a CSG member and the UEs of a non-CSG member. This enables the flexible arrangement of hybrid cells as a system and accordingly enables handling of an increase in the number of HeNB s to be operated in the future.

The method of deriving the uplink initial transmission power in the hybrid cell, which is disclosed here, is applicable in starting uplink communication in the hybrid cell in a case where, for example, the UE of a CSG member performs cell reselection to the hybrid cell in the RRC_Idle state. Further, the method is applicable in starting uplink communication in the hybrid cell to be targeted in a case where, for example, the UE of a CSG member executes HO to the hybrid cell in the RRC_Connected state.

The method of notifying the UEs of the maximum permissible power used in the hybrid cell is described below.

As a first method, the above-mentioned maximum permissible power is notified from the cell in which the power is set to the UEs being served thereby on the PBCH or PDSCH using the BCCH as the broadcast information. The maximum permissible power is notified on the PBCH using the master information (MIB) or on the PDSCH using the system information (SIB). The MIB is mapped on the PBCH, and accordingly the method in which the MIB is used is excellent in that a UE is capable receiving just a small amount of control delay. In the case of using the SIB, the maximum permissible power is notified using the SIB1. This is the method excellent in that the MIB or SIB1 is the absolutely required minimum amount of broadcast information received in a time period from the start of cell search to entering the idle state (RRC-Idle state) and that the control delay of a UE is reduced. Further, the maximum permissible power is notified using the channel for transmitting the broadcast information even in the method of notifying the power in the system information other than the SIB1, which is the method excellent in that all UEs being served can be notified and that radio resources are effectively used.

As a second method, the above-mentioned maximum permissible power is dedicatedly notified to the UEs that perform HO from the serving cell in performing HO on the cell in which the power is set as the target cell. The maximum permissible power may be notified, to the UEs, by being included in the information of the target cell that is required for performing HO or may be notified using another message. It is possible to reduce the number of necessary messages as a result of the maximum permissible power being notified by being included in the information of the target cell, which reduces the time period required for completing HO. On the other hand, in a case of notifying the maximum permissible power using the another message, the message can be notified only in the case of the cell that requires setting of the maximum permissible power. Accordingly, in a case of HO to the cell that does not require the setting of the maximum permissible power, it is possible to reduce the information amount that is required for the notification and reduce the number of messages.

The value of the maximum permissible power (Pemax_csg) for a CSG member and the value of the maximum permissible power (Pemax_noncsg) for a non-CSG member may be determined by a hybrid cell or may be determined by the network side (such as MME and HeNBGW). In the case of the determination by the network side, the maximum permissible power is notified in advance form the network side to the hybrid cell. This notification can be made using the interface S1 of the hybrid cell and the network side.

Through the determination by the network side, the values can be set based on the environment of radio waves of the neighbor cells and load condition (for example, the number of connected users) thereof. This enables reductions in the condition in which communications cannot be made, connection delay due to erroneous communication, an increase of signaling amount, load concentration and the like.

In the above-mentioned methods, the maximum permissible power for a CSG member is represented by Pemax_csg, whereas the maximum permissible power for a non-CSG member is represented by Pemax_noncsg. As another method, a maximum permissible power (Pemax_common) common to the CSG member and non-CSG member may be provided and a difference (Pemax_delta) of the maximum permissible power between the CSG member and non-CSG member may be provided. An example of the derivation equation for the initial transmission power Pprach in the hybrid cell on this occasion is expressed as follows.

$$Pprach=\min\{Pcmax, PREAMBLE\_RECEIVED\_TARGET\_POWER+PL\}\_[dBm]$$

As to the CSG member, Pcmax=min{Pemax_common+Pemax_delta, Pumax}, while as to the non-CSG member, Pcmax=min{Pemax_common, Pumax}. This enables the UEs of a CSG member and the UEs of a non-CSG member to have different maximum permissible power, and accordingly similar effects to those of the above-mentioned methods are achieved.

Note that Pemax set as the conventional maximum permissible power may be the common parameter Pemax_common. As a result, the method of deriving the initial transmission power of a non-CSG member does not need to be changed from the current method. Therefore, an effect of preventing a mobile communication system from becoming intricate can be achieved.

Further, as another method, Pu max may be provided individually for a CSG member and a non-CSG member. Pu max represents the maximum transmission power of a UE, which is determined in advance in accordance with the power class of each UE. Pumax may be determined in advance for a CSG member (Pumax_csg) and a non-CSG member (Pumax_noncsg) in accordance with the power class of each UE. An example of the derivation equation for the initial transmission power Pprach in the hybrid cell on this occasion is expressed as follows.

$$Pprach=\min\{Pcmax, PREAMBLE\_RECEIVED\_TARGET\_POWER+PL\}\_[dBm]$$

As to the CSG member, Pcmax=min{Pemax, Pumax_csg}, while as to the non-CSG member, Pcmax=min{Pemax, Pumax_noncsg}.

Accordingly, Pemax can be set to be common to all UEs being served, and thus what is required is the setting little different from the conventional setting.

A static value may be taken as a mobile communication system. The static value refers to a value known to a UE and a base station as a mobile communication system and a known value described in a specification. A radio signal does not occur between a base station (on a network side) and a UE with the use of a static value. Accordingly, an effect can be achieved in that radio resources are effectively used. Further, the static value is a value determined in a static manner, with the result that an effect of preventing erroneous reception of a radio signal from occurring can be achieved.

Described below is a specific operation example in a case where the maximum permissible power for a CSG member is set as Pemax_csg and the maximum permissible power for a non-CSG member is set as Pemax_noncsg in hybrid cells.

Figure 50:
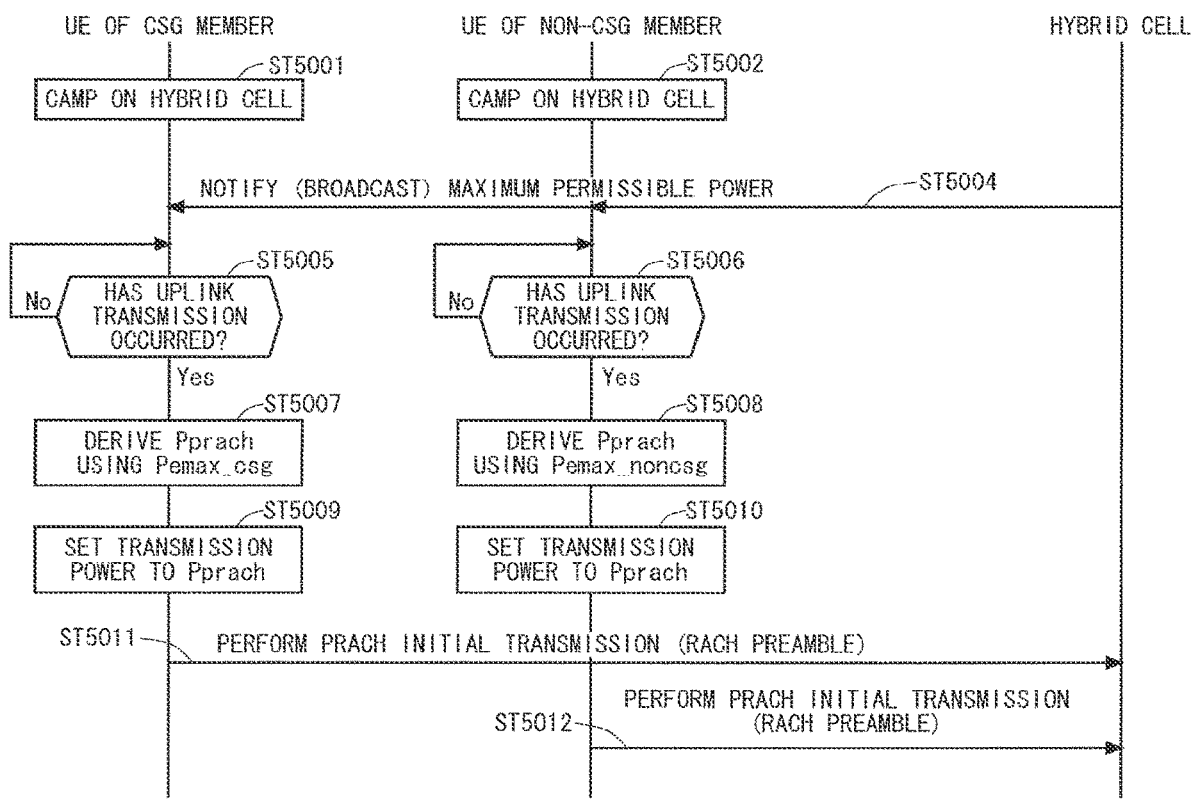
FIG. 50 shows an example of a procedure before PRACH initial transmission in a hybrid cell.

FIG. 50 shows an example of the process until the PRACH initial transmission in hybrid cells.

First, the UE of a CSG member is described. In Step ST5001, the UE of a CSG member camps on the hybrid cell after, for example, cell reselection. The hybrid cell transmits the broadcast information in Step ST5004, and the UE of a CSG member receives the broadcast information. The broadcast information includes the maximum permissible power. In a case where uplink transmission occurs in the UE of a CSG member in Step ST5005, the UE proceeds to Step ST5007, and derives the uplink initial transmission power using the maximum permissible power for the UE of a CSG member (Pemax_csg). The UE of a CSG member sets the uplink initial transmission power to the transmission power in Step ST5009 and then starts the uplink transmission in Step ST5011.

Next, the UE of a non-CSG member is described. In Step ST5002, the UE of a non-CSG member camps on a hybrid cell after, for example, cell reselection. The hybrid cell transmits the broadcast information in Step ST5004, and the UE of a non-CSG member receives the broadcast information. The broadcast information includes the maximum permissible power. In a case where uplink transmission occurs in the UE of a non-CSG member in Step ST5006, the UE proceeds to Step ST5008, and derives the uplink initial transmission power using the maximum permissible power for the UE of a non-CSG member (Pemax_noncsg). The UE of a non-CSG member sets the uplink initial transmission power to the transmission power in Step ST5010 and then starts the uplink transmission in Step ST5012.

Note that the timing at which uplink transmission occurs differs for each UE, and accordingly the timing of uplink initial transmission differs for each UE. Therefore, for example, Step ST5012 may be executed subsequently to Step ST5011 as shown in the figure, or Step ST5011 may be executed subsequently to Step ST5012.

As described above, the maximum permissible power used for deriving the uplink initial transmission power is varied in accordance with whether the UE that is camping on the hybrid cell belongs to a CSG member or a non-CSG member, whereby it is possible to increase the transmission power of uplink transmission for the UE of a CSG member even in a case where the UE of a CSG member camps on the area that can be accessed. This enables to secure the uplink received power sufficient for communications in hybrid cells.

The method disclosed in the present embodiment enables to solve a problem that the uplink transmission of the UEs of a CSG member fails in a case where the coverage of the UEs of a CSG member becomes wider compared with the UEs of a non-CSG member in hybrid cells.

In addition, it is possible for the UEs of a CSG member to stay longer at hybrid cells than the UEs of a non-CSG member, and accordingly the CSG member can receive the service such as high-speed communications and preferential charging plan for the CSG member in hybrid cells more rapidly in a longer period of time.

Further, it is possible to provide lower maximum permissible power to the UEs of a non-CSG member compared with the UEs of a CSG member, and thus the UEs of a non-CSG member can be prevented from being provided with transmission power larger than necessary in a case of large PL, which enables to reduce the uplink interference power.

Twenty-Third Embodiment

In order to allow the initial transmission power of the UE when starting uplink communication to vary between the UEs of a CSG member and the UEs of a non-CSG member, in the present embodiment, the criteria difference between the UEs having a CSG-ID in the whitelist or the UEs registered in a CSG and the other UEs in cell reselection.

As a specific example, a difference between the threshold (S_intrasearch) for cell reselection in case where the whitelist includes no CSG-ID and the threshold (S_intrasearchCSG) for cell reselection in a case where the whitelist includes a CSG-ID or the UE has been registered in a CSG, which are disclosed in the seventeenth embodiment, is used.

Further, as another specific example, a difference between the offset value (Qoffset_csg_in) applied to the UEs having a CSG-ID in the whitelist or the UEs registered in a CSG and the offset value (Qoffset_noncsg_in) applied to the other UEs, which are disclosed in the eighteenth embodiment, is used. This difference may be the difference value (Qoffset_delta).

Further, as still another specific example, a difference between the offset value (Qoffset_csg_out) applied to the UEs having a CSG-ID in the whitelist or the UEs registered in a CSG and the offset value (Qoffset_noncsg_out) applied to the other UEs, which are disclosed in the nineteenth embodiment, is used. This difference may be a difference value.

It suffices that those difference values are used as the difference values of the maximum permissible power used in deriving the PRACH initial transmission power in hybrid cells between the UEs of a CSG member and the UEs of a non-CSG member.

In the case of the threshold (S_intrasearch) for cell reselection when the whitelist includes no CSG-ID and the threshold (S_intrasearchCSG) for cell reselection when the whitelist includes a CSG-ID, which are disclosed in the seventeenth embodiment, this difference is used. The difference value is S_intrasearch_delta.

$$S\_intrasearch\_delta = S\_intrasearch - S\_intrasearchCSG$$

This value is Pemax_delta (=Pemax_csg−Pemax_noncsg) that is a difference value of the maximum permissible power used in deriving the PRACH initial transmission power between the UEs of a CSG member and the UEs of a non-CSG member.

The value may be expressed by $$Pemax\_delta = S\_intrasearch\_delta$$

or $$Pemax\_delta = |S\_intrasearch\_delta|.$$

In the case of the offset value (Qoffset_csg_in) applied to the UEs having a CSG-ID in the whitelist or the UEs registered in a CSG and the offset value (Qoffset_noncsg_in) applied to the other UEs, which are disclosed in the eighteenth embodiment, taking the difference value as Qoffset_delta (=Qoffset_noncsg_in−Qoffset_csg_in), the value may be expressed by $$Pemax\_delta = Qoffset\_delta$$

or $$Pemax\_delta = |Qoffset\_delta|.$$

In the case of the offset value (Qoffset_csg_out) applied to the UEs having a CSG-ID in the whitelist or the UEs registered in a CSG and the offset value (Qoffset_noncsg_out) applied to the other UEs, which are disclosed in the nineteenth embodiment, taking the difference value as Qoffset_delta (=Qoffset_csg_out−Qoffset_noncsg_out), the value may be expressed by $$Pemax\_delta = Qoffset\_delta$$

or $$Pemax\_delta = |Qoffset\_delta|.$$

Described below is a specific operation example of the method of using the criteria difference applied to the UEs having a CSG-ID in the whitelist or the UEs registered in a CSG and the other UEs in the cell reselection, in deriving the maximum permissible power in hybrid cells.

Figure 51:
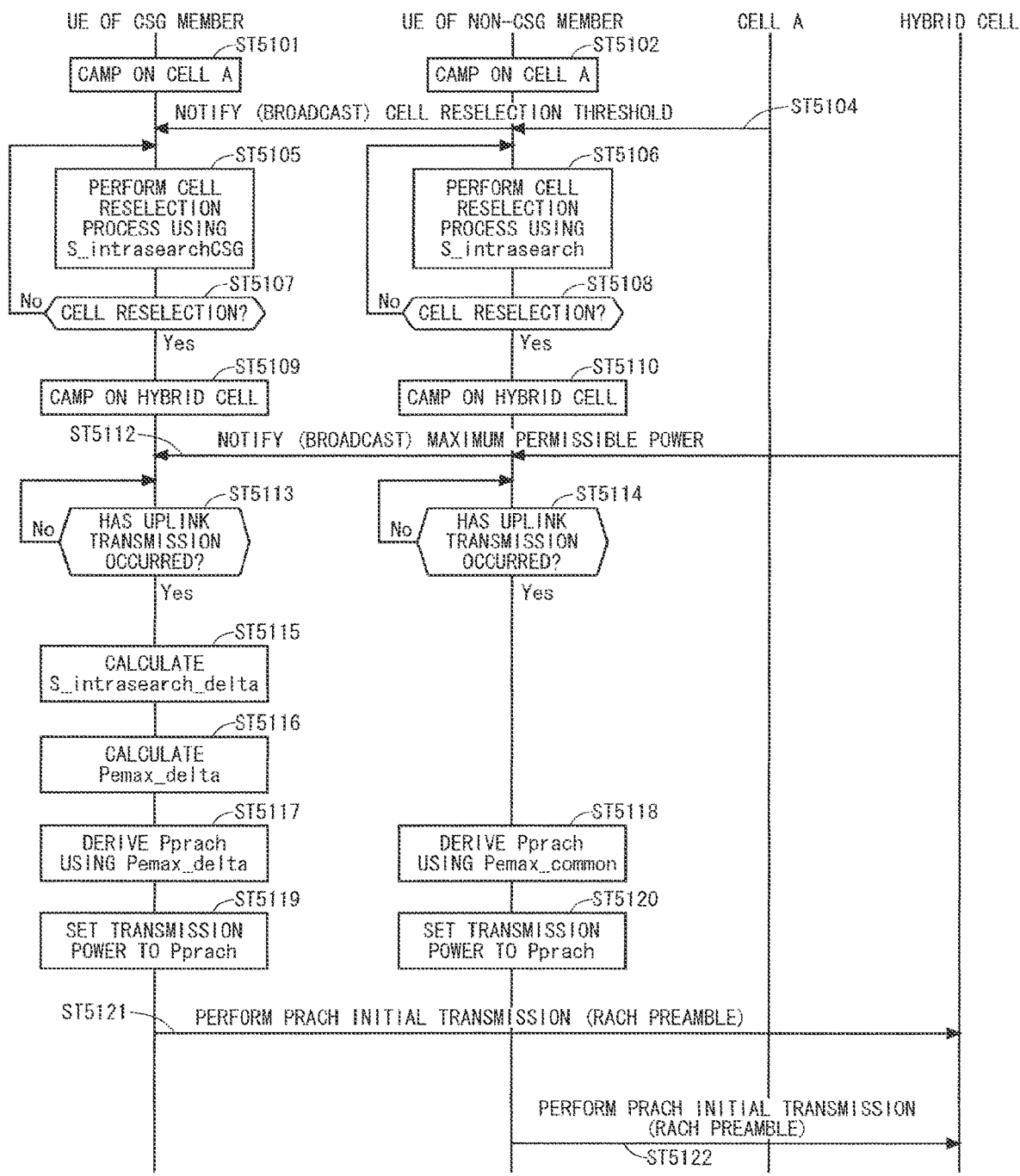
FIG. 51 schematically shows a procedure before PRACH initial transmission in a hybrid cell in a case where a difference of cell reselection thresholds is used.

FIG. 51 shows the outline of the process until the PRACH initial transmission in hybrid cells in a case where the difference of cell reselection threshold is used.

First, the UE of a CSG member is described. In Step ST5101, the UE of a CSG member camps on a cell A after, for example, cell reselection. The cell A transmits the broadcast information in Step ST5104, and the UE of a CSG member receives the broadcast information. The broadcast information includes the cell reselection thresholds. In Step ST5105, the UE of a CSG member performs cell reselection process using, among the received cell reselection thresholds, the cell reselection threshold (S_intrasearchCSG) in a case where the UE has a CSG-ID in the whitelist or has been registered in a CSG. In Step ST5107, the UE determines whether the cell reselection criteria are matched, and the UE proceeds to Step ST5109 in a case where they are matched or returns to Step ST5105 in a case where they are not matched. In a case where the UE of a CSG member performs reselection to hybrid cell as a result of the cell reselection criteria being matched in Step ST5107, the UE camps on the hybrid cell in Step ST5109.

The hybrid cell transmits the broadcast information in Step ST5112, and the UE of a CSG member receives the broadcast information. The broadcast information includes the maximum permissible power. Note that the maximum permissible transmission power to be broadcast in this case does not include the maximum permissible transmission power that is set differently for CSG member and non-CSG member as disclosed in the twenty-second embodiment, and merely includes the conventional maximum permissible power common to cells. In a case where uplink transmission occurs in the UE of a CSG member in Step ST5113, the UE proceeds to Step ST5115, and derives the difference value (S_intrasearch_delta) between the threshold value (S_intrasearch) for cell reselection in the case where the whitelist includes no CSG-ID and the threshold (S_intrasearchCSG) for cell reselection in the case where the whitelist includes a CSG-ID. In Step ST5116, the UE of a CSG member takes the difference value (S_intrasearch_delta) as a difference (Pemax_delta) of transmission power for the UE of a CSG member and UE of a non-CSG member, and derives the uplink transmission power (Pprach) using the difference value (Pemax_delta) in Step ST5117. In Step ST5119, the UE of a CSG member sets the uplink initial transmission power to the transmission power and starts uplink transmission in Step ST5121.

Next, the UE of a non-CSG member is described. In Step ST5102, the UE of a non-CSG member camps on the cell A after, for example, cell reselection. The cell A transmits the broadcast information in Step ST5104, and the UE of a non-CSG member receives the broadcast information. The broadcast information includes the cell reselection thresholds. In Step ST5106, the UE of a non-CSG member performs the cell reselection process using, among the received cell reselection thresholds, the threshold (S_intrasearch) for cell reselection in a case where the whitelist includes no CSG-ID. In Step ST5108, the UE determines whether or not the cell reselection criteria are matched, and the UE proceeds to Step ST5110 in a case where they are matched or returns to Step ST5106 in a case where they are not matched. In a case where the UE of a non-CSG member performs reselection to a hybrid cell as a result of the cell reselection criteria being matched in Step ST5108, the UE camps on the hybrid cell in Step ST5110.

The UE of a non-CSG member that has a CSG-ID in the whitelist but is a non-CSG member of the hybrid cell also has to perform reselection of a hybrid cell in an open access mode, and accordingly in the end, performs cell reselection process using the threshold (S_intrasearch) for cell reselection in a case where the whitelist includes no CSG-ID, to thereby determine whether or not the cell reselection criteria are matched. In the case of the UE that has a CSG-ID in the whitelist but is a non-CSG member of the hybrid cell, for example, even though it initially performs the cell reselection process using S_intrasearchCSG, the UE may be configured so as to receive the CSG-ID of the cell and check the CSG-ID, and in a case where the CSG-ID is not matched, to perform cell reselection using the cell reselection process Step ST5106 for a non-CSG member.

The hybrid cell transmits the broadcast information in Step ST5112, and the UE of a non-CSG member receives the broadcast information. The broadcast information includes the maximum permissible power. Note that the maximum permissible transmission power to be broadcast in this case does not include the maximum permissible transmission power that is set differently for CSG member and non-CSG member as disclosed in the twenty-second embodiment, and merely includes the conventional maximum permissible power common to cells. In a case where uplink transmission occurs in the UE of a CSG member in Step ST5114, the UE proceeds to Step ST5118, and in Step ST5118, derives the uplink initial transmission power (Pprach) using the conventional maximum permissible power (Pemax_common) common to cells that has been broadcast from the hybrid cell in Step ST5112. In Step ST5120, the UE of a non-CSG member sets the uplink initial transmission power to the transmission power and starts uplink transmission in Step ST5122.

Note that the timing at which uplink transmission occurs differs for each UE, and thus the timing of uplink initial transmission differs for each UE. Accordingly, for example, Step ST5122 may be executed subsequently to Step ST5121 as shown in the figure, or Step ST5121 may be executed subsequently to Step ST5122.

As described above, it is possible to employ the method of varying the maximum permissible power used in deriving the uplink initial transmission power in accordance with whether the UE camping on a hybrid cell belongs to a CSG member or a non-CSG member, with the use of a criteria difference applied for the UEs having a CSG-ID in the whitelist or the UEs registered in a CSG and the other UEs in cell reselection. In this case, only the UE of a CSG member is allowed to increase the transmission power for uplink transmission even when the UE of a CSG member camps on the area that can be accessed, whereby it is possible to secure the uplink received power sufficient for communications in a hybrid cell.

The methods disclosed in the seventeenth embodiment, the eighteenth embodiment, the nineteenth embodiment and the twentieth embodiment can be used, not only limited to the specific example described above.

Not limited to the above-mentioned example, the PRACH initial transmission power may be derived individually for the UEs of a CSG member and the UEs of a non-CSG member based on the difference of the setting parameters that affect the coverage size of a hybrid cell among the criteria for cell reselection.

Further, in a case where multiple criteria (for example, such as threshold and offset for cell reselection) are set in cell reselection, which criteria are used may be determined in advance. For example, priority may be provided as to which criteria are used among multiple criteria. This enables to use other criteria in the priority order even when any of those criteria is not set. As another example, which criteria among multiple criteria are used in accordance with the difference value thereof may be determined. For example, the criteria having the largest difference value are used. As still another example, an average value of the difference values of multiple criteria may be used.

Further, as another method, the serving cell may determine which criteria among multiple criteria are used and notify the UE of the determined criteria. As the notification method, the criteria may be notified as the broadcast information. The criteria may be determined by the network side (such as MME and HeNBGW) not by the serving cell, and then may be notified to the UE through the serving cell.

The interface S1 may be used in the notification to the serving cell from the network side. This enables flexible handling of an arrangement of cells including a hybrid cell. In a case where determination is made by the network side, it is possible to set a value based on the environment of radio waves of neighbor cells and a load condition (for example, such as the number of connected equipments). This enables to reduce the situation in which communications cannot be performed, connection delay due to erroneous communication, an increase in signaling amount, load concentration and the like, as a system.

The method described above uses the criteria in cell reselection. Accordingly, it is possible to use the method in a case where a hybrid cell is reselected using the criteria. In other case, for example, in a case where the UE moves to a hybrid cell by HO, the method disclosed in the twenty-second embodiment may be applied such that the setting value is notified dedicatedly to the UEs that perform HO from the serving cell.

The method disclosed in the present embodiment enables to vary the initial transmission power in starting uplink communication between the UEs of a CSG member and the UEs of a non-CSG member, whereby it is possible to allow the UEs of a CSG member to stay longer at hybrid cells than the UEs of a non-CSG member.

Further, in order to enable the initial transmission power of the UE in starting uplink communication between the UEs of a CSG member and the UEs of a non-CSG member, the maximum permissible power used in deriving the PRACH initial transmission power in the hybrid cell is provided individually for the UEs of a CSG member and the UEs of a non-CSG member and is notified from the hybrid cell to the UEs being served thereby. However, the maximum permissible power used in deriving the PRACH initial transmission power in the hybrid cell is not required to be provided individually for the UEs of a CSG member and the UEs of a non-CSG member, and accordingly does not need to be notified to the UEs being served. This enables to reduce the number of parameters required to be broadcast in the hybrid cell, and further reduce the information amount for signaling.

The methods disclosed in the seventeenth embodiment to the twenty-third embodiment are applicable not only in a case (mixed carrier) where an open mode cell (non-CSG cell) and a CSG cell coexist in the same frequency carrier (same frequency layer) but also in a case (dedicated carrier) where only a CSG cell exists in the same frequency carrier (same frequency layer). In addition, those methods are applicable if a hybrid cell exists in the same frequency layer.

Further, those methods are applicable not only to the cell reselection and HO in the same frequency layer (intra-frequency) but also to those between the frequency layers (inter-frequency) or between systems (RATs) (inter-RAT).

While the LTE using a HeNB in which a CSG is used is described above, the present invention is also applicable to the UMTS using a HNB in which a CSG is used, a HeNB in which a CSG is not used, a HNB, and a base station having a small radius (also referred to as pico cell or macro cell). The first modified example of the sixteenth embodiment is capable of achieving the following effect in addition to the effects of the sixteenth embodiment. It is possible to reduce the power consumption of the UE in a case where the UE has not been registered in the CSG cell located in the vicinity of the present serving cell. Further, the solution of the modified example of the sixteenth embodiment is excellent in that the above-mentioned effect is achieved even if the network side (such as a base station) does not recognize which CSG cell a relevant UE is registered in (which CSG-ID is included in the whitelist). As a result, the UE does not need to notify the base station of the CSG-ID in the whitelist, which enables effective use of radio resources. Further, an effect that the processing load of a base station is alleviated can be achieved in that the base station does not need to manage a CSG-ID in the whitelist of the UEs being served thereby.

While the case where the CSG-ID that is the information broadcast by a CSG cell or cell and the tracking area code (TAC) broadcast by a CSG cell or cell are associated with each other is mainly described above, needless to say, the present invention is applicable even in a case where the CSG-ID and the TAC are not associated with each other.

In the case where they are not associated with each other, for example, whether or not registration has been made with the CSG and whether or not the TA needs to be updated may be determined individually as described below.

In the cell reselection, in a case of determining whether or not the own UE has been registered in the selected cell, determination is made based on whether or not the CSG-ID received in the broadcast information of the cell is included in the whitelist of the own UE. In the case where the CSG-ID received in the broadcast information of the cell is included in the whitelist, it is determined that the own UE has been registered in the selected cell. That is, it is determined that the cell can serve a "suitable cell" for the UE. On the other hand, in a case where the CSG-ID received in the broadcast information of the cell is not included in the whitelist of the own UE, it is determined that the own UE has not been registered in the selected cell. That is, it is determined that the cell is unable to serve as a "suitable cell" for the UE.

Further, in the cell reselection, in a case of determining whether or not the TA needs to be updated, determination is made based on whether or not the TAC received in the broadcast information of the cell is included in one or a plurality of TACs (hereinafter, TA list) stored in the own UE. When the TAC received from the broadcast information of the cell is included in the TA list in the own UE, it is determined that the TA does not need to be updated and TAU is unnecessary. On the other hand, when the TAC received in the broadcast information of the cell is not included in the TA list in the own UE, it is determined that the TA needs to be updated and TAU is required to be performed.

As a specific example, the above corresponds to, for example, Step ST1406 to Step ST1409 of FIG. 14 or Step ST1607 to Step ST1610 of FIG. 16.

INDUSTRIAL APPLICABILITY

While the LTE system (E-UTRAN) is mainly described in the present invention, the present invention is applicable to the W-CDMA system (UTRAN, UMTS) and LTE-Advanced. Further, the present invention is applicable to a mobile communication system in which a closed subscriber group (GSG) is introduced and a communication system in which an operator identifies subscribers and the identified subscribers are allowed access as in the CSG.

The invention claimed is:

1. A communication method performed in a mobile communication system which comprises specific user equipments, base stations and a radio network controller managing an access made by the user equipments to the base stations and a tracking area for tracking location of the user equipments, the communication method comprising:
   requesting an update of a tracking area from the user equipments to the radio network controller through the base stations manually selected by the user equipments;
   checking in the radio network controller whether access made by the user equipments to the base stations is allowed;
   rejecting an update of a tracking area from the radio network controller to the user equipments through the base stations in a case where access made by the user equipments to the base stations is not allowed; and
   selecting base stations to be connected except for the base stations to which access made by the user equipments is not allowed in a case where the update of the tracking area is rejected.

2. A mobile communication system comprising specific user equipments, base stations and a radio network controller managing an access made by the user equipments to the base stations and a tracking area for tracking location of the user equipments, wherein the user equipments comprise a processor coupled to a memory and configured to:
   request an update of a tracking area to the radio network controller through the base stations manually selected by the user equipments, and
   select base stations to be connected except for the base stations to which access made by the user equipments is not allowed in a case where the update of the tracking area is rejected, and the radio network controller comprises a processor coupled to a memory and configured to:

check whether access made by the user equipments to the base stations is allowed, and reject an update of a tracking area to the user equipments through the base stations in a case where access made by the user equipments to the base stations is not allowed.

3. A user equipment for a mobile communication system comprising specific user equipments, base stations and a radio network controller managing an access made by the user equipments to the base stations and a tracking area for tracking location of the user equipments, the user equipment comprising a processor coupled to a memory and configured to:

request an update of a tracking area to the radio network controller through the base stations manually selected by the user equipments; and select base stations to be connected except for the base stations to which access made by the user equipments is not allowed in a case where the update of the tracking area is rejected.

4. A radio network controller for a mobile communication system comprising specific user equipments, base stations and the radio network controller managing an access made by the user equipments to the base stations and a tracking area for tracking location of the user equipments, the radio network controller comprising a processor coupled to a memory and configured to:

check whether access made by the user equipments to the base stations is allowed in a case where an update of a tracking area through the base stations manually selected by the user equipments is requested; and reject an update of a tracking area to the user equipments through the base stations in a case where access made by the user equipments to the base stations is not allowed.

5. The radio network controller according to claim 4, wherein the memory stores a white list that is used, in part, to check whether access made by the user equipments is allowed.

* * * * *